US012353181B2

(12) United States Patent
Cella et al.

(10) Patent No.: US 12,353,181 B2
(45) Date of Patent: *Jul. 8, 2025

(54) SYSTEMS FOR MONITORING AND MANAGING INDUSTRIAL SETTINGS

(71) Applicant: STRONG FORCE IOT PORTFOLIO 2016, LLC, Fort Lauderdale, FL (US)

(72) Inventors: Charles Cella, Pembroke, MA (US); Teymour El-Tahry, Detroit, MI (US); Richard Spitz, Fort Lauderdale, FL (US); Jeffrey P. McGuckin, Philadelphia, PA (US); Gerald William Duffy, Jr., Philadelphia, PA (US)

(73) Assignee: STRONG FORCE IOT PORTFOLIO 2016, LLC, Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/685,489

(22) Filed: Mar. 3, 2022

(65) Prior Publication Data
US 2022/0191282 A1  Jun. 16, 2022

Related U.S. Application Data

(63) Continuation of application No. 17/333,507, filed on May 28, 2021, which is a continuation of application No. PCT/US2019/059088, filed on Oct. 31, 2019.
(Continued)

(51) Int. Cl.
G05B 19/042 (2006.01)
G05B 19/418 (2006.01)
(Continued)

(52) U.S. Cl.
CPC ....... G05B 19/042 (2013.01); G05B 19/4183 (2013.01); G05B 19/41845 (2013.01);
(Continued)

(58) Field of Classification Search
CPC .............. G05B 19/042; G05B 19/4183; G05B 19/41845; G05B 19/4185;
(Continued)

(56) References Cited

U.S. PATENT DOCUMENTS

| | | | |
|---|---|---|---|
| 4,070,647 | A | 1/1978 | Robson |
| 4,074,142 | A | 2/1978 | Jackson |

(Continued)

FOREIGN PATENT DOCUMENTS

| | | | |
|---|---|---|---|
| CA | 2323380 | A1 | 4/2001 |
| CA | 2639281 | A1 | 7/2009 |

(Continued)

OTHER PUBLICATIONS

Abstract of Cachada et al., "Maintenance 4.0: Intelligent and Predictive Maintenance System Architecture," Oct. 25, 2018, 1 page.
(Continued)

Primary Examiner — Michael A Keller
(74) Attorney, Agent, or Firm — RMCK Law Group, PLC

(57) ABSTRACT

A system can include a backend system and a sensor kit configured to monitor an industrial setting. The sensor kit can include an edge device and a plurality of sensors that capture sensor data and transmit the sensor data via a self-configuring sensor kit network. At least one sensor can capture sensor measurements and output instances of sensor data, generate and output reporting packets, and transmit the reporting packets to the edge device via the self-configuring sensor kit network in accordance with a first communication protocol. The edge device receives reporting packets from the plurality of sensors via the self-configuring sensor kit network and transmits sensor kit packets to the backend system via a public network. The backend system can
(Continued)

include a processing system and a storage system, where the processing system performs backend operations on the sensor data and the storage systems stores the sensor data.

27 Claims, 22 Drawing Sheets

Related U.S. Application Data

(60) Provisional application No. 62/914,998, filed on Oct. 14, 2019, provisional application No. 62/869,011, filed on Jun. 30, 2019, provisional application No. 62/827,166, filed on Mar. 31, 2019, provisional application No. 62/791,878, filed on Jan. 13, 2019.

(51) Int. Cl.
| | |
|---|---|
| *G06N 5/04* | (2023.01) |
| *G06N 20/00* | (2019.01) |
| *G16Y 20/10* | (2020.01) |
| *H04L 41/08* | (2022.01) |
| *H04L 41/0806* | (2022.01) |
| *H04L 41/16* | (2022.01) |
| *H04L 67/00* | (2022.01) |
| *H04L 67/12* | (2022.01) |
| *H04N 19/136* | (2014.01) |
| *H04W 4/38* | (2018.01) |
| *H04W 40/02* | (2009.01) |
| *G06F 18/21* | (2023.01) |
| *H04N 19/50* | (2014.01) |
| *H04W 84/22* | (2009.01) |

(52) U.S. Cl.
CPC ........... *G05B 19/4185* (2013.01); *G06N 5/04* (2013.01); *G06N 20/00* (2019.01); *G16Y 20/10* (2020.01); *H04L 41/0806* (2013.01); *H04L 41/0809* (2013.01); *H04L 41/0886* (2013.01); *H04L 41/16* (2013.01); *H04L 67/12* (2013.01); *H04L 67/34* (2013.01); *H04N 19/136* (2014.11); *H04W 4/38* (2018.02); *H04W 40/02* (2013.01); *G05B 2219/31449* (2013.01); *G06F 18/2193* (2023.01); *H04N 19/50* (2014.11); *H04W 84/22* (2013.01)

(58) Field of Classification Search
CPC ....... G05B 2219/31449; G06K 9/6265; G06N 5/04; G06N 20/00; G06N 3/0427; G16Y 20/10; H04L 41/0803; H04L 41/0806; H04L 41/0809; H04L 41/0886; H04L 41/16; H04L 41/087; H04L 41/0846; H04L 41/40; H04L 67/12; H04L 67/125; H04L 67/34; H04L 67/565; H04L 67/5651; H04L 69/04; H04L 63/1416; H04N 19/50; H04W 4/38; H04W 40/02; H04W 84/22; Y02P 90/80; G05D 1/0287; G06F 16/29; G06F 3/017; G06F 3/0481; G06Q 10/067; G06Q 10/087; H05K 13/0895

See application file for complete search history.

(56) References Cited

U.S. PATENT DOCUMENTS

| | | |
|---|---|---|
| 4,605,928 A | 8/1986 | Georgiou |
| 4,620,304 A | 10/1986 | Faran, Jr. et al. |
| 4,621,263 A | 11/1986 | Takenaka et al. |
| 4,724,420 A | 2/1988 | Woodard |
| 4,740,736 A | 4/1988 | Sidman et al. |
| 4,852,083 A | 7/1989 | Niehaus et al. |
| 5,051,981 A | 9/1991 | Kline |
| 5,072,366 A | 12/1991 | Simcoe |
| 5,123,011 A | 6/1992 | Hein et al. |
| 5,157,629 A | 10/1992 | Sato et al. |
| 5,166,926 A | 11/1992 | Cisneros et al. |
| 5,365,428 A | 11/1994 | DePinto et al. |
| 5,469,150 A | 11/1995 | Sitte |
| 5,541,914 A | 7/1996 | Krishnamoorthy et al. |
| 5,566,092 A | 10/1996 | Wang et al. |
| 5,568,356 A | 10/1996 | Schwartz |
| 5,621,345 A | 4/1997 | Lee et al. |
| 5,629,870 A | 5/1997 | Farag et al. |
| 5,650,951 A | 7/1997 | Staver |
| 5,680,025 A | 10/1997 | Bowers, III et al. |
| D395,291 S | 6/1998 | Mason et al. |
| 5,761,940 A | 6/1998 | Moore, Jr. et al. |
| 5,842,034 A | 11/1998 | Bolstad et al. |
| 5,854,994 A | 12/1998 | Canada et al. |
| 5,874,790 A | 2/1999 | Macks |
| 5,875,420 A | 2/1999 | Piety et al. |
| 5,892,468 A | 4/1999 | Wilson et al. |
| 5,895,857 A | 4/1999 | Robinson et al. |
| 5,922,963 A | 7/1999 | Piety et al. |
| 5,978,389 A | 11/1999 | Chen |
| 5,982,776 A | 11/1999 | Manning et al. |
| 6,108,616 A | 8/2000 | Borchers et al. |
| 6,141,355 A | 10/2000 | Palmer et al. |
| 6,184,713 B1 | 2/2001 | Agrawal et al. |
| 6,229,464 B1 | 5/2001 | McNeely |
| 6,257,066 B1 | 7/2001 | Chandler et al. |
| 6,301,514 B1 | 10/2001 | Canada et al. |
| 6,313,772 B1 | 11/2001 | McNeely |
| 6,421,341 B1 | 7/2002 | Han et al. |
| 6,434,512 B1 | 8/2002 | Discenzo |
| 6,466,277 B1 | 10/2002 | McNeely |
| 6,484,109 B1 | 11/2002 | Lofall |
| 6,532,392 B1 | 3/2003 | Eryurek et al. |
| 6,554,978 B1 | 4/2003 | Vandenborre |
| 6,581,048 B1 | 6/2003 | Werbos |
| 6,633,782 B1 | 10/2003 | Schleiss et al. |
| 6,650,142 B1 | 11/2003 | Agrawal et al. |
| 6,678,268 B1 | 1/2004 | Francis et al. |
| 6,703,860 B1 | 3/2004 | Agrawal et al. |
| 6,737,958 B1 | 5/2004 | Satyanarayana |
| 6,744,472 B1 | 6/2004 | MacInnis et al. |
| 6,789,030 B1 | 9/2004 | Coyle et al. |
| 6,832,521 B1 | 12/2004 | Courtney et al. |
| 6,856,600 B1 | 2/2005 | Russell et al. |
| 6,873,620 B1 | 3/2005 | Coveley et al. |
| 6,970,758 B1 | 11/2005 | Shi et al. |
| 6,982,974 B1 | 1/2006 | Saleh et al. |
| 7,018,800 B2 | 3/2006 | Huisenga et al. |
| 7,027,981 B2 | 4/2006 | Bizjak |
| 7,043,728 B1 | 5/2006 | Galpin |
| 7,135,888 B1 | 11/2006 | Hutton et al. |
| 7,142,990 B2 | 11/2006 | Bouse et al. |
| 7,225,037 B2 | 5/2007 | Shani |
| 7,289,857 B2 | 10/2007 | Nauck et al. |
| 7,298,296 B1 | 11/2007 | Kamath |
| 7,546,377 B2 | 6/2009 | Venkatramani et al. |
| 7,710,153 B1 | 5/2010 | Masleid et al. |
| 7,717,849 B2 | 5/2010 | Mathew et al. |
| D619,614 S | 7/2010 | O'Mullan et al. |
| 7,817,743 B2 | 10/2010 | Stojanovic et al. |
| 7,862,084 B2 | 1/2011 | Maeda et al. |
| 7,882,394 B2 | 2/2011 | Hosek et al. |
| D640,264 S | 6/2011 | Fujii |
| 7,970,087 B2 | 6/2011 | Millman |
| 8,026,933 B2 | 9/2011 | Baier et al. |
| 8,057,646 B2 | 11/2011 | Hinatsu et al. |
| 8,060,017 B2 | 11/2011 | Schlicht et al. |
| 8,102,188 B1 | 1/2012 | Chan et al. |
| 8,200,775 B2 | 6/2012 | Moore |
| 8,352,149 B2 | 1/2013 | Meacham |
| 8,380,652 B1 | 2/2013 | Francis, Jr. |
| 8,381,053 B1 | 2/2013 | Joshi |
| 8,566,602 B2 | 10/2013 | Aaron |
| 8,571,835 B2 | 10/2013 | Farrow et al. |

(56) References Cited

U.S. PATENT DOCUMENTS

| | | |
|---|---|---|
| 8,571,904 B2 | 10/2013 | Guru et al. |
| 8,612,182 B2 | 12/2013 | Hess et al. |
| 8,615,374 B1 | 12/2013 | Discenzo |
| 8,620,604 B2 | 12/2013 | Gross et al. |
| 8,635,005 B2 | 1/2014 | Hagari et al. |
| 8,766,925 B2 | 7/2014 | Perlin et al. |
| 8,768,634 B2 | 7/2014 | Fu et al. |
| 8,781,536 B1 | 7/2014 | Zaslavsky et al. |
| 8,799,800 B2 | 8/2014 | Hood et al. |
| D719,584 S | 12/2014 | Wu |
| D720,366 S | 12/2014 | Hiltunen et al. |
| 8,902,936 B2 | 12/2014 | Stephanson |
| 8,907,243 B2 | 12/2014 | Watanabe et al. |
| 8,924,033 B2 | 12/2014 | Goutard et al. |
| 8,977,578 B1 | 3/2015 | Cruz-Albrecht et al. |
| D731,543 S | 6/2015 | Aoshima |
| 9,092,593 B2 | 7/2015 | Nasle |
| 9,225,783 B2 | 12/2015 | Stephanson |
| 9,257,353 B1 | 2/2016 | Mikalo et al. |
| 9,314,190 B1 | 4/2016 | Giuffida et al. |
| D759,075 S | 6/2016 | Bain |
| D759,076 S | 6/2016 | Bain |
| 9,359,074 B2 | 6/2016 | Ganesh et al. |
| 9,425,817 B1 | 8/2016 | Melanson |
| 9,432,298 B1 | 8/2016 | Smith |
| 9,435,684 B2 | 9/2016 | Baldwin |
| 9,491,490 B1 | 11/2016 | Toth et al. |
| 9,584,256 B2 | 2/2017 | Kojima et al. |
| 9,619,999 B2 | 4/2017 | Stephanson |
| 9,621,173 B1 | 4/2017 | Xiu |
| D789,416 S | 6/2017 | Baluja et al. |
| D790,572 S | 6/2017 | Subramanian et al. |
| 9,721,210 B1 | 8/2017 | Brown |
| 9,824,311 B1 | 11/2017 | Cruz-Albrecht et al. |
| 9,846,752 B2 | 12/2017 | Nasle |
| 9,871,530 B1 | 1/2018 | Grou |
| 9,912,595 B1 | 3/2018 | Ramasamy |
| 9,916,702 B2 | 3/2018 | Rudenko et al. |
| 9,929,979 B2 | 3/2018 | Germain |
| 9,959,497 B1 | 5/2018 | Ivanov |
| 9,973,186 B2 | 5/2018 | Dedic et al. |
| 9,976,986 B2 | 5/2018 | Wayman et al. |
| 9,977,425 B1 | 5/2018 | McCann et al. |
| 9,984,212 B2 | 5/2018 | Madabhushi et al. |
| 10,157,506 B2 | 12/2018 | Tart et al. |
| D845,993 S | 4/2019 | Taylor et al. |
| 10,260,935 B2 | 4/2019 | Hedin |
| 10,338,553 B2 | 7/2019 | Cella et al. |
| 10,365,625 B2 | 7/2019 | Cella et al. |
| 10,379,842 B2 | 8/2019 | Malladi et al. |
| 10,409,245 B2 | 9/2019 | Cella et al. |
| 10,409,246 B2 | 9/2019 | Cella et al. |
| 10,416,126 B2 | 9/2019 | Bowers, III et al. |
| 10,416,634 B2 | 9/2019 | Cella et al. |
| 10,416,636 B2 | 9/2019 | Cella et al. |
| 10,416,639 B2 | 9/2019 | Cella et al. |
| 10,437,218 B2 | 10/2019 | Cella et al. |
| 10,445,944 B2 | 10/2019 | Galera et al. |
| 10,551,811 B2 | 2/2020 | Cella et al. |
| 10,551,812 B2 | 2/2020 | Cella et al. |
| D877,774 S | 3/2020 | Baluja et al. |
| 10,598,568 B1 | 3/2020 | Morey et al. |
| 10,627,795 B2 | 4/2020 | Cella et al. |
| 10,739,743 B2 | 8/2020 | Cella et al. |
| 10,775,757 B2 | 9/2020 | Cella et al. |
| D900,159 S | 10/2020 | Baluja et al. |
| 10,838,837 B2 | 11/2020 | Brown et al. |
| 10,852,179 B2 | 12/2020 | Hedin |
| D917,502 S | 4/2021 | Canady |
| D922,396 S | 6/2021 | Chih et al. |
| 11,099,531 B2 | 8/2021 | Neti et al. |
| 11,106,188 B2 | 8/2021 | Cella et al. |
| 11,126,153 B2 | 9/2021 | Cella et al. |
| 11,169,496 B2 | 11/2021 | Cella et al. |
| 11,169,497 B2 | 11/2021 | Cella et al. |
| D938,488 S | 12/2021 | Baluja et al. |
| 11,327,455 B2 | 5/2022 | Cella et al. |
| D957,455 S | 7/2022 | Baluja et al. |
| 11,448,567 B2 | 9/2022 | Balboni et al. |
| D989,088 S | 6/2023 | Butter et al. |
| D990,513 S | 6/2023 | Harvey |
| 11,676,098 B2 | 6/2023 | Berti et al. |
| D998,638 S | 9/2023 | Harvey |
| D998,640 S | 9/2023 | Harvey |
| D998,642 S | 9/2023 | Harvey |
| D999,223 S | 9/2023 | Harvey |
| D999,232 S | 9/2023 | Harvey |
| D999,234 S | 9/2023 | Harvey |
| D1,030,773 S | 6/2024 | Dose |
| D1,033,442 S | 7/2024 | Li |
| D1,036,458 S | 7/2024 | Alcorn et al. |
| 12,069,831 B2 | 8/2024 | Harvey et al. |
| 2001/0015918 A1 | 8/2001 | Bhatnagar |
| 2001/0030468 A1 | 10/2001 | Anderson et al. |
| 2002/0004694 A1 | 1/2002 | Mcleod et al. |
| 2002/0013635 A1 | 1/2002 | Gotou et al. |
| 2002/0016856 A1 | 2/2002 | Tallegas et al. |
| 2002/0077711 A1 | 6/2002 | Nixon et al. |
| 2002/0084815 A1 | 7/2002 | Murphy et al. |
| 2002/0114984 A1 | 8/2002 | Edlund et al. |
| 2002/0129379 A1 | 9/2002 | Levinson et al. |
| 2002/0136336 A1 | 9/2002 | McCarty |
| 2002/0138217 A1 | 9/2002 | Shen et al. |
| 2002/0152037 A1 | 10/2002 | Sunshine et al. |
| 2002/0174708 A1 | 11/2002 | Mattes |
| 2002/0177878 A1 | 11/2002 | Poore et al. |
| 2002/0181799 A1 | 12/2002 | Matsugu et al. |
| 2003/0043037 A1 | 3/2003 | Lay |
| 2003/0048962 A1 | 3/2003 | Sato et al. |
| 2003/0054960 A1 | 3/2003 | Bedard |
| 2003/0061008 A1 | 3/2003 | Smith et al. |
| 2003/0069648 A1 | 4/2003 | Douglas et al. |
| 2003/0083756 A1 | 5/2003 | Hsiung et al. |
| 2003/0094992 A1 | 5/2003 | Geysen |
| 2003/0118081 A1 | 6/2003 | Philips et al. |
| 2003/0137648 A1 | 7/2003 | Voorhis et al. |
| 2003/0158954 A1 | 8/2003 | Williams |
| 2003/0212511 A1 | 11/2003 | Carle et al. |
| 2004/0019461 A1 | 1/2004 | Bouse et al. |
| 2004/0088406 A1 | 5/2004 | Corley et al. |
| 2004/0093516 A1 | 5/2004 | Hornbeek et al. |
| 2004/0109065 A1 | 6/2004 | Tokunaga |
| 2004/0114047 A1 | 6/2004 | Vora et al. |
| 2004/0205097 A1 | 10/2004 | Toumazou et al. |
| 2004/0260404 A1 | 12/2004 | Russell et al. |
| 2005/0007249 A1 | 1/2005 | Eryurek et al. |
| 2005/0011266 A1 | 1/2005 | Robinson et al. |
| 2005/0011278 A1 | 1/2005 | Brown et al. |
| 2005/0020255 A1 | 1/2005 | Kingsolver et al. |
| 2005/0049801 A1 | 3/2005 | Lindberg et al. |
| 2005/0081410 A1 | 4/2005 | Furem et al. |
| 2005/0100172 A1 | 5/2005 | Schliep et al. |
| 2005/0162258 A1 | 7/2005 | King |
| 2005/0165581 A1 | 7/2005 | Roba et al. |
| 2005/0251291 A1 | 11/2005 | Solomon |
| 2006/0006997 A1 | 1/2006 | Rose-Pehrsson et al. |
| 2006/0010230 A1 | 1/2006 | Karklins et al. |
| 2006/0028993 A1 | 2/2006 | Yang et al. |
| 2006/0034569 A1 | 2/2006 | Shih et al. |
| 2006/0037177 A1 | 2/2006 | Blum et al. |
| 2006/0069689 A1 | 3/2006 | Karklins et al. |
| 2006/0089889 A1 | 4/2006 | McCarthy, Jr. |
| 2006/0103555 A1 | 5/2006 | Antonesei |
| 2006/0150738 A1 | 7/2006 | Leigh |
| 2006/0155900 A1 | 7/2006 | Sagues et al. |
| 2006/0167638 A1 | 7/2006 | Murphy et al. |
| 2006/0184410 A1 | 8/2006 | Ramamurthy et al. |
| 2006/0224254 A1 | 10/2006 | Rumi et al. |
| 2006/0241907 A1 | 10/2006 | Armstrong et al. |
| 2006/0271617 A1 | 11/2006 | Hughes et al. |
| 2007/0025382 A1 | 2/2007 | Jones et al. |
| 2007/0041338 A1 | 2/2007 | Rowe |
| 2007/0047444 A1 | 3/2007 | Leroy et al. |
| 2007/0067678 A1 | 3/2007 | Hosek et al. |

(56) References Cited

U.S. PATENT DOCUMENTS

| | | |
|---|---|---|
| 2007/0078802 A1 | 4/2007 | Bestgen et al. |
| 2007/0111661 A1 | 5/2007 | Bargroff et al. |
| 2007/0150565 A1 | 6/2007 | Ayyagar et al. |
| 2007/0179672 A1 | 8/2007 | Fairlie et al. |
| 2007/0180207 A1 | 8/2007 | Garfinkle |
| 2007/0207752 A1 | 9/2007 | Behzad |
| 2007/0241261 A1 | 10/2007 | Wendt |
| 2007/0247285 A1 | 10/2007 | Rajala |
| 2007/0270671 A1 | 11/2007 | Gal |
| 2007/0294360 A1 | 12/2007 | Ebling et al. |
| 2007/0296368 A1 | 12/2007 | Woodland et al. |
| 2008/0010537 A1 | 1/2008 | Hayutin et al. |
| 2008/0033695 A1 | 2/2008 | Sahara et al. |
| 2008/0065290 A1 | 3/2008 | Breed et al. |
| 2008/0073975 A1 | 3/2008 | Wight et al. |
| 2008/0079029 A1 | 4/2008 | Williams |
| 2008/0112140 A1 | 5/2008 | Wong |
| 2008/0162302 A1 | 7/2008 | Sundaresan et al. |
| 2008/0170853 A1 | 7/2008 | Rakib et al. |
| 2008/0188973 A1 | 8/2008 | Filev et al. |
| 2008/0234964 A1 | 9/2008 | Miyasaka et al. |
| 2008/0247313 A1 | 10/2008 | Nath et al. |
| 2008/0278197 A1 | 11/2008 | Murotake |
| 2008/0316076 A1 | 12/2008 | Dent et al. |
| 2008/0319279 A1 | 12/2008 | Ramsay et al. |
| 2009/0003599 A1 | 1/2009 | Hart et al. |
| 2009/0012728 A1 | 1/2009 | Spanier et al. |
| 2009/0043530 A1 | 2/2009 | Sittier et al. |
| 2009/0055126 A1 | 2/2009 | Yanovich et al. |
| 2009/0061775 A1 | 3/2009 | Warren et al. |
| 2009/0063739 A1 | 3/2009 | Weddle |
| 2009/0066505 A1 | 3/2009 | Jensen et al. |
| 2009/0083019 A1 | 3/2009 | Nasle |
| 2009/0135761 A1 | 5/2009 | Khandekar et al. |
| 2009/0185496 A1 | 7/2009 | Doverspike et al. |
| 2009/0204232 A1 | 8/2009 | Guru et al. |
| 2009/0228224 A1 | 9/2009 | Spanier et al. |
| 2009/0243732 A1 | 10/2009 | Tarng et al. |
| 2009/0256817 A1 | 10/2009 | Perlin et al. |
| 2009/0265064 A1 | 10/2009 | Furuno |
| 2009/0292505 A1 | 11/2009 | Dyke et al. |
| 2009/0303197 A1 | 12/2009 | Bonczek et al. |
| 2010/0030417 A1 | 2/2010 | Fang et al. |
| 2010/0060296 A1 | 3/2010 | Jiang et al. |
| 2010/0076913 A1 | 3/2010 | Yang et al. |
| 2010/0156632 A1 | 6/2010 | Hyland et al. |
| 2010/0161283 A1 | 6/2010 | Qing et al. |
| 2010/0179691 A1 | 7/2010 | Gal et al. |
| 2010/0216523 A1 | 8/2010 | Sebastiano et al. |
| 2010/0223163 A1 | 9/2010 | Edwards |
| 2010/0241601 A1 | 9/2010 | Carson et al. |
| 2010/0241918 A1 | 9/2010 | Nedovic |
| 2010/0249976 A1 | 9/2010 | Aharoni et al. |
| 2010/0253414 A1 | 10/2010 | Dedic et al. |
| 2010/0262401 A1 | 10/2010 | Pfeifer et al. |
| 2010/0271199 A1 | 10/2010 | Belov et al. |
| 2010/0315207 A1 | 12/2010 | Bullard et al. |
| 2011/0050913 A1 | 3/2011 | Kim |
| 2011/0071794 A1 | 3/2011 | Bronczyk et al. |
| 2011/0071963 A1 | 3/2011 | Piovesan et al. |
| 2011/0121978 A1 | 5/2011 | Schwörer et al. |
| 2011/0178737 A1 | 7/2011 | Hudson et al. |
| 2011/0276975 A1 | 11/2011 | Brown et al. |
| 2011/0277010 A1 | 11/2011 | Paul |
| 2011/0282508 A1 | 11/2011 | Goutard et al. |
| 2011/0288796 A1 | 11/2011 | Peczalski et al. |
| 2011/0309937 A1 | 12/2011 | Bunza et al. |
| 2012/0013497 A1 | 1/2012 | Katsuki et al. |
| 2012/0025526 A1 | 2/2012 | Luo et al. |
| 2012/0065901 A1 | 3/2012 | Bechhoefer et al. |
| 2012/0111978 A1 | 5/2012 | Murphy et al. |
| 2012/0173045 A1 | 7/2012 | Conroy |
| 2012/0191349 A1 | 7/2012 | Lenz et al. |
| 2012/0219089 A1 | 8/2012 | Murakami et al. |
| 2012/0246055 A1 | 9/2012 | Schlifstein et al. |
| 2012/0254803 A1 | 10/2012 | Grist et al. |
| 2012/0265359 A1 | 10/2012 | Das et al. |
| 2012/0323741 A1 | 12/2012 | Rangachari et al. |
| 2012/0328301 A1 | 12/2012 | Gupta et al. |
| 2013/0060524 A1 | 3/2013 | Liao |
| 2013/0073228 A1 | 3/2013 | Fulghum et al. |
| 2013/0083945 A1 | 4/2013 | Rossum |
| 2013/0106637 A1 | 5/2013 | Liao et al. |
| 2013/0115535 A1 | 5/2013 | Delfino |
| 2013/0163619 A1 | 6/2013 | Stephanson |
| 2013/0163833 A1 | 6/2013 | Wang et al. |
| 2013/0201316 A1 | 8/2013 | Binder et al. |
| 2013/0211559 A1 | 8/2013 | Lawson et al. |
| 2013/0218451 A1 | 8/2013 | Yamada |
| 2013/0223426 A1 | 8/2013 | Parker |
| 2013/0243429 A1 | 9/2013 | Whelihan et al. |
| 2013/0243963 A1 | 9/2013 | Rina |
| 2013/0245795 A1 | 9/2013 | McGreevy et al. |
| 2013/0255311 A1 | 10/2013 | Thiebault et al. |
| 2013/0274898 A1 | 10/2013 | Thatikonda et al. |
| 2013/0346348 A1 | 12/2013 | Buehler et al. |
| 2013/0346628 A1 | 12/2013 | Canion et al. |
| 2013/0346667 A1 | 12/2013 | Stroud et al. |
| 2014/0046881 A1 | 2/2014 | Lösl et al. |
| 2014/0067289 A1 | 3/2014 | Baldwin |
| 2014/0074433 A1 | 3/2014 | Crepet |
| 2014/0097247 A1 | 4/2014 | Zumsteg |
| 2014/0114612 A1 | 4/2014 | Yoskovitz et al. |
| 2014/0120972 A1 | 5/2014 | Hartman |
| 2014/0152451 A1 | 6/2014 | Murphy |
| 2014/0161135 A1 | 6/2014 | Acharya et al. |
| 2014/0161279 A1 | 6/2014 | Jones et al. |
| 2014/0167810 A1 | 6/2014 | Neti et al. |
| 2014/0176203 A1 | 6/2014 | Matheny et al. |
| 2014/0198615 A1 | 7/2014 | Ray |
| 2014/0260761 A1 | 9/2014 | Soderlind |
| 2014/0271449 A1 | 9/2014 | McAlister |
| 2014/0288876 A1 | 9/2014 | Donaldson |
| 2014/0314099 A1 | 10/2014 | Dress |
| 2014/0324367 A1 | 10/2014 | Garvey, III et al. |
| 2014/0324389 A1 | 10/2014 | Baldwin et al. |
| 2014/0337429 A1 | 11/2014 | Asenjo et al. |
| 2014/0365195 A1 | 12/2014 | Lahiri et al. |
| 2015/0032392 A1 | 1/2015 | Bradley |
| 2015/0039250 A1 | 2/2015 | Rank |
| 2015/0052985 A1 | 2/2015 | Brenner et al. |
| 2015/0055633 A1 | 2/2015 | Wu et al. |
| 2015/0059442 A1 | 3/2015 | Liljenberg et al. |
| 2015/0080044 A1 | 3/2015 | McHenry et al. |
| 2015/0098526 A1 | 4/2015 | Hind et al. |
| 2015/0102940 A1 | 4/2015 | Keech et al. |
| 2015/0104183 A1 | 4/2015 | Jeffrey |
| 2015/0134954 A1 | 5/2015 | Walley et al. |
| 2015/0142384 A1 | 5/2015 | Chao et al. |
| 2015/0149134 A1 | 5/2015 | Mehta et al. |
| 2015/0154969 A1 | 6/2015 | Craven et al. |
| 2015/0169190 A1 | 6/2015 | Girardeau |
| 2015/0177100 A1 | 6/2015 | Dietz |
| 2015/0217379 A1 | 8/2015 | Kim et al. |
| 2015/0248828 A1 | 9/2015 | Cloutier et al. |
| 2015/0271106 A1 | 9/2015 | Walker et al. |
| 2015/0277399 A1 | 10/2015 | Maturana et al. |
| 2015/0278839 A1 | 10/2015 | Hansen |
| 2015/0288257 A1 | 10/2015 | Cooper et al. |
| 2015/0301521 A1* | 10/2015 | Byron ............ G05B 19/4183 700/108 |
| 2015/0302664 A1 | 10/2015 | Miller |
| 2015/0320255 A1 | 11/2015 | She et al. |
| 2015/0330950 A1 | 11/2015 | Bechhoefer |
| 2015/0354607 A1 | 12/2015 | Avni |
| 2015/0363750 A1 | 12/2015 | Svensson et al. |
| 2015/0373735 A1 | 12/2015 | Thubert et al. |
| 2016/0007102 A1 | 1/2016 | Raza et al. |
| 2016/0011692 A1 | 1/2016 | Heim et al. |
| 2016/0026729 A1 | 1/2016 | Gil et al. |
| 2016/0041070 A1 | 2/2016 | Wascat et al. |
| 2016/0048399 A1 | 2/2016 | Shaw |
| 2016/0054284 A1 | 2/2016 | Washburn |
| 2016/0059412 A1 | 3/2016 | Oleynik |

(56) References Cited

U.S. PATENT DOCUMENTS

| | | |
|---|---|---|
| 2016/0069624 A1 | 3/2016 | Rollins et al. |
| 2016/0071032 A1 | 3/2016 | Hunter |
| 2016/0078695 A1 | 3/2016 | McClintic et al. |
| 2016/0098647 A1 | 4/2016 | Nixon et al. |
| 2016/0104330 A1 | 4/2016 | Rudenko et al. |
| 2016/0153806 A1 | 6/2016 | Ciasulli et al. |
| 2016/0163186 A1 | 6/2016 | Davidson et al. |
| 2016/0171846 A1 | 6/2016 | Brav et al. |
| 2016/0179075 A1 | 6/2016 | Shin et al. |
| 2016/0182309 A1 | 6/2016 | Maturana et al. |
| 2016/0188675 A1 | 6/2016 | Vossler |
| 2016/0192084 A1 | 6/2016 | Oliaei |
| 2016/0196375 A1 | 7/2016 | Nasle |
| 2016/0209831 A1 | 7/2016 | Pal |
| 2016/0219024 A1 | 7/2016 | Verzun et al. |
| 2016/0225372 A1 | 8/2016 | Cheung et al. |
| 2016/0234342 A1 | 8/2016 | Oonk et al. |
| 2016/0245686 A1 | 8/2016 | Pal et al. |
| 2016/0247129 A1 | 8/2016 | Song et al. |
| 2016/0261411 A1 | 9/2016 | Yau et al. |
| 2016/0274558 A1 | 9/2016 | Strohmenger et al. |
| 2016/0282853 A1 | 9/2016 | Michalscheck et al. |
| 2016/0282872 A1 | 9/2016 | Ahmed et al. |
| 2016/0301991 A1 | 10/2016 | Loychik et al. |
| 2016/0328883 A1 | 11/2016 | Parfenov et al. |
| 2016/0333855 A1 | 11/2016 | Lund et al. |
| 2016/0341629 A1 | 11/2016 | Schaefer |
| 2016/0369777 A1 | 12/2016 | Chiang et al. |
| 2016/0378086 A1 | 12/2016 | Plymill et al. |
| 2017/0001308 A1 | 1/2017 | Bataller et al. |
| 2017/0006135 A1 | 1/2017 | Siebel et al. |
| 2017/0011298 A1 | 1/2017 | Pal et al. |
| 2017/0011360 A1 | 1/2017 | Kuffner, Jr. et al. |
| 2017/0012861 A1 | 1/2017 | Blumenthal et al. |
| 2017/0022015 A1 | 1/2017 | Göllü |
| 2017/0030349 A1 | 2/2017 | Bassett et al. |
| 2017/0032281 A1 | 2/2017 | Hsu |
| 2017/0038753 A1 | 2/2017 | Shah et al. |
| 2017/0046458 A1 | 2/2017 | Meagher et al. |
| 2017/0061326 A1 | 3/2017 | Talathi et al. |
| 2017/0067860 A1 | 3/2017 | Grabill et al. |
| 2017/0070237 A1 | 3/2017 | Ardalan |
| 2017/0074715 A1 | 3/2017 | Bartos et al. |
| 2017/0075552 A1 | 3/2017 | Berenbaum et al. |
| 2017/0103339 A1 | 4/2017 | Pandit et al. |
| 2017/0103506 A1 | 4/2017 | Dandibhotla et al. |
| 2017/0108406 A1 | 4/2017 | Thomson |
| 2017/0108834 A1 | 4/2017 | Wang et al. |
| 2017/0115899 A1 | 4/2017 | Franke et al. |
| 2017/0130700 A1 | 5/2017 | Sakaguchi et al. |
| 2017/0149605 A1 | 5/2017 | Strasser |
| 2017/0168180 A1 | 6/2017 | Senechal |
| 2017/0173458 A1 | 6/2017 | Billington et al. |
| 2017/0177703 A1 | 6/2017 | Liu |
| 2017/0178311 A1 | 6/2017 | Pal |
| 2017/0180214 A1 | 6/2017 | Azevedo et al. |
| 2017/0187588 A1 | 6/2017 | Nolan et al. |
| 2017/0205451 A1 | 7/2017 | Moinuddin |
| 2017/0207926 A1 | 7/2017 | Gil et al. |
| 2017/0222999 A1 | 8/2017 | Banga et al. |
| 2017/0223026 A1 | 8/2017 | Amiri et al. |
| 2017/0237996 A1 | 8/2017 | Schneider |
| 2017/0238072 A1 | 8/2017 | Mackie et al. |
| 2017/0277800 A1 | 9/2017 | Lucas et al. |
| 2017/0284690 A1 | 10/2017 | Lipanov |
| 2017/0284974 A1 | 10/2017 | Hershey et al. |
| 2017/0286572 A1 | 10/2017 | Hershey et al. |
| 2017/0295057 A1 | 10/2017 | Dost et al. |
| 2017/0300290 A1 | 10/2017 | Hester et al. |
| 2017/0310601 A1 | 10/2017 | Yu et al. |
| 2017/0313332 A1 | 11/2017 | Paget et al. |
| 2017/0323240 A1 | 11/2017 | Johnson et al. |
| 2017/0323274 A1 | 11/2017 | Johnson et al. |
| 2017/0338832 A1 | 11/2017 | Voinigescu et al. |
| 2017/0352010 A1 | 12/2017 | Son et al. |
| 2017/0357233 A1 | 12/2017 | Gurciullo |
| 2017/0374490 A1 | 12/2017 | Schoppmeier |
| 2018/0005307 A1 | 1/2018 | Abedin |
| 2018/0007131 A1 | 1/2018 | Cohn et al. |
| 2018/0012270 A1 | 1/2018 | Hill et al. |
| 2018/0052428 A1 | 2/2018 | Abramov |
| 2018/0054376 A1 | 2/2018 | Hershey et al. |
| 2018/0067779 A1 | 3/2018 | Pillalamarri et al. |
| 2018/0082172 A1 | 3/2018 | Patel et al. |
| 2018/0088206 A1 | 3/2018 | Meadow |
| 2018/0094953 A1 | 4/2018 | Colson et al. |
| 2018/0130260 A1 | 5/2018 | Schmirler et al. |
| 2018/0137219 A1 | 5/2018 | Goldfarb et al. |
| 2018/0144243 A1 | 5/2018 | Hsieh et al. |
| 2018/0188704 A1 | 7/2018 | Cella et al. |
| 2018/0188714 A1 | 7/2018 | Cella et al. |
| 2018/0198641 A1 | 7/2018 | Gilani et al. |
| 2018/0210436 A1 | 7/2018 | Burd et al. |
| 2018/0217585 A1 | 8/2018 | Giering et al. |
| 2018/0255381 A1 | 9/2018 | Cella et al. |
| 2018/0260733 A1 | 9/2018 | Abado et al. |
| 2018/0261344 A1 | 9/2018 | Sapia |
| 2018/0275675 A1 | 9/2018 | Loosararian et al. |
| 2018/0284755 A1 | 10/2018 | Cella et al. |
| 2018/0300124 A1 | 10/2018 | Malladi et al. |
| 2018/0321667 A1 | 11/2018 | Cella et al. |
| 2018/0330083 A1 | 11/2018 | Abbaszadeh et al. |
| 2018/0334755 A1 | 11/2018 | Civiero et al. |
| 2018/0367466 A1 | 12/2018 | Shear et al. |
| 2018/0375743 A1 | 12/2018 | Lee et al. |
| 2019/0020659 A1 | 1/2019 | Loni et al. |
| 2019/0035101 A1 | 1/2019 | Kwant et al. |
| 2019/0042988 A1 | 2/2019 | Brown et al. |
| 2019/0045207 A1 | 2/2019 | Chen et al. |
| 2019/0049929 A1 | 2/2019 | Good et al. |
| 2019/0056107 A1 | 2/2019 | Desai et al. |
| 2019/0064034 A1 | 2/2019 | Fayfield et al. |
| 2019/0088101 A1 | 3/2019 | Tunnell et al. |
| 2019/0102360 A1 | 4/2019 | SayyarRodsari et al. |
| 2019/0121334 A1 | 4/2019 | Song et al. |
| 2019/0121340 A1 | 4/2019 | Cella et al. |
| 2019/0138906 A1 | 5/2019 | Cakmak et al. |
| 2019/0146470 A1 | 5/2019 | Akkaram et al. |
| 2019/0156443 A1* | 5/2019 | Hall .................. G06Q 10/067 |
| 2019/0173109 A1 | 6/2019 | Wang |
| 2019/0179647 A1 | 6/2019 | Deka et al. |
| 2019/0184563 A1 | 6/2019 | Krautwurm |
| 2019/0236489 A1 | 8/2019 | Koudal et al. |
| 2019/0236527 A1* | 8/2019 | Bhaumik ............. G06Q 10/087 |
| 2019/0281132 A1 | 9/2019 | Sethuraman et al. |
| 2019/0294485 A1 | 9/2019 | Kukreja et al. |
| 2019/0302712 A1 | 10/2019 | Neti et al. |
| 2019/0310281 A1 | 10/2019 | Jayzen et al. |
| 2019/0317459 A1 | 10/2019 | Banerjee et al. |
| 2019/0317488 A1 | 10/2019 | Al-Maghlouth et al. |
| 2019/0318660 A1 | 10/2019 | Kimoto |
| 2019/0323922 A1 | 10/2019 | Acur |
| 2019/0324434 A1 | 10/2019 | Cella et al. |
| 2019/0325668 A1 | 10/2019 | Cole et al. |
| 2019/0339209 A1 | 11/2019 | Du et al. |
| 2019/0339678 A1 | 11/2019 | Biernat et al. |
| 2019/0346837 A1 | 11/2019 | Dagnino et al. |
| 2019/0349676 A1 | 11/2019 | Chen et al. |
| 2019/0354922 A1 | 11/2019 | Berti et al. |
| 2019/0358730 A1 | 11/2019 | Nadler et al. |
| 2019/0385074 A1 | 12/2019 | Bostick et al. |
| 2020/0012265 A1* | 1/2020 | Thomsen .............. G06F 3/0481 |
| 2020/0067789 A1 | 2/2020 | Khuti et al. |
| 2020/0068759 A1* | 2/2020 | Cvijetinovic ....... H05K 13/0895 |
| 2020/0103888 A1 | 4/2020 | Sayyarrodsari et al. |
| 2020/0106864 A1 | 4/2020 | Denison et al. |
| 2020/0125078 A1 | 4/2020 | Koudal et al. |
| 2020/0133255 A1 | 4/2020 | Cella et al. |
| 2020/0159961 A1* | 5/2020 | Smith .................. H04L 67/12 |
| 2020/0167652 A1* | 5/2020 | Huang ................. G06N 3/0427 |
| 2020/0175765 A1* | 6/2020 | McAdam ............... G06F 16/29 |
| 2020/0201875 A1 | 6/2020 | Wu et al. |
| 2020/0225655 A1 | 7/2020 | Cella et al. |
| 2020/0265329 A1 | 8/2020 | Thomsen et al. |

(56) References Cited

U.S. PATENT DOCUMENTS

| | | | |
|---|---|---|---|
| 2020/0265535 A1 | 8/2020 | Okada et al. | |
| 2020/0285788 A1 | 9/2020 | Brebner | |
| 2020/0285988 A1 | 9/2020 | Saha et al. | |
| 2020/0294401 A1* | 9/2020 | Kerecsen | G05D 1/0287 |
| 2020/0310394 A1* | 10/2020 | Wouhaybi | H04L 41/0846 |
| 2020/0401944 A1 | 12/2020 | Sundström et al. | |
| 2021/0029029 A1* | 1/2021 | Mehmedagic | H04L 41/40 |
| 2021/0157312 A1 | 5/2021 | Cella et al. | |
| 2021/0182690 A1 | 6/2021 | Jordan et al. | |
| 2021/0272467 A1* | 9/2021 | Yang | G06F 3/017 |
| 2021/0287459 A1 | 9/2021 | Cella et al. | |
| 2021/0294306 A1 | 9/2021 | Deokar et al. | |
| 2021/0342836 A1 | 11/2021 | Cella et al. | |
| 2021/0360070 A1 | 11/2021 | Cella et al. | |
| 2021/0374936 A1 | 12/2021 | Koopman et al. | |
| 2022/0003542 A1 | 1/2022 | Napier et al. | |
| 2022/0046033 A1* | 2/2022 | Tang | H04L 63/1416 |
| 2022/0067230 A1 | 3/2022 | Harvey et al. | |
| 2022/0075515 A1 | 3/2022 | Floren et al. | |
| 2022/0101192 A1 | 3/2022 | Patel | |
| 2022/0108262 A1 | 4/2022 | Cella et al. | |
| 2022/0163960 A1 | 5/2022 | Cella et al. | |
| 2022/0191282 A1 | 6/2022 | Cella et al. | |
| 2022/0198562 A1 | 6/2022 | Cella et al. | |
| 2022/0208319 A1 | 6/2022 | Ansari et al. | |
| 2022/0214671 A1 | 7/2022 | Alt et al. | |
| 2022/0236709 A1 | 7/2022 | Cella et al. | |
| 2022/0247971 A1 | 8/2022 | McNelley et al. | |
| 2022/0366494 A1 | 11/2022 | Cella et al. | |
| 2022/0390997 A1 | 12/2022 | Hendriks et al. | |
| 2022/0414287 A1 | 12/2022 | Strafer et al. | |
| 2023/0173395 A1 | 6/2023 | Cella et al. | |
| 2023/0176557 A1 | 6/2023 | Cella et al. | |
| 2023/0186201 A1 | 6/2023 | Cella et al. | |
| 2023/0196230 A1 | 6/2023 | Cella et al. | |
| 2023/0206329 A1 | 6/2023 | Cella et al. | |
| 2023/0281527 A1 | 9/2023 | Cella et al. | |
| 2023/0419304 A1 | 12/2023 | Cella et al. | |
| 2024/0004514 A1 | 1/2024 | Sarin et al. | |
| 2024/0310860 A1 | 9/2024 | Van De Velde et al. | |

FOREIGN PATENT DOCUMENTS

| | | |
|---|---|---|
| CN | 1319967 A | 10/2001 |
| CN | 1414561 A | 4/2003 |
| CN | 2545752 Y | 4/2003 |
| CN | 1716827 A | 1/2006 |
| CN | 2751314 | 1/2006 |
| CN | 2911636 Y | 6/2007 |
| CN | 201138454 | 10/2008 |
| CN | 101403684 A | 4/2009 |
| CN | 101476745 A | 7/2009 |
| CN | 101694577 A | 4/2010 |
| CN | 102052963 A | 5/2011 |
| CN | 102662339 A | 9/2012 |
| CN | 202583862 U | 12/2012 |
| CN | 102914432 A | 2/2013 |
| CN | 103098393 A | 5/2013 |
| CN | 103220552 A | 7/2013 |
| CN | 103458795 A | 12/2013 |
| CN | 103928836 A | 7/2014 |
| CN | 104579552 A | 4/2015 |
| CN | 105208681 A | 12/2015 |
| CN | 105264770 A | 1/2016 |
| CN | 105302016 A | 2/2016 |
| CN | 105320839 A | 2/2016 |
| CN | 108919760 A | 11/2018 |
| CN | 109356789 A | 2/2019 |
| CN | 110376605 A | 10/2019 |
| CN | 110795874 A | 2/2020 |
| CN | 307718753 | 12/2022 |
| CN | 307838992 | 2/2023 |
| CN | 308239071 | 9/2023 |
| CN | 308239072 | 9/2023 |
| CN | 308328891 | 11/2023 |
| CN | 308440210 | 1/2024 |
| CN | 308511536 | 3/2024 |
| CN | 308644905 | 5/2024 |
| DE | 29806131 U1 | 7/1998 |
| EM | 0088744240001 | 3/2022 |
| EM | 0088744240003 | 3/2022 |
| EM | 0088744240004 | 3/2022 |
| EP | 0897111 A2 | 2/1999 |
| EP | 1080347 A1 | 3/2001 |
| EP | 2983056 A1 | 2/2016 |
| EP | 3287405 A1 | 2/2018 |
| GB | 2395827 A | 6/2004 |
| GB | 2513456 A | 10/2014 |
| JP | S5913084 B2 | 3/1984 |
| JP | H06137164 A | 5/1994 |
| JP | H0927592 A | 1/1997 |
| JP | H10152297 A | 6/1998 |
| JP | H1186178 A | 3/1999 |
| JP | H11118661 A | 4/1999 |
| JP | 2001133364 A | 5/2001 |
| JP | 2001160097 A | 6/2001 |
| JP | 2003150237 A | 5/2003 |
| JP | 2003337962 A | 11/2003 |
| JP | 2005258585 A | 9/2005 |
| JP | 2006522396 A | 9/2006 |
| JP | 2006338519 A | 12/2006 |
| JP | 2008232934 A | 10/2008 |
| JP | 2010074876 A | 4/2010 |
| JP | 2013073414 A | 4/2013 |
| JP | 2013250928 A | 12/2013 |
| JP | 2014163539 A | 9/2014 |
| JP | 2014203274 A | 10/2014 |
| JP | 2015128967 A | 7/2015 |
| JP | 2015209205 A | 11/2015 |
| JP | 5849167 B1 | 1/2016 |
| JP | 2018005433 A | 1/2018 |
| JP | 2018022372 A | 2/2018 |
| JP | 2018142836 A | 9/2018 |
| JP | 2018533105 A | 11/2018 |
| TW | 201802650 A | 1/2018 |
| WO | 9412917 A1 | 6/1994 |
| WO | 0233558 A1 | 4/2002 |
| WO | 2003020571 A1 | 3/2003 |
| WO | 2003020572 A1 | 3/2003 |
| WO | 2006116849 A1 | 11/2006 |
| WO | 2009133161 A2 | 11/2009 |
| WO | 2010138831 A2 | 12/2010 |
| WO | 2014054858 A1 | 4/2014 |
| WO | 2015191079 A1 | 12/2015 |
| WO | 2016068929 A1 | 5/2016 |
| WO | 2016137848 A1 | 9/2016 |
| WO | 2017067721 A1 | 4/2017 |
| WO | 2017190795 A1 | 11/2017 |
| WO | 2018084307 A1 | 5/2018 |
| WO | 2018111368 A1 | 6/2018 |
| WO | 2019028269 A2 | 2/2019 |
| WO | 2020146036 A1 | 7/2020 |
| WO | 2020227429 A1 | 11/2020 |

OTHER PUBLICATIONS

Alkhadafe, H., "Computational Intelligence for Fault Diagnosis in Gearbox Systems," Thesis, Mar. 2015, 243 pages.

Cachada, A. et al., "Maintenance 4.0: Intelligent and Predictive Maintenance System Architecture," 2018 IEEE 23rd International Conference on Emerging Technologies and Factory Automation (ETFA), Oct. 25, 2018, pp. 139-146.

Chen, Y. et al., "Optical design of the Fresnel lens for LED-driven flashlight," Applied Optics, vol. 55, No. 4, Feb. 1, 2016, pp. 712-721.

Devi, S. et al., "A Comparative Study Between Vibration and Acoustic Signals In HTC Cooling Pump and Chilling Pump," IACSIT International Journal of Engineering and Technology, vol. 2, No. 3, Jun. 2010, pp. 273-277.

Extended European Search Report dated Apr. 14, 2020 for EP Application No. 17796676.9, 10 pages.

Extended European Search Report dated Jan. 24, 2020 for European Application No. 17748108.2, 8 pages.

(56) References Cited

OTHER PUBLICATIONS

Extended European Search Report dated Jan. 4, 2023 for EP Application No. 20802722.7, 8 pages.
Geropp, B., "Envelope Analysis—A Signal Analysis Technique for Early Detection and Isolation of Machine Faults," FAC Fault Detection, Supervision and Safety for Technical Processes, Kingston Upon Hull, UK, 1997, pp. 977-981.
Gerth, B., "University of Victoria Issues with the Use of the BlackBerry PDA at UVic and a Proposal to Evaluate Alternatives," Computing User Services, Nov. 29, 2004, pp. 1-9.
IMV Corporation, "All about Vibration Measuring Systems," May 20, 2017 [retrieved on Mar. 13, 2021], Retrieved from the Internet: . (Year: 2017), 5 pages.
International Search Report and Written Opinion dated Jun. 12, 2017 for PCT International Application No. PCT/US2017/016113, 10 pages.
International Search Report and Written Opinion for International Application No. PCT/US2017/031721 dated Sep. 11, 2017, 23 pages.
Kamaras, K. et al., "Vibration Analysis of Rolling Element Bearings Using Spectral Kurtosis and Envelope Analysis," Jan. 2016, FNT @Sea Services Ltd., 14 pages.
MSA, "MSA Chips™ Communication System," Product Brochure, Dec. 2009, pp. 1-6.
PCT International Search Report and Written Opinion dated Aug. 14, 2019 for International Application No. PCT/US2019/020044, 78 pages.
PCT International Search Report and Written Opinion dated Mar. 15, 2021 for International Application No. PCT/US2020/062384, 12 pages.
PCT International Search Report and Written Opinion dated May 11, 2020 for International Application No. PCT/US2019/059088, 22 pages.
PCT International Search Report and Written Opinion dated Apr. 2, 2019 for International Application No. PCT/US2018/060043, 29 pages.
PCT International Search Report and Written Opinion dated Aug. 4, 2020 for International Application No. PCT/US2020/031706, 24 pages.
PCT International Search Report and Written Opinion dated Jan. 25, 2022 for International Application No. PCT/US2021/053339, 31 pages.
PCT International Search Report and Written Opinion dated Mar. 21, 2019 for International Application No. PCT/US2018/045036, 187 pages.
Pérez, E.T., "Study of vibration severity assessment for Machine Tool spindles within Condition Monitoring," Autumn 2015, M.S. Degree Thesis, Production Engineering and Management Platform, Stockholm, Sweden, 147 pages.
Product: Fluke 63/66/68 Infrared Thermometers User Manual, Released for Sale Sep. 2004, Rev. 3, 6/09, 35 pages.
Qi, G. et al., "Blackboard Mechanism Based Ant Colony Theory for Dynamic Deployment of Mobile Sensor Networks," Journal of Bionic Engineering, vol. 5, Issue 3, Sep. 2008, pp. 197-203.
Reinhardt, A., "Designing sensor networks for smart spaces, Unified Interfacing and Energy-Efficient Communication Between Wireless Sensor and Actuator Nodes," Vom Fachbereich Elektrotechnik und Informationstechnik der Technischen Universitat Darmstadt, 2011, 165 pages.
Sibul, L., "Adaptive Signal Processing," Feb. 12, 2007, 85 pages.
Supplementary Partial EP Search Report dated Aug. 26, 2022 for EP Application No. 19908436, 17 pages.
Supplementary Partial European Search Report dated Feb. 3, 2022 for EP Application No. 19799558.2, 12 pages.
Tiwari, A. et al., "Energy-Efficient Wireless Sensor Network Design and Implementation for Condition-Based Maintenance," ACM Transactions on Sensor Networks, vol. 3, No. 1, Article 1, Published: Mar. 2007, pp. 1-23.
Wang, Y. et al., "Frontier-based Multi-Robot Map Exploration Using Particle Swarm Optimization," 2011 IEEE Symposium on Swarm Intelligence, Jul. 2011, 6 pages.
Yue, Y. et al., "Optimization-Based Artificial Bee Colony Algorithm for Data Collection in Large-Scale Mobile Wireless Sensor Networks," Journal of Sensors, http://dx.doi.org/10.1155/2016/7057490, vol. 2016, May 2016, 13 pages.
Munteanu, A.D., "The Internet Of Things—Business Transformation," Annals. Computer Science Series, vol. 13, Dec. 2015, pp. 103-106.
Pan, J. et al., "Future Edge Cloud and Edge Computing for Internet of Things Applications," IEEE Internet of Things Journal, vol. 5, No. 1, Feb. 2018, pp. 439-449.
Pradeep, "Renault partners with Microsoft for blockchain-based digital car maintenance book," MSPoweruser, Jul. 27, 2017, https://mspoweruser.com/renault-partners-microsoft-blockchain-based-digital-car-maintenance-book.com, 4 bages.
U.S. Appl. No. 16/684,794, filed Nov. 15, 2019, Cella et al.
Langone, R. et al., "LS-SVM Based Spectral Clustering and Regression for Predicting Maintenance of Industrial Machines," Engineering Applications of Artificial Intelligence, vol. 37, 2015, pp. 268-278.
Monostori, L. et al., "Cyber-Physical Systems In Manufacturing," CIRP Annals—Manufacturing Technology, vol. 65, 2016, pp. 621-641.
Teti, R. et al., "Advanced monitoring of machining operations," CIRP Annals—Manufacturing Technology, vol. 59, 2010, pp. 717-739.
Clemens, D., "MalNet Maltego Transforms with Proofpoint Data," May 2016, https://blog.shadowdragon.io/malnet-maltego-transforms-with-proofpoint-data, 2 pages.
Extended European Search Report dated Feb. 2, 2024 for EP Application No. 23204985.8, 9 pages.
Hartmann, A., Creating interactive, web-based and data-enriched maps with the Systems Biology Graphical Notation, Mar. 2012, https://www.researchgate.net/figure/Screenshot-of-the-SBGN-ED-desktop-1-side-panel-2-graph-editor-view-3-toolbar_fig11_221881695, 1 page.
Amor, H.B. et al., "Interaction Primitives for Human-Robot Cooperation Tasks," 2014 IEEE International Conference on Robotics & Automation (ICRA), Hong Kong, CN, May 31-Jun. 7, 2014, 7 pages.
Dillmann, R., "Teaching and learning of robot tasks via observation of human performance," Science Direct—Robotics and Autonomous Systems, vol. 47, 2004, pp. 109-116.
Extended European Search Report dated Mar. 1, 2024 for EP Application No. 20894311.8, 12 pages.
Najmaei, N. et al., "Applications of Artificial Intelligence in Safe Human-Robot Interactions," IEEE Transactions On Systems, Man, and Cybernetics—Parr B: Cybernetics, vol. 41, No. 2, Apr. 2011, pp. 448-459.
Zhang, H. et al., "A Generic Data Analytics System For Manufacturing Production," Big Data Mining and Analytics, vol. 1, No. 2, Jun. 2018, pp. 160-171.
English language abstract provided for CN102052963A.
English language abstract provided for CN102914432A.
English language abstract provided for CN103098393A.
English language abstract provided for CN103458795A.
English language abstract provided for CN103928836A.
English language abstract provided for CN105264770A.
English language abstract provided for CN105302016A.
English language abstract provided for CN105320839A.
English language abstract provided for CN307718753.
English language abstract provided for CN307838992.
English language abstract provided for CN308239071.
English language abstract provided for CN308239072.
English language abstract provided for CN308328891.
English language abstract provided for CN308440210.
English language abstract provided for CN308511536.
English language abstract provided for CN308644905.
English language abstract provided for WO2018084307A1.
U.S. Appl. No. 16/052,998, filed Aug. 2, 2018, Desai et al.
U.S. Appl. No. 16/369,063, filed Mar. 29, 2019, Cella et al.

(56) References Cited

OTHER PUBLICATIONS

U.S. Appl. No. 16/369,087, filed Mar. 29, 2019, Cella et al.
U.S. Appl. No. 16/369,130, filed Mar. 29, 2019, Cella et al.
U.S. Appl. No. 16/684,135, filed Nov. 14, 2019, Cella et al.
U.S. Appl. No. 16/684,207, filed Nov. 14, 2019, Cella et al.
U.S. Appl. No. 16/684,651, filed Nov. 15, 2019, Cella et al.
U.S. Appl. No. 16/684,668, filed Nov. 15, 2019, Cella et al.
U.S. Appl. No. 16/684,687, filed Nov. 15, 2019, Cella et al.
U.S. Appl. No. 16/684,727, filed Nov. 15, 2019, Cella et al.
U.S. Appl. No. 16/685,012, filed Nov. 15, 2019, Cella et al.
U.S. Appl. No. 16/685,048, filed Nov. 15, 2019, Cella et al.
U.S. Appl. No. 16/685,372, filed Nov. 15, 2019, Cella et al.
U.S. Appl. No. 16/685,464, filed Nov. 15, 2019, Cella et al.
U.S. Appl. No. 16/685,518, filed Nov. 15, 2019, Cella et al.
U.S. Appl. No. 16/741,470, filed Jan. 13, 2020, Cella et al.
U.S. Appl. No. 16/868,018, filed May 6, 2020, Cella et al.
U.S. Appl. No. 17/104,964, filed Nov. 25, 2020, Cella et al.
U.S. Appl. No. 17/333,507, filed May 28, 2021, Cella et al.
U.S. Appl. No. 17/333,556, filed May 28, 2021, Cella et al.
U.S. Appl. No. 17/333,603, filed May 28, 2021, Cella et al.
U.S. Appl. No. 17/333,672, filed May 28, 2021, Cella et al.
U.S. Appl. No. 29/806,171, filed Sep. 1, 2021, Cardno et al.
U.S. Appl. No. 17/493,440, filed Oct. 4, 2021, Cella et al.
U.S. Appl. No. 17/537,096, filed Nov. 29, 2021, Cella et al.
U.S. Appl. No. 17/537,132, filed Nov. 29, 2021, Cella et al.
U.S. Appl. No. 17/537,180, filed Nov. 29, 2021, Cella et al.
U.S. Appl. No. 17/537,717, filed Nov. 30, 2021, Cella et al.
U.S. Appl. No. 17/537,735, filed Nov. 30, 2021, Cella et al.
U.S. Appl. No. 17/685,468, filed Mar. 3, 2022, Cella et al.
U.S. Appl. No. 17/685,475, filed Mar. 3, 2022, Cella et al.
U.S. Appl. No. 17/685,503, filed Mar. 3, 2022, Cella et al.
U.S. Appl. No. 17/685,515, filed Mar. 3, 2022, Cella et al.
U.S. Appl. No. 17/685,531, filed Mar. 3, 2022, Cella et al.
U.S. Appl. No. 17/685,549, filed Mar. 3, 2022, Cella et al.
U.S. Appl. No. 17/717,641, filed Apr. 11, 2022, Cella et al.
U.S. Appl. No. 18/072,884, filed Dec. 1, 2022, Cella et al.
U.S. Appl. No. 18/072,928, filed Dec. 1, 2022, Cella et al.
U.S. Appl. No. 18/073,037, filed Dec. 1, 2022, Cella et al.
U.S. Appl. No. 18/078,263, filed Dec. 9, 2022, Cella et al.
U.S. Appl. No. 18/081,088, filed Dec. 14, 2022, Cella et al.
U.S. Appl. No. 18/081,218, filed Dec. 14, 2022, Cella et al.
U.S. Appl. No. 18/081,267, filed Dec. 14, 2022, Cella et al.
U.S. Appl. No. 18/081,304, filed Dec. 14, 2022, Cella et al.
U.S. Appl. No. 18/081,324, filed Dec. 14, 2022, Cella et al.
U.S. Appl. No. 18/081,352, filed Dec. 14, 2022, Cella et al.
U.S. Appl. No. 18/085,736, filed Dec. 21, 2022, Cella et al.
C3.ai, "Digital Twins—The Foundation of AI-Driven Asset Reliability," Oct. 2022, https://developer.c3.ai/blog/reliability/digital-twins-foundation-ai-driven-asset-reliability, 4 pages.
Girroir, J., "Visualizing Azure Digital Twins in 3D," Oct. 2021, https://techcommunity.microsoft.com/t5/internet-of-things-blog/visualizing-azure-digital-twins-in-3d/ba-p/2898159, 1 page.
Harvey, T., "Transforming Automation User Experience with Deep Digital Twins," Oct. 2019, https://medium.com/passivelogic/transforming-automation-user-experience-with-deep-digital-twins-30f2922b39db, 2 pages.
Rouse, M., "Multilayer Perceptron," Techopedia, Mar. 2017, https://www.techopedia.com/definition/20879/multilayer-perceptron-mlp, 4 pages.
Strong Force Catalyst, "AI-Driven Digital Twin," May 2024, https://strongforcecatalyst.com/#digitaltwinvideo, 1 page.
Van Schalkwyk, P., "Digital Twin: Your Most Productive Remote Worker," Mar. 2020, https://xmpro.com/digital-twin-your-most-productive-remote-worker/, 3 pages.
Extended European Search Report dated Oct. 16, 2024 for EP Application No. 24186423.0, 12 pages.
Prado, J.A. et al., "Visuo-auditory Multimodal Emotional Structure to Improve Human-Robot-Interaction," Int J Soc Robot, Dec. 2011, vol. 4, pp. 29-51.
Ramik, D.M. et al., "A Soft-Computing basis for robots' cognitive autonomous learning," Soft Comput, vol. 19, Oct. 2014, pp. 2407-2421.
Russell, E., "Real-Time Topic and Sentiment Analysis in Human-Robot Conversation," Dec. 2015, Master's Theses (2009), Marquette University, 91 pages.
Sarvadevabhatla, R. et al., "Extended duration human-robot interaction: tools and analysis," 19th IEEE International Symposium on Robot and Human Interactive Communication, Sep. 2010, pp. 7-14.
Tzafestas, S., "Intelligent Systems, Control and Automation: Science and Engineering," Sociorobot World, vol. 80, 2016, 228 pages.
Eid, M.A. et al., "Affective Haptics: Current Research and Future Directions," IEEE Access, vol. 4, Nov. 2015, pp. 26-40.
Extended European Search Report dated Nov. 11, 2024 for EP Application No. 24195163.1, 10 pages.
Schuh, G. et al., "Systematization models for taylor-made sensor system applications and sensor data fit in production," Smart Sys Tech, Jun. 2015, European Conference on Smart Objects, Systems and Technologies, pp. 1-8.

* cited by examiner

SYSTEMS FOR MONITORING AND MANAGING INDUSTRIAL SETTINGS

CROSS-REFERENCE TO RELATED APPLICATIONS

This application is a continuation of U.S. application Ser. No. 17/333,507, filed on May 28, 2021, which is a bypass continuation of International Application No. PCT/US2019/059088, filed on Oct. 31, 2019, which claims priority to U.S. Provisional Patent Application No. 62/791,878 filed on Jan. 13, 2019, U.S. Provisional Patent Application No. 62/827,166 filed on Mar. 31, 2019, U.S. Provisional Patent Application No. 62/869,011 filed on Jun. 30, 2019, and U.S. Provisional Patent Application No. 62/914,998 filed on Oct. 14, 2019, each entitled METHODS, SYSTEMS, KITS, AND APPARATUSES FOR MONITORING INDUSTRIAL SETTINGS. Each of the above-identified applications is hereby incorporated by reference in its entirety as if fully set forth herein.

FIELD

The present disclosure relates to various configurations of Internet of Things (IoT) systems in conveniently deployed kits that monitor or manage industrial settings using various configurations of sensors, edge computing devices, networking systems, and artificial intelligence.

BACKGROUND

The Internet of Things (IoT) is a network of connected devices, systems, components, services, programs, vehicles, appliances, machines, and other electronic items that communicate via a set of communication networks and communication interfaces and protocols. While much of the development in the IoT space has centered on consumer products, such as wearable devices, home monitoring systems, smart appliances, and the like, there are many industrial applications for IoT devices and systems, including embodiments described throughout this disclosure and in the documents incorporated herein. For example, IoT sensors can be used to monitor industrial facilities, such as factories, refineries, oil and gas fields, manufacturing lines, energy production facilities, mining environments, and the like, as well as the many machines and systems disposed in such environments. While machines may include embedded sensors and instrumentation, such as onboard diagnostic systems, many machines do not have such embedded sensors, and others only have a limited set of sensors; accordingly, a need and an opportunity exist for vastly more data collection, such as via the location (which may be temporary (such as with portable or mobile data collectors as described in documents incorporated by reference, or by drones, autonomous vehicles, or the like), semi-permanent (such as with modular interfaces for convenient connection and disconnection), or permanent) of large numbers of heterogeneous sensors of various types on, in or around machines in industrial environments.

There are a number of issues, however, that arise in the Industrial IoT setting. For example, while many industrial IoT devices may be configured to communicate using cellular protocols, such as the 3G, 4G, LTE or 5G communication protocols, those protocols may not be natively well suited for communication in the industrial setting, as heavy machinery and thick dense structures may adversely affect communication between devices. Wi-Fi systems may also provide network connections within facilities; however, Wi-Fi systems may also experience challenges due to the adverse physical environments involved in industrial settings. For example, Wi-Fi systems are not typically well designed to communicate through obstructions, such as slabs of concrete or brick. Also, many devices in an industrial setting may be mobile, such that Wi-Fi and cellular systems have difficulty resolving which devices are communicating at a given time.

Another issue that may arise is related to bandwidth. As hundreds or thousands of sensors may be placed in an area to be monitored (e.g., factory, assembly line, oil field, etc.), and those sensors may capture multiple readings every second, the amount of data that is being collected may put a strain on the computing resources of even the most robust computing systems. A need exists for methods and systems that address challenges of efficient and effective bandwidth utilization.

Another issue is security. IoT devices can be perceived as security risks when the devices are connected to computer networks, such as ones used to operate mission critical machines. IoT devices have historically experienced security vulnerabilities and have frequently been points of attack on networks and devices.

Concerns about bandwidth, reliability, latency and/or security may deter organizations from integrating IoT sensor systems into their industrial environments and computer networks. A need exists for systems that provide the benefits of the IoT while addressing networking needs and security risks.

Another challenge for organizations considering IoT deployments is that such deployments require sophisticated integration of IoT devices with networking systems and with platforms (e.g., cloud platforms) where analysis of IoT-collected data is performed and where both human and automated controls are provided for industrial settings. Organizations may lack the range of expertise or available staff to undertake effective IoT integrations. A need exists for simplified deployment systems that offer the benefits of the IoT.

SUMMARY

Provided herein are methods and systems for monitoring and managing industrial settings, including through a variety of configurable kits that provide out-of-the-box, self-configuring and automatically provisioned capabilities for monitoring and managing industrial settings while mitigating issues of complexity, integration, bandwidth, latency and security. The practical implementation of an IoT solution may include a set of components that may comprise an appropriate set of sensors each configured for various respective industrial settings, a set of communication devices, a set of edge computing devices and a set of communication capabilities (including various protocols, ports, gateways, connectors, interfaces and the like) that collectively provide automatically configured and/or pre-configured processing and transmission of sensor data from the sensor kits to a set of backend systems (e.g., cloud-deployed systems or on-premises systems) via appropriate protocols, and a set of backend systems that are automatically configured and/or preconfigured to provide monitoring and/or management information to owners and operators of industrial settings from the particular sensor kits that are registered to their industrial settings. As used herein "set" may include a set with a single member. References to "monitoring" and/or to "management" should be understood, except where context indicates otherwise, to encompass various actions or activities that may benefit from the information shared via the IoT, such as monitoring machine performance, reporting on status, states, or conditions, managing states, conditions, parameters, undertaking remote control, supporting autonomous functions that depend on status or state information, supporting analytics, supporting self-configuration, supporting artificial intelligence, supporting machine learning, and the like.

According to some embodiments of the present disclosure, a sensor kit configured for monitoring an industrial setting is disclosed. In embodiments, the sensor kit includes an edge device and a plurality of sensors, i.e., a set of sensors, that capture sensor data and transmit the sensor data via a self-configuring sensor kit network. The plurality of sensors includes one or more sensors of a first sensor type and one or more sensors of a second sensor type. At least one sensor of the plurality of sensors includes a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The edge device includes a communication system having: a first communication device that receives reporting packets from the plurality of sensors via the self-configuring sensor kit network and a second communication device that transmits sensor kit packets to a backend system via a public network. The edge device further includes a processing system having one or more processors that execute computer-executable instructions that cause the processing system to: receive the reporting packets from the communication system; perform one or more edge operations on the instances of sensor data in the reporting packets; generate the sensor kit packets based on the instances of sensor data, wherein each sensor kit packet includes at least one instance of sensor data; and output the sensor kits packets to the communication system, wherein the communication system transmits the reporting packets to the backend system via the public network.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In some embodiments, the edge device further includes one or more storage devices that store a sensor data store that stores instances of sensor data captured by the plurality of sensors of the sensor kit.

In some embodiments, the edge device further includes one or more storage devices that store a model data store that stores one or more machine-learned models that are each trained to predict or classify a condition of an industrial component of the industrial setting and/or the industrial setting based on a set of features that are derived from instances of sensor data captured by one or more of the plurality of sensors. In some of these embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial setting or the industrial setting and a degree of confidence corresponding to the prediction or classification; and selectively encoding the one or more instances of sensor data prior to transmission to the backend system based on the condition or prediction. In some of these embodiments, selectively encoding the one or more instances of sensor data includes: compressing the one or more instances of sensor data using a lossy codec in response to obtaining one or more predictions or classifications relating to conditions of respective industrial components of the industrial setting and the industrial setting that collectively indicate that there are likely no issues relating to any industrial component of the industrial setting and the industrial setting. In some of these embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In some embodiments, selectively encoding the one or more instances of sensor data includes compressing the one or more instances of sensor data using a lossless codec in response to obtaining a prediction or classification relating to a condition of a particular industrial component or the industrial setting that indicates that there is likely an issue relating to the particular industrial component or the industrial setting. In some embodiments, selectively encoding the one or more instances of sensor data includes refraining from compressing the one or more instances of sensor data in response to obtaining a prediction or classification relating to a condition of a particular industrial component or the industrial setting that indicates that there is likely an issue relating to the particular industrial component or the industrial setting. In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial setting or the industrial setting and a degree of confidence corresponding to the prediction or classification; and selectively storing the one or more instances of sensor data in a storage device of the edge device based on the prediction or classification. In some embodiments, selectively storing the one or more instances of sensor data includes in response to obtaining one or more predictions or classifications relating to conditions of respective industrial components of the industrial setting and the industrial setting that collectively indicate that there are likely no issues relating to any industrial component of the industrial setting and the industrial setting, storing the one or more instances of sensor data in the storage device with an expiry, such that the one or more instances of sensor data are purged from the storage device in accordance with the expiry. In some embodiments, selectively storing the one or more instances of sensor data includes in response to obtaining a prediction or classification relating to a condition of a particular industrial component or the industrial setting that indicates that there is likely an issue relating to the particular industrial component or the industrial setting, storing the one or more instances of sensor data in the storage device indefinitely.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In embodiments, the self-configuring sensor kit network is a mesh network such that the communication device of each sensor of the plurality of sensors is configured to establish a communication channel with at least one other sensor of the plurality of sensors, and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In embodiments, the self-configuring sensor kit network is a hierarchical network. In some of these embodiments, the sensor kit further includes one or more collection devices configured to receive reporting packets from one or more sensors of the plurality of sensors and route the reporting packets to the edge device.

In embodiments, the self-configuring sensor kit network is a ring network that communicates using a serial data protocol.

In embodiments, the sensor kit network is a mesh network.

In embodiments, at least one of the sensors in the sensor kit network is a multi-axis vibration sensor.

In embodiments, the edge device includes a rule-based network protocol adaptor for selecting a network protocol by which to send sensor kit packets via the public network.

According to some embodiments of the present disclosure, a method for monitoring an industrial setting using a sensor kit having a plurality of sensors and an edge device including a processing system is disclosed. In embodiments, the method includes receiving, by the processing system, reporting packets from one or more respective sensors of the plurality of sensors, wherein each reporting packet is sent from a respective sensor and indicates sensor data captured by the respective sensor; performing, by the processing system, one or more edge operations on one or more instances of sensor data received in the reporting packets; generating, by the processing system, one or more sensor kit packets based on the instances of sensor data, wherein each sensor kit packet includes at least one instance of sensor data; and outputting, by the processing system, the sensor kit packets to a backend system via a public network. In embodiments, the reporting packets received from one or more respective sensors of the plurality of sensors include a sensor identifier of the respective sensor. In embodiments, receiving the reporting packets from the one or more respective sensors is performed using a first communication device implementing a first communication protocol and outputting the sensor kit packets to the backend system is performed using a second communication device implementing a second communication protocol. In some embodiments, the second communication device is a satellite terminal device, and outputting the sensor kit packets includes transmitting the sensor kit packets to a satellite using the satellite terminal device, wherein the satellite routes the sensor kit packets to the public network. In embodiments, outputting the sensor kit packets to a backend system includes transmitting the sensor kit packets to a gateway device of the sensor kit. In some embodiments, transmitting the sensor kit packets to the gateway device includes transmitting the sensor kit packets to the gateway via a wired communication link between the edge device and the gateway device. In embodiments, the gateway device includes a satellite terminal device that is configured to transmit the sensor kit packets to a satellite that routes the sensor kits to the public network. In some embodiments, the gateway device includes a cellular chipset that is pre-configured to transmit sensor kit packets to a cellphone tower of a preselected cellular provider. In embodiments, the method further includes storing, by one or more storage devices of the edge device, a model data store that stores one or more machine-learned models. In some embodiments, the one or more machine-learned models are trained to predict or classify a condition of an industrial component of the industrial setting and/or of the industrial setting based on a set of features that are derived from instances of sensor data captured by one or more of the plurality of sensors.

In some embodiments performing one or more edge operations includes generating a feature of vector based on one or more instances of sensor data received from one or more sensors of the plurality of sensors; inputting the feature vector to a machine-learned model of the one or more machine-learned models to obtain a prediction or classification relating to a condition of a particular industrial component of the industrial setting or the industrial setting and a degree of confidence corresponding to the prediction or classification; and selectively encoding the one or more instances of sensor data prior to transmission to the backend system based on the condition or prediction. In some embodiments, selectively encoding the one or more instances of sensor data includes: compressing the one or more instances of sensor data using a lossy codec in response to obtaining one or more predictions or classifications relating to conditions of respective industrial components of the industrial setting and the industrial setting that collectively indicate that there are likely no issues relating to any industrial component of the industrial setting and the industrial setting. In embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In some embodiments, selectively encoding the one or more instances of sensor data includes compressing the one or more instances of sensor data using a lossless codec in response to obtaining a prediction or classification relating to a condition of a particular industrial component or the industrial setting that indicates that there is likely an issue relating to the particular industrial component or the industrial setting. In embodiments, selectively encoding the one or more instances of sensor data includes refraining from compressing the one or more instances of sensor data in response to obtaining a prediction or classification relating to a condition of a particular industrial component or the industrial setting that indicates that there is likely an issue relating to the particular industrial component or the industrial setting.

In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial setting or the industrial setting and a degree of confidence corresponding to the prediction or classification; and selectively storing the one or more instances of sensor data in a storage device of the edge device based on the prediction or classification. In embodiments, selectively storing the one or more instances of sensor data includes storing the one or more instances of sensor data in the storage device with an expiry such that the one or more instances of sensor data are purged from the storage device in accordance with the expiry, wherein storing the one or more instances of sensor data in the storage device with an expiry is performed in response to obtaining one or more predictions or classifications relating to conditions of respective industrial components of the industrial setting and the industrial setting that collectively indicate that there are likely no issues relating to any industrial component of the industrial setting and the industrial setting. In some embodiments, selectively storing the one or more instances of sensor data includes storing the one or more instances of sensor data in the storage device indefinitely in response to obtaining a prediction or classification relating to a condition of a particular industrial component or the industrial setting that indicates that there is likely an issue relating to the particular industrial component or the industrial setting.

In some embodiments, the method further includes: capturing, by a sensing component of a sensor of the plurality of sensors, sensor measurements; generating, by a processor of the sensor, one or more reporting packets based on the captured sensor measurements; and transmitting, by a communication unit of the sensor, the one or more reporting packets to the edge device via a self-configuring sensor kit network. In some of these embodiments, the method further includes initiating, by the processing system, configuration of the self-configuring sensor kit network, wherein the self-configuring sensor kit network is a star network. In some embodiments, the reporting packets are received directly from respective sensors using a short-range communication protocol. In embodiments, the method further includes initiating, by the processing system, configuration of the self-configuring sensor kit network, wherein the self-configuring sensor kit network is a mesh network. In some embodiments, the method further includes: establishing, by the communication device of each sensor of the plurality of sensors, a communication channel with at least one other sensor of the plurality of sensors; receiving, by the at least one sensor of the plurality of sensors, instances of sensor data from one or more other sensors of the plurality of sensors; and routing, by the at least one sensor of the plurality of sensors, the received instances of the sensor data towards the edge device via the mesh network.

In some embodiments, the self-configuring sensor kit network is a hierarchical network and the sensor kit includes one or more collection devices that participate in the hierarchical network. In some of these embodiments, the method further includes receiving, by a collection device of the one or more collection devices, reporting packets from a set of sensors of the plurality of sensors that communicate with the collection device using a first short-range communication protocol; and routing, by the one or more collection devices, the reporting packets to the edge device using one of the first short-range communication protocol or a second short-range communication protocol that is different than the second-range communication protocol.

In some embodiments, the edge device includes a rule-based network protocol adaptor. In some of these embodiments, the method further includes: selecting, by the rule-based network protocol adaptor, a network protocol; and sending, by the edge device, sensor kit packets by the network protocol via the public network.

In some embodiments, the plurality of sensors includes a first set of sensors of a first sensor type and a second set of sensors of a second sensor type.

According to some embodiments of the present disclosure, a sensor kit configured for monitoring an industrial setting is disclosed. In embodiments, the sensor kit includes an edge device and a plurality of sensors that capture sensor data and transmit the sensor data via a self-configuring sensor kit network. The plurality of sensors includes one or more sensors of a first sensor type and one or more sensors of a second sensor type. At least one sensor of the plurality of sensors includes a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The edge device includes one or more storage devices that store a model data store that stores a plurality of machine-learned models that are each trained to predict or classify a condition of an industrial component of the industrial setting or of the industrial setting based on a set of features that are derived from instances of sensor data captured by one or more of the plurality of sensors. The edge device further includes a communication system that receives reporting packets from the plurality of sensors via the self-configuring sensor kit network using a first communication protocol and that transmits sensor kit packets to a backend system via a public network using a second communication protocol that is different from the first communication protocol. The edge device further includes a processing system having one or more processors that execute computer-executable instructions that cause the processing system to: receive the reporting packets from the communication system; generate a set of feature vectors based on one or more respective instances of sensor data received in the reporting packets; for each respective feature vector, input the respective feature vector into a respective machine-learned model that corresponds to the feature vector to obtain a respective prediction or classification relating to a condition of a respective industrial component of the industrial setting or the industrial setting and a degree of confidence corresponding to the respective prediction or classification; selectively encode the one or more instances of sensor data prior to transmission to the backend system based on the respective predictions or classifications outputted by the machine-learned models in response to the respective feature vector to obtain one or more sensor kit packets; and output the sensor kits packets to the communication system, wherein the communication system transmits the reporting packets to the backend system via the public network.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In embodiments, the one or more storage devices that store a sensor data store that stores instances of sensor data captured by the plurality of sensors of the sensor kit.

In embodiments, selectively encoding the one or more instances of sensor data includes, in response to obtaining one or more predictions or classifications relating to conditions of respective industrial components of the industrial setting and the industrial setting that collectively indicate that there are likely no issues relating to any industrial component of the industrial setting and the industrial setting, compressing the one or more instances of sensor data using a lossy codec. In some embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In some of these embodiments, selectively encoding the one or more instances of sensor data includes: in response to obtaining a prediction or classification relating to a condition of a particular industrial component or the industrial setting that indicates that there is likely an issue relating to the particular industrial component or the industrial setting, compressing the one or more instances of sensor data using a lossless codec.

In some embodiments, selectively encoding the one or more instances of sensor data includes: in response to obtaining a prediction or classification relating to a condition of a particular industrial component or the industrial setting that indicates that there is likely an issue relating to the particular industrial component or the industrial setting, refraining from compressing the one or more instances of sensor data.

In embodiments, the computer-executable instructions further cause the one or more processors of the edge device to selectively store the one or more instances of sensor data in the one or more storage devices of the edge device based on the respective predictions or classifications. In some of these embodiments, selectively storing the one or more instances of sensor data includes, in response to obtaining one or more predictions or classifications relating to conditions of respective industrial components of the industrial setting and the industrial setting that collectively indicate that there are likely no issues relating to any industrial component of the industrial setting and the industrial setting, storing the one or more instances of sensor data in the storage device with an expiry, such that the one or more instances of sensor data are purged from the storage device in accordance with the expiry. In some embodiments, selectively storing the one or more instances of sensor data includes, in response to obtaining a prediction or classification relating to a condition of a particular industrial component or the industrial setting that indicates that there is likely an issue relating to the particular industrial component or the industrial setting, storing the one or more instances of sensor data in the storage device indefinitely.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In some embodiments, the self-configuring sensor kit network is a mesh network such that: the communication device of each sensor of the plurality of sensors is configured to establish a communication channel with at least one other sensor of the plurality of sensors, and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In embodiments, the self-configuring sensor kit network is a hierarchical network. In some of these embodiments, the sensor kit includes one or more collection devices configured to receive reporting packets from one or more sensors of the plurality of sensors and route the reporting packets to the edge device.

According to some embodiments of the present disclosure, a method for monitoring an industrial setting using a sensor kit having a plurality of sensors and an edge device including a processing system is disclosed. The method includes: receiving, by the processing system, reporting packets from one or more respective sensors of the plurality of sensors, wherein each reporting packet includes routing data and one or more instances of sensor data; generating, by the processing system, a set of feature vectors based on one or more respective instances of sensor data received in the reporting packets; inputting, by the processing system, each respective feature vector into a respective machine-learned model of a plurality of machine-learned models that are each trained to predict or classify a respective condition of an industrial component of the industrial setting or of the industrial setting based on a set of features that are derived from instances of sensor data captured by one or more of the plurality of sensors; obtaining, by the processing system, a respective prediction or classification and a degree of confidence corresponding to the respective prediction or classification from each respective machine-learned model based on the respective feature vector inputted into the respective machine-learned model; selectively encoding, by the processing system, the one or more instances of sensor data based on the respective prediction or classification to obtain one or more sensor kit packets; and transmitting, by the processing system, the sensor kit packets to a backend system via a public network. In some embodiments, the sensor kit includes a gateway device configured to receive sensor kit packets from the edge device via a wired communication link and transmit the sensor kit packets to the backend system via the public network on behalf of the edge device. In embodiments, the gateway device includes a satellite terminal device that transmits the sensor kit packets to a satellite that routes the sensor kit packets to the public network. In some embodiments, the gateway device includes a cellular chipset that transmits the sensor kit packets to a cellphone tower of a preselected cellular provider. In embodiments, receiving the reporting packets from the one or more respective sensors is performed using a first communication device implementing a first communication protocol and transmitting the sensor kit packets to the backend system is performed using a second communication device implementing a second communication protocol. In some embodiments, the second communication device of the edge device is a satellite terminal device and transmitting the sensor kit packets to the backend system includes transmitting, by the satellite terminal device, the sensor kit packets to a satellite that routes the sensor kit packets to the public network In some embodiments, the method further includes compressing, by the processing system, the one or more instances of sensor data using a lossy codec in response to obtaining one or more predictions or classifications relating to conditions of the respective industrial components of the industrial setting and the industrial setting that collectively indicate that there are likely no issues relating to any industrial component of the industrial setting and the industrial setting. In some of these embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of the sensor data. In some embodiments, the method includes compressing, by the processing system, the one or more instances of sensor data using a lossless codec in response to obtaining a prediction or classification relating to a condition of a particular industrial component or the industrial setting that indicates that there is likely an issue relating to the particular industrial component or the industrial setting. In embodiments, the method includes refraining, by the processing system, from compressing the one or more instances of sensor data in response to obtaining a prediction or classification relating to a condition of a particular industrial component or the industrial setting that indicates that there is likely an issue relating to the particular industrial component or the industrial setting.

In some embodiments, the edge communication device includes one or more storage devices that store the plurality of machine-learned models. In some of these embodiments, the one or more storage devices store instances of the sensor data captured by the plurality of sensors of the sensor kit. In some embodiments, the method further includes selectively storing, by the processing system, the one or more instances of sensor data in the one or more storage devices based on the respective predictions or classifications. In embodiments, the method further includes storing, by the processing system, the one or more instances of sensor data in the storage device with an expiry such that the one or more instances of sensor data are purged from the storage device in accordance with the expiry, wherein the processing system stores the one or more instances of sensor data in the storage device with the expiry in response to obtaining one or more predictions or classifications relating to conditions of respective industrial components of the industrial setting and the industrial setting that collectively indicate that there are likely no issues relating to any industrial component of the industrial setting and the industrial setting. In some embodiments, the method further includes storing, by the processing system, the one or more instances of sensor data in the storage device indefinitely in response to obtaining a prediction or classification relating to a condition of a particular industrial component or the industrial setting that indicates that there is likely an issue relating to the particular industrial component or the industrial setting In some embodiments, the method further includes capturing, by the plurality of sensors, sensor data; and transmitting, by the plurality of sensors, the sensor data via a self-configuring sensor kit network. In some of these embodiments, transmitting the sensor data via the self-configuring sensor kit network includes directly transmitting, by each sensor of the plurality of sensors, instances of sensor data with the edge device using a short-range communication protocol, wherein the self-configuring sensor kit network is a star network. In some embodiments, the method further includes initiating, by the processing system, configuration of the self-configuring sensor kit network. In embodiments, the self-configuring sensor kit network is a mesh network and each sensor of the plurality of sensors includes a communication device. In embodiments, the method further includes: establishing, by the communication device of each sensor of the plurality of sensors, a communication channel with at least one other sensor of the plurality of sensors; receiving, by at least one sensor of the plurality of sensors, instances of sensor data from one or more other sensors of the plurality of sensors; and routing, by the at least one sensor of the plurality of sensors, the received instances of the sensor data towards the edge device.

In some embodiments, the self-configuring sensor kit network is a hierarchical network and the sensor kit includes one or more collection devices. In some of these embodiments, the method further includes: receiving, by at least one collection device of the plurality of collection devices, reporting packets from one or more sensors of the plurality of sensors; and routing, by the at least one collection device of the plurality of collection devices, the reporting packets to the edge device.

In embodiments, the plurality of sensors includes a first set of sensors of a first sensor type and a second set of sensors of a second sensor type.

According to some embodiments of the present disclosure, a sensor kit configured for monitoring an industrial setting is disclosed. In embodiments, the sensor kit includes an edge device and a plurality of sensors that capture sensor data and transmit the sensor data via a self-configuring sensor kit network. The plurality of sensors includes one or more sensors of a first sensor type and one or more sensors of a second sensor type. At least one sensor of the plurality of sensors includes a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The edge device includes a first communication device that receives reporting packets from the plurality of sensors via the self-configuring sensor kit network; and a second communication device that transmits sensor kit packets to a backend system via a public network. The edge device further includes a processing system having one or more processors that execute computer-executable instructions that cause the processing system to: receive the reporting packets from the communication system; generate a block of media content frames, wherein each media content frame includes a plurality of frame values, each frame value being indicative of a respective instance of sensor data; compress the block of media content frames using a media codec; generate one or more server kit packets based on the block of media content frames; and transmit the one or more server kit packets to the backend system via the public network.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In embodiments, the edge device further includes one or more storage devices that store a sensor data store that stores instances of sensor data captured by the plurality of sensors of the sensor kit.

In embodiments, the edge device further includes one or more storage devices that store a model data store that stores one or more machine-learned models that are each trained to predict or classify a condition of an industrial component of the industrial setting and/or the industrial setting based on a set of features that are derived from instances of sensor data captured by one or more of the plurality of sensors. In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial setting or the industrial setting and a degree of confidence corresponding to the prediction or classification; and selecting the codec used to compress the block of media frames based on the condition or prediction. In some embodiments, selecting the codec includes, in response to obtaining one or more predictions or classifications relating to conditions of respective industrial components of the industrial setting and the industrial setting that collectively indicate that there are likely no issues relating to any industrial component of the industrial setting and the industrial setting, selecting a lossy codec. In some of these embodiments, selectively encoding the one or more instances of sensor data includes, in response to obtaining a prediction or classification relating to a condition of a particular industrial component or the industrial setting that indicates that there is likely an issue relating to the particular industrial component or the industrial setting, selecting a lossless codec.

In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial setting or the industrial setting and a degree of confidence corresponding to the prediction or classification; and selectively storing the one or more instances of sensor data in a storage device of the edge device based on the prediction or classification. In some of these embodiments, selectively storing the one or more instances of sensor data includes: in response to obtaining one or more predictions or classifications relating to conditions of respective industrial components of the industrial setting and the industrial setting that collectively indicate that there are likely no issues relating to any industrial component of the industrial setting and the industrial setting, storing the one or more instances of sensor data in the storage device with an expiry, such that the one or more instances of sensor data are purged from the storage device in accordance with the expiry. In some embodiments, selectively storing the one or more instances of sensor data includes: in response to obtaining a prediction or classification relating to a condition of a particular industrial component or the industrial setting that indicates that there is likely an issue relating to the particular industrial component or the industrial setting, storing the one or more instances of sensor data in the storage device indefinitely.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In some embodiments, the self-configuring sensor kit network is a mesh network such that: the communication device of each sensor of the plurality of sensors is configured to establish a communication channel with at least one other sensor of the plurality of sensors, and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In embodiments, the self-configuring sensor kit network is a hierarchical network. In some of these embodiments, the sensor kit includes one or more collection devices configured to receive reporting packets from one or more sensors of the plurality of sensors and route the reporting packets to the edge device.

In some embodiments, generating the block of media frames includes: for each instance of sensor data that is to be included in a media frame, normalizing the instance of sensor data into a respective normalized media frame value that is within of range of media frame values that are permitted by an encoding standard corresponding to the media frame; and embedding each respective normalized media frame value into the media frame. In some of these embodiments, wherein each media frame is a video frame including a plurality of pixels and the respective normalized media frame values are pixel values. In some embodiments, embedding each respective normalized media frame value into the media frame includes: determining a pixel of the plurality of pixels corresponding to the respective normalized media frame based on a mapping that maps respective sensors of the plurality of sensors to respective pixels of the plurality of pixels; and setting a value of the determined pixel equal to the respective normalized media frame value. In embodiments, the codec is an H.264/MPEG-4 codec. In embodiments, the codec is an H.265/MPEG-H codec. In embodiments, the codec is an H.263/MPEG-4 codec.

According to some embodiments of the present disclosure, a method for monitoring an industrial setting using a sensor kit having a plurality of sensors and an edge device including a processing system is disclosed. The method includes: receiving, by the processing system, reporting packets from one or more respective sensors of the plurality of sensors, wherein each reporting packet includes routing data and one or more instances of sensor data; generating, by the processing system, a block of media content frames, wherein each media content frame includes a plurality of frame values, each frame value being indicative of a respective instance of sensor data; compressing, by the processing system, the block of media content frames using a media codec to obtain a compressed block; generating, by the processing system, one or more server kit packets based on the compressed block; and transmitting, by the processing system, the one or more server kit packets to a backend system via a public network. In some embodiments, the sensor kit includes a gateway device configured to receive sensor kit packets from the edge device via a wired communication link and transmit the sensor kit packets to the backend system via the public network on behalf of the edge device. In embodiments, the gateway device includes a satellite terminal device that is configured to transmit the sensor kit packets to a satellite that routes the sensor kits to the public network. In some embodiments, the gateway device includes a cellular chipset that is pre-configured to transmit sensor kit packets to a cellphone tower of a preselected cellular provider.

In embodiments, receiving the reporting packets from the one or more respective sensors is performed using a first communication device that receives reporting packets from the plurality of sensors via a self-configuring sensor kit network and transmitting the sensor kit packets to the backend system is performed using a second communication device. In some of these embodiments, the second communication device of the edge device is a satellite terminal device that is configured to transmit the sensor kit packets to a satellite that routes the sensor kits to the public network. In some embodiments, the method further includes capturing, by the plurality of sensors, sensor data; and transmitting, by the plurality of sensors, the sensor data to the edge device via the self-configuring sensor kit network. In some embodiments, transmitting the sensor data via the self-configuring sensor kit network includes directly transmitting, by each sensor of the plurality of sensors, instances of sensor data with the edge device using a short-range communication protocol, wherein the self-configuring sensor kit network is a star network. In embodiments, the method further includes initiating, by the processing system, configuration of the self-configuring sensor kit network.

In some embodiments, the self-configuring sensor kit network is a mesh network and each sensor of the plurality of sensors includes a communication device. In some of these embodiments, the method further includes establishing, by the communication device of each sensor of the plurality of sensors, a communication channel with at least one other sensor of the plurality of sensors; receiving, by at least one sensor of the plurality of sensors, instances of sensor data from one or more other sensors of the plurality of sensors; and routing, by the at least one sensor of the plurality of sensors, the received instances of the sensor data towards the edge device.

In some embodiments, the self-configuring sensor kit network is a hierarchical network and the sensor kit includes one or more collection devices. In some of these embodiments, the method further includes receiving, by at least one collection device of the plurality of collection devices, reporting packets from one or more sensors of the plurality of sensors; and routing, by the at least one collection device of the plurality of collection devices, the reporting packets to the edge device.

In some embodiments, the method further includes storing, by one or more storage devices of the edge device, instances of sensor data captured by the plurality of sensors of the sensor kit.

In embodiments, the edge device further includes one or more storage devices that store a model data store that stores one or more machine-learned models that are each trained to predict or classify a condition of an industrial component of the industrial setting and/or the industrial setting based on a set of features that are derived from instances of sensor data captured by one or more of the plurality of sensors. In some of these embodiments, the method further includes: generating, by the processing system, a feature vector based on one or more instances of sensor data received from one or more sensors of the plurality of sensors; inputting, by the processing system, the feature vector to the machine-learned model to obtain a prediction or classification relating to a condition of a particular industrial component of the industrial setting or the industrial setting and a degree of confidence corresponding to the prediction or classification; and selecting the media codec used to compress the block of media content frames based on the classification or prediction. In some embodiments, selecting the media codec includes selecting a lossy codec in response to obtaining one or more predictions or classifications relating to conditions of respective industrial components of the industrial setting and the industrial setting that collectively indicate that there are likely no issues relating to any industrial component of the industrial setting and the industrial setting. In embodiments, selecting the media codec includes selecting a lossless codec in response to obtaining a prediction or classification relating to a condition of a particular industrial component or the industrial setting that indicates that there is likely an issue relating to the particular industrial component or the industrial setting.

In some embodiments, the method further includes: generating, by the processing system, a feature vector based on one or more instances of sensor data received from one or more sensors of the plurality of sensors; inputting, by the processing system, the feature vector to the machine-learned model to obtain a prediction or classification relating to a condition of a particular industrial component of the industrial setting or the industrial setting and a degree of confidence corresponding to the prediction or classification; and selectively storing, by the processing system, the one or more instances of sensor data in the storage device of the edge device based on the prediction or classification. In embodiments, selectively storing the one or more instances of sensor data in the storage device includes storing the one or more instances of sensor data in the storage device with an expiry such that the one or more instances of sensor data are purged from the storage device in accordance with the expiry, wherein storing the one or more instances of sensor data in the storage device with an expiry is performed in response to obtaining one or more predictions or classifications relating to conditions of respective industrial components of the industrial setting and the industrial setting that collectively indicate that there are likely no issues relating to any industrial component of the industrial setting and the industrial setting. In some embodiments, selectively storing the one or more instances of sensor data in the storage device includes storing the one or more instances of sensor data in the storage device indefinitely in response to obtaining a prediction or classification relating to a condition of a particular industrial component or the industrial setting that indicates that there is likely an issue relating to the particular industrial component or the industrial setting.

In some embodiments, generating the block of media content frames includes: normalizing, by the processing system, for each instance of sensor data that is to be included in a media content frame, the instance of sensor data into a respective normalized media content frame value that is within of range of media content frame values that are permitted by an encoding standard corresponding to the media content frame; and embedding, by the processing system, each respective normalized media content frame value into the media content frame. In some of these embodiments, each media content frame is a video frame including a plurality of pixels and the respective normalized media frame values are pixel values. In embodiments, embedding each respective normalized media content frame value into the media content frame includes: determining, by the processing system, a pixel of the plurality of pixels corresponding to the respective normalized media content frame based on a mapping that maps respective sensors of the plurality of sensors to respective pixels of the plurality of pixels; and setting a value of the determined pixel value equal to the respective normalized media content frame value. In some embodiments, the codec is an H.264/MPEG-4 codec. In some embodiments, the codec is an H.265/MPEG-H codec. In some embodiments, the codec is an H.263/MPEG-4 codec.

In embodiments, the plurality of sensors includes a first set of sensors of a first sensor type and a second set of sensors of a second sensor type.

According to some embodiments of the present disclosure, a system is disclosed. The system includes a backend system and a sensor kit configured to monitor an industrial setting, the sensor kit. The sensor kit includes a plurality of sensors that capture sensor data and transmit the sensor data via a self-configuring sensor kit network, wherein the plurality of sensors includes one or more sensors of a first sensor type and one or more sensors of a second sensor type, wherein at least one sensor of the plurality of sensors includes: a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The edge device includes a communication system having: a first communication device that receives reporting packets from the plurality of sensors via the self-configuring sensor kit network; and a second communication device that transmits sensor kit packets to a backend system via a public network. The edge device includes a processing system having one or more processors that execute computer-executable instructions that cause the processing system to: receive the reporting packets from the communication system; perform one or more edge operations on the instances of sensor data in the reporting packets; generate the sensor kit packets based on the instances of sensor data, wherein each sensor kit packet includes at least one instance of sensor data; and output the sensor kits packets to the communication system, wherein the communication system transmits the reporting packets to the backend system via the public network. The backend system includes a backend storage system that stores a sensor kit data store that stores sensor data received from one or more respective sensor kits, including the sensor kit; and a backend processing system having one or more processors that execute computer-executable instructions that cause the backend processing system to: receive the sensor kit packets from the sensor kit; determine sensor data collected by the sensor kit based on the sensor kit packets; perform one or more backend operations on the sensor data collected by the sensor kit; and store the sensor data collected by the sensor kit in the sensor kit data store.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In embodiments, the edge device further includes one or more storage devices that store a sensor data store that stores instances of sensor data captured by the plurality of sensors of the sensor kit.

In embodiments, the edge device further includes one or more storage devices that store a model data store that stores one or more machine-learned models that are each trained to predict or classify a condition of an industrial component of the industrial setting and/or the industrial setting based on a set of features that are derived from instances of sensor data captured by one or more of the plurality of sensors. In some of these embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial setting or the industrial setting and a degree of confidence corresponding to the prediction or classification; and selectively encoding the one or more instances of sensor data prior to transmission to the backend system based on the condition or prediction. In some embodiments, selectively encoding the one or more instances of sensor data includes: in response to obtaining one or more predictions or classifications relating to conditions of respective industrial components of the industrial setting and the industrial setting that collectively indicate that there are likely no issues relating to any industrial component of the industrial setting and the industrial setting, compressing the one or more instances of sensor data using a lossy codec. In some embodiments, compressing the one or more instances of sensor data using the lossy codec includes: normalizing the one or more instances of sensor data into respective pixel values; encoding the respective pixel values into a video frame; and compressing a block of video frames using the lossy codec to obtain a compressed block of frames, wherein the lossy codec is a video codec and the block of video frames includes the video frame and one or more other video frames that include normalized pixel values of other instances of sensor data. In embodiments, the backend system receives the compressed block of frames in one or more sensor kit packets and determines the sensor data collected by the sensor kit by decompressing the compressed block of frames using the lossy codec. In some embodiments, selectively encoding the one or more instances of sensor data includes, in response to obtaining a prediction or classification relating to a condition of a particular industrial component or the industrial setting that indicates that there is likely an issue relating to the particular industrial component or the industrial setting, compressing the one or more instances of sensor data using a lossless codec. In embodiments, selectively encoding the one or more instances of sensor data includes, in response to obtaining a prediction or classification relating to a condition of a particular industrial component or the industrial setting that indicates that there is likely an issue relating to the particular industrial component or the industrial setting, refraining from compressing the one or more instances of sensor data. In embodiments, selectively encoding the one or more instances of sensor data includes selecting a stream of sensor data instances for uncompressed transmission. In embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial setting or the industrial setting and a degree of confidence corresponding to the prediction or classification; and selectively storing the one or more instances of sensor data in a storage device of the edge device based on the prediction or classification. In some of these embodiments, selectively storing the one or more instances of sensor data includes, in response to obtaining one or more predictions or classifications relating to conditions of respective industrial components of the industrial setting and the industrial setting that collectively indicate that there are likely no issues relating to any industrial component of the industrial setting and the industrial setting, storing the one or more instances of sensor data in the storage device with an expiry, such that the one or more instances of sensor data are purged from the storage device in accordance with the expiry. In some embodiments, selectively storing the one or more instances of sensor data includes, in response to obtaining a prediction or classification relating to a condition of a particular industrial component or the industrial setting that indicates that there is likely an issue relating to the particular industrial component or the industrial setting, storing the one or more instances of sensor data in the storage device indefinitely.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In some embodiments, the self-configuring sensor kit network is a mesh network such that: the communication device of each sensor of the plurality of sensors is configured to establish a communication channel with at least one other sensor of the plurality of sensors, and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In embodiments, the self-configuring sensor kit network is a hierarchical network. In some of these embodiments, the sensor kit includes one or more collection devices configured to receive reporting packets from one or more sensors of the plurality of sensors and route the reporting packets to the edge device.

In embodiments, the backend operations include performing one or more analytics tasks using the sensor data; performing one or more artificial intelligence tasks using the sensor data; issuing a notification to a human user associated with the industrial setting based on the sensor data; and/or controlling at least one component of the industrial setting based on the sensor data.

According to some embodiments of the present disclosure, a method for monitoring an industrial setting using a sensor kit in communication with a backend system, the sensor kit including a plurality of sensors and an edge device is disclosed. The method includes: receiving, by an edge processing system of the edge device, reporting packets from one or more respective sensors of the plurality of sensors, wherein each reporting packet includes routing data and one or more instances of sensor data; performing, by the edge processing system, one or more edge operations on the instances of sensor data in the reporting packets; generating, by the edge processing system, a plurality of sensor kit packets based on the instances of sensor data, wherein each sensor kit packet includes at least one instance of sensor data; transmitting, by the edge processing system, the sensor kit packets to the backend system via a public network; receiving, by a backend processing system of the backend system, the sensor kit packets from the sensor kit via the public network; determining, by the backend processing system, the sensor data collected by the sensor kit based on the sensor kit packets; performing, by the backend processing system, one or more backend operations on the sensor data collected by the sensor kit; and storing, by the backend processing system, the sensor data collected by the sensor kit in a sensor kit data store residing in a backend storage system of the backend system. In some embodiments, the sensor kit further includes a gateway device, wherein the gateway device is configured to receive sensor kit packets from the edge device via a wired communication link and transmit the sensor kit packets to the backend system via the public network on behalf of the edge device. In some embodiments, the gateway device includes a satellite terminal device that is configured to transmit the sensor kit packets to a satellite that routes the sensor kits to the public network. In embodiments, the gateway device includes a cellular chipset that is pre-configured to transmit sensor kit packets to a cellphone tower of a preselected cellular provider.

In embodiments, receiving the reporting packets from the one or more respective sensors is performed using a first communication device of the edge device that receives reporting packets from the plurality of sensors via a self-configuring sensor kit network and transmitting the sensor kit packets to the backend system is performed using a second communication device of the edge device. In some of these embodiments, the second communication device of the edge device is a satellite terminal device that is configured to transmit the sensor kit packets to a satellite that routes the sensor kits to the public network. In embodiments, the method further includes capturing, by the plurality of sensors, sensor data; and transmitting, by the plurality of sensors, the sensor data to the edge device via the self-configuring sensor kit network. In some embodiments, transmitting the sensor data via the self-configuring sensor kit network includes directly transmitting, by each sensor of the plurality of sensors, instances of sensor data with the edge device using a short-range communication protocol, wherein the self-configuring sensor kit network is a star network. In embodiments, the method further includes initiating, by the edge processing system, configuration of the self-configuring sensor kit network. In some embodiments, the self-configuring sensor kit network is a mesh network and each sensor of the plurality of sensors includes a communication device. In some embodiments, the method further includes: establishing, by the communication device of each sensor of the plurality of sensors, a communication channel with at least one other sensor of the plurality of sensors; receiving, by at least one sensor of the plurality of sensors, instances of sensor data from one or more other sensors of the plurality of sensors; and routing, by the at least one sensor of the plurality of sensors, the received instances of the sensor data towards the edge device.

In some embodiments, the self-configuring sensor kit network is a hierarchical network and the sensor kit includes one or more collection devices. In some of these embodiments, the method further includes: receiving, by at least one collection device of the plurality of collection devices, reporting packets from one or more sensors of the plurality of sensors; and routing, by the at least one collection device of the plurality of collection devices, the reporting packets to the edge device.

In embodiments, the method further includes storing, by one or more storage devices of the edge device, instances of sensor data captured by the plurality of sensors of the sensor kit.

In some embodiments, the edge device further includes one or more storage devices that store a model data store that stores one or more machine-learned models that are each trained to predict or classify a condition of an industrial component of the industrial setting and/or the industrial setting based on a set of features that are derived from instances of sensor data captured by one or more of the plurality of sensors. In some of these embodiments, performing one or more edge operations includes: generating, by the edge processing system, a feature vector based on one or more instances of sensor data received from one or more sensors of the plurality of sensors; inputting, by the edge processing system, the feature vector to the machine-learned model to obtain a prediction or classification relating to a condition of a particular industrial component of the industrial setting or the industrial setting and a degree of confidence corresponding to the prediction or classification; and selectively encoding, by the edge processing system, the one or more instances of sensor data prior to transmission to the backend system based on the prediction or classification. In some embodiments, selectively encoding the one or more instances of sensor data includes compressing, by the edge processing system, the one or more instances of sensor data using a lossy codec in response to obtaining one or more predictions or classifications relating to conditions of respective industrial components of the industrial setting and the industrial setting that collectively indicate that there are likely no issues relating to any industrial component of the industrial setting and the industrial setting. In some embodiments, compressing the one or more instances of sensor data using a lossy codec includes: normalizing, by the edge processing system, the one or more instances of sensor data into respective pixel values; encoding, by the edge processing system, the respective pixel values into a media content frame; and compressing, by the edge processing system, a block of media content frames using the lossy codec to obtain a compressed block, wherein the lossy codec is a video codec and the compressed block includes the media content frame and one or more other media content frames that include normalized pixel values of other instances of sensor data. In embodiments, the backend system receives the compressed block in one or more sensor kit packets and determines the sensor data collected by the sensor kit by decompressing the compressed block using the lossy codec.

In some embodiments, selectively encoding the one or more instances of sensor data includes compressing, by the edge processing system, the one or more instances of sensor data using a lossless codec in response to obtaining a prediction or classification relating to a condition of a particular industrial component or the industrial setting that indicates that there is likely an issue relating to the particular industrial component or the industrial setting. In embodiments, selectively encoding the one or more instances of sensor data includes refraining, by the edge processing system, from compressing the one or more instances of sensor data in response to obtaining a prediction or classification relating to a condition of a particular industrial component or the industrial setting that indicates that there is likely an issue relating to the particular industrial component or the industrial setting. In some embodiments, selectively encoding the one or more instances of sensor data includes selecting, by the edge processing system, a stream of sensor data instances for uncompressed transmission.

In some embodiments, performing one or more edge operations includes: generating, by the edge processing system, a feature vector based on one or more instances of sensor data received from one or more sensors of the plurality of sensors; inputting, by the edge processing system, the feature vector to the machine-learned model to obtain a prediction or classification relating to a condition of a particular industrial component of the industrial setting or the industrial setting and a degree of confidence corresponding to the prediction or classification; and selectively storing, by the edge processing system, the one or more instances of sensor data in a storage device of the one or more storage devices based on the prediction or classification. In some embodiments, selectively storing the one or more instances of sensor data includes storing, by the edge processing system, the one or more instances of sensor data in the storage device with an expiry in response to obtaining one or more predictions or classifications relating to conditions of respective industrial components of the industrial setting and the industrial setting that collectively indicate that there are likely no issues relating to any industrial component of the industrial setting and the industrial setting, wherein storing the one or more instances of sensor data in the storage device with an expiry is performed such that the one or more instances of sensor data are purged from the storage device in accordance with the expiry. In some embodiments, selectively storing the one or more instances of sensor data includes storing, by the edge processing system, the one or more instances of sensor data in the storage device indefinitely in response to obtaining a prediction or classification relating to a condition of a particular industrial component or the industrial setting that indicates that there is likely an issue relating to the particular industrial component or the industrial setting.

In some embodiments, the plurality of sensors includes a first set of sensors of a first sensor type and a second set of sensors of a second sensor type.

According to some embodiments of the present disclosure, a sensor kit configured to monitor an indoor agricultural facility is disclosed. The sensor kit includes an edge device and a plurality of sensors that capture sensor data and transmit the sensor data via a self-configuring sensor kit network, wherein the plurality of sensors includes one or more sensors of a first sensor type and one or more sensors of a second sensor type. At least one sensor of the plurality of sensors includes: a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The plurality of sensors includes two or more sensor types selected from the group including: light sensors, humidity sensors, temperature sensors, carbon dioxide sensors, fan speed sensors, weight sensors, and camera sensors. The edge device includes a communication system having a first communication device that receives reporting packets from the plurality of sensors via the self-configuring sensor kit network and a second communication device that transmits sensor kit packets to a backend system via a public network. The edge device also includes a processing system having one or more processors that execute computer-executable instructions that cause the processing system to: receive the reporting packets from the communication system, perform one or more edge operations on the instances of sensor data in the reporting packets; generate the sensor kit packets based on the instances of sensor data, wherein each sensor kit packet includes at least one instance of sensor data; and output the sensor kits packets to the communication system, wherein the communication system transmits the reporting packets to the backend system via the public network.

In embodiments, the sensor kit includes an edge device and a plurality of sensors that capture sensor data and transmit the sensor data via a self-configuring sensor kit network. The plurality of sensors includes one or more sensors of a first sensor type and one or more sensors of a second sensor type. At least one sensor of the plurality of sensors includes a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol.

In embodiments, the edge device further includes one or more storage devices that store a sensor data store that stores instances of sensor data captured by the plurality of sensors of the sensor kit.

In embodiments, the edge device further includes one or more storage devices that store a model data store that stores one or more machine-learned models that are each trained to predict or classify a condition of a component of the indoor agricultural setting and/or the indoor agricultural setting based on a set of features that are derived from instances of sensor data captured by one or more of the plurality of sensors. In some of these embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular component of the indoor agricultural setting or the indoor agricultural setting and a degree of confidence corresponding to the prediction or classification; and selectively encoding the one or more instances of sensor data prior to transmission to the backend system based on the condition or prediction. In some embodiments, selectively encoding the one or more instances of sensor data includes compressing the one or more instances of sensor data using a lossy codec in response to obtaining one or more predictions or classifications relating to conditions of respective industrial components of the indoor agricultural setting and the indoor agricultural setting that collectively indicate that there are likely no issues relating to any component of the indoor agricultural setting and the indoor agricultural setting. In some embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In some embodiments, selectively encoding the one or more instances of sensor data includes: compressing the one or more instances of sensor data using a lossless codec in response to obtaining a prediction or classification relating to a condition of a particular industrial component or the industrial setting that indicates that there is likely an issue relating to the particular industrial component or the industrial setting. In embodiments, selectively encoding the one or more instances of sensor data includes refraining from compressing the one or more instances of sensor data in response to obtaining a prediction or classification relating to a condition of a particular component or the indoor agricultural setting that indicates that there is likely an issue relating to the particular component or the indoor agricultural setting. In embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular component of the indoor agricultural setting or the indoor agricultural setting and a degree of confidence corresponding to the prediction or classification; and selectively storing the one or more instances of sensor data in a storage device of the edge device based on the prediction or classification. In some of these embodiments, selectively storing the one or more instances of sensor data includes storing the one or more instances of sensor data in the storage device with an expiry in response to obtaining one or more predictions or classifications relating to conditions of respective industrial components of the indoor agricultural setting and the indoor agricultural setting that collectively indicate that there are likely no issues relating to any component of the indoor agricultural setting and the indoor agricultural setting, such that the one or more instances of sensor data are purged from the storage device in accordance with the expiry. In some embodiments, selectively storing the one or more instances of sensor data includes storing the one or more instances of sensor data in the storage device indefinitely in response to obtaining a prediction or classification relating to a condition of a particular industrial component or the industrial setting that indicates that there is likely an issue relating to the particular component or the indoor agricultural setting.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In embodiments, the self-configuring sensor kit network is a mesh network such that: the communication device of each sensor of the plurality of sensors is configured to establish a communication channel with at least one other sensor of the plurality of sensors; and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In embodiments, the self-configuring sensor kit network is a hierarchical network. In some of these embodiments, the sensor kit further includes one or more collection devices configured to receive reporting packets from one or more sensors of the plurality of sensors and route the reporting packets to the edge device. In embodiments, each collection device is installed in a different respective room of the indoor agricultural setting and collects sensor data from sensors of the plurality sensors that are deployed in the respective room.

According to some embodiments of the present disclosure, a sensor kit configured to monitor an indoor agricultural setting is disclosed. The sensor kit includes an edge device and a plurality of sensors that capture sensor data and transmit the sensor data via a self-configuring sensor kit network, wherein the plurality of sensors includes one or more sensors of a first sensor type and one or more sensors of a second sensor type. At least one sensor of the plurality of sensors includes: a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The plurality of sensors includes two or more sensor types selected from the group including: infrared sensors, ground penetrating sensors, light sensors, humidity sensors, temperature sensors, chemical sensors, fan speed sensors, rotational speed sensors, weight sensors, and camera sensors. The edge device includes a communication system having a first communication device that receives reporting packets from the plurality of sensors via the self-configuring sensor kit network and a second communication device that transmits sensor kit packets to a backend system via a public network. The edge device further includes a processing system having one or more processors that execute computer-executable instructions that cause the processing system to: receive the reporting packets from the communication system; perform one or more edge operations on the instances of sensor data in the reporting packets; generate the sensor kit packets based on the instances of sensor data, wherein each sensor kit packet includes at least one instance of sensor data; and output the sensor kits packets to the communication system, wherein the communication system transmits the reporting packets to the backend system via the public network.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In embodiments, the edge device further includes one or more storage devices that store a sensor data store that stores instances of sensor data captured by the plurality of sensors of the sensor kit.

In embodiments, the edge device further includes one or more storage devices that store a model data store that stores one or more machine-learned models that are each trained to predict or classify a condition of a component of the indoor agricultural setting and/or the indoor agricultural setting based on a set of features that are derived from instances of sensor data captured by one or more of the plurality of sensors. In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular component of the indoor agricultural setting or the indoor agricultural and a degree of confidence corresponding to the prediction or classification; and selectively encoding the one or more instances of sensor data prior to transmission to the backend system based on the condition or prediction.

In embodiments, selectively encoding the one or more instances of sensor data includes compressing the one or more instances of sensor data using a lossy codec in response to obtaining one or more predictions or classifications relating to conditions of respective components of the indoor agricultural setting and the indoor agricultural setting that collectively indicate that there are likely no issues relating to any component of the indoor agricultural setting and the indoor agricultural setting. In embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In embodiments, selectively encoding the one or more instances of sensor data includes compressing the one or more instances of sensor data using a lossless codec in response to obtaining a prediction or classification relating to a condition of a particular component or the indoor agricultural setting that indicates that there is likely an issue relating to the particular component or the indoor agricultural setting. In embodiments, selectively encoding the one or more instances of sensor data includes refraining from compressing the one or more instances of sensor data in response to obtaining a prediction or classification relating to a condition of a particular component or the indoor agricultural setting that indicates that there is likely an issue relating to the particular component or the indoor agricultural setting.

In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular component of the indoor agricultural setting or the indoor agricultural setting and a degree of confidence corresponding to the prediction or classification; and selectively storing the one or more instances of sensor data in a storage device of the edge device based on the prediction or classification. In embodiments, selectively storing the one or more instances of sensor data includes storing the one or more instances of sensor data in the storage device with an expiry in response to obtaining one or more predictions or classifications relating to conditions of respective components of the indoor agricultural setting and the indoor agricultural setting that collectively indicate that there are likely no issues relating to any component of the indoor agricultural setting and the indoor agricultural setting, such that the one or more instances of sensor data are purged from the storage device in accordance with the expiry. In embodiments, selectively storing the one or more instances of sensor data includes storing the one or more instances of sensor data in the storage device indefinitely in response to obtaining a prediction or classification relating to a condition of a particular component or the indoor agricultural setting that indicates that there is likely an issue relating to the particular component or the indoor agricultural setting.

In some embodiments, the plurality of sensors includes a first set of sensors of a first sensor type and a second set of sensors of a second sensor type selected from the group including: light sensors, humidity sensors, temperature sensors, carbon dioxide sensors, fan speed sensors, weight sensors, and camera sensors.

According to some embodiments of the present disclosure, a sensor kit configured to monitor a pipeline setting is disclosed. The sensor kit includes an edge device and a plurality of sensors that capture sensor data and transmit the sensor data via a self-configuring sensor kit network. The plurality of sensors includes one or more sensors of a first sensor type and one or more sensors of a second sensor type. At least one sensor of the plurality of sensors includes: a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The plurality of sensors includes two or more sensor types selected from the group including: infrared sensors, metal penetrating sensors, concrete penetrating sensors, light sensors, strain sensors, rust sensors, biological sensors, humidity sensors, temperature sensors, chemical sensors, valve integrity sensors, vibration sensors, flow sensors, cavitation sensors, pressure sensors, weight sensors, and camera sensors. The edge device includes a communication system having: a first communication device that receives reporting packets from the plurality of sensors via the self-configuring sensor kit network and a second communication device that transmits sensor kit packets to a backend system via a public network. The edge device further includes a processing system having one or more processors that execute computer-executable instructions that cause the processing system to: receive the reporting packets from the communication system; perform one or more edge operations on the instances of sensor data in the reporting packets; generate the sensor kit packets based on the instances of sensor data, wherein each sensor kit packet includes at least one instance of sensor data; and output the sensor kits packets to the communication system, wherein the communication system transmits the reporting packets to the backend system via the public network.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In embodiments, the edge device further includes one or more storage devices that store a sensor data store that stores instances of sensor data captured by the plurality of sensors of the sensor kit.

In embodiments, the edge device further includes one or more storage devices that store a model data store that stores one or more machine-learned models that are each trained to predict or classify a condition of a pipeline component of the pipeline setting and/or the pipeline setting based on a set of features that are derived from instances of sensor data captured by one or more of the plurality of sensors. In some of these embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular pipeline component of the pipeline setting or the pipeline setting and a degree of confidence corresponding to the prediction or classification; and selectively encoding the one or more instances of sensor data prior to transmission to the backend system based on the condition or prediction. In embodiments, selectively encoding the one or more instances of sensor data includes compressing the one or more instances of sensor data using a lossy codec in response to obtaining one or more predictions or classifications relating to conditions of respective pipeline components of the pipeline setting and the pipeline setting that collectively indicate that there are likely no issues relating to any pipeline component of the pipeline setting and the pipeline setting. In embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In embodiments, selectively encoding the one or more instances of sensor data includes compressing the one or more instances of sensor data using a lossless codec in response to obtaining a prediction or classification relating to a condition of a particular pipeline component or the pipeline setting that indicates that there is likely an issue relating to the particular pipeline component or the pipeline setting. In embodiments, selectively encoding the one or more instances of sensor data includes refraining from compressing the one or more instances of sensor data in response to obtaining a prediction or classification relating to a condition of a particular pipeline component or the pipeline setting that indicates that there is likely an issue relating to the particular pipeline component or the pipeline setting. In embodiments, performing one or more edge operations includes generating a feature vector based on one or more instances of sensor data received from one or more sensors of the plurality of sensors; inputting the feature vector to the machine-learned model to obtain a prediction or classification relating to a condition of a particular pipeline component of the pipeline setting or the pipeline setting and a degree of confidence corresponding to the prediction or classification; and selectively storing the one or more instances of sensor data in a storage device of the edge device based on the prediction or classification. In embodiments, selectively storing the one or more instances of sensor data includes storing the one or more instances of sensor data in the storage device with an expiry in response to obtaining one or more predictions or classifications relating to conditions of respective pipeline components of the pipeline setting and the pipeline setting that collectively indicate that there are likely no issues relating to any pipeline component of the pipeline setting and the pipeline setting, such that the one or more instances of sensor data are purged from the storage device in accordance with the expiry. In embodiments, selectively storing the one or more instances of sensor data includes storing the one or more instances of sensor data in the storage device indefinitely in response to obtaining a prediction or classification relating to a condition of a particular pipeline component or the pipeline setting that indicates that there is likely an issue relating to the particular pipeline component or the pipeline setting.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In embodiments, the self-configuring sensor kit network is a mesh network such that: the communication device of each sensor of the plurality of sensors is configured to establish a communication channel with at least one other sensor of the plurality of sensors; and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In embodiments, the self-configuring sensor kit network is a hierarchical network. In some of these embodiments, the sensor kit further includes one or more collection devices configured to receive reporting packets from one or more sensors of the plurality of sensors and route the reporting packets to the edge device. In embodiments, each collection device is installed in a different respective section of the pipeline setting and collects sensor data from sensors of the plurality sensors that are deployed in the respective room.

According to some embodiments of the present disclosure, a method of monitoring a pipeline setting using a sensor kit including an edge device and a plurality of sensors is disclosed. The method includes: receiving, by an edge processing system of the edge device, reporting packets from a plurality of sensors via a self-configuring sensor kit network, each reporting packet containing routing data and one or more instances of sensor data captured by a respective sensor of the plurality of sensors, wherein the plurality of sensors includes two or more sensor types selected from the group including: light sensors, humidity sensors, temperature sensors, carbon dioxide sensors, fan speed sensors, weight sensors, and camera sensors; performing, by the edge processing system, one or more edge operations on the instances of sensor data in the reporting packets; generating, by the edge processing system, one or more edge operations on the instances of sensor data in the reporting packets; and transmitting, by the edge processing system, the sensor kit packets to an edge communication system of the edge device, wherein the edge communication system transmits the reporting packets to a backend system via a public network. In some embodiments, the sensor kit further includes a gateway device, wherein the gateway device is configured to receive sensor kit packets from the edge device via a wired communication link and transmit the sensor kit packets to the backend system via the public network on behalf of the edge device. In embodiments, the gateway device includes a satellite terminal device that is configured to transmit the sensor kit packets to a satellite that routes the sensor kits to the public network. In some embodiments, the gateway device includes a cellular chipset that is pre-configured to transmit sensor kit packets to a cellphone tower of a preselected cellular provider. In embodiments, receiving the reporting packets from the one or more respective sensors is performed using a first communication device of the edge device that receives reporting packets from the plurality of sensors via a self-configuring sensor kit network and transmitting the sensor kit packets to the backend system is performed using a second communication device of the edge device. In some embodiments, the second communication device of the edge device is a satellite terminal device that is configured to transmit the sensor kit packets to a satellite that routes the sensor kits to the public network.

In some embodiments, the method further includes capturing, by the plurality of sensors, sensor data; and transmitting, by the plurality of sensors, the sensor data to the edge device via the self-configuring sensor kit network. In some of these embodiments, transmitting the sensor data via the self-configuring sensor kit network includes directly transmitting, by each sensor of the plurality of sensors, instances of sensor data with the edge device using a short-range communication protocol, wherein the self-configuring sensor kit network is a star network. In some embodiments, the method further includes initiating, by the edge processing system, configuration of the self-configuring sensor kit network.

In embodiments, the self-configuring sensor kit network is a mesh network and each sensor of the plurality of sensors includes a communication device. In some of these embodiments, the method further includes: establishing, by the communication device of each sensor of the plurality of sensors, a communication channel with at least one other sensor of the plurality of sensors; receiving, by at least one sensor of the plurality of sensors, instances of sensor data from one or more other sensors of the plurality of sensors; and routing, by the at least one sensor of the plurality of sensors, the received instances of the sensor data towards the edge device.

In some embodiments, the self-configuring sensor kit network is a hierarchical network and the sensor kit includes one or more collection devices. In some of these embodiments, the method further includes: receiving, by at least one collection device of the plurality of collection devices, reporting packets from one or more sensors of the plurality of sensors; and routing, by the at least one collection device of the plurality of collection devices, the reporting packets to the edge device. In some embodiments, each collection device is installed in a different respective section of the pipeline setting and collects sensor data from sensors of the plurality sensors that are deployed in the respective room.

In some embodiments, the method further includes storing, by one or more storage devices of the edge device, instances of sensor data captured by the plurality of sensors of the sensor kit. In embodiments, the edge device further includes one or more storage devices that store a model data store that stores one or more machine-learned models that are each trained to predict or classify a condition of a component of the agricultural setting and/or the agricultural setting based on a set of features that are derived from instances of sensor data captured by one or more of the plurality of sensors.

In some embodiments, performing one or more edge operations includes: generating, by the edge processing system, a feature vector based on one or more instances of sensor data received from one or more sensors of the plurality of sensors; inputting, by the edge processing system, the feature vector to the machine-learned model to obtain a prediction or classification relating to a condition of a particular component of the agricultural setting or the agricultural setting and a degree of confidence corresponding to the prediction or classification; and selectively encoding, by the edge processing system, the one or more instances of sensor data prior to transmission to the backend system based on the prediction or classification. In some of these embodiments, selectively encoding the one or more instances of sensor data includes compressing, by the edge processing system, the one or more instances of sensor data using a lossy codec in response to obtaining one or more predictions or classifications relating to conditions of respective components of the agricultural setting and the agricultural setting that collectively indicate that there are likely no issues relating to any component of the agricultural setting and the agricultural setting. In some embodiments, compressing the one or more instances of sensor data using a lossy codec includes: normalizing, by the edge processing system, the one or more instances of sensor data into respective pixel values; encoding, by the edge processing system, the respective pixel values into a media content frame; and compressing, by the edge processing system, a block of media content frames using the lossy codec to obtain a compressed block, wherein the lossy codec is a video codec and the compressed block includes the media content frame and one or more other media content frames that include normalized pixel values of other instances of sensor data. In some embodiments, the backend system receives the compressed block in one or more sensor kit packets and determines the sensor data collected by the sensor kit by decompressing the compressed block using the lossy codec.

In some embodiments, selectively encoding the one or more instances of sensor data includes compressing, by the edge processing system, the one or more instances of sensor data using a lossless codec in response to obtaining a prediction or classification relating to a condition of a particular component or the agricultural setting that indicates that there is likely an issue relating to the particular component or the agricultural setting. In embodiments, encoding the one or more instances of sensor data includes refraining, by the edge processing system, from compressing the one or more instances of sensor data in response to obtaining a prediction or classification relating to a condition of a particular component or the agricultural setting that indicates that there is likely an issue relating to the particular component or the agricultural setting. In some embodiments, selectively encoding the one or more instances of sensor data includes selecting, by the edge processing system, a stream of sensor data instances for uncompressed transmission.

In some embodiments, performing one or more edge operations includes: generating, by the edge processing system, a feature vector based on one or more instances of sensor data received from one or more sensors of the plurality of sensors; inputting, by the edge processing system, the feature vector to the machine-learned model to obtain a prediction or classification relating to a condition of a particular component of the agricultural setting or the agricultural setting and a degree of confidence corresponding to the prediction or classification; and selectively storing, by the edge processing system, the one or more instances of sensor data in a storage device of the one or more storage devices based on the prediction or classification. In some of these embodiments, selectively storing the one or more instances of sensor data includes storing, by the edge processing system, the one or more instances of sensor data in the storage device with an expiry in response to obtaining one or more predictions or classifications relating to conditions of respective components of the agricultural setting and the agricultural setting that collectively indicate that there are likely no issues relating to any component of the agricultural setting and the agricultural setting, wherein storing the one or more instances of sensor data in the storage device with an expiry is performed such that the one or more instances of sensor data are purged from the storage device in accordance with the expiry. In some embodiments, selectively storing the one or more instances of sensor data includes storing, by the edge processing system, the one or more instances of sensor data in the storage device indefinitely in response to obtaining a prediction or classification relating to a condition of a particular component or the agricultural setting that indicates that there is likely an issue relating to the particular component or the agricultural setting. In some embodiments, the plurality of sensors includes a first set of sensors of a first sensor type and a second set of sensors of a second sensor type selected from the group including: light sensors, humidity sensors, temperature sensors, carbon dioxide sensors, fan speed sensors, weight sensors, and camera sensors.

According to some embodiments of the present disclosure, a sensor kit configured to monitor an industrial manufacturing setting is disclosed. The sensor kit includes an edge device and a plurality of sensors that capture sensor data and transmit the sensor data via a self-configuring sensor kit network, wherein the plurality of sensors includes one or more sensors of a first sensor type and one or more sensors of a second sensor type. At least one sensor of the plurality of sensors includes a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The plurality of sensors includes two or more sensor types selected from the group including: metal penetrating sensors, concrete penetrating sensors, vibration sensors, light sensors, strain sensors, rust sensors, biological sensors, temperature sensors, chemical sensors, valve integrity sensors, rotational speed sensors, vibration sensors, flow sensors, cavitation sensors, pressure sensors, weight sensors, and camera sensors. The edge device includes a communication system having a first communication device that receives reporting packets from the plurality of sensors via the self-configuring sensor kit network; and a second communication device that transmits sensor kit packets to a backend system via a public network. The edge device further includes a processing system having one or more processors that execute computer-executable instructions that cause the processing system to: receive the reporting packets from the communication system; perform one or more edge operations on the instances of sensor data in the reporting packets; generate the sensor kit packets based on the instances of sensor data, wherein each sensor kit packet includes at least one instance of sensor data; and output the sensor kits packets to the communication system, wherein the communication system transmits the reporting packets to the backend system via the public network.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In embodiments, the edge device further includes one or more storage devices that store a sensor data store that stores instances of sensor data captured by the plurality of sensors of the sensor kit.

In embodiments, the edge device further includes one or more storage devices that store a model data store that stores one or more machine-learned models that are each trained to predict or classify a condition of an industrial component of the industrial manufacturing setting and/or the industrial manufacturing setting based on a set of features that are derived from instances of sensor data captured by one or more of the plurality of sensors. In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial manufacturing setting or the industrial manufacturing setting and a degree of confidence corresponding to the prediction or classification; and selectively encoding the one or more instances of sensor data prior to transmission to the backend system based on the condition or prediction. In some of these embodiments, selectively encoding the one or more instances of sensor data includes compressing the one or more instances of sensor data using a lossy codec in response to obtaining one or more predictions or classifications relating to conditions of respective industrial components of the industrial manufacturing setting and the industrial manufacturing setting that collectively indicate that there are likely no issues relating to any industrial component of the industrial manufacturing setting and the industrial manufacturing setting. In some embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In embodiments, selectively encoding the one or more instances of sensor data includes compressing the one or more instances of sensor data using a lossless codec in response to obtaining a prediction or classification relating to a condition of a particular industrial component or the industrial manufacturing setting that indicates that there is likely an issue relating to the particular industrial component or the industrial manufacturing setting. In embodiments, selectively encoding the one or more instances of sensor data includes refraining from compressing the one or more instances of sensor data in response to obtaining a prediction or classification relating to a condition of a particular industrial component or the industrial manufacturing setting that indicates that there is likely an issue relating to the particular industrial component or the industrial manufacturing setting. In embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the industrial manufacturing setting or the industrial manufacturing setting and a degree of confidence corresponding to the prediction or classification; and selectively storing the one or more instances of sensor data in a storage device of the edge device based on the prediction or classification. In embodiments, selectively storing the one or more instances of sensor data includes storing the one or more instances of sensor data in the storage device with an expiry, such that the one or more instances of sensor data are purged from the storage device in accordance with the expiry in response to obtaining one or more predictions or classifications relating to conditions of respective industrial components of the industrial manufacturing setting and the industrial manufacturing setting that collectively indicate that there are likely no issues relating to any industrial component of the industrial manufacturing setting and the industrial manufacturing setting. In embodiments, selectively storing the one or more instances of sensor data includes storing the one or more instances of sensor data in the storage device indefinitely in response to obtaining a prediction or classification relating to a condition of a particular industrial component or the industrial manufacturing setting that indicates that there is likely an issue relating to the particular industrial component or the industrial manufacturing setting.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In embodiments, the self-configuring sensor kit network is a mesh network such that: the communication device of each sensor of the plurality of sensors is configured to establish a communication channel with at least one other sensor of the plurality of sensors; and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In embodiments, the self-configuring sensor kit network is a hierarchical network. In some of these embodiments, the sensor kit further includes one or more collection devices configured to receive reporting packets from one or more sensors of the plurality of sensors and route the reporting packets to the edge device. In embodiments, each collection device is installed in a different respective room of the industrial manufacturing setting and collects sensor data from sensors of the plurality sensors that are deployed in the respective room.

According to some embodiments of the present disclosure, a sensor kit configured to monitor an underwater industrial setting is disclosed. The sensor kit includes an edge device and a plurality of sensors that capture sensor data and transmit the sensor data via a self-configuring sensor kit network, wherein the plurality of sensors includes one or more sensors of a first sensor type and one or more sensors of a second sensor type. At least one sensor of the plurality of sensors includes: a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The plurality of sensors includes two or more sensor types selected from the group including: infrared sensors, sonar sensors, LIDAR sensors, water penetrating sensors, light sensors, strain sensors, rust sensors, biological sensors, temperature sensors, chemical sensors, valve integrity sensors, vibration sensors, flow sensors, cavitation sensors, pressure sensors, weight sensors, and camera sensors. The edge device includes a communication system having a first communication device that receives reporting packets from the plurality of sensors via the self-configuring sensor kit network and a second communication device that transmits sensor kit packets to a backend system via a public network. The edge device further includes a processing system having one or more processors that execute computer-executable instructions that cause the processing system to: receive the reporting packets from the communication system; perform one or more edge operations on the instances of sensor data in the reporting packets; generate the sensor kit packets based on the instances of sensor data, wherein each sensor kit packet includes at least one instance of sensor data; and output the sensor kits packets to the communication system, wherein the communication system transmits the reporting packets to the backend system via the public network.

In some embodiments, the sensor kit further includes a gateway device that is configured to receive sensor kit packets from the edge device via a wired communication link and transmit the sensor kit packets to the backend system via the public network on behalf of the edge device. In some of these embodiments, the gateway device includes a satellite terminal device that is configured to transmit the sensor kit packets to a satellite that routes the sensor kits to the public network. Alternatively, in some embodiments, the gateway device includes a cellular chipset that is preconfigured to transmit sensor kit packets to a cellphone tower of a preselected cellular provider.

In some embodiments, the second communication device of the edge device is a satellite terminal device that is configured to transmit the sensor kit packets to a satellite that routes the sensor kits to the public network.

In embodiments, the edge device further includes one or more storage devices that store a sensor data store that stores instances of sensor data captured by the plurality of sensors of the sensor kit.

In embodiments, the edge device further includes one or more storage devices that store a model data store that stores one or more machine-learned models that are each trained to predict or classify a condition of an industrial component of the underwater industrial setting and/or the underwater industrial setting based on a set of features that are derived from instances of sensor data captured by one or more of the plurality of sensors. In some embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the underwater industrial setting or the underwater industrial setting and a degree of confidence corresponding to the prediction or classification; and selectively encoding the one or more instances of sensor data prior to transmission to the backend system based on the condition or prediction. In embodiments, selectively encoding the one or more instances of sensor data includes compressing the one or more instances of sensor data using a lossy codec in response to obtaining one or more predictions or classifications relating to conditions of respective industrial components of the underwater industrial setting and the underwater industrial setting that collectively indicate that there are likely no issues relating to any industrial component of the underwater industrial setting and the underwater industrial setting. In embodiments, compressing the one or more instances of sensor data using the lossy codec includes: normalizing the one or more instances of sensor data into respective pixel values; encoding the respective pixel values into a video frame; and compressing a block of video frames using the lossy codec, wherein the lossy codec is a video codec and the block of video frames includes the video frame and one or more other video frames that include normalized pixel values of other instances of sensor data. In embodiments, selectively encoding the one or more instances of sensor data includes compressing the one or more instances of sensor data using a lossless codec in response to obtaining a prediction or classification relating to a condition of a particular industrial component or the underwater industrial setting that indicates that there is likely an issue relating to the particular industrial component or the underwater industrial setting. In embodiments, selectively encoding the one or more instances of sensor data includes refraining from compressing the one or more instances of sensor data in response to obtaining a prediction or classification relating to a condition of a particular industrial component or the underwater industrial setting that indicates that there is likely an issue relating to the particular industrial component or the underwater industrial setting. In embodiments, performing one or more edge operations includes: generating a feature vector based on one or more instances of sensor data received from one or more sensors of the plurality of sensors; inputting the feature vector to the machine-learned model to obtain a prediction or classification relating to a condition of a particular industrial component of the underwater industrial setting or the underwater industrial setting and a degree of confidence corresponding to the prediction or classification; and selectively storing the one or more instances of sensor data in a storage device of the edge device based on the prediction or classification. In embodiments, selectively storing the one or more instances of sensor data includes storing the one or more instances of sensor data in the storage device with an expiry in response to obtaining one or more predictions or classifications relating to conditions of respective industrial components of the underwater industrial setting and the underwater industrial setting that collectively indicate that there are likely no issues relating to any industrial component of the underwater industrial setting and the underwater industrial setting, such that the one or more instances of sensor data are purged from the storage device in accordance with the expiry. In embodiments, selectively storing the one or more instances of sensor data includes storing the one or more instances of sensor data in the storage device indefinitely in response to obtaining a prediction or classification relating to a condition of a particular industrial component or the underwater industrial setting that indicates that there is likely an issue relating to the particular industrial component or the underwater industrial setting.

In embodiments, the self-configuring sensor kit network is a star network such that each sensor of the plurality of sensors transmits respective instances of sensor data with the edge device directly using a short-range communication protocol. In some of these embodiments, the computer-executable instructions further cause the one or more processors of the edge device to initiate configuration of the self-configuring sensor kit network.

In embodiments, the self-configuring sensor kit network is a mesh network such that: the communication device of each sensor of the plurality of sensors is configured to establish a communication channel with at least one other sensor of the plurality of sensors; and at least one sensor of the plurality of sensors is configured to receive instances of sensor data from one or more other sensors of the plurality of sensors and to route the received instances of the sensor data towards the edge device. In some of these embodiments, the computer-executable instructions further cause the one or more processors of the edge device to initiate configuration of the self-configuring sensor kit network, wherein the plurality of sensors form the mesh network in response to the edge device initiating configuration of the self-configuring sensor kit network.

In some embodiments, the self-configuring sensor kit network is a hierarchical network. In some of these embodiments, the sensor kit further includes one or more collection devices configured to receive reporting packets from one or more sensors of the plurality of sensors and route the reporting packets to the edge device. In some of these embodiments, wherein each collection device is installed in a different respective section of the underwater industrial setting and collects sensor data from sensors of the plurality sensors that are deployed in the respective section.

According to some embodiments of the present disclosure, a system for monitoring an industrial setting is disclosed. The system includes a set of sensor kits each having a set of sensors that are registered to respective industrial settings and configured to monitor physical characteristics of the industrial settings. The system also includes a set of communication gateway for communicating instances of sensor values from the sensor kits to a backend system. The backend system is configured to process the instances of sensor values to monitor the industrial setting, wherein upon receiving registration data for a sensor kit to an industrial setting, the backend system automatically configures and populates a dashboard for an owner or operator of the industrial setting. The dashboard provides monitoring information that is based on the instances of sensor values for the industrial setting.

In embodiments, the registration of the sensor kit includes an interface for specifying a type of entity or industrial setting to be monitored. In some of these embodiments, the backend system configures the dashboard based on the registered type of entity or industrial setting. In embodiments, the backend system includes an analytics facility that is configured based on the type of entity or industrial setting. In embodiments, the backend system includes a machine learning facility that is configured based on the type of entity or industrial setting.

In embodiments, the communication gateway is configured to provide a virtual container for instances of sensor values such that only a registered owner or operator of the industrial setting can access the sensor values.

In embodiments, upon registration of a sensor kit to an industrial setting, a user may select a set or parameters for monitoring and wherein a set of services and capabilities of the backend system is automatically provisioned based on the selected parameters.

In embodiments, at least one of the sensor kit, the communication gateway and the backend system includes an edge computation system for automatically calculating a metric for an industrial setting based on a plurality of instances of sensor values from a set of sensor kits.

In embodiments, the sensor kit is a self-configuring sensor kit network. In some embodiments, the sensor kit network is a star network such that each sensor of the plurality of sensors transmits respective instances of sensor data with the communication gateway directly using a short-range communication protocol. In some embodiments, computer-executable instructions cause one or more processors of the communication gateway device to initiate configuration of the self-configuring sensor kit network. In some embodiments, the self-configuring sensor kit network is a mesh network such that: a communication device of each sensor of the plurality of sensors is configured to establish a communication channel with at least one other sensor of the plurality of sensors; and at least one sensor of the plurality of sensors is configured to receive instances of sensor data from one or more other sensors of the plurality of sensors and to route the received instances of the sensor data towards the communication gateway. In some embodiments, the computer-executable instructions further cause the one or more processors of the communication gateway to initiate configuration of the self-configuring sensor kit network, wherein the plurality of sensors form the mesh network in response to the communication gateway initiating configuration of the self-configuring sensor kit network. In some embodiments, the self-configuring sensor kit network is a hierarchical network.

According to some embodiments of the present disclosure, a system for monitoring an industrial setting is disclosed. The system includes: a set of sensor kits each having a set of sensors that are registered to respective industrial settings and configured to monitor physical characteristics of the industrial settings; a set of communication gateways for communicating instances of sensor values from the sensor kits to a backend system; and said backend system for processing the instances of sensor values to monitor the industrial setting, wherein upon receiving registration data for a sensor kit to an industrial setting, the backend system automatically configures and populates a dashboard for an owner or operator of the industrial setting, wherein the dashboard provides monitoring information that is based on the instances of sensor values for the industrial setting. In some embodiments, the registration of the sensor kit includes an interface for specifying a type of entity or industrial setting to be monitored. In embodiments, the backend system configures the dashboard based on the registered type of entity or industrial setting. In some embodiments, the backend system includes an analytics facility that is configured based on the type of entity or industrial setting. In embodiments, the backend system includes a machine learning facility that is configured based on the type of entity or industrial setting.

In some embodiments, the communication gateway is configured to provide a virtual container for instances of sensor values such that only a registered owner or operator of the industrial setting can access the sensor values. In embodiments, upon registration of a sensor kit to an industrial setting, a user may select a set of parameters for monitoring and wherein a set of services and capabilities of the backend system is automatically provisioned based on the selected parameters. In some embodiments, at least one of the sensor kit, the communication gateway and the backend system includes an edge computation system for automatically calculating a metric for an industrial setting based on a plurality of instances of sensor values from a set of sensor kits.

In some embodiments, the sensor kit is a self-configuring sensor kit network. In some of these embodiments, the sensor kit network is a star network such that each sensor of the plurality of sensors transmits respective instances of sensor data with the communication gateway directly using a short-range communication protocol. In embodiments, computer-executable instructions cause one or more processors of the communication gateway device to initiate configuration of the self-configuring sensor kit network.

In some embodiments, the self-configuring sensor kit network is a mesh network such that: a communication device of each sensor of the plurality of sensors is configured to establish a communication channel with at least one other sensor of the plurality of sensors; and at least one sensor of the plurality of sensors is configured to receive instances of sensor data from one or more other sensors of the plurality of sensors and to route the received instances of the sensor data towards the communication gateway. In some of these embodiments, the computer-executable instructions further cause the one or more processors of the communication gateway to initiate configuration of the self-configuring sensor kit network, wherein the plurality of sensors form the mesh network in response to the communication gateway initiating configuration of the self-configuring sensor kit network. In some embodiments, the self-configuring sensor kit network is a hierarchical network.

According to some embodiments of the present disclosure, a method of monitoring a plurality of industrial settings using a set of sensors kits, a set of communication gateways, and a backend system is disclosed. The method includes: registering each sensor kit of the plurality of sensor kits to a respective industrial setting of the plurality of industrial settings; configuring each sensor kit of the plurality of sensor kits to monitor physical characteristics of the respective industrial setting to which the sensor kit is registered; transmitting, by each communication gateway of the set of communication gateways, instances of sensor data from a respective sensor kit of the plurality of sensor kits to the backend system; processing, by the backend system, the instances of sensor data received from each sensor kit of the plurality of sensor kits; automatically configuring and populating, by the backend system, a dashboard for an owner or operator of the respective industrial setting upon receiving registration data for a sensor kit of the plurality of sensor kits; and providing, by the dashboard, monitoring information that is based on the instances of sensor data for the respective industrial setting.

In some embodiments, registering each sensor kit includes providing an interface for specifying a type of entity or industrial setting to be monitored. In some of these embodiments, configuring each sensor kit to monitor physical characteristics of the respective industrial setting includes configuring, by the backend system, the dashboard based on the registered type of entity or industrial setting. In some embodiments, the backend system includes an analytics facility that is configured based on the type of entity of the industrial setting. In embodiments, the backend system includes a machine learning facility that is configured based on the type of entity or industrial setting.

In some embodiments, the method further includes providing, by each communication gateway of the plurality of communication gateways, a virtual container for instances of sensor data such that only a registered owner or operator of the respective industrial setting can access the sensor data. In embodiments, upon registration of a sensor kit to an industrial setting, a user may select a set of parameters for monitoring. In some embodiments, the method further includes automatically provisioning, by the backend system, a set of services and capabilities of the backend system based on the selected parameters. In embodiments, at least one of a sensor kit of the plurality of sensor kits, a communication gateway of the plurality of communication gateways, and the backend system includes an edge computation system for automatically calculating a metric for an industrial setting based on a plurality of instances of sensor data from a set of sensor kits.

In some embodiments, at least one sensor kit of the plurality of sensor kits is a self-configuring sensor kit network including a plurality of sensors. In some of these embodiments, the method further includes: capturing, by the plurality of sensors, sensor data; and transmitting, by the plurality of sensors, the sensor data to and edge device via the self-configuring sensor kit network. In some embodiments, transmitting the sensor data via the self-configuring sensor kit network includes directly transmitting, by each sensor of the plurality of sensors, instances of sensor data with the edge device using a short-range communication protocol, wherein the self-configuring sensor kit network is a star network. In some embodiments, the method further includes initiating, by the edge processing system, configuration of the self-configuring sensor kit network.

In embodiments, the self-configuring sensor kit network is a mesh network and each sensor of the plurality of sensors includes a communication device. In some of these embodiments, the method further includes: establishing, by the communication device of each sensor of the plurality of sensors, a communication channel with at least one other sensor of the plurality of sensors; receiving, by at least one sensor of the plurality of sensors, instances of sensor data from one or more other sensors of the plurality of sensors; and routing, by the at least one sensor of the plurality of sensors, the received instances of the sensor data towards the edge device.

In some embodiments, the self-configuring sensor kit network is a hierarchical network and the sensor kit includes one or more collection devices. In some embodiments, the plurality of sensors includes a first set of sensors of a first sensor type and a second set of sensors of a second sensor type.

According to some embodiments of the present disclosure, a sensor kit configured for monitoring an industrial setting is disclosed. The sensor kit includes: an edge device; and a plurality of sensors that capture sensor data and transmit the sensor data via a self-configuring sensor kit network, wherein the plurality of sensors includes one or more sensors of a first sensor type and one or more sensors of a second sensor type, wherein at least one sensor of the plurality of sensors includes: a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The edge device includes: a communication system having: a first communication device that receives reporting packets from the plurality of sensors via the self-configuring sensor kit network; and a second communication device that transmits sensor kit packets to a backend system via a public network; a processing system having one or more processors that execute computer-executable instructions that cause the processing system to: receive the reporting packets from the communication system; generate a data block based on sensor data obtained from the reporting packets, wherein the data block includes (i) a block header that defines an address of the data block and (ii) a block body that defines the sensor data and a parent address of another data block to which the data block will be linked; and transmit the data block to one or more node computing devices that collectively store a distributed ledger that is comprised of a plurality of data blocks.

In some embodiments, generating the data block includes generating a hash value of the block body. In embodiments, generating the data block includes encrypting the block body.

In some embodiments, the distributed ledger includes a smart contract that defines one or more conditions relating to collected sensor data and one or more actions that are initiated by the smart contract in response to the one or more conditions being satisfied. In some embodiments, the smart contract receives the data block from the sensor kit and determines whether the one or more conditions are satisfied based on at least the sensor data stored in the data block. In embodiments, the smart contract corresponds to an insurer. In some embodiments, the action defined in the smart contract triggers a transfer of funds to an account associated with an operator associated with the sensor kit in response to satisfying the one or more conditions. In embodiments, the one or more conditions include a first condition that determines whether the sensor kit has reported a sufficient amount of sensor data and a second condition that determines whether the reported sensor data indicates that the industrial setting is operating without issue.

In some embodiments, the smart contract corresponds to a regulatory body. In some of these embodiments, the action defined in the smart contract triggers an issuance of a token to an operator associated with the sensor kit in response to satisfying the one or more conditions. In embodiments, the one or more conditions include a first condition that requires a certain amount of reported sensor data to be reported by a sensor kit and a second condition that requires the reported sensor data to be compliant with the reporting regulations.

In some embodiments, the edge device is one of the node computing devices.

According to some embodiments of the present disclosure, a method for monitoring an industrial setting using a sensor kit having a plurality of sensors and an edge device including a processing system is disclosed. The method includes: receiving, by the processing system, reporting packets from one or more respective sensors of the plurality of sensors, wherein each reporting packet includes routing data and one or more instances of sensor data; generating, by the processing system, a data block based on sensor data obtained from the reporting packets, wherein the data block includes (i) a block header that defines an address of the data block and (ii) a block body that defines the sensor data and a parent address of another data block to which the data block will be linked; and transmitting, by the processing system, the data block to one or more node computing devices that collectively store a distributed ledger that is comprised of a plurality of data blocks. In some embodiments, generating the data block includes generating, by the processing system, a hash value of the block body. In embodiments, generating the data block includes encrypting, by the processing system, the block body.

In some embodiments, the distributed ledger includes a smart contract that defines one or more conditions relating to collected sensor data and one or more actions that are initiated by the smart contract in response to the one or more conditions being satisfied. In some of these embodiments, the smart contract receives the data block from the sensor kit and determines whether the one or more conditions are satisfied based on at least the sensor data stored in the data block. In some embodiments, the smart contract corresponds to an insurer. In embodiments, the action defined in the smart contract triggers a transfer of funds to an account associated with an operator associated with the sensor kit in response to satisfying the one or more conditions. In some embodiments, the one or more conditions include a first condition that determines whether the sensor kit has reported a sufficient amount of sensor data and a second condition that determines whether the reported sensor data indicates that the industrial setting is operating without issue.

In some embodiments, the smart contract corresponds to a regulatory body. In some of these embodiments, the action defined in the smart contract triggers an issuance of a token to an operator associated with the sensor kit in response to satisfying the one or more conditions.

In some embodiments, the one or more conditions include a first condition that requires a certain amount of reported sensor data to be reported by a sensor kit and a second condition that requires the reported sensor data to be compliant with the reporting regulations.

In some embodiments, the edge device is one of the node computing devices.

In some embodiments, the plurality of sensors includes a first set of sensors of a first sensor type and a second set of sensors of a second sensor type.

According to some embodiments of the present disclosure, a system is disclosed. The system includes: a backend system including one or more servers configured to deploy a smart contract to a distributed ledger on behalf of a user, wherein the smart contract defines one or more conditions relating to collected sensor data and one or more actions that are initiated by the smart contract in response to the one or more conditions being satisfied; a sensor kit configured for monitoring an industrial setting, the sensor kit including: an edge device; and a plurality of sensors that capture sensor data and transmit the sensor data via a self-configuring sensor kit network, wherein the plurality of sensors includes one or more sensors of a first sensor type and one or more sensors of a second sensor type, wherein at least one sensor of the plurality of sensors includes: a sensing component that captures sensor measurements and outputs instances of sensor data; a processing unit that generates reporting packets based on one or more instances of sensor data and outputs the reporting packets, wherein each reporting packet includes routing data and one or more instances of sensor data; and a communication device configured to receive reporting packets from the processing unit and to transmit the reporting packets to the edge device via the self-configuring sensor kit network in accordance with a first communication protocol. The edge device includes: a communication system having a first communication device that receives reporting packets from the plurality of sensors via the self-configuring sensor kit network, and a second communication device that transmits sensor kit packets to a backend system via a public network; a processing system having one or more processors that execute computer-executable instructions that cause the processing system to: receive the reporting packets from the communication system; generate a data block based on sensor data obtained from the reporting packets, wherein the data block includes (i) a block header that defines an address of the data block and (ii) a block body that defines the sensor data and a parent address of another data block to which the data block will be linked; and transmit the data block to one or more node computing devices that collectively store a distributed ledger that is comprised of a plurality of data blocks.

In some embodiments, generating the data block includes generating a hash value of the block body. In some embodiments, generating the data block includes encrypting the block body.

In some embodiments, the smart contract receives the data block from the sensor kit and determines whether the one or more conditions are satisfied based on at least the sensor data stored in the data block. In some of these embodiments, the smart contract corresponds to an insurer. In some embodiments, the action defined in the smart contract triggers a transfer of funds to an account associated with an operator associated with the sensor kit in response to satisfying the one or more conditions. In embodiments, the one or more conditions include a first condition that determines whether the sensor kit has reported a sufficient amount of sensor data and a second condition that determines whether the reported sensor data indicates that the industrial setting is operating without issue. In some embodiments, the smart contract corresponds to a regulatory body. In embodiments, the action defined in the smart contract triggers an issuance of a token to an operator associated with the sensor kit in response to satisfying the one or more conditions. In some embodiments, the one or more conditions include a condition that determines whether the sensor kit has reported a required amount of sensor data as defined by a regulation.

In some embodiments, the edge device is one of the node computing devices.

According to some embodiments of the present disclosure, a method for monitoring an industrial setting using a sensor kit in communication with a backend system, the sensor kit including a plurality of sensors and an edge device, is disclosed. The method includes: deploying, by the backend system, a smart contract to a distributed ledger on behalf of a user, wherein the smart contract defines one or more conditions relating to collected sensor data and one or more actions that are initiated by the smart contract in response to the one or more conditions being satisfied; receiving, by an edge processing system of the edge device, reporting packets from one or more respective sensors of the plurality of sensors, wherein each reporting packet includes routing data and one or more instances of sensor data; generating, by the edge processing system, a data block based on sensor data obtained from the reporting packets, wherein the data block includes (i) a block header that defines an address of the data block and (ii) a block body that defines the sensor data and a parent address of another data block to which the data block will be linked; and transmitting, by the edge processing system, the data block to one or more node computing devices that collectively store a distributed ledger that is comprised of a plurality of data blocks.

In some embodiments, generating the data block includes generating, by the edge processing system, a hash value of the block body. In embodiments, generating the data block includes encrypting, by the edge processing system, the block body.

In some embodiments, the distributed ledger receives the data block from the sensor kit and determines whether the one or more conditions of the smart contract are satisfied based on at least the sensor data stored in the data block. In some of these embodiments, the smart contract corresponds to an insurer. In embodiments, the action defined in the smart contract triggers a transfer of funds to an account associated with an operator associated with the sensor kit in response to satisfying the one or more conditions. In some embodiments, the one or more conditions include a first condition that determines whether the sensor kit has reported a sufficient amount of sensor data and a second condition that determines whether the reported sensor data indicates that the industrial setting is operating without issue.

In some embodiments, the smart contract corresponds to a regulatory body. In some of these embodiments, the action defined in the smart contract triggers an issuance of a token to an operator associated with the sensor kit in response to satisfying the one or more conditions. In some embodiments, the one or more conditions include a condition that determines whether the sensor kit has reported a required amount of sensor data as defined by a regulation. In embodiments, the edge device is one of the node computing devices. In some embodiments, the backend system is one of the node computing devices. In embodiments, the plurality of sensors includes a first set of sensors of a first sensor type and a second set of sensors of a second sensor type.

A more complete understanding of the disclosure will be appreciated from the description and accompanying drawings and the claims, which follow.

BRIEF DESCRIPTION OF THE DRAWINGS

The accompanying drawings, which are included to provide a better understanding of the disclosure, illustrate embodiment(s) of the disclosure and together with the description serve to explain the principle of the disclosure. In the drawings.

DETAILED DESCRIPTION

Various configurations of sensor kits are disclosed. A sensor kit may be a purpose-configured system that includes sensors for monitoring a specific type of industrial setting, wherein the sensors are provided in a unified kit, optionally along with other devices, systems and components, such as ones that provide communication, processing and intelligence capabilities. In embodiments, an owner or operator of an industrial setting may purchase or otherwise obtain the sensor kit. During the purchase process, the owner or operator, or a user associated with the industrial setting, may provide or indicate one or more features of the industrial setting (e.g., type of the setting, location of the setting, size of the setting, whether the setting is indoors or outdoors, the components and/or types of components being monitored, the number of each component and/or type of component being monitored, and the like). In embodiments, the sensor kit may be preconfigured based on features and requirements of the industrial operator or owner. The sensor kit may be preconfigured such that the owner or operator may install the sensor kit in a "plug-and-play" manner, whereby the owner or operator does not need to configure a sensor kit network on which the devices of the sensor kit communicate.

Figure 1:
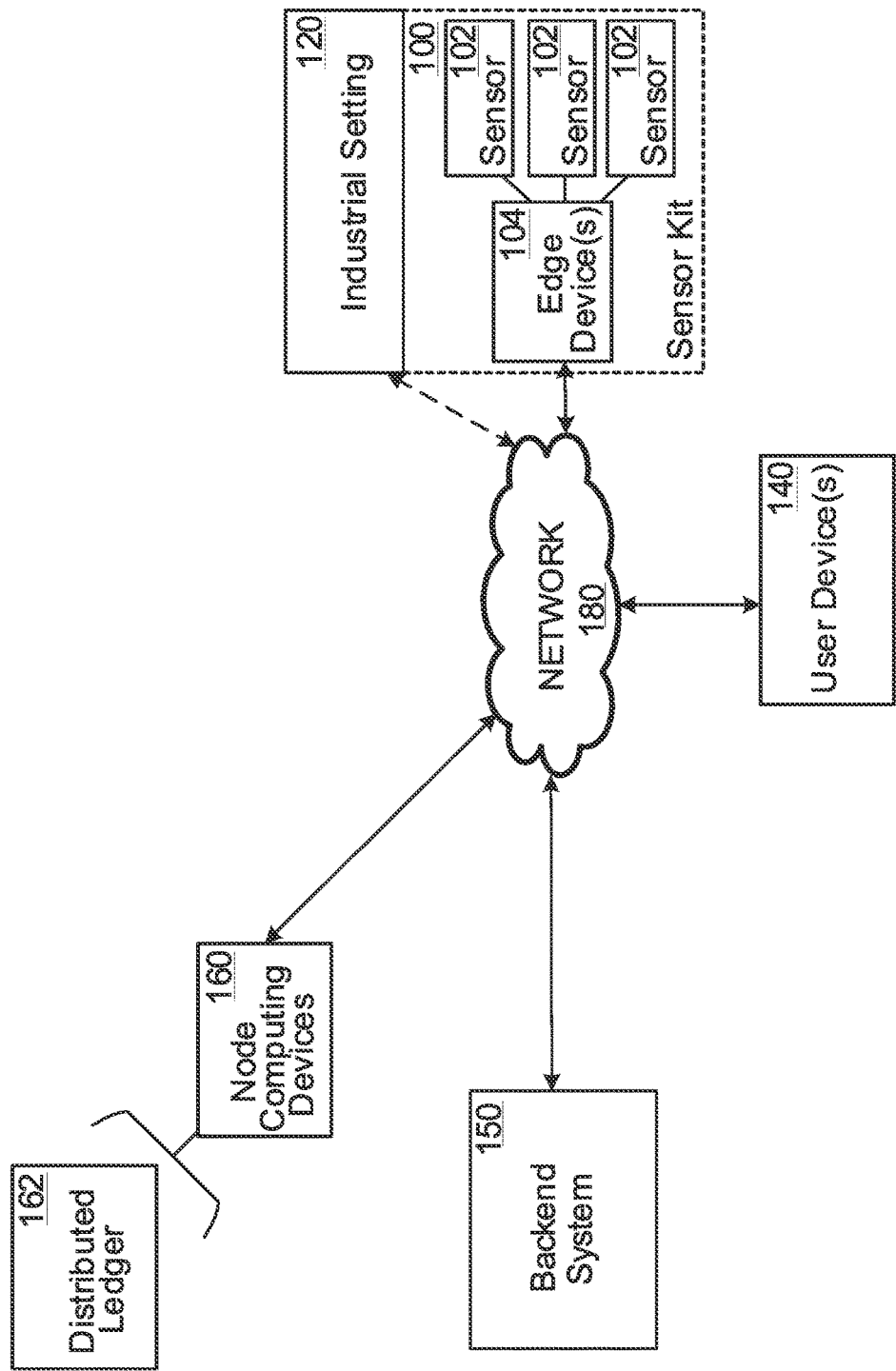
FIG. 1 is a schematic illustrating an example of a sensor kit deployed in an industrial setting according to some embodiments of the present disclosure.

FIG. 1—Sensor Kit Environment

FIG. 1 is a schematic illustrating an industrial setting 120 at which a sensor kit 100 has been installed. In embodiments, the sensor kit 100 may refer to a fully deployable, purpose-configured industrial IoT system that is provided in a unified kit and is ready for deployment in the industrial setting 120 by a consumer entity (e.g., owner or operator of an industrial setting 120). In embodiments, the sensor kit 100 allows the owner or operator to install and deploy the sensor kit with no or minimal configuration (e.g., setting user permissions, setting passwords, and/or setting notification and/or display preferences). The term "sensor kit" 100 may refer to a set of devices that are installed in an industrial setting 120 (e.g., a factory, a mine, an oil field, an oil pipeline, a refinery, a commercial kitchen, an industrial complex, a storage facility, a building site, and the like). The collection of devices comprising the sensor kit 100 includes a set of one or more internet of things (IoT) sensors 102 and a set of one or more edge devices 104. For purposes of discussion, references to "sensors" or "sensor devices" should be understood to mean IoT sensors, unless specifically stated otherwise.

In embodiments, the sensor kit 100 includes a set of IoT sensors 102 that are configured for deployment in, on, or around an industrial component, a type of an industrial component (e.g., a turbine, a generator, a fan, a pump, a valve, an assembly line, a pipe or pipeline, a food inspection line, a server rack, and the like), an industrial setting 120, and/or a type of industrial setting 120 (e.g., indoor, outdoor, manufacturing, mining, drilling, resource extraction, underground, underwater, and the like) and a set of edge devices capable of handling inputs from the sensors and providing network-based communications. In embodiments, an edge device 104 may include or may communicate with a local data processing system (e.g., a device configured to compress sensor data, filter sensor data, analyze sensor data, issue notifications based on sensor data and the like) capable of providing local outputs, such as of signals and of analytic results that result from local processing. In embodiments, the edge device 104 may include or may communicate with a communication system (e.g., a Wi-Fi chipset, a cellular chipset, a satellite transceiver, cognitive radio, one or more Bluetooth chips and/or other networking device) that is capable of communicating data (e.g., raw and/or processed sensor data, notifications, command instructions, etc.) within and outside the industrial environment. In embodiments, the communication system is configured to operate without reliance on the main data or communication networks of an industrial setting 120. In embodiments, the communication system is provided with security capabilities and instructions that maintain complete physical and data separation from the main data or communication networks of an industrial setting 120. For example, in embodiments, Bluetooth-enabled edge devices may be configured to permit pairing only with pre-registered components of a kit, rather than with other Bluetooth-enabled devices in an industrial setting 120.

In embodiments, an IoT sensor 102 is a sensor device that is configured to collect sensor data and to communicate sensor data to another device using at least one communication protocol. In embodiments, IoT sensors 102 are configured for deployment in, on, or around a defined type of an industrial entity. The term industrial entity may refer to any object that may be monitored in an industrial setting 120. In embodiments, industrial entities may include industrial components (e.g., a turbine, a generator, a fan, a pump, a valve, an assembly line, a pipe or pipe line, a food inspection line, a server rack, and the like). In embodiments, industrial entities may include organisms that are associated with an industrial setting 120 (e.g., humans working in the industrial setting 120 or livestock being monitored in the industrial setting 120). Depending on the intended use, setting, or purpose of the sensor kit 100, the configuration and form factor of an IoT sensor 102 will vary. Examples of different types of sensors include: vibration sensors, inertial sensors, temperature sensors, humidity sensors, motion sensors, LIDAR sensors, smoke/fire sensors, current sensors, pressure sensors, pH sensors, light sensors, radiation sensors, and the like.

In embodiments, an edge device 104 may be a computing device configured to receive sensor data from the one or more IoT sensors 102 and perform one or more edge-related processes relating to the sensor data. An edge-related process may refer to a process that is performed at an edge device 104 in order to store the sensor data, reduce bandwidth on a communication network, and/or reduce the computational resources required at a backend system. Examples of edge processes can include data filtering, signal filtering, data processing, compression, encoding, quick-predictions, quick-notifications, emergency alarming, and the like.

In embodiments, a sensor kit 100 is pre-configured such that the devices (e.g., sensors 102, edge devices 104, collection devices, gateways, etc.) within the sensor kit 100 are configured to communicate with one another via a sensor kit network without a user having to configure the sensor kit network. A sensor kit network may refer to a closed communication network that is established between the various devices of the sensor kit and that utilizes two or more different communication protocols and/or communication mediums to enable communication of data between the devices and to a broader communication network, such as a public communication network 190 (e.g., the Internet, a satellite network, and/or one or more cellular networks). For example, while some devices in a sensor kit network may communicate using a Bluetooth communication protocol, other devices may communicate with one another using a near-field communication protocol, a Zigbee protocol, and/or a Wi-Fi communication protocol. In some implementations, a sensor kit 100 may be configured to establish a mesh network having various devices acting as routing nodes within the sensor kit network. For example, sensors 102 may be configured to collect data and transmit the collected data to the edge device 104 via the sensor kit network, but may also be configured to receive and route data packets from other sensors 102 within the sensor kit network towards an edge device 104.

In embodiments, a sensor kit network may include additional types of devices. In embodiments, a sensor kit 100 may include one or more collection devices (not shown in FIG. 1) that act as routing nodes in the sensor network, such that the collection devices may be part of a mesh network. In embodiments, a sensor kit 100 may include a gateway device (not shown in FIG. 1) that enable communication with a broader network, whereby the gateway device may communicate with the edge device 104 over a wired or wireless communication medium in industrial settings 120 that would prevent an edge device 104 from communicating with the public communication network 190 (e.g., in a factory having very thick concrete walls). Embodiments of the sensor kit 100 may include additional devices without departing from the scope of the disclosure.

In embodiments, the sensor kit 100 is configured to communicate with a backend system 150 via a communication network, such as the public communication network 190. In embodiments, the backend system 150 is configured to receive sensor data from a sensor kit 100 and to perform one or more backend operations on the received sensor data. Examples of backend operations may include storing the sensor data in a database, performing analytics tasks on the sensor data, providing the results of the analytics and/or visualizations of the sensor data to a user via a portal and/or a dashboard, training one or more machine-learned models using the sensor data, determining predictions and/or classifications relating to the operation of the industrial setting 120 and/or industrial devices of the industrial setting 120 based on the sensor data, controlling an aspect and/or an industrial device of the industrial setting 120 based on the predictions and/or classifications, issuing notifications to the user via the portal and/or the dashboard based on the predictions and/or classifications, and the like.

It is appreciated that in some embodiments, the sensor kit 100 may provide additional types of data to the backend system 150. For example, the sensor kit 100 may provide diagnostic data indicating any detected issues (e.g., malfunction, battery levels low, etc.) or potential issues with the sensors 102 or other devices in the sensor kit 100.

In embodiments, the sensor kit 100 is configured to self-monitor for failing components (e.g., failing sensors 102) and to report failing components to the operator. For example, in some embodiments, the edge device 104 may be configured to detect failure of a sensor 102 based on a lack of reporting from a sensor, a lack of response to requests (e.g., "pings"), and/or based on unreliable data (e.g., data regularly falling out of the expected sensor readings). In some embodiments, the edge device 104 can maintain a sensor kit network map indicating where each device in the sensor kit network is located and can provide approximate locations and/or identifiers of failed sensors to a user.

In embodiments, the sensor kit 100 may be implemented to allow post-installation configuration. A post-installation configuration may refer to an update to the sensor kit 100 by adding devices and/or services to the sensor kit 100 after the sensor kit 100 has been installed. In some of these embodiments, users (e.g., operators of the industrial setting 120) of the system may subscribe to or purchase certain edge "services." For example, the sensor kit 100 may be configured to execute certain programs installed on one or more devices of the sensor kit 100 only if the user has a valid subscription or ownership permission to access the edge service supported by the program. When the user no longer has the valid subscription and/or ownership permission, the sensor kit 100 may preclude execution of those programs. For example, a user may subscribe to unlock AI-based edge services, mesh networking capabilities, self-monitoring services, compression services, in-facility notifications, and the like.

In some embodiments, users can add new sensors 102 to the sensor kit post-installation in a plug-and-play-like manner. In some of these embodiments, the edge device 104 and the sensors 102 (or other devices to be added to the sensor kit 100) may include respective short-range communication capabilities (e.g., near-field communication (NFC) chips, RFID chips, Bluetooth chips, Wi-Fi adapters, and the like). In these embodiments, the sensors 102 may include persistent storage that stores identifying data (e.g., a sensor identifier value) and any other data that would be used to add the sensor 102 to the sensor kit 100 (e.g., an industrial device type, supported communication protocols, and the like). In some embodiments, a user may initiate a post-installation addition to the sensor kit 100 by pressing a button on the edge device 104, and/or by bringing the sensor 102 into the vicinity of the edge device 104. In some embodiments, in response to a user initiating a post-installation addition to the sensor kit, the edge device 104 may emit a signal (e.g., a radio frequency). The edge device 104 may emit the signal, for example, as a result of a human user pushing a button or at a predetermined time interval. The emitted signal may trigger a sensor 102 proximate enough to receive the signal and to transmit the sensor ID of the sensor 102 and any other suitable configuration data (e.g., device type, communication protocols, and the like). In response to the sensor 102 transmitting its configuration data (e.g., sensor ID and other relevant configuration data) to the edge device 104, the edge device 104 may add the sensor 102 to the sensor kit 102. Adding the sensor 102 to the sensor kit 104 may include updating a data store or manifest stored at the edge device 104 that identifies the devices of the sensor kit 100 and data relating thereto. Non-limiting examples of data that may be stored in the manifest relating to each respective sensor 102 may include the communication protocol used by the sensor 102 to communicate with the edge device 104 (or intermediate devices), the type of sensor data provided by the sensor 102 (e.g., vibration sensor data, temperature data, humidity data, etc.), models used to analyze sensor data from the sensor 102 (e.g., a model identifier), alarm limits associated with the sensor 102, and the like.

In embodiments, the sensor kit 100 (e.g., the edge device 104) may be configured to update a distributed ledger 162 with sensor data captured by the sensor kit 100. In embodiments, a distributed ledger 162 is a Blockchain or any other suitable distributed ledger 162. The distributed ledger 162 may be a public ledger or a private ledger. Private ledgers reduce power consumption requirements of maintaining the distributed ledger 162, while public ledgers consume more power but offer more robust security. In embodiments, the distributed ledger 162 may be distributed amongst a plurality of node computing devices 160. The node computing devices 160 may be any suitable computing device, including physical servers, virtual servers, personal computing devices, and the like. In some embodiments, the node computing devices 160 are approved (e.g., via a consensus mechanism) before the node computing devices 160 may participate in the distributed ledger. In some embodiments, the distributed ledger 162 may be privately stored. For example, a distributed ledger may be stored amongst a set of preapproved node computing devices, such that the distributed ledger 162 is not accessible by non-approved devices. In some embodiments, the node computing devices 160 are edge devices 104 of the sensor kit 102 and other sensor kits 102.

In embodiments, the distributed ledger 162 is comprised of a set of linked data structures (e.g., blocks, data records, etc.), such that the linked data structures form an acyclic graph. For purposes of explanation, the data structures will be referred to as blocks. In embodiments, each block may include a header that includes a unique ID of the block and a body that includes the data that is stored in the block, and a pointer. In embodiments, the pointer is the block ID of a parent block of the block, wherein the parent block is a block that was created prior to the block being written. The data stored in a respective block can be sensor data captured by a respective sensor kit 100. Depending on the implementation, the types of sensor data and the amount of sensor data stored in a respective body of a block may vary. For example, a block may store a set of sensor measurements from one or more types of sensors 102 of the sensor kit 100 captured over a period of time (e.g., sensor data 102 captured from all of the sensors 102 in the sensor kit 100 over a period one hour or one day) and metadata relating thereto (e.g., sensor identifiers of each sensor measurement and a timestamp of each sensor measurement or group of sensor measurements). In some embodiments, a block may store sensor measurements determined to be anomalous (e.g., outside a standard deviation of expected sensor measurements or deltas in sensor measurements that are above a threshold) and/or sensor measurements indicative of an issue or potential issue, and related metadata (e.g., sensor IDs of each sensor measurement and a timestamp of each sensor measurement or group of sensor measurements). In some embodiments, the sensor data stored in a block may be compressed and/or encoded sensor data, such that the edge device 104 compresses/encodes the sensor data into a more compact format. In embodiments, the edge device 104 may generate a hash of the body, such that the contents of the body (e.g., block ID of the parent block and the sensor data) are hashed and cannot be altered without changing the value of the hash. In embodiments, the edge device 104 may encrypt the content within the block, so that the content may not be read by unauthorized devices.

As mentioned, the distributed ledger 162 may be used for different purposes. In some embodiments, the distributed ledger 162 may further include one or more smart contracts. A smart contract is a self-executing digital contract. A smart contract may include code (e.g., executable instructions) that defines one or more conditions that trigger one or more actions. A smart contract may be written by a developer in a scripting language (e.g., JavaScript), an object code language (e.g., Java), or a compiled language (e.g., C++ or C). Once written, a smart contract may be encoded in a block and deployed to the distributed ledger 162. In embodiments, the backend system 150 is configured to receive the smart contract from a user and write the smart contract to a respective distributed ledger 162. In embodiments, an address of the smart contract (e.g., the block ID of the block containing the smart contract) may be provided to one or more parties to the smart contract, such that respective parties may invoke the smart contract using the address. In some embodiments, the smart contract may include an API that allows a party to provide data (e.g., addresses of blocks) and/or to transmit data (e.g., instructions to transfer funds to an account).

In example implementations, an insurer may allow insured owners and/or operators of an industrial setting 120 to agree to share sensor data with the insurer to demonstrate that the equipment in the facility is functioning properly and, in return, the insurer may issue a rebate or refund to the owners and/or operators if the owners and/or operators are compliant with an agreement with the insurers. Compliance with the agreement may be verified electronically by participant nodes in the distributed ledger and/or the sensor kit 100 via a smart contract. In embodiments, the insurer may deploy the smart contract (e.g., by adding the smart contract to a distributed ledger 162) that triggers the issuance of rebates or refunds on portions of insurance premiums when the sensor kit 100 provides sufficient sensor data to the insurer via the distributed ledger that indicates the facility is operating without issue. In some of these embodiments, the smart contract may include a first condition that requires a certain amount of sensor data to be reported by a facility and a second condition that each instance of the sensor data equals a value (e.g., there are no classified or predicted issues) or range of values (e.g., all sensor measurements are within a predefined range of values). In some embodiments, the action taken in response to one or more of the conditions being met may be to deposit funds (e.g., a wire transfer or cryptocurrency) into an account. In this example, the edge device 104 may write blocks containing sensor data to the distributed ledger. The edge device 104 may also provide the addresses of these blocks to the smart contract (e.g., using an API of the smart contract). Upon the smart contract verifying the first and second conditions of the contract, the smart contract may initiate the transfer of funds from an account of the insurer to the account of the insured.

In another example, a regulatory body (e.g., a state, local, or federal regulatory agency) may require facility operators to report sensor data to ensure compliance with one or more regulations. For instance, the regulatory body may regulate food inspection facilities, pharmaceutical manufacturing facilities, e.g., manufacturing facility 1700, indoor agricultural facilities, e.g., indoor agricultural facility 1800, offshore oil extraction facilities, e.g., underwater industrial facility 1900, or the like. In embodiments, the regulatory body may deploy a smart contract that is configured to receive and verify the sensor data from an industrial setting 120, and in response to verifying the sensor data issues a compliance token (or certificate) to an account of the facility owner. In some of these embodiments, the smart contract may include a condition that requires a certain amount of sensor data to be reported by a facility and a second condition that requires the sensor data to be compliant with the reporting regulations. In this example, the edge device 104 may write blocks containing sensor data to the distributed ledger 162. The edge device 104 may also provide the addresses of these blocks to the smart contract (e.g., using an API of the smart contract). Upon the smart contract verifying the first and second conditions of the contract, the smart contract may generate a token indicating compliance by the facility operator and may initiate the transfer of funds to an account (e.g., a digital wallet) associated with the facility.

A distributed ledger 162 may be adapted for additional or alternative applications without departing from the scope of the disclosure.

Figure 2A:
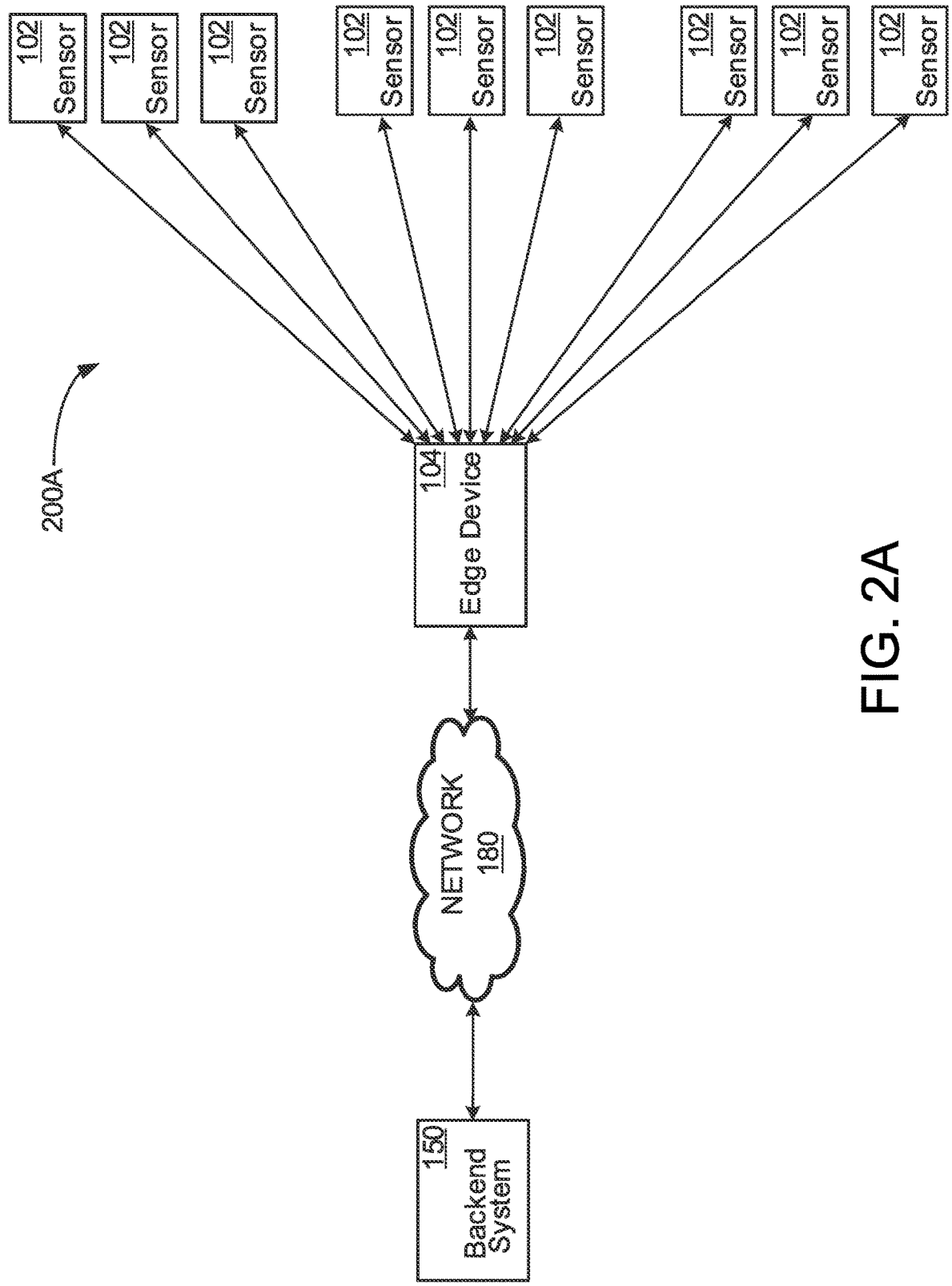
FIG. 2A is a schematic illustrating an example of a sensor kit network having a star network topology according to some embodiments of the present disclosure.
Figure 2B:
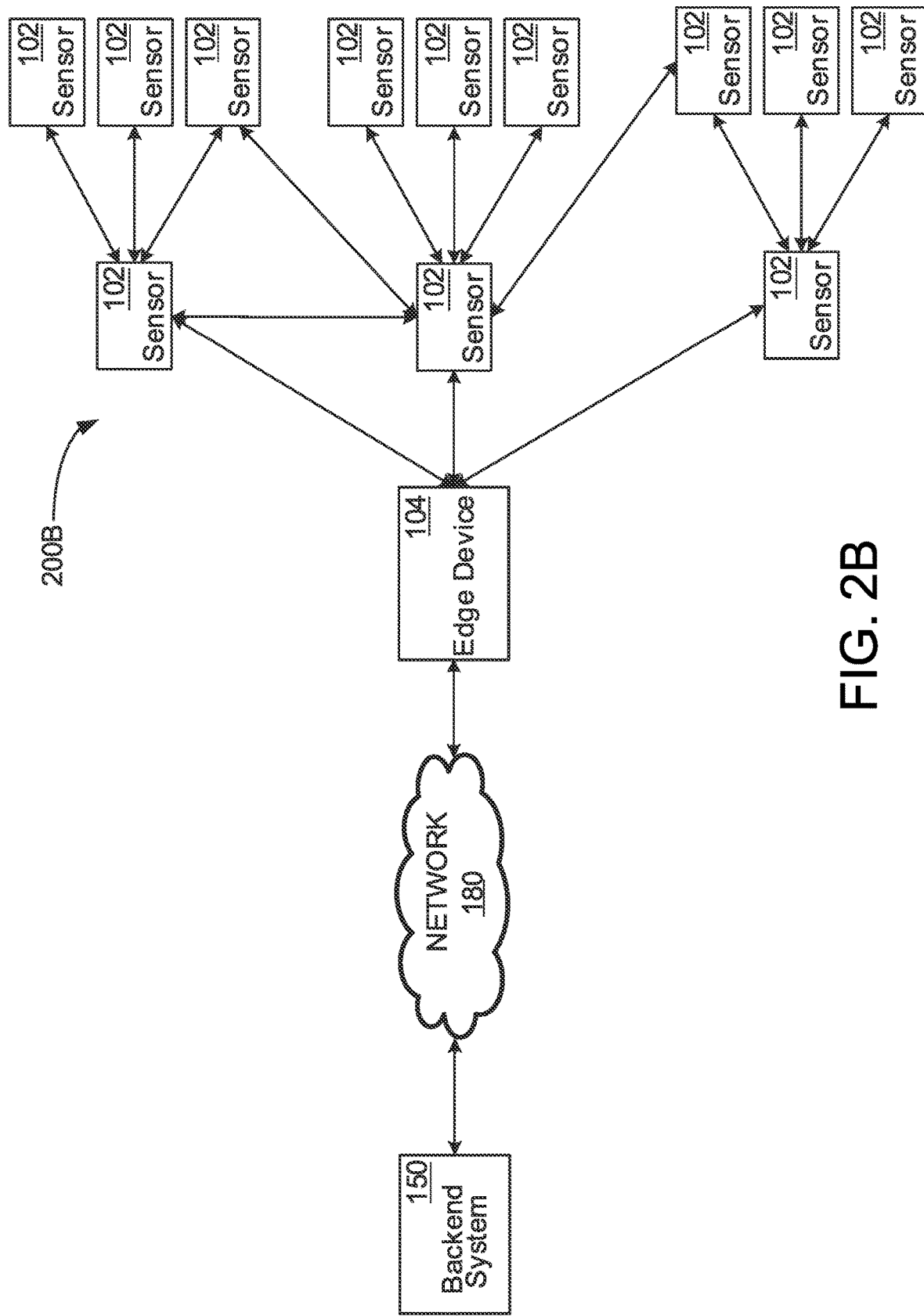
FIG. 2B is a schematic illustrating an example of a sensor kit network having a mesh network topology according to some embodiments of the present disclosure.
Figure 2C:
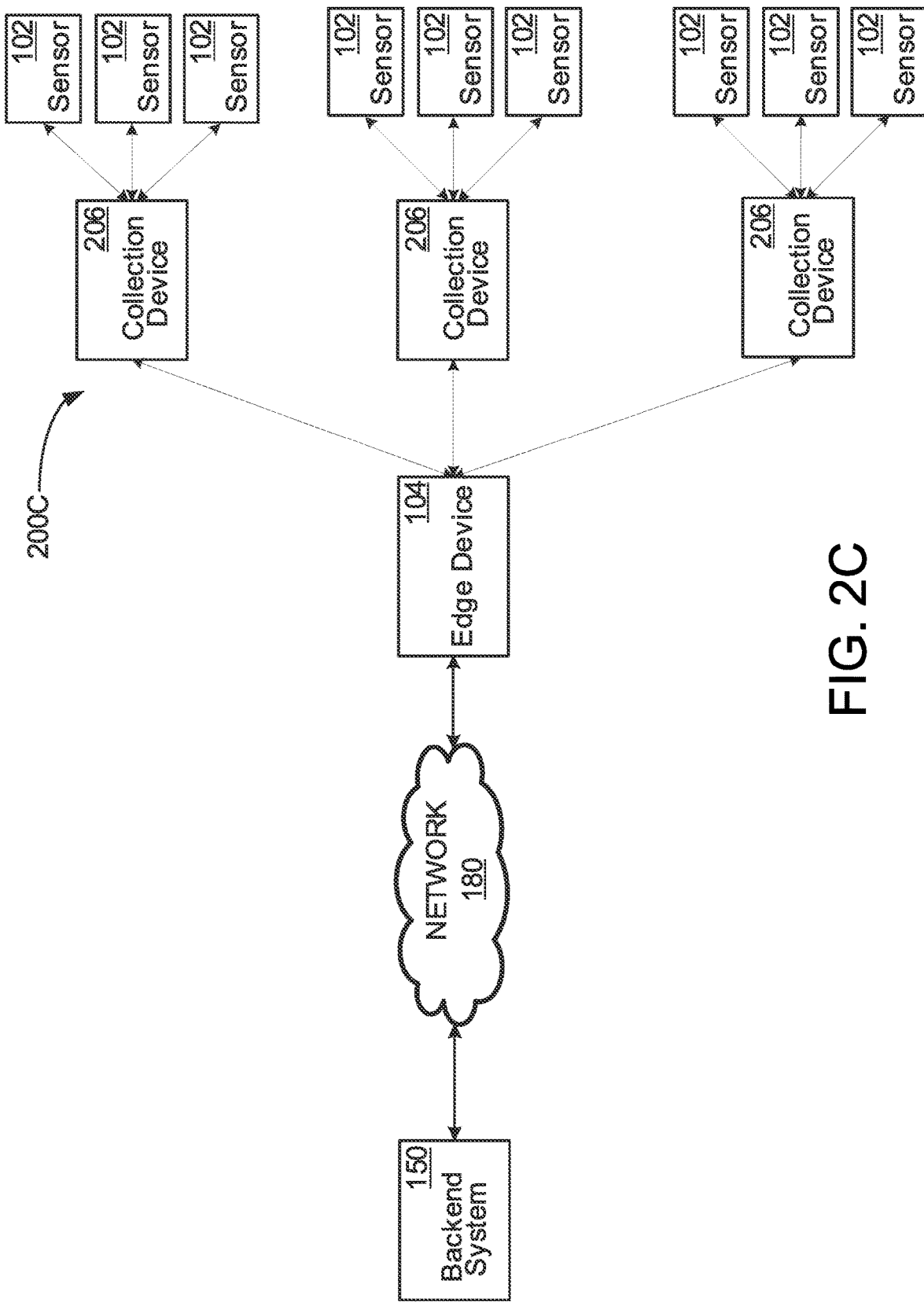
FIG. 2C is a schematic illustrating an example of a sensor kit network having a hierarchical network topology according to some embodiments of the present disclosure.

FIGS. 2A, 2B, and 2C—Components and Networking

FIGS. 2A, 2B, and 2C illustrate example configurations of a sensor kit network 200. Depending on the sensor kit 100 and the industrial setting 120 that the sensor kit 100 is installed in, the sensor kit network 200 may communicate in different manners.

FIG. 2A illustrates an example sensor kit network 200A that is a star network. In these embodiments, the sensors 102 communicate directly with the edge device 104. In these embodiments, the communication protocol(s) utilized by the sensor devices 102 and the edge device 104 to communicate are based on one or more of the physical area of the sensor kit network 102, the power sources available, and the types of sensors 102 in the sensor kit 100. For example, in settings where the area being monitored is a relatively small area and where the sensors 102 are not able to connect to a power supply, the sensors 102 may be fabricated with a Bluetooth Low Energy (BLE) microchip that communicates using a Bluetooth Low Energy protocol (e.g., the Bluetooth 5 protocol maintained by the Bluetooth Special Interest Group). In another example, in a relatively small area where lots of sensors 102 are to be deployed, the sensors 102 may be fabricated with the Wi-Fi microchip that communicates using the IEEE 802.11 protocol. In the embodiments of FIG. 2A, the sensors 102 may be configured to perform one-way or two-way communication. In embodiments where the edge device 104 does not need to communicate data and/or instructions to the sensors 102, the sensors 102 may be configured for one-way communication. In embodiments where the edge device 104 does communicate data and/or instructions to the sensors 102, the sensors 102 may be configured with transceivers that perform two-way communication. A star network may be configured with devices having other suitable communication devices without departing from the scope of the disclosure.

FIG. 2B illustrates an example sensor kit network 200B that is a mesh network where the nodes (e.g., sensors 102) connect to each other directly, dynamically, and/or non-hierarchically to cooperate with one another to efficiently route data to and from the edge device 104. In some embodiments, the devices in the mesh network (e.g., the sensors 102, the edge device 104, and/or any other devices in the sensor kit network 200B) may be configured to self-organize and self-configure the mesh network, such that the sensors 102 and/or the edge device 104 may determine which devices route data on behalf of other devices, and/or redundancies for transmission should a routing node (e.g., sensor 102) fail. In embodiments, the sensor kit 100 may be configured to implement a mesh network in industrial settings 120 where the area being monitored is relatively large (e.g., greater than 100 meters in radius from the edge device 104) and/or where the sensors 102 in the sensor kit 100 are intended to be installed in close proximity to one another. In the latter scenario, the power consumption of each individual sensor 102 may be reduced in comparison to sensors 102 in a star network, as the distance that each respective sensor 102 needs to transmit over is relatively less than the distance that the respective sensor 102 would need to transmit over in a star network. In embodiments, a sensor 102 may be fabricated with a Zigbee® microchips, a Digi XBee® microchip, a Bluetooth Low Energy microchip, and/or any other suitable communication devices configured to participate in a mesh network.

FIG. 2C illustrates an example of a sensor kit network 200C that is a hierarchical network. In these embodiments, the sensor kit 100 includes a set of collection devices 206. A collection device 206 may refer to a non-sensor device that receives sensor data from a sensor device 104 and routes the sensor data to an edge device 104, either directly or via another collection device 206. In embodiments, a hierarchical network may refer to a network topography where one or more intermediate devices (e.g., collection devices 206) route data from one or more respective peripheral devices (e.g., sensor devices 102) to a central device (e.g., edge device 104). A hierarchical network may include wired and/or wireless connections. In embodiments, a sensor device 102 may be configured to communicate with a collection device 206 via any suitable communication device (e.g., Bluetooth Low Energy microchips, Wi-Fi microchips, Zigbee microchips, or the like). In embodiments, hierarchical sensor kit networks may be implemented in industrial settings 120 where power sources are available to power the collection devices 206 and/or where the sensors 102 are likely to be spaced too far apart to support a reliable mesh network.

The examples of FIGS. 2A-2C are provided for examples of different topologies of a sensor kit network. These examples are not intended to limit the types of sensor kit networks 200 that may be formed by a sensor kit 100. Furthermore, sensor kit networks 200 may be configured as hybrids of star networks, hierarchical networks, and/or mesh networks, depending on the industrial settings 120 in which respective sensor kits 200 are being deployed.

Figure 3A:
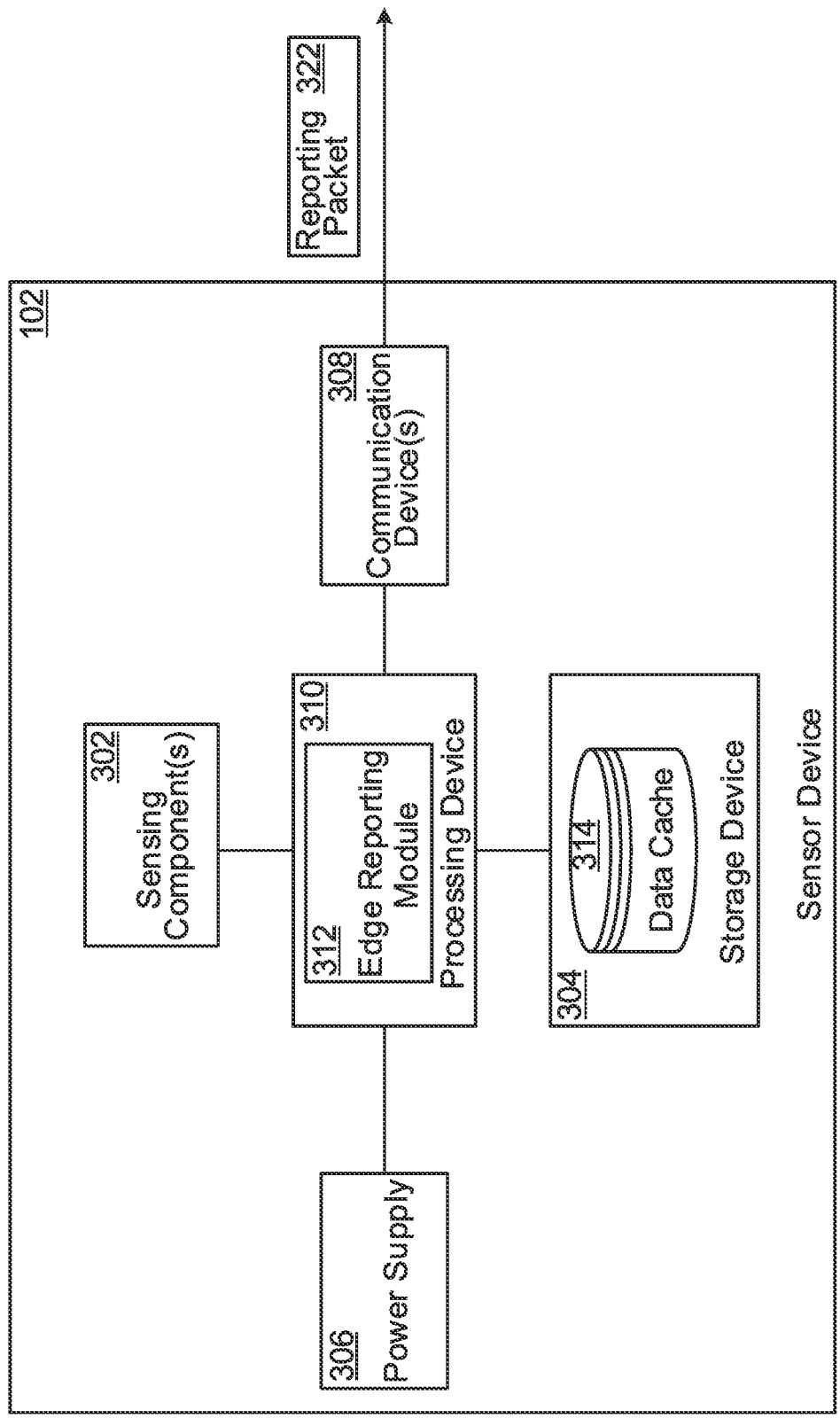
FIG. 3A is a schematic illustrating an example of a sensor according to some embodiments of the present disclosure.

FIGS. 3A, 3B, 4, and 5—Example Configurations of Sensors, Edge Devices, and Backend Systems FIG. 3A illustrates an example IoT sensor 102 (or sensor) according to embodiments of the present disclosure. Embodiments of the IoT sensor 102 may include, but are not limited to, one or more sensing components 302, one or more storage devices 304, one or more power supplies 306, one or more communication devices 308, and a processing device 310. In embodiments, the processing device 310 may execute an edge reporting module 312.

A sensor 102 includes at least one sensing component 302. A sensing component 302 may be any digital, analog, chemical, and/or mechanical component that outputs raw sensor data to the processing device 310. It is appreciated that different types of sensors 102 are fabricated with different types of sensing components. In embodiments, sensing components 302 of an inertial sensor may include one or more accelerometers and/or one or more gyroscopes. In embodiments, sensing components 302 of a temperature sensor may include one or more thermistors or other temperature sensing mechanisms. In embodiments, sensing components 302 of a heat flux sensor may include, for example, thin film sensors, surface mount sensors, polymer-based sensors, chemical sensors and others. In embodiments, sensing components 302 of a motion sensor may include a LIDAR device, a radar device, a sonar device, or the like. In embodiments, sensing components 302 of an occupancy sensor may include a surface being monitored for occupancy, a pressure activated switch embedded under the surface of the occupancy sensor and/or a piezoelectric element integrated into the surface of the occupancy sensor, such that an electrical signal is generated when an object occupies the surface being monitored for occupancy. In embodiments, sensing components 302 of a humidity sensor may include a capacitive element (e.g., a metal oxide between to electrodes) that outputs an electrical capacity value corresponding to the ambient humidity; a resistive element that includes a salt medium having electrodes on two sides of the medium, whereby the variable resistance measured at the electrodes corresponds to the ambient humidity; and/or a thermal element that includes a first thermal sensor that outputs a temperature of a dry medium (e.g., dry nitrogen) and a second thermal sensor that outputs an ambient temperature of the sensor's environment, such that the humidity is determined based on the change, i.e., the delta, between the temperature in the dry medium and the ambient temperature. In embodiments, sensing components 302 of a vibration sensor may include accelerometer components, position sensing components, torque sensing components, and others. It is appreciated that the list of sensor types and sensing components thereof is provided for example. Additional or alternative types of sensors and sensing components may be integrated into a sensor 102 without departing from the scope of the disclosure. Furthermore, in some embodiments, the sensors 102 of a sensor kit 100 may include audio, visual, or audio/visual sensors, in addition to non-audio/visual sensors 102 (i.e., sensors that do not capture video or audio). In these embodiments, the sensing components 392 may include a camera and/or one or more microphones. In some embodiments, the microphones may be directional microphones, such that a direction of a source of audio may be determined.

A storage device 304 may be any suitable medium for storing data that is to be transmitted to the edge device 104. In embodiments, a storage device 304 may be a persistent storage medium, such as a flash memory device. In embodiments, a storage device 304 may be a transitory storage medium, such as a random access memory device. In embodiments, a storage device 304 may be a circuit configured to store charges, whereby the magnitude of the charge stored by the component is indicative of a sensed value, or incremental counts. In these embodiments, this type of storage device 304 may be used where power availability and size are concerns, and/or where the sensor data is count-based (e.g., a number of detection events). It is appreciated that any other suitable storage devices 304 may be used. In embodiments, the storage device 304 may include a cache 314, such that the cache 314 stores sensor data that is not yet reported to the edge device 104. In these embodiments, the edge reporting module 312 may clear the cache 314 after the sensor data being stored in the cache 314 is transmitted to the edge device 104.

A power supply 306 is any suitable component that provides power to the other components of the sensor 102, including the sensing components 302, storage devices 304, communication devices 306, and/or the processing device 308. In embodiments, a power supply 306 includes a wired connection to an external power supply (e.g., alternating current delivered from a power outlet, or direct current delivered from a battery or solar power supply). In embodiments, the power supply 306 may include a power inverter that converts alternating currents to direct currents (or vice-versa). In embodiments, a power supply 306 may include an integrated power source, such as a rechargeable lithium ion battery or a solar element. In embodiments, a power supply 306 may include a self-powering element, such as a piezoelectric element. In these embodiments, the piezoelectric element may output a voltage upon a sufficient mechanical stress or force being applied to the element. This voltage may be stored in a capacitor and/or may power a sensing element 302. In embodiments, the power supply 306 may include an antenna (e.g., a receiver or transceiver) that receives a radio frequency that energizes the sensor 102. In these embodiments, the radio frequency may cause the sensor 102 to "wake up" and may trigger an action by the sensor 102, such as taking sensor measurements and/or reporting sensor data to the edge device 104. A power supply 306 may include additional or alternative components as well.

In embodiments, a communication device 308 is a device that enables wired or wireless communication with another device in the sensor kit network 200. In most sensor kit configurations 100, the sensors 102 are configured to communicate wirelessly. In these embodiments, a communication device 308 may include a transmitter or transceiver that transmits data to other devices in the sensor kit network 200. Furthermore, in some of these embodiments, communication devices 308 having transceivers may receive data from other devices in the sensor kit network 200. In wireless embodiments, the transceiver may be integrated into a chip that is configured to perform communication using a respective communication protocol. In some embodiments, a communication device 308 may be a Zigbee® microchip, a Digi XBee® microchip, a Bluetooth microchip, a Bluetooth Low Energy microchip, a Wi-Fi microchip, or any other suitable short-range communication microchip. In embodiments where the sensor kit 200 supports a mesh network, the communication device 308 may be a microchip that implements a communication protocol that supports mesh networking (e.g., ZigBee PRO mesh networking protocol, Bluetooth Mesh, 802.11a/b/g/n/ac, and the like). In these embodiments, a communication device 308 may be configured to establish the mesh network and handle the routing of data packets received from other devices in accordance with the communication protocol implemented by the communication device 308. In some embodiments, a sensor 102 may be configured with two or more communication devices 308. In these embodiments, the sensors 102 may be added to different sensor kit 100 configurations and/or may allow for flexible configuration of the sensor kit 102 depending on the industrial setting 120.

In embodiments, the processing device 310 may be a microprocessor. The microprocessor may include memory (e.g., read-only memory (ROM)) that stores computer-executable instructions and one or more processors that execute the computer-executable instructions. In embodiments, the processing device 310 executes an edge reporting module 312. In embodiments, the edge reporting module 312 is configured to transmit data to the edge device 104. Depending on the configuration of the sensor kit network 200 and location of the sensors 102 with respect to the edge device 104, the edge reporting module 312 may transmit data (e.g., sensor data) either directly to the edge device 104, or to an intermediate device (e.g., a collection device 206 or another sensor device 102) that routes the data towards the edge device 104. In embodiments, the edge reporting module 312 obtains raw sensor data from a sensing component 302 or from a storage device 304 and packetizes the raw sensor data into a reporting packet 320.

Figure 3B:
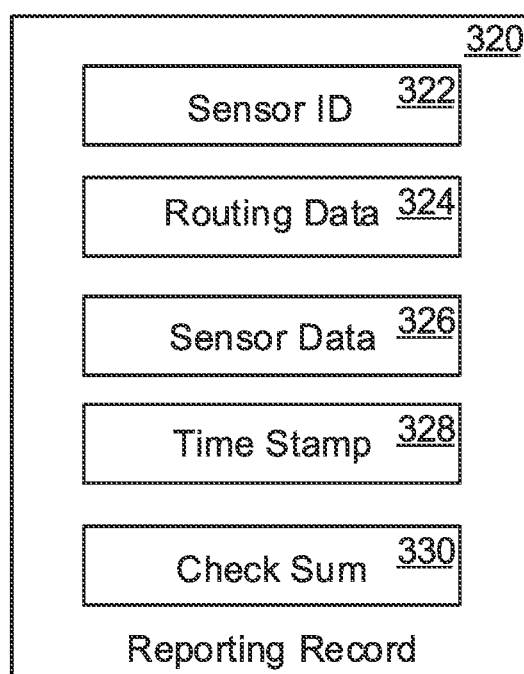
FIG. 3B is a schematic illustrating an example schema of a reporting packet according to some embodiments of the present disclosure.

FIG. 3B illustrates an example reporting packet 320 according to some embodiments of the present disclosure. In some of these embodiments, the edge reporting module 312 may populate a reporting packet template to obtain a reporting packet 320. In embodiments, a reporting packet 320 may include a first field 322 indicating a sensor ID of the sensor 102 and a second field 326 indicating the sensor data. Additionally, the reporting packet 320 may include additional fields, such as a routing data field 324 indicating a destination of the packet (e.g., an address or identifier of the edge device 104), a time stamp field 328 indicating a time stamp, and/or a checksum field 330 indicating a checksum (e.g., a hash value of the contents of the reporting packet). The reporting packet may include additional or alternative fields (e.g., error codes) without departing from the scope of the disclosure.

Referring back to FIG. 3A, in embodiments, the edge reporting module 312 may generate a reporting packet 320 for each instance of sensor data. Alternatively, the edge reporting module 312 may generate a reporting packet 320 that includes a batch of sensor data (e.g., the previous N sensor readings or all the sensor readings maintained in a cache 314 of the sensor 102 since the cache 314 was last purged). Upon generating a reporting packet 320, the edge reporting module 312 may output the reporting packet 320 to the communication device 308, which transmits the reporting packet 320 to the edge device 104 (either directly or via one or more intermediate devices). The edge reporting module 312 may generate and transmit reporting packets 320 at predetermined intervals (e.g., every second, every minute, every hour), continuously, or upon being triggered (e.g., upon being activated via the power supply or upon being command by the edge device 104).

In embodiments, the edge reporting module 312 instructs the sensing component(s) 302 to capture sensor data. In embodiments, the edge reporting module 312 may instruct a sensing component 302 to capture sensor data at predetermined intervals. For example, the edge reporting module 312 may instruct the sensing component 302 to capture sensor data every second, every minute, or every hour. In embodiments, the edge reporting module 312 may instruct a sensing component 302 to capture sensor data upon the power supply 306 being energized. For example, the power supply 306 may be energized by a radio frequency or upon a pressure-switch being activated and closing a circuit. In embodiments, the edge reporting module 312 may instruct a sensing component 302 to capture sensor data in response to receiving a command to report sensor data from the edge device 104 or a human user (e.g., in response to the user pressing a button).

In embodiments, a sensor 102 includes a housing (not shown). The sensor housing may have any suitable form factor. In embodiments where the sensor 102 is being used outdoors, the sensor may have a housing that is waterproof and/or resistant to extreme cold and/or extreme heat. In embodiments, the housing may have suitable coupling mechanisms to removably couple to an industrial component.

The foregoing is an example of a sensor 102. The sensor 102 may have additional or alternative components without departing from the scope of the disclosure.

Figure 4:
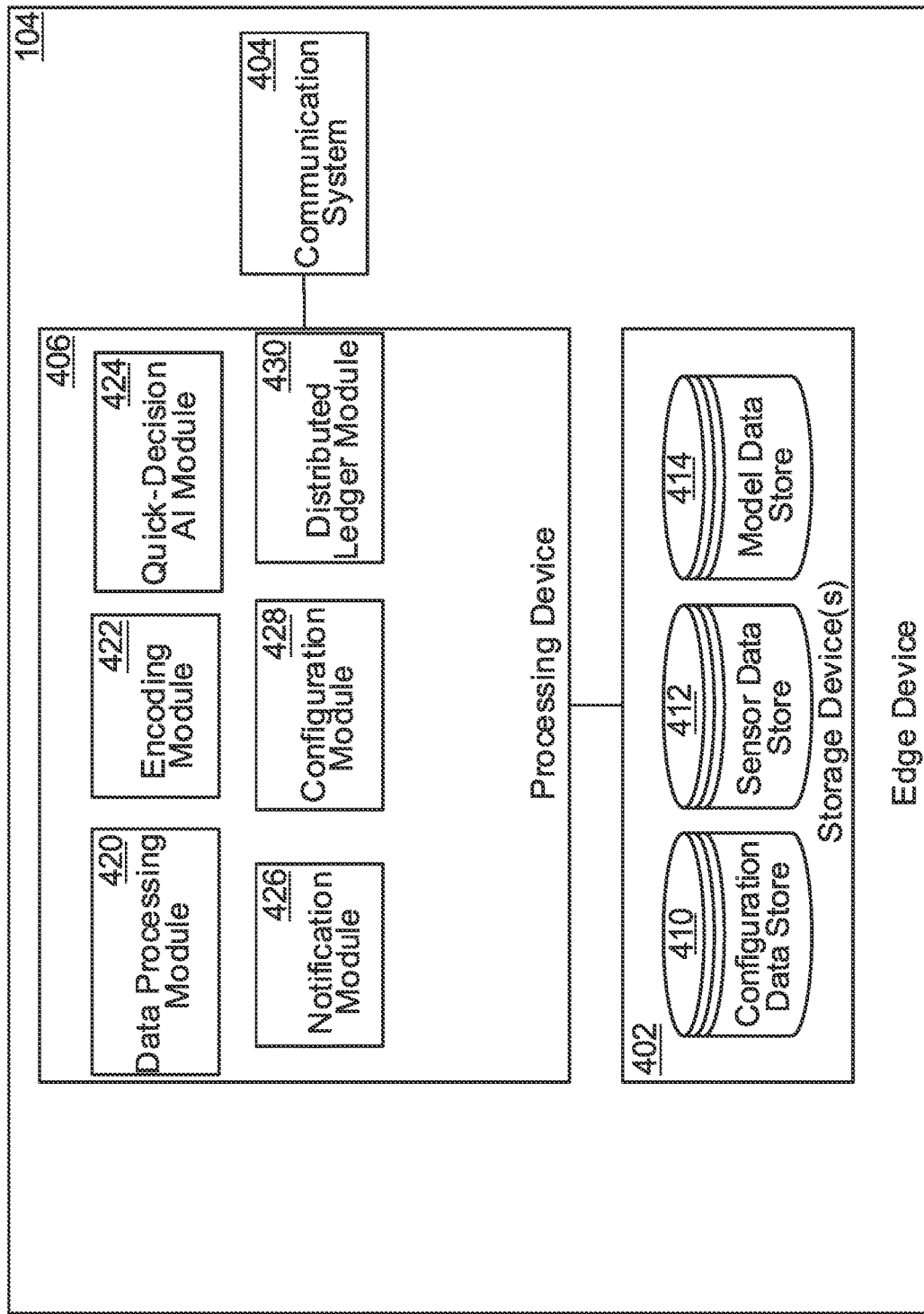
FIG. 4 is a schematic illustrating an example of an edge device of a sensor kit according to some embodiments of the present disclosure.

FIG. 4 illustrates an example of an edge device 104. In embodiments, the edge device 104 may include a storage system 402, a communication system 404, and a processing system 406. The edge device 104 may include additional components not shown, such as a power supply, a user interface, and the like.

The storage system 402 includes one or more storage devices. The storage devices may include persistent storage mediums (e.g., flash memory drive, hard disk drive) and/or transient storage devices (e.g., RAM). The storage system 402 may store one or more data stores. A data store may include one or more databases, tables, indexes, records, filesystems, folders and/or files. In the illustrated embodiments, the storage device stores a configuration data store 410, a sensor data store 412, and a model data store 414. A storage system 402 may store additional or alternative data stores without departing from the scope of the disclosure.

In embodiments, the configuration data store 410 stores data relating to the configuration of the sensor kit 100, including the devices of the sensor kit 100. In some embodiments, the configuration data store 410 may maintain a set of device records. The device records may indicate a device identifier that uniquely identifies a device of the sensor kit 100. The device records may further indicate the type of device (e.g., a sensor, a collection device, a gateway device, etc.). In embodiments where the network paths from each device to the edge device 104 do not change, a device record may also indicate the network path of the device to the edge device 104 (e.g., any intermediate devices in the device's network path). In the case that a device record corresponds to a sensor 102, the device record may indicate the type of sensor (e.g., a sensor type identifier) and/or a type of data that is provided by the sensor 102.

In embodiments, the configuration data store 410 may maintain a set of sensor type records, where each record corresponds to a different type of sensor 102 in the sensor kit 100. A sensor type record may indicate a type identifier that identifies the type of sensor and/or the type of sensor data provided by the sensor. In embodiments, a sensor type record may further indicate relevant information relating to the sensor data, including maximum or minimum values of the sensor data, error codes output by sensors 102 of the sensor type, and the like.

In embodiments, the configuration data store 410 may maintain a map of the sensor kit network 200. The map of the sensor kit network 200 may indicate a network topology of the sensor kit network 200, including network paths of the collection of devices in the sensor kit 100. In some embodiments, the map may include physical locations of the sensors as well. The physical location of a sensor 102 may be defined as a room or area that the sensor 102 is in, a specific industrial component that the sensor 102 is monitoring, a set of coordinates relative of the edge device 104 (e.g., x, y, z coordinates relative to the edge device 104, or an angle and distance of the sensor 102 relative to the edge device 104), an estimated longitude and latitude of the sensor 102, or any other suitable format of relative or absolute location determination and/or measurement.

In embodiments, a sensor data store stores 412 stores sensor data collected from the sensors 102 of the sensor kit 100. In embodiments, the sensor data store 412 maintains sensor data that is collected over a period of time. In some of these embodiments, the sensor data store 412 may be a cache that stores sensor data until it is reported and backed up at the backend system 150. In these embodiments, the cache may be cleared when sensor data is reported to the backend system 150. In some embodiments, the sensor data store 412 stores all sensor data collected by the sensor kit 412. In these embodiments, the sensor data store 412 may provide a backup for all the sensor data collected by the sensor kit 100 over time, thereby ensuring that the owner of the sensor kit 100 maintains ownership of its data.

In embodiments, a model data store 414 stores machine-learned models. The machine-learned models may include any suitable type of models, including neural networks, deep neural networks, recursive neural networks, Bayesian neural networks, regression-based models, decision trees, prediction trees, classification trees, Hidden Markov Models, and/or any other suitable types of models. A machine-learned model may be trained on training data, which may be expert generated data, historical data, and/or outcome-based data. Outcome-based data may be data that is collected after a prediction or classification is made that indicates whether the prediction or classification was correct or incorrect and/or a realized outcome. A training data instance may refer to a unit of training data that includes a set of features and a label. In embodiments, the label in a training data instance may indicate a condition of an industrial component or an industrial setting 120 at a given time. Examples of conditions will vary greatly depending on the industrial setting 120 and the conditions that the machine-learned model is being trained to predict or classify. Examples of labels in a manufacturing facility may include, but are not limited to, no issues detected, a mechanical failure of a component, an electrical failure of a component, a chemical leak detected, and the like. Examples of labels in a mining facility may include, but are not limited to, no issues detected, an oxygen deficiency, the presence of a toxic gas, a failing structural component, and the like. Examples of labels in an oil and/or gas facility (e.g., oil field, gas field, oil refinery, pipeline) may include, but are not limited to, no issues detected, a mechanical failure of a component (e.g., a failed valve or failed O-ring), a leak, and the like. Examples of labels in an indoor agricultural facility may include, but are not limited to, no issues detected, a plant died, a plant wilted, a plant turned a certain color (e.g., brown, purple, orange, or yellow), mold found, and the like. In each of these examples, there are certain features that may be relevant to a condition and some features that may have little or no bearing on the condition. Through a machine-learning process (which may be performed at the backend system 150 or another system), the model is trained to determine predictions or classifications based on a set of features. Thus, the set of features in a training data instance may include sensor data that is temporally proximate to a time when a condition of the industrial component or industrial setting 120 occurred (e.g., the label associated with the industrial component or industrial setting 120).

In embodiments, the machine-learned models may include prediction models that are used to predict potential issues relating to an industrial component being monitored. In some of these embodiments, a machine-learned model may be trained on training data (expert generated data and/or historical data) that corresponds to one or more conditions relating to a particular component. In some of these embodiments, the training data sets may include sensor data corresponding to scenarios where maintenance or some intervening action was later required and sensor data corresponding to scenarios where maintenance or some intervening action was ultimately not required. In these example embodiments, the machine-learned model may be used to determine a prediction of one or more potential issues that may arise with respect to one or more industrial components being monitored and/or the industrial setting 120 being monitored.

In embodiments, the machine-learned models may include classification models that classify a condition of an industrial component being monitored and/or the industrial setting 120. In some of these embodiments, a machine-learned model may be trained on training data (e.g., expert generated data and/or historical data) that corresponds to one or more conditions relating to a particular component. In some of these embodiments, the training data sets may include sensor data corresponding to scenarios where respective industrial components and/or respective industrial settings 120 were operating in a normal condition and sensor data where the respective industrial components and/or respective industrial settings 120 were operating in an abnormal condition. In training data instances where there was an abnormal condition, the training data instance may include a label indicating the type of abnormal condition. For example, a training data instance corresponding to an indoor agricultural facility that was deemed too humid for ideal growing conditions may include a label that indicates the facility was too humid.

In embodiments, the communication system 404 includes two or more communication devices, including at least one internal communication device that communicates with the sensor kit network 200 and at least one external communication device that communicates with a public communication network (e.g., the Internet) either directly or via a gateway device. The at least one internal communication devices may include Bluetooth chips, Zigbee chips, XBee chips, Wi-Fi chips, and the like. The selection of the internal communication devices may depend on the environment of the industrial setting 120 and the impacts thereof on the sensors 102 to be installed therein (e.g., whether the sensors 102 have reliable power sources, whether the sensors 102 will be spaced in proximity to one another, whether the sensors 102 need to transmit through walls, and the like). The external communication devices may perform wired or wireless communication. In embodiments, the external communication devices may include cellular chipsets (e.g., 4G or 5G chipsets), Ethernet cards, satellite communication cards, or other suitable communication devices. The external communication device(s) of an edge device 104 may be selected based on the environment of the industrial setting 120 (e.g., indoors v. outdoors, thick walls that prevent wireless communication v. thin walls that allow wireless communication, located near cellphone towers v. located in remote areas) and the preferences of an operator of the industrial setting 120 (e.g., the operator allows the edge device 104 to access a private network of the industrial setting 120, or the operator does not allow the edge device 104 to access a private network of the industrial setting 120).

In embodiments, the processing system 406 may include one or more memory devices (e.g., ROM and/or RAM) that store computer-executable instructions and one or more processors that execute the computer-executable instructions. The processing system 406 may execute one or more of a data processing module 420, an encoding module 422, a quick-decision AI module 424, a notification module 426, a configuration module 428, and a distributed ledger module 430. The processing system 406 may execute additional or alternative modules without departing from the scope of the disclosure. Furthermore, the modules discussed herein may include submodules that perform one or more functions of a respective module.

In embodiments, the data processing module 420 receives sensor data from the sensor kit network 200 and performs one or more data processing operations on the received sensor data. In embodiments, the data processing module 420 receives reporting packets 320 containing sensor data. In some of these embodiments, the data processing module 420 may filter data records that are duplicative (e.g., filtering out one out of two reporting packets 320 received from two respective sensors monitoring the same component for redundancy). The data processing module 420 may additionally or alternatively filter and/or flag reporting packets 320 containing sensor data that is clearly erroneous (e.g., sensor not within a tolerance range given the type of sensor 102 or contains an error code). In embodiments, the data processing module 420 may store and/or index the sensor data in the sensor data store.

In embodiments, the data processing module 420 may aggregate sensor data received over a period of time from the sensors 102 of the sensor kit 100 or a subset thereof and may transmit the sensor data to the backend system 150. In transmitting sensor data to the backend system 150, the data processing module 420 may generate a sensor kit reporting packet that includes one or more instances of sensor data. The sensor data in the sensor kit reporting packet may be compressed or uncompressed. In embodiments, the sensor kit reporting packet may indicate a sensor kit identifier that identifies the source of the data packet to the backend system 150. In embodiments, the data processing module 420 may transmit the sensor data upon receipt of the sensor data from a sensor 102, at predetermined intervals (e.g., every second, every minute, every hour, every day), or in response to a triggering condition (e.g., a prediction or classification that there is an issue with an industrial component or the industrial setting 120 based on received sensor data). In some embodiments, the sensor data may be encoded/compressed, such that sensor data collected from multiple sensors 102 and/or over a period of time may be more efficiently transmitted. In embodiments, the data processing module 420 may leverage the quick-decision AI module 424 to determine whether the industrial components of the industrial setting 120 and/or the industrial setting 120 itself is likely in a normal condition. If the quick-decision AI module 424 determines that the industrial components and/or the industrial setting 120 are in a normal condition with a high degree of certainty, then the data processing module 420 may delay or forgo transmitting the sensor data used to make the classification to the backend system 150. Additionally or alternatively, if the quick-decision AI module 424 determines that the industrial components and/or the industrial setting 120 are in a normal condition with a high degree of certainty, then the data processing module 420 may compress the sensor data and may be compressed at a greater rate. The data processing module 420 may perform additional or alternative functions without departing from the scope of the disclosure.

In embodiments, the encoding module 422 receives sensor data and may encode, compress, and/or encrypt the sensor data. The encoding module 422 may employ other techniques to compress the sensor data. In embodiments, the encoding module 422 may employ horizontal or compression techniques to compress the sensor data. For example, the encoding module 422 may use the Lempel-Zev-Welch algorithm or variations thereof. In some embodiments, the encoding module 522 may represent sensor data in an original integer or "counts format" and with relevant calibration coefficients and offsets at the time of collection. In these embodiments, the coefficients and offsets may be coalesced at the time of collection when a precise signal path is known, such that one floating-point coefficient and one integer offset is stored for each channel.

In embodiments, the encoding module 422 may employ one or more codecs to compress the sensor data. The codecs may be proprietary codecs and/or publicly available codecs. In some embodiments, the encoding module 422 may use a media compression codec (e.g., a video compression codec) to compress the sensor data. For example, the encoding module 422 may normalize the sensor data into values that fall within a range and format of a media frame (e.g., normalizing sensor data into acceptable pixel values for inclusion into a video frame) and may embed the normalized sensor data into the media frame. The encoding module 422 may embed the normalized sensor data collected from the sensors 102 of the sensor kit 100 into the media frame according to a predefined mapping (e.g., a mapping of respective sensors 102 to one or more respective pixels in a media frame). The encoding module 422 may generate a set of consecutive media frames in this manner and may compress the media frames using a media codec (an H.264/MPEG-4 codec, an H.265/MPEG-H codec, an H.263/MPEG-4 codec, proprietary codecs, and the like) to obtain a sensor data encoding. The encoding module 422 may then transmit sensor data encoding to the backend system, which may decompress and recalculate the sensor data based on the normalized values. In these embodiments, the codec used for compression and the mappings of sensors to pixels may be selected to reduce lossiness or to increase compression rates. Furthermore, the foregoing technique may be applied to sensor data that tends to be more static and less changing between samplings and/or where sensor data collected from different sensors tend to have little variation when sampled at the same time. The encoding module 422 may employ additional or alternative encoding/compression techniques without departing from the scope of the disclosure.

In embodiments, the quick-decision AI module 424 may utilize a limited set of machine-learned models to generate predictions and/or classifications of a condition of an industrial component being monitored and/or of the industrial setting 120 being monitored. In embodiments, the quick-decision AI module 424 may receive a set of features (e.g., one or more sensor data values) and request for a specific type of prediction or classification based thereon. In embodiments, the quick-decision AI module 424 may leverage a machine-learned model corresponding to the requested prediction or classification. The quick-decision AI module 424 may generate a feature vector based on the received features, such that the feature vector includes one or more sensor data values obtained from one or more sensors 102 of the sensor kit 100. The quick-decision AI module 424 may feed the feature vector to the machine-learned model. The machine-learned model may output a prediction or classification and a degree of confidence in the prediction or classification. In embodiments, the quick-decision AI module 424 may output the prediction or classification to the data processing module 420 (or another module that requested a prediction or classification). For example, in embodiments the data processing module 420 may use classifications that the industrial components and/or the industrial setting 120 are in a normal condition to delay or forgo transmission of sensor data and/or to compress sensor data. In embodiments, the data processing module 420 may use a prediction or classification that the industrial components and/or the industrial setting 120 are likely to encounter a malfunction to transmit uncompressed sensor data to the backend system 150, which may further analyze the sensor data and/or notify a human user of a potential issue.

In embodiments, the notification module 426 may provide notifications or alarms to users based on the sensor data. In some of these embodiments, the notification module 426 may apply a set of rules that trigger a notification or alarm if certain conditions are met. The conditions may define sensor data values that are strongly correlated with an undesirable (e.g., emergency) condition. Upon receiving sensor data from the data processing module 420, the notification module 426 may apply one or more rules to the sensor data. If the conditions to trigger an alarm or notification are met, the notification module 426 may issue an alarm or notification to a human user. The manner by which an alarm or notification is provided to the human user (e.g., to a user device, or triggering an audible alarm) may be predefined or, in some embodiments, may be defined by an operator of the industrial setting 120.

In embodiments, the configuration module 428 configures the sensor kit network 200. In embodiments, the configuration module 428 may transmit configuration requests to the other devices in the sensor kit 100, upon the sensors 102, edge device 104, and any other devices being installed in the industrial setting 120. In some of these embodiments, the sensors 102 and/or other devices may establish a mesh network or a hierarchical network in response to the configuration requests. In embodiments, the sensors 102 and other devices in the sensor kit network may respond to the configuration requests, in response to the configuration requests. In embodiments, the configuration module 428 may generate device records corresponding to the devices that responded based on the device IDs of those devices and any additional data provided in the responses to the configuration requests.

In embodiments, the configuration module 428 adds new devices to the sensor kit 100. In these embodiments, the configuration module 428 adds new sensors 102 to the sensor kit 100 post-installation in a plug-and-play-like manner. In some of these embodiments, the communication devices 404, 308 of the edge device 104 and the sensors 102 (or other devices to be added to the sensor kit 100) may include respective short-range communication capabilities (e.g., near-field communication (NFC) chips). In these embodiments, the sensors 102 may include persistent storage that stores identifying data (e.g., a sensor id value) and any other data that would be used to add the sensor to the sensor kit (e.g., device type, supported communication protocols, and the like). In response to a user initiating a post-installation addition to the sensor kit 100 (e.g., the user pressing a button on the edge device 104 and/or bringing the sensor 102 into the vicinity of the edge device 104), the configuration module 428 may cause the communication system 404 to emit a signal (e.g., a radio frequency). The emitted signal may trigger a sensor 102 proximate enough to receive the signal to transmit its sensor ID and any other suitable configuration data (e.g., device type, communication protocols, and the like). In response to the sensor 102 transmitting its configuration data (sensor ID and other relevant configuration data) to the edge device 104, the configuration module 428 may add the new sensor 102 to the sensor kit 102. In embodiments, adding the sensor 102 to the sensor kit 104 may include generating a new device record corresponding to the new sensor 102 based on the sensor id updating the configuration data store 410 with the new device record. The configuration module 428 may add a new sensor 102 to the sensor kit 100 in any other suitable manner.

In embodiments, the edge device 104 may include a distributed ledger module 430. In embodiments, the distributed ledger module 430 may be configured to update a distributed ledger 162 with sensor data captured by the sensor kit 100. In embodiments, the distributed ledger may be distributed amongst a plurality of node computing devices 160. As discussed, in embodiments, a distributed ledger 162 is comprised of a set of linked data structures (e.g., blocks, data records, etc.). For purposes of explanation, the data structures will be referred to as blocks.

As discussed, each block may include a header that includes a unique ID of the block and a body that includes the data that is stored in the block and a pointer of a parent block. In embodiments, the pointer in the block is the block ID of a parent block of the block. The data stored in a respective block can be sensor data captured by a respective sensor kit 100. Depending on the implementation, the types of sensor data and the amount of sensor data stored in a respective body of a block may vary. For example, a block may store a set of sensor measurements from one or more types of sensors 102 in the sensor kit 100 captured over a period of time (e.g., sensor data 102 captured from all of the sensors 102 in the sensor kit 100 over a period one hour or one day) and metadata relating thereto (e.g., sensor IDs of each sensor measurement and a timestamp of each sensor measurement or group of sensor measurements). In some embodiments, a block may store sensor measurements determined to be anomalous (e.g., outside a standard deviation of expected sensor measurements or deltas in sensor measurements that are above a threshold) and/or sensor measurements indicative of an issue or potential issue, and related metadata (e.g., sensor IDs of each sensor measurement and a timestamp of each sensor measurement or group of sensor measurements). In some embodiments, the sensor data stored in a block may be compressed and/or encoded sensor data, such that the encoding module 422 compresses/encodes the sensor data into a more compact format. In embodiments, the distributed ledger module 430 may generate a hash of the body, such that the contents of the body (e.g., block ID of the parent block and the sensor data) are hashed and cannot be altered without changing the value of the hash. In embodiments, the distributed ledger module 430 may encrypt the content within the block, so that the content may not be read by unauthorized devices.

In embodiments, the distributed ledger module 430 generates a block in response to a triggering event. Examples of triggering events may include a predetermined time (e.g., every minute, every hour, every day), when a potential issue is classified or predicted, when one or more sensor measurements are outside of a tolerance threshold, or the like. In response to the triggering event, the distributed ledger module 430 may generate a block based on sensor data that is to be reported. Depending on the configuration of the server kit 100 and the intended use of the distributed ledger 162, the amount of data and type of data that is included in a block may vary. For example, in a manufacturing or resource extraction setting such as the manufacturing facility 1700 or the underwater industrial setting 1800, the distributed ledger 162 may be used to demonstrate functional machinery and/or to predict maintenance needs. In this example, the distributed ledger module 430 may be accessible by insurance providers to set insurance rates and/or issue refunds. Thus, in this example, the distributed ledger module 430 may include any sensor measurements (and related metadata) that are outside of a tolerance threshold or instance where an issue is classified or predicted. In another example, the distributed ledger may be accessible by a regulatory body to ensure that a facility is operating in accordance with one or more regulations. In these embodiments, the distributed ledger module 430 may store a set of one or more sensor measurements (and related metadata) in a block, such that the sensor measurements may be analyzed by the regulatory agency. In some of these embodiments, the sensor measurements may be compressed to store more sensor data in a single block. In response to generating a block, the distributed ledger module 430 may transmit the block to one or more node computing devices 160. Upon the block being verified (e.g., using a consensus mechanism), each node computing device 160 may update the distributed ledger 162 with the new block.

As discussed, in some embodiments the distributed ledger may further include smart contracts. Once written, a smart contract may be encoded in a block and deployed to the distributed ledger 162. The address of the smart contract (e.g., the block ID of the block containing the smart contract) may be provided to one or more parties to the smart contract, such that respective parties may invoke the smart contract using the address. In some of these embodiments, the address of the smart contract may be provided to the distributed ledger module 430, such that the distributed ledger module 430 may report items to the smart contract. In some embodiments, the distributed ledger module 430 may leverage the API of a smart contract to report the items to the smart contract.

In example implementations discussed above, an insurer may utilize a smart contract to allow insured facility owners and/or operators to demonstrate that the equipment in the facility is functioning properly. In some embodiments, the smart contract may trigger the issuance of rebates or refunds on portions of insurance premiums when an owner and/or operator of a facility provides sufficient sensor data that indicates the facility is operating without issue. In some of these embodiments, the smart contract may include a first condition that requires a certain amount of sensor data to be reported by a facility and a second condition that each instance of the sensor data equals a value (e.g., no classified or predicted issues) or range of values (e.g., all sensor measurements within a predefined range of values). In some embodiments, the action may be to deposit funds (e.g., a wire transfer or cryptocurrency) into an account in response to the first and second conditions being met. In this example, the distributed ledger module 430 may write blocks containing sensor data to the distributed ledger 162. The distributed ledger module 430 may also provide the addresses of these blocks to the smart contract (e.g., via an API of the smart contract). Upon the smart contract verifying the first and second conditions of the contract, the smart contract may initiate the transfer of funds from an account of the insurer to the account of the insured.

In another example discussed above, a regulatory body (e.g., a state, local, or federal regulatory agency) may utilize a smart contract that monitors facilities (e.g., food inspection facilities, pharmaceutical manufacturing facilities, indoor agricultural facilities, offshore oil extraction facilities, or the like) based on reported sensor data to ensure compliance with one or more regulations. In embodiments, the smart contract may be configured to receive and verify the sensor data from a facility (e.g., via an API of the smart contract), and in response to verifying the sensor data issues a compliance token (or certificate) to an account of the facility owner. In some of these embodiments, the smart contract may include a first condition that requires a certain amount of sensor data to be reported by a facility and a second condition that requires the sensor data to be compliant with the reporting regulations. In this example, the distributed ledger module 430 may write blocks containing sensor data to the distributed ledger. The sensor kit 100 may also provide the addresses of these blocks to the smart contract (e.g., using an API of the smart contract). Upon the smart contract verifying the first and second conditions of the contract, the smart contract may generate a token indicating compliance by the facility operator, and may initiate the transfer of funds to an account (e.g., a digital wallet) associated with the facility.

Figure 5:
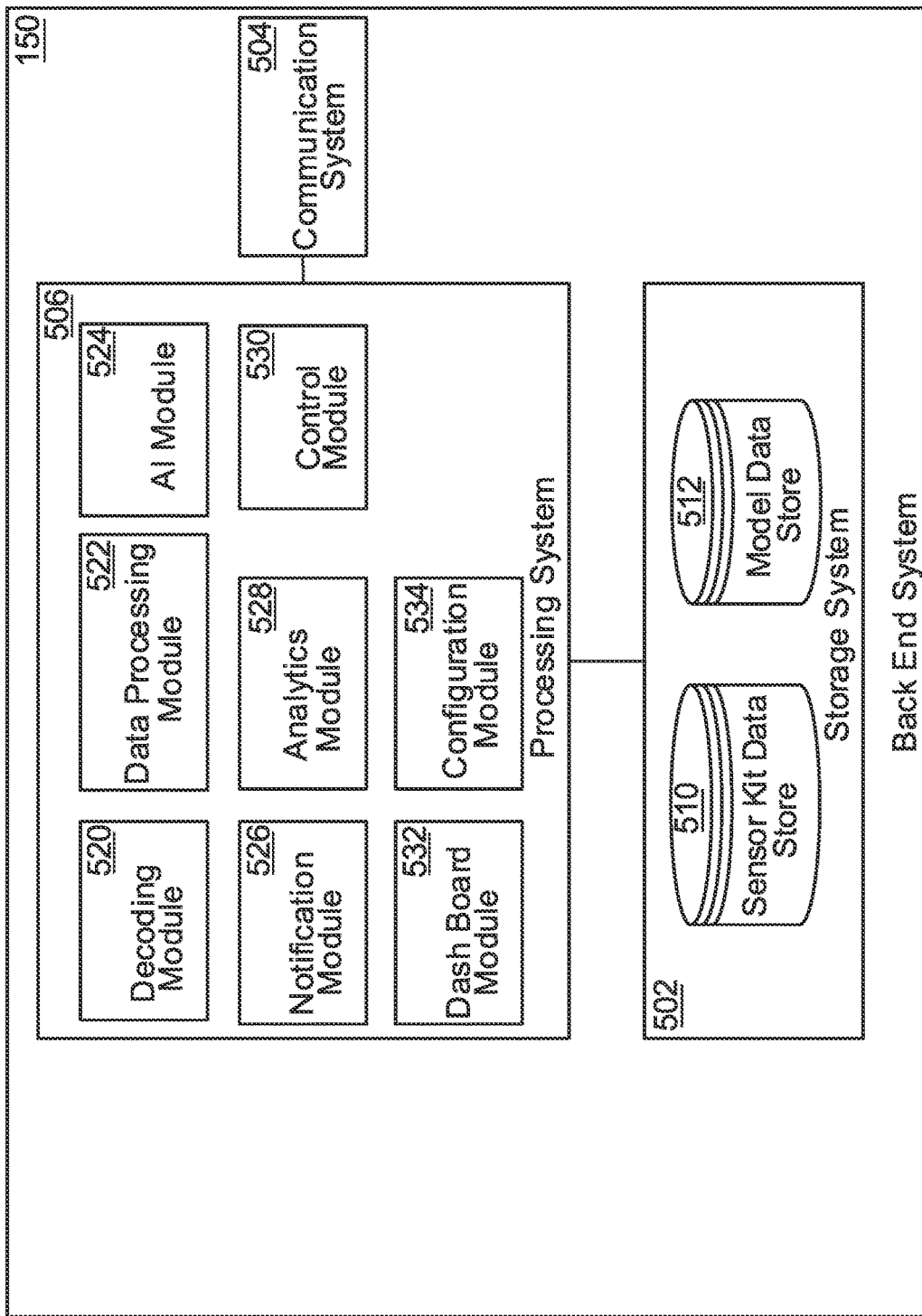
FIG. 5 is a schematic illustrating an example of a backend system that receives sensor data from sensor kits deployed in industrial settings according to some embodiments of the present disclosure.

FIG. 5 illustrates an example backend system 150 according to some embodiments of the present disclosure. In embodiments, the backend system 150 may be implemented as a cloud service that is executed at one or more physical server devices. In embodiments, the backend system 150 may include a storage system 502, a communication system 504, and a processing system 506. The backend system 150 may include additional components not shown.

A storage system 502 includes one or more storage devices. The storage devices may include persistent storage mediums (e.g., flash memory drive, hard disk drive) and/or transient storage devices (e.g., RAM). The storage system 502 may store one or more data stores. A data store may include one or more databases, tables, indexes, records, filesystems, folders and/or files. In the illustrated embodiments, the storage system 502 stores a sensor kit data store 510 and a model data store 512. A storage system 502 may store additional or alternative data stores without departing from the scope of the disclosure.

In embodiments, the sensor kit data store 510 stores data relating to respective sensor kits 100. In embodiments, the sensor kit data store 510 may store sensor kit data corresponding to each installed sensor kit 100. In embodiments, the sensor kit data may indicate the devices in a sensor kit 100, including each sensor 102 (e.g., a sensor ID) in the sensor kit 100. In some embodiments, the sensor kit data may indicate the sensor data captured by the sensor kit 100. In some of these embodiments, the sensor kit data may identify each instance of sensor data captured by the sensor kit 100, and for each instance of sensor data, the sensor kit data may indicate the sensor 102 that captured the sensor data and, in some embodiments, a time stamp corresponding to the sensor data.

In embodiments, the model data store 512 stores machine-learned models that are trained by the AI system 524 based on training data. The machine-learned models may include prediction models and classification models. In embodiments, the training data used to train a particular model includes data collected from one or more sensor kits 100 that monitor the same type of industrial setting 120. The training data may additionally or alternatively may include historical data and/or expert generated data. In embodiments, each machine-learned model may pertain to a respective type of industrial setting 120. In some of these embodiments, the AI system 524 may periodically update a machine-learned model pertaining to a type of industrial setting 120 based on sensor data collected from sensor kits 100 monitoring those types of industrial setting 120 and outcomes obtained from those industrial setting 120. In embodiments, machine-learned models pertaining to a type of industrial setting 120 may be provided to the edge devices 104 of sensor kits 100 monitoring that type of industrial setting 120.

In embodiments, a communication system 504 includes one or more communication devices, including at least one external communication device that communicates with a public communication network (e.g., the Internet) ether. The external communication devices may perform wired or wireless communication. In embodiments, the external communication devices may include cellular chipsets (e.g., 4G or 5G chipsets), Ethernet cards and/or Wi-Fi cards, or other suitable communication devices.

In embodiments, the processing system 506 may include one or more memory devices (e.g., ROM and/or RAM) that store computer-executable instructions and one or more processors that execute the computer-executable instructions. The processors may execute in a parallel or distributed manner. The processors may be located in the same physical server device or in different server devices. The processing system 506 may execute one or more of a decoding module 520, a data processing module 522, an AI module 524, a notification module 526, an analytics module 528, a control module 530, a dashboard module 532, a configuration module 534, and a distributed ledger management module 536. The processing system 406 may execute additional or alternative modules without departing from the scope of the disclosure. Furthermore, the modules discussed herein may include submodules that perform one or more functions of a respective module.

In embodiments, a sensor kit 100 may transmit encoded sensor kit packets containing sensor data to the backend system 150. In these embodiments, the decoding module 520 may receive encoded sensor data from an edge device 104 and may decrypt, decode, and/or decompress the encoded sensor kit packets to obtain the sensor data and metadata relating to the received sensor data (e.g., a sensor kit id and one or more sensor ids of sensors that captured the sensor data). The decoding module 520 may output the sensor data and any other metadata to the data processing module 522.

In embodiments, the data processing module 522 may process the sensor data received from the sensor kits 100. In some embodiments, the data processing module 522 may receive the sensor data and may store the sensor data in the sensor kit data store 510 in relation to the sensor kit 100 that provided the sensor data. In embodiments, the data processing system 522 may provide AI-related requests to the AI module 524. In these embodiments, the data processing system 522 may extract relevant sensor data instances from the received sensor data and may provide the extracted sensor data instances to the AI module 524 in a request that indicates the type of request (e.g., what type of prediction or classification) and the sensor data to be used. In the event a potential issue is predicted or classified, the data processing module 522 may execute a workflow associated with the potential issue. A workflow may define the manner by which a potential issue is handled. For instance, the workflow may indicate that a notification should be transmitted to a human user, a remedial action should be initiated, and/or other suitable actions. The data processing module 522 may perform additional or alternative processing tasks without departing from the scope of the disclosure.

In embodiments, the AI module 524 trains machine-learned models that are used to make predictions or classifications. The machine-learned models may include any suitable type of models, including neural networks, deep neural networks, recursive neural networks, Bayesian neural networks, regression-based models, decision trees, prediction trees, classification trees, Hidden Markov Models, and/or any other suitable types of models. The AI module 524 may train a machine-learned model on a training data set. A training data set may include expert-generated data, historical data, and/or outcome-based data. Outcome-based data may be data that is collected after a prediction or classification is made that indicates whether the prediction or classification was correct or incorrect and/or a realized outcome. A training data instance may refer to a unit of training data that includes a set of features and a label. In embodiments, the label in a training data instance may indicate a condition of an industrial component or an industrial setting 120 at a given time. Examples of conditions will vary greatly depending on the industrial setting 120 and the conditions that the machine-learning model is being trained to predict or classify. Examples of labels in a manufacturing facility may include, but are not limited to, no issues detected, a mechanical failure of a component, an electrical failure of a component, a chemical leak detected, and the like. Examples of labels in a mining facility may include, but are not limited to, no issues detected, an oxygen deficiency, the presence of a toxic gas, a failing structural component, and the like. Examples of labels in an oil and/or gas facility (e.g., oil field, gas field, oil refinery, pipeline) may include, but are not limited to, no issues detected, a mechanical failure of a component (e.g., a failed valve or failed O-ring), a leak, and the like. Examples of labels in an indoor agricultural facility may include, but are not limited to, no issues detected, a plant died, a plant wilted, a plant turned a certain color (e.g., brown, purple, orange, or yellow), mold found, and the like. In each of these examples, there are certain features that may be relevant to a condition and some features that may have little or no bearing on the condition. In embodiments, the AI module 524 may reinforce the machine-learned models as more sensor data and outcomes relating to the machine-learned models are received. In embodiments, the machine-learned models may be stored in the model data store 512. Each model may be stored with a model identifier, which may be indicative of (e.g., mapped to) the type of industrial setting 120 that the model makes, the type of prediction or classification made by the model, and the features that the model receives. In some embodiments, one or more machine-learned models (and subsequent updates thereto) may be pushed to respective sensor kits 100, whereby the edge devices 104 of the respective sensor kits 100 may use one or more machine-learned model to make predictions and/or classifications without having to rely on the backend system 150.

In embodiments, the AI module 524 receives requests for predictions and/or classifications and determines predictions and/or classifications based on the requests. In embodiments, a request may indicate a type of prediction or classification that is being requested and may include a set of features for making the prediction or classification. In response to the request, the AI module 524 may select a machine-learned model to leverage based on the type of prediction or classification being requested, whereby the selected model receives a certain set of features. The AI module 524 may then generate a feature vector that includes one or more instances of sensor data and may feed the feature vector into the selected model. In response to the feature vector, the selected model may output a prediction or classification, and a degree of confidence (e.g., a confidence score) in the prediction or classification. The AI module 524 may output the prediction or classification, as well as the degree of confidence therein, to the module that provided the request.

In embodiments, the notification module 526 may issue notifications to users and/or respective industrial setting 120 when an issue is detected in a respective setting. In embodiments, a notification may be sent to a user device of a user indicating the nature of the issue. The notification module 526 may implement an API (e.g., a REST API), whereby a user device of a user associated with the industrial setting 120 may request notifications from the backend system 150. In response to the request, the notification module 526 may provide any notifications, if any, to the user device. In embodiments, a notification may be sent to a device located at an industrial setting 120, whereby the device may raise an alarm at the industrial setting 120 in response to the industrial setting 120.

In embodiments, the analytics module 528 may perform analytics related tasks on sensor data collected by the backend system 150 and stored in the sensor kit data store 510. In embodiments, the analytics tasks may be performed on sensor data received from individual sensor kits. Additionally, or alternatively, the analytics tasks may be performed on sensor data Examples of analytics tasks that may be performed on sensor data obtained from various sensor kits 100 monitoring different industrial setting 120. Examples of analytics tasks may include energy utilization analytics, quality analytics, process optimization analytics, financial analytics, predictive analytics, yield optimization analytics, fault prediction analytics, scenario planning analytics, and many others.

In embodiments, the control module 530 may control one or more aspects of an industrial setting 120 based on a determination made by the AI system 524. In embodiments, the control module 530 may be configured to provide commands to a device or system at the industrial setting 120 to take a remedial action in response to a particular issue being detected. For example, the control module 530 may issue a command to a manufacturing facility to stop an assembly line in response to a determination that a critical component on the assembly line is likely failing or likely failed. In another example, the control module 530 may issue a command to an agricultural facility to activate a dehumidifier in response to a determination that the humidity levels are too high in the facility. In another example, the control module 530 may issue a command to shut a valve in an oil pipeline in response to a determination that a component in the oil pipeline downstream to the valve is likely failing or likely failed. For a particular industrial setting 120, the control module 530 may perform remedial actions defined by a human user associated with the industrial setting 120, such that the human user may define what conditions may trigger the remedial action.

In embodiments, the dashboard module 532 presents a dashboard to human users via a user device 140 associated with the human user. In embodiments, the dashboard provides a graphical user interface that allows the human user to view relating to a sensor kit 100 with which the human user is associated (e.g., an employee at the industrial setting 120). In these embodiments, the dashboard module 532 may retrieve and display raw sensor data provided by the sensor kit, analytical data relating to the sensor data provided by the sensor kit 100, predictions or classifications made by the backend system 150 based on the sensor data, and the like.

In embodiments, the dashboard module 532 allows human users to configure aspects of the sensor kits 100. In embodiments, the dashboard module 532 may present a graphical user interface that allows a human user to configure one or more aspects of a sensor kit 100 with which the human user is associated. In embodiments, the dashboard may allow a user to configure alarm limits with respect to one or more sensor types and/or conditions. For example, a user may define a temperature value at which a notification is sent to a human user. In another example, the user may define a set of conditions, which if predicted by the AI module and/or the edge device, trigger an alarm. In embodiments, the dashboard may allow a user to define which users receive a notification when an alarm is triggered. In embodiments, the dashboard may allow a user to subscribe to additional features of the backend system 150 and/or an edge device 104.

In embodiments, the dashboard may allow a user to add one or more subscriptions to a sensor kit 100. The subscriptions may include access to backend services and/or edge services. A user may select a service to add to a sensor kit 100 and may provide payment information to pay for the services. Upon verification of the payment information, the backend system 150 may provide the sensor kit 100 access to those features. Examples of services that may be subscribed to include analytics services, AI-services, notification services, and the like. The dashboard may allow the user to perform additional or alternative configurations.

In embodiments, the configuration module 534 maintains configurations of respective sensor kits 100. Initially, when a new sensor kit 100 is deployed in an industrial setting 120, the configuration module 534 may update the sensor kit data store 510 with the device IDs of each device in the newly installed sensor kit 100. Once the sensor kit data store 510 has updated the sensor kit data store 510 to reflect the newly installed sensor kit 100, the backend system 150 may begin storing sensor data from the sensor kit 100. In embodiments, new sensors 102 may be added to respective sensor kits 100. In these embodiments, an edge device 104 may provide an add request to the backend system 150 upon an attempt to add a device to the sensor kit 100. In embodiments, the request may indicate a sensor ID of the new sensor. In response to the request, the configuration module 534 may add the sensor ID of the new sensor to the sensor kit data of the requesting sensor kit 100 in the sensor kit data store 510.

In embodiments, the backend system 150 includes a distributed ledger management module 536. In some of these embodiments, the distributed ledger management module 536 allows a user to update and/or configure a distributed ledger. In some of these embodiments, the distributed ledger management module 536 allows a user to define or upload a smart contract. As discussed, the smart contract may include one or more conditions that are verified by the smart contract and one or more actions that are triggered when the conditions are verified. In embodiments, the user may provide one or more conditions that are to be verified to the distributed ledger management module 536 via a user interface. In some of these embodiments, the user may provide the code (e.g., JavaScript code, Java code, C code, C++ code, etc.) that defines the conditions. The user may also provide the actions that are to be performed in response to certain conditions being met. In response to a smart contract being uploaded/created, the distributed ledger management module 536 may deploy the smart contract. In embodiments, the distributed ledger management module 536 may generate a block containing the smart contract. The block may include a header that defines an address of the block, and a body that includes an address to a previous block and the smart contract. In some embodiments, the distributed ledger management module 536 may determine a hash value based on the body of the block and/or may encrypt the block. The distributed ledger management module 536 may transmit the block to one or more node computing devices 160, which in turn update the distributed ledger with the block containing the smart contract. The distributed ledger management module 536 may further provide the address of the block to one or more parties that may access the smart contract. The distributed ledger management module 536 may perform additional or alternative functions without departing from the scope of the disclosure.

The backend system 150 may include additional or alternative components, data stores, and/or modules that are not discussed.

FIGS. 6-9—Exemplary Methods of Encoding and/or Decoding Sensor Data

Figure 6:
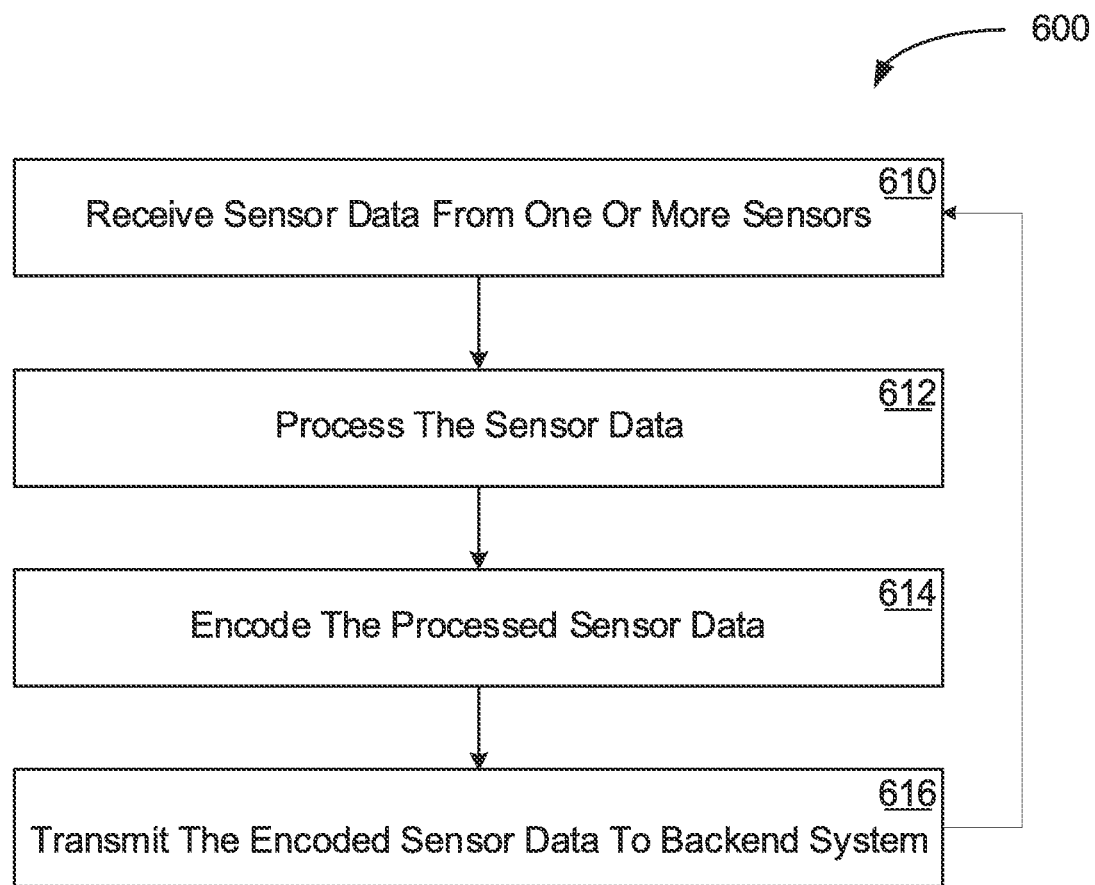
FIG. 6 is a flow chart illustrating an example set of operations of a method for encoding sensor data captured by a sensor kit according to some embodiments of the present disclosure.

FIG. 6 illustrates an example set of operations of a method 600 for compressing sensor data obtained by a sensor kit 100. In embodiments, the method 600 may be performed by an edge device 104 of a sensor kit 100.

At 610, the edge device 104 receives sensor data from one or more sensors 102 of the sensor kit 100 via a sensor kit network 200. In embodiments, the sensor data from a respective sensor 102 may be received in a reporting packet. Each reporting packet may include a device identifier of the sensor 102 that generated the reporting packet and one or more instances of sensor data captured by sensor 102. The reporting packet may include additional data, such as a timestamp or other metadata.

At 612, the edge device 104 processes the sensor data. In embodiments, the edge device 104 may dedupe any reporting packets that are duplicative. In embodiments, the edge device 104 may filter out sensor data that is clearly erroneous (e.g., outside of a tolerance range). In embodiments, the edge device 104 may aggregate the sensor data obtained from multiple sensors 102. In embodiments, the edge device 104 may perform one or more AI related tasks, such as determining a prediction or classification relating to a condition of one or more industrial components of the industrial setting 120. In some of these embodiments, the decision to compress the sensor data may depend on whether the edge device 104 determines that there are any potential issues with the industrial component. For example, the edge device 104 may compress the sensor data when there have been no issues predicted or classified. In other embodiments, the edge device 104 may compress any sensor data that is being transmitted to the backend system or certain types of sensor data (e.g., sensor data obtained from temperature sensors).

At 614, the edge device 104 may compress the sensor data. The edge device 104 may employ any suitable compression techniques for compressing the sensor data. For example, the edge device 104 may employ vertical or horizontal compression techniques. The edge device 104 may be configured with a codec that compresses the sensor data. The codec may be a proprietary codec or an "off-the-shelf" codec.

At 616, the edge device 104 may transmit the compressed sensor data to the backend system 150. In embodiments, the edge device 104 may generate a sensor kit packet that contains the compressed data. The sensor kit packet may designate the source of the sensor kit packet (e.g., a sensor kit ID or edge device ID) and may include additional metadata (e.g., a timestamp). In embodiments, the edge device 104 may encrypt the sensor kit packet prior to transmitting the sensor kit packet to the backend system 150. In embodiments, the edge device 104 transmits the sensor kit packet to the backend system 150 directly (e.g., via a cellular connection, a network connection, or a satellite uplink). In other embodiments, the edge device 104 transmits the sensor kit packet to the backend system 150 via a gateway device, which transmits the sensor kit packet to the backend system 150 directly (e.g., via a cellular connection or a satellite uplink).

Figure 7:
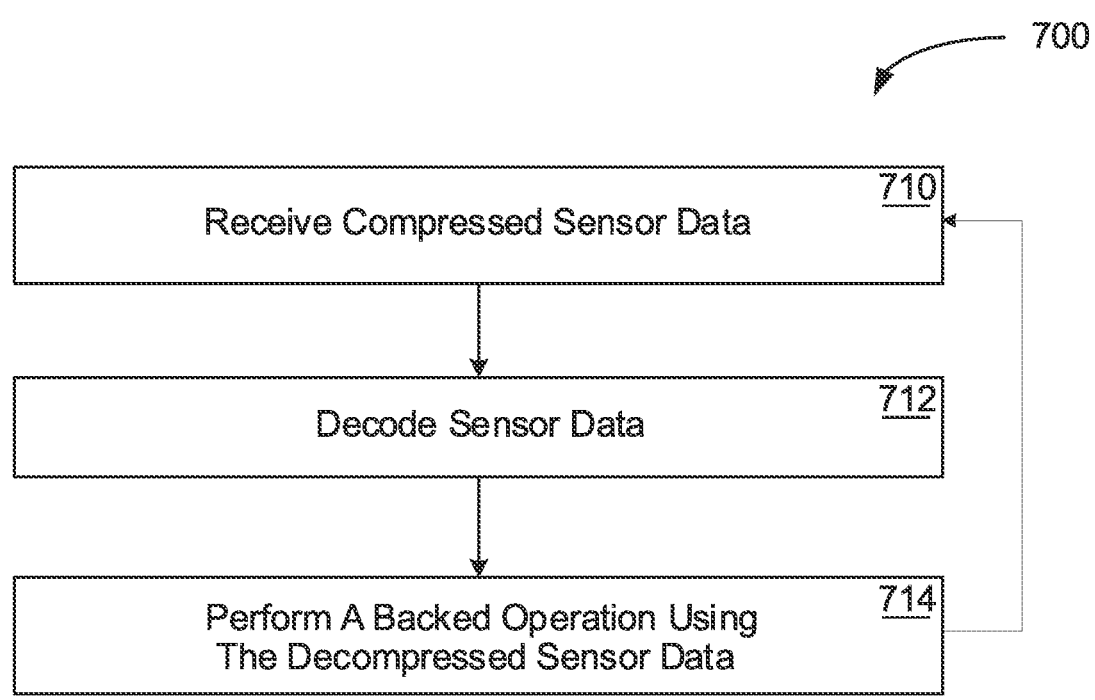
FIG. 7 is a flow chart illustrating an example set of operations of a method for decoding sensor data provided to a backend system by a sensor kit according to some embodiments of the present disclosure.

FIG. 7 illustrates an example set of operations of a method 700 for processing compressed sensor data received from a sensor kit 100. In embodiments, the method 700 is executed by a backend system 150.

At 710, the backend system 150 receives compressed sensor data from a sensor kit. In embodiments, the compressed sensor data may be received in a sensor kit packet.

At 712, the backend system 150 decompresses the received sensor data. In embodiments, the backend system may utilize a codec to decompress the received sensor data. Prior to decompressing the received sensor data, the backend system 150 may decrypt a sensor kit packet containing the compressed sensor data.

At 714, the backend system 150 performs one or more backend operations on the decompressed sensor data. The backend operations may include storing the data, filtering the data, performing AI-related tasks on the sensor data, issuing one or more notifications in relation to the results of the AI-related tasks, performing one or more analytics related tasks, controlling an industrial component of the industrial setting 120, and the like.

Figure 8:
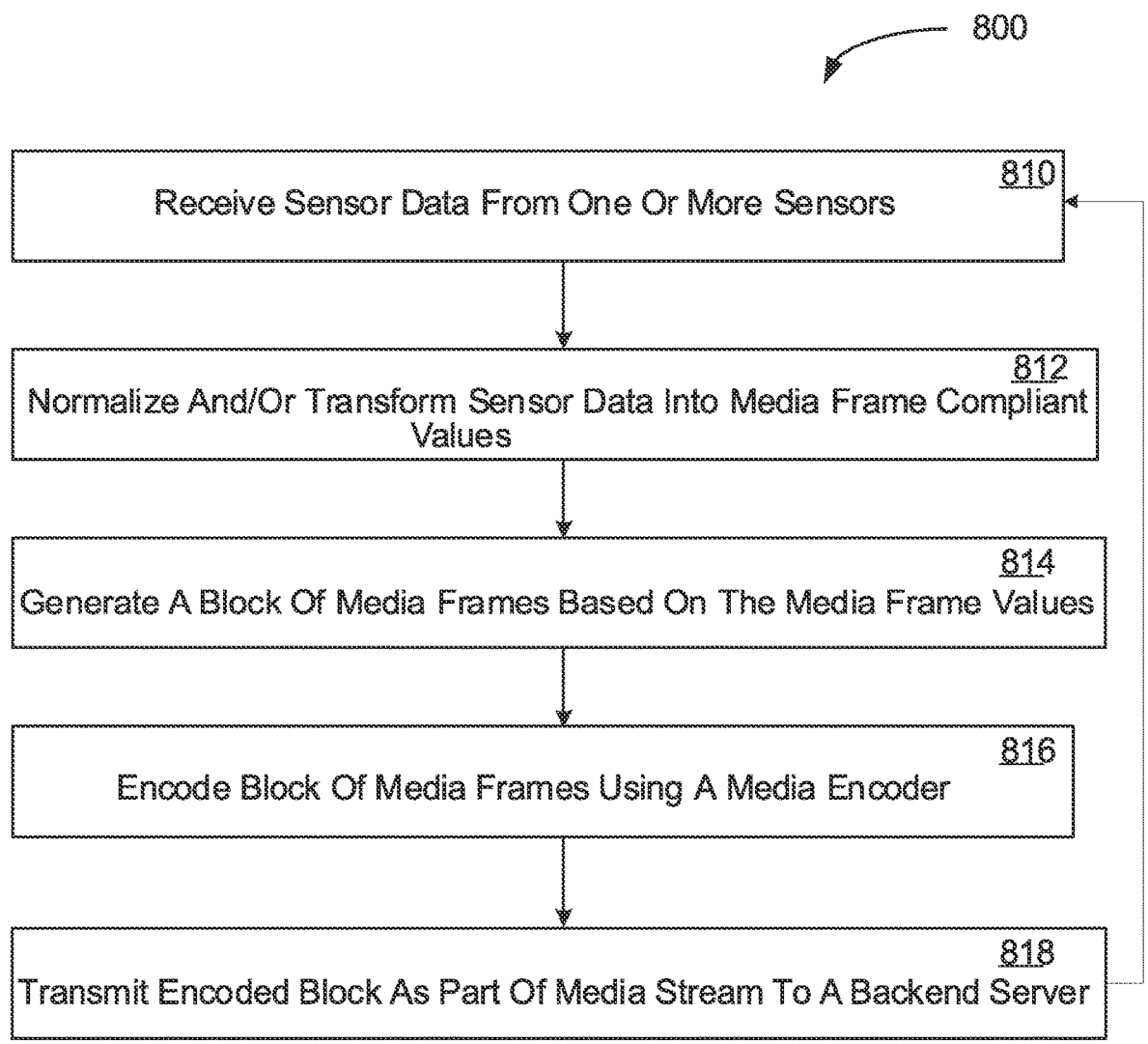
FIG. 8 is a flow chart illustrating an example set of operations of a method for encoding sensor data captured by a sensor kit using a media codec according to some embodiments of the present disclosure.

FIG. 8 illustrates an example set of operations of a method 800 for streaming sensor data from a sensor kit 100 to a backend system 150. In embodiments, the method 800 may be executed by an edge device 104 of the sensor kit 100.

At 810, the edge device 104 receives sensor data from one or more sensors 102 of the sensor kit 100 via a sensor kit network 200. In embodiments, the sensor data from a respective sensor 102 may be received in a reporting packet. Each reporting packet may include a device identifier of the sensor 102 that generated the reporting packet and one or more instances of sensor data captured by sensor 102. The reporting packet may include additional data, such as a timestamp or other metadata. In embodiments, the edge device 104 may process the sensor data. For example, the edge device 104 may dedupe any reporting packets that are duplicative and/or may filter out sensor data that is clearly erroneous (e.g., outside of a tolerance range). In embodiments, the edge device 104 may aggregate the sensor data obtained from multiple sensors 102.

At 812, the edge device 104 may normalize and/or transform the sensor data into a media-frame compliant format. In embodiments, the edge device 104 may normalize and/or transform each sensor data instance into a value that adheres to the restrictions of a media frame that will contain the sensor data. For example, in embodiments where the media frames are video frames, the edge device 104 may normalize and/or transform instances of sensor data into acceptable pixel frames. The edge device 104 may employ one or more mappings and/or normalization functions to transform and/or normalize the sensor data.

At 814, the edge device 104 may generate a block of media frames based on the transformed and/or normalized sensor data. For example, in embodiments where the media frames are video frames, the edge device 104 may populate each instance of transformed and/or normalized sensor data into a respective pixel of the video frame. The manner by which the edge device 104 assigns an instance of transformed and/or normalized sensor data to a respective pixel may be defined in a mapping that maps respective sensors to respective pixel values. In embodiments, the mapping may be defined so as to minimize variance between the values in adjacent pixels. In embodiments, the edge device 104 may generate a series of time-sequenced media frames, such that each successive media frame corresponds to a subsequent set of sensor data instances.

At 816, the edge device 104 may encode the block of the media frame. In embodiments, the edge device 104 may employ an encoder of a media codec (e.g., a video codec) to compress the block of media frames. The codec may be a proprietary codec or an "off-the-shelf" codec. For example, the media codec may be an H.264/MPEG-4 codec, an H.265/MPEG-H codec, an H.263/MPEG-4 codec, proprietary codecs, and the like. The codec receives the block of media frames and generates an encoded media block based thereon.

At 818, the edge device 104 may transmit the encoded media block to the backend system 150. In embodiments, the edge device 104 may stream the encoded media blocks to the backend system 150. Each encoded block may designate the source of the block (e.g., a sensor kit ID or edge device ID) and may include additional metadata (e.g., a timestamp and/or a block identifier). In embodiments, the edge device 104 may encrypt the encoded media blocks prior to transmitting encoded media blocks to the backend system 150. The edge device 104 may transmit the encoded media blocks to the backend system 150 directly (e.g., via a cellular connection, a network connection, or a satellite uplink) or via a gateway device, which transmits the encoded media block to the backend system 150 directly (e.g., via a cellular connection or a satellite uplink).

The edge device 104 may continue to execute the foregoing method 800, so as to deliver a stream of live sensor data from a sensor kit. The foregoing method 900 may be performed in settings where there are many sensors deployed within the setting and the sensors are sampled frequently or continuously. In this way, the bandwidth required to provide the sensor data to the backend system is reduced.

Figure 9:
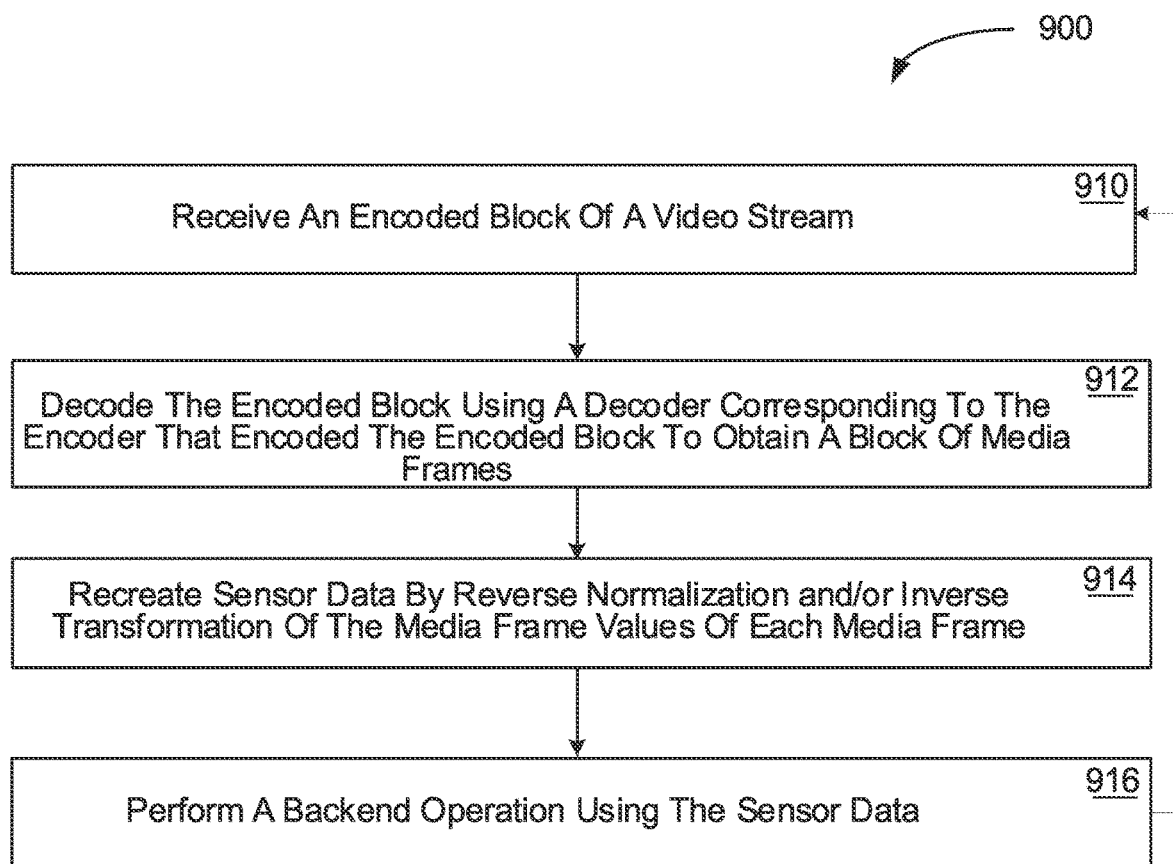
FIG. 9 is a flow chart illustrating an example set of operations of a method for decoding sensor data provided to a backend system by a sensor kit using a media codec according to some embodiments of the present disclosure.

FIG. 9 illustrates an example set of operations of a method 900 for ingesting a sensor data stream from an edge device 104. In embodiments, the method 900 is executed by a backend system.

At 910, the backend system 150 receives an encoded media block from a sensor kit. The backend system 150 may receive encoded media blocks as part of a sensor data stream.

At 912, the backend system 150 decodes the encoded block using a decoder corresponding to the codec of the codec used to encode the media block to obtain a set of successive media frames. As discussed with respect to the encoding operation, the codec may be a proprietary codec or an "off-the-shelf" codec. For example, the media codec may be an H.264/MPEG-4 codec, an H.265/MPEG-H codec, an H.263/MPEG-4 codec, proprietary codecs, and the like. The codec receives the encoded block of media frames and decodes the encoded block to obtain a set of sequential media frames.

At 914, the backend system 150 recreates the sensor data based on the media frame. In embodiments, the backend system 150 determines the normalized and/or transformed sensor values embedded in each respective media frame. For example, in embodiments where the media frames are video frames, the backend system 150 may determine pixel values for each pixel in the media frame. A pixel value may correspond to respective sensor 102 of a sensor kit 100 and the value may represent a normalized and/transformed instance of sensor data. In embodiments, the backend system 150 may recreate the sensor data by inversing the normalization and/or transformation of the pixel value. In embodiments, the backend system 150 may utilize an inverse transformation and/or an inverse normalization function to obtain each recreated sensor data instance.

AT 918, the backend system 150 performs one or more backend operations based on the recreated sensor data. The backend operations may include storing the data, filtering the data, performing AI-related tasks on the sensor data, issuing one or more notifications in relation to the results of the AI-related tasks, performing one or more analytics related tasks, controlling an industrial component of the industrial setting 120, and the like.

Figure 10:
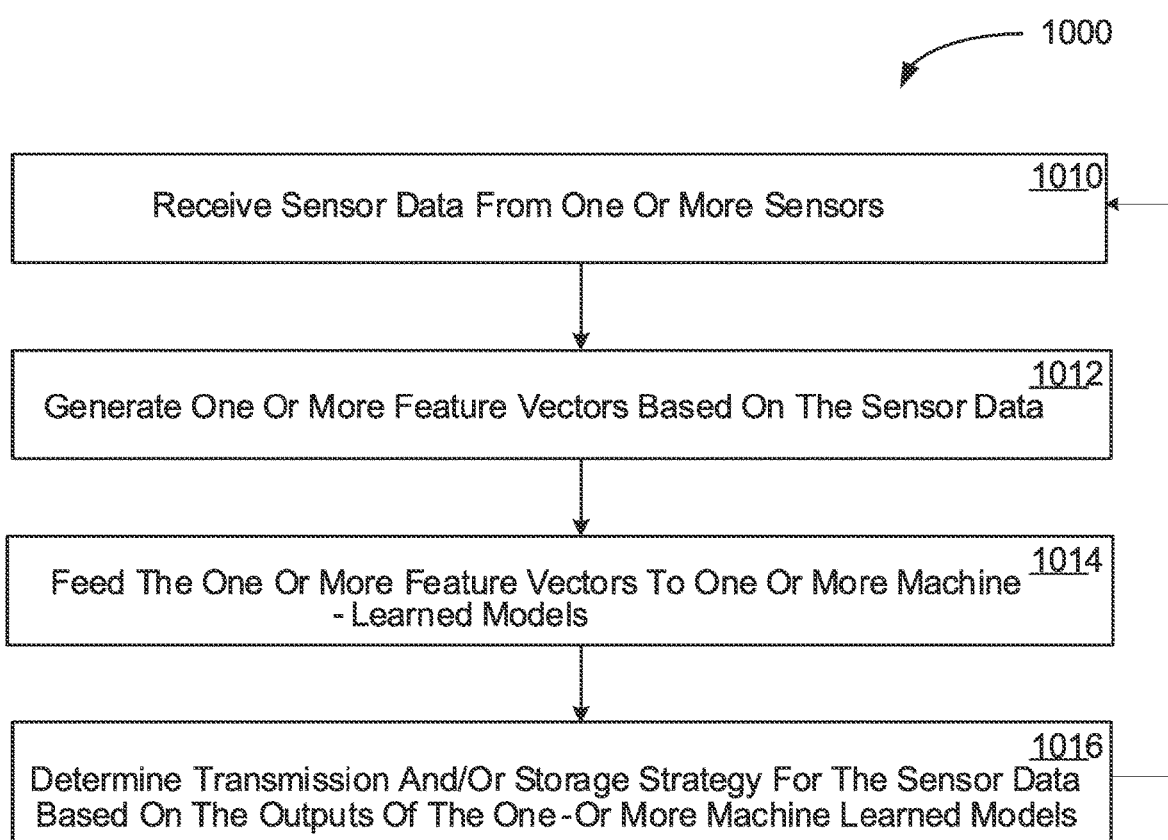
FIG. 10 is a flow chart illustrating an example set of operations of a method for determining a transmission strategy and/or a storage strategy for sensor data collected by a sensor kit based on the sensor data, according to some embodiments of the present disclosure

FIG. 10—Exemplary Method of Determining Transmission Strategy

FIG. 10 illustrates a set of operations of a method 1000 for determining a transmission strategy and/or a storage strategy for sensor data collected by a sensor kit 100 based on the sensor data. A transmission strategy may define a manner that sensor data is transmitted (if at all) to the backend system. For example, sensor data may be compressed using an aggressive lossy codec, compressed using a lossless codec, and/or transmitted without compression. A storage strategy may define a manner by which sensor data is stored at the edge device 104. For example, sensor data may be stored permanently (or until a human removes the sensor data), may be stored for a period of time (e.g., one year) or may be discarded. The method 1000 may be executed by an edge device 104. The method 1000 may be executed to reduce the network bandwidth consumed by the sensor kit 100 and/or reduce the storage constraints at the edge device 104.

At 1010, the edge device 104 receives sensor data from the sensors 102 of the sensor kit 100. The data may be received continuously or intermittently. In embodiments, the sensors 102 may push the sensor data to the edge device 104 and/or the edge device 104 may request the sensor data 102 from the sensors 102 periodically. In embodiments, the edge device 104 may process the sensor data upon receipt, including deduping the sensor data.

In embodiments, the edge device 104 may be configured to perform one or more AI-related tasks prior to transmission via the satellite uplink. In some of these embodiments, the edge device 104 may be configured to determine whether there are likely no issues relating to any of the components and/or the industrial setting 120 based on the sensor data and one or more machine-learned models.

At 1012, the edge device 104 may generate one or more feature vectors based on the sensor data. The feature vectors may include sensor data from a single sensor 102, a subset of sensors 102, or all of the sensors 102 of the sensor kit 100. In scenarios where a single sensor or a subset of sensors 102 are included in the feature vector, the machine-learned model may be trained to identify one or more issues relating to an industrial component or the industrial setting 120, but may not be sufficient to fully deem the entire setting as likely safe/free from issues. Additionally or alternatively, the feature vectors may correspond to a single snapshot in time (e.g., all sensor data in the feature vector corresponds to the same sampling event) or over a period of time (sensor data samples from a most recent sampling event and sensor data samples from previous sampling events). In embodiments where the feature vectors define sensor data from a single snapshot, the machine-learned models may be trained to identify potential issues without any temporal context. In embodiments where the feature vectors define sensor data over a period of time, the machine-learned models may be trained to identify potential issues with the context of what the sensor(s) 102 was/were reporting previously. In these embodiments, the edge device 104 may maintain a cache of sensor data that is sampled over a predetermined time (e.g., previous hour, previous day, previous N days), such that the cache is cleared out in a first-in-first-out manner. In these embodiments, the edge device 104 may retrieve the previous sensor data samples from the cache to use to generate feature vectors that have data samples spanning a period of time.

At 1014, the edge device 104 may input the one or more feature vectors into one or more respective machine-learned models. A respective model may output a prediction or classification relating to an industrial component and/or the industrial setting 120, and a confidence score relating to the prediction or classification.

At 1016, the edge device 104 may determine a transmission strategy and/or a storage strategy based on the output of the machine-learned models. In some embodiments, the edge device 104 may make determinations relating to the manner by which sensor data is transmitted to the backend system 150. In some embodiments, the edge device 104 may make determinations relating to the manner by which sensor data is transmitted to the backend system 150 and/or stored at the edge device. In some of these embodiments, the edge device 104 may compress sensor data when there are no likely issues across the entire industrial setting 120 and individual components of the industrial setting 120. For example, if the machine-learned models predict that there are likely no issues and classify that there are currently no issues with a high degree of confidence (e.g., the confidence score is greater than 0.98), the edge device 104 may compress the sensor data. Alternatively, in the scenario where the machine-learned models predict that there are likely no issues and classify that there are currently no issues with a high degree of confidence, the edge device 104 may forego transmission but may store the sensor data at the edge device 104 for a predefined period of time (e.g., a one-year expiry). In scenarios where a machine-learned model predicts a potential issue or classifies a current issue, the edge device 104 may transmit the sensor data without compressing the sensor data or using a lossless compression codec. Additionally or alternatively, in scenarios where a machine-learned model predicts a potential issue or classifies a current issue, the edge device 104 may store the sensor data used to make the prediction or classification indefinitely, as well as data that was collected prior to and/or after the condition was predicted or classified.

FIGS. 11-15—Exemplary Sensor Kit Configurations

Figure 11:
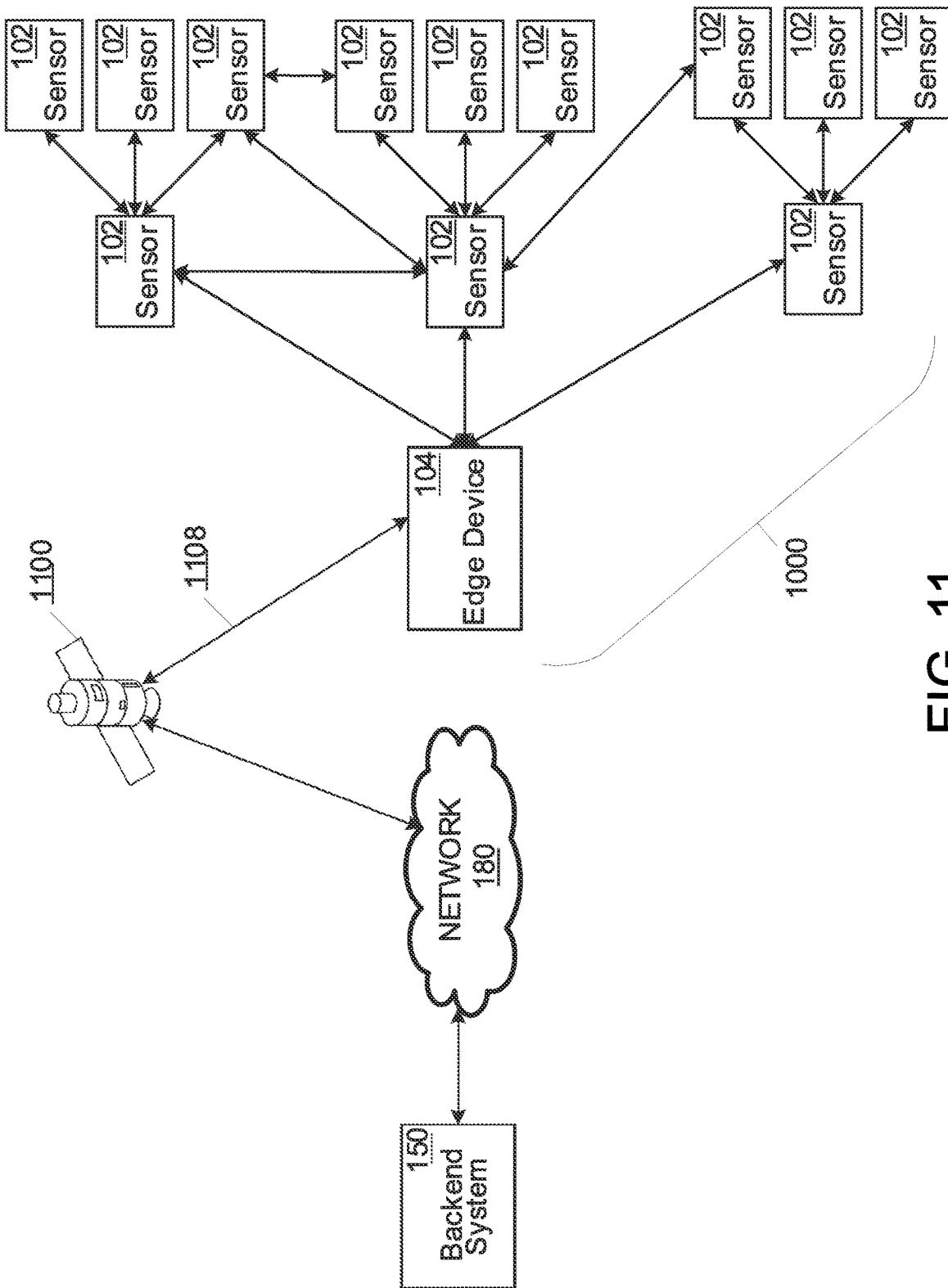
FIGS. 11-15 are schematics illustrating different configurations of sensor kits according to some embodiments of the present disclosure.

FIG. 11 illustrates an example configuration of a sensor kit 1100 according to some embodiments of the present disclosure. In the illustrated example, the sensor kit 1100 is configured to communicate with a communication network 180 via an uplink 1108 to a satellite 1110. In embodiments, the sensor kit 1100 of FIG. 11 is configured for use in industrial setting 120 located in remote locations, where cellular coverage is unreliable or non-existent. In embodiments, the sensor kit 1100 may be installed in natural resource extraction, natural resource transportation systems, power generation facilities, and the like. For example, the sensor kit 1100 may be deployed in an oil or natural gas fields, off-shore oil rigs, mines, oil or gas pipelines, solar fields, wind farms, hydroelectric power stations, and the like.

In the example of FIG. 11, the server kit 1100 includes an edge device 104 and a set of sensors 102. The sensors 102 may include various types of sensors 102, which may vary depending on the industrial setting 120. In the illustrated example, the sensors 102 communicate with the edge device 104 via a mesh network. In these embodiments, the sensors 102 may communicate sensor data to proximate sensors 102, so as to propagate the sensor data to the edge device 104 located at the remote/peripheral areas of the industrial setting 120 to the edge device 104. While a mesh network is shown, the sensor kits 1100 of FIG. 11 may include alternative network topologies, such as a hierarchal topology (e.g., some or all of the sensors 102 communicate with the edge device 104 via respective collection devices) or a star topology (e.g., sensors 102 communicate to the edge device directly).

In the embodiments of FIG. 11, the edge device 104 includes a satellite terminal with a directional antenna that communicates with a satellite. The satellite terminal may be pre-configured to communicate with a geosynchronous or low Earth orbit satellites. The edge device 104 may receive sensor data from the sensor kit network established by the sensor kit 1100. The edge device 104 may then transmit the sensor data to the backend system 150 via the satellite 1110.

In embodiments, the configurations of the server kit 1100 are suited for industrial setting 120 covering a remote area where external power sources are not abundant. In embodiments, the sensor kit 1100 may include external power sources, such as batteries, rechargeable batteries, generators, and/or solar panels. In these embodiments, the external power sources may be deployed to power the sensors 102, the edge device 104, and any other devices in the sensor kit 1100.

In embodiments, the configurations of the server kit 1100 are suited for outdoor industrial setting 120. In embodiments, the sensors 102, the edge device 104, and other devices of the sensor kit 100 (e.g., collection devices) may be configured with weatherproof housings. In these embodiments, the sensor kit 1100 may be deployed in an outdoor setting.

In embodiments, the edge device 104 may be configured to perform one or more AI-related tasks prior to transmission via the satellite uplink. In some of these embodiments, the edge device 104 may be configured to determine whether there are likely no issues relating to any of the components and/or the industrial setting 120 based on the sensor data and one or more machine-learned models. In embodiments, the edge device 104 may receive the sensor data from the various sensors and may generate one or more feature vectors based thereon. The feature vectors may include sensor data from a single sensor 102, a subset of sensors 102, or all of the sensors 102 of the sensor kit 1100. In scenarios where a single sensor or a subset of sensors 102 are included in the feature vector, the machine-learned model may be trained to identify one or more issues relating to an industrial component or the industrial setting 120, but may not be sufficient to fully deem the entire setting as likely safe/free from issues. Additionally or alternatively, the feature vectors may correspond to a single snapshot in time (e.g., all sensor data in the feature vector corresponds to the same sampling event) or over a period of time (sensor data samples from a most recent sampling event and sensor data samples from previous sampling events). In embodiments where the feature vectors define sensor data from a single snapshot, the machine-learned models may be trained to identify potential issues without any temporal context. In embodiments where the feature vectors define sensor data over a period of time, the machine-learned models may be trained to identify potential issues with the context of what the sensor(s) 102 was/were reporting previously. In these embodiments, the edge device 104 may maintain a cache of sensor data that is sampled over a predetermined time (e.g., previous hour, previous day, previous N days), such that the cache is cleared out in a first-in-first-out manner. In these embodiments, the edge device 104 may retrieve the previous sensor data samples from the cache to use to generate feature vectors that have data samples spanning a period of time.

In embodiments, the edge device 104 may feed the one or more feature vectors into one or more respective machine-learned models. A respective model may output a prediction or classification relating to an industrial component and/or the industrial setting 120, and a confidence score relating to the prediction or classification. In some embodiments, the edge device 104 may make determinations relating to the manner by which sensor data is transmitted to the backend system 150 and/or stored at the edge device. For instance, in some embodiments, the edge device 104 may compress sensor data based on the prediction or classification. In some of these embodiments, the edge device 104 may compress sensor data when there are no likely issues across the entire industrial setting 120 and individual components of the industrial setting 120. For example, if the machine-learned models predict that there are likely no issues and classify that there are currently no issues with a high degree of confidence (e.g., the confidence score is greater than 0.98), the edge device 104 may compress the sensor data. Alternatively, in the scenario where the machine-learned models predict that there are likely no issues and classify that there are currently no issues with a high degree of confidence, the edge device 104 may forego transmission but may store the sensor data at the edge device 104 for a predefined period of time (e.g., one year). In scenarios where a machine-learned model predicts a potential issue or classifies a current issue, the edge device 104 may transmit the sensor data without compressing the sensor data or using a lossless compression codec. In this way, the amount of bandwidth that is transmitted via the satellite uplink may be reduced, as the majority of the time the sensor data will be compressed or not transmitted.

In embodiments, the edge device 104 may apply one or more rules to determine whether a triggering condition exists. In embodiments, the one or more rules may be tailored to identify potentially dangerous and/or emergency situations. In these embodiments, the edge device 104 may trigger one or more notifications or alarms when a triggering condition exists. Additionally or alternatively, the edge device 104 may transmit the sensor data without any compression when a triggering condition exists.

Figure 12:
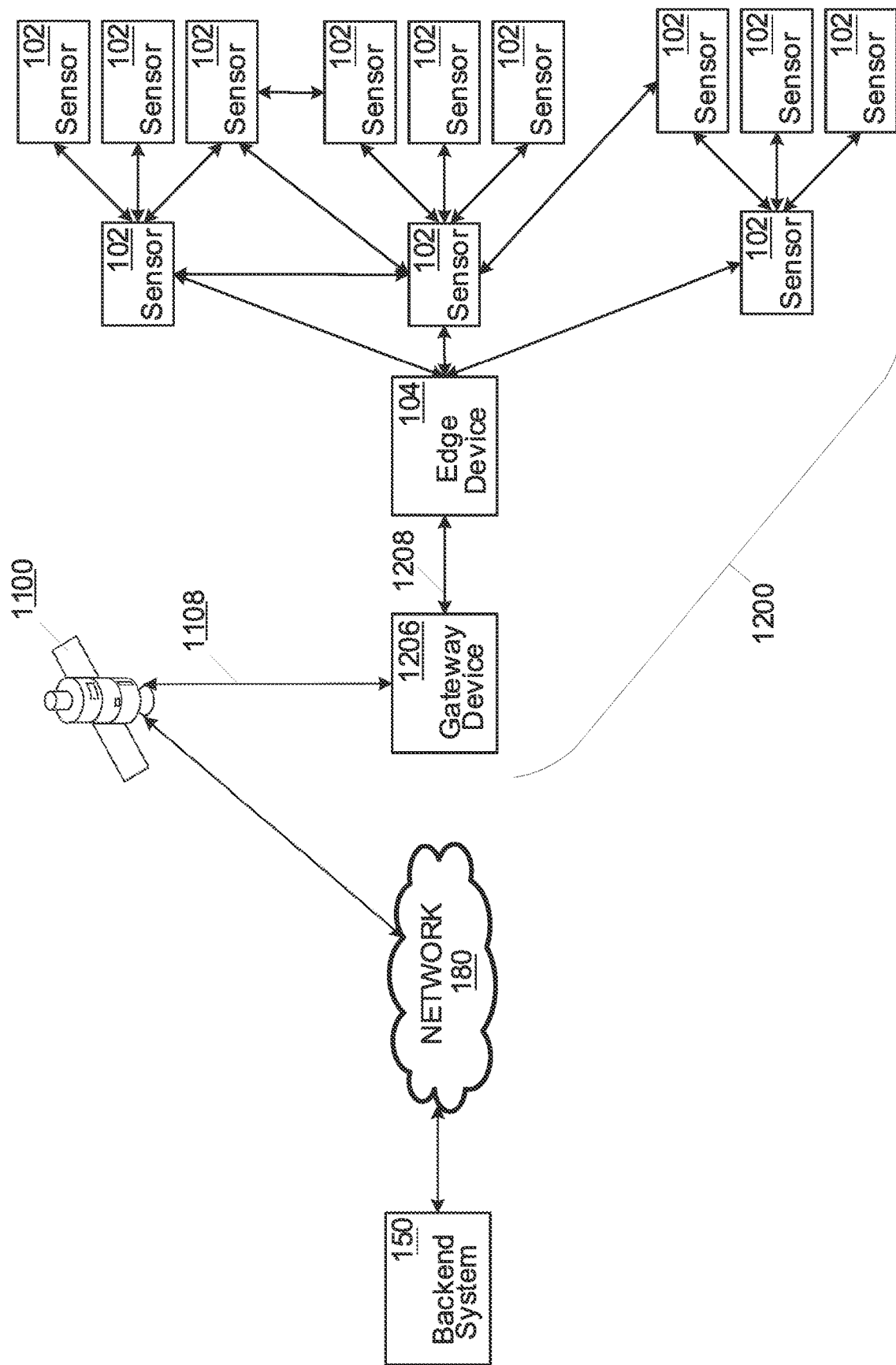

FIG. 12 illustrates an example configuration of a sensor kit 1200 according to some embodiments of the present disclosure. In the illustrated example, the sensor kit 1200 is configured to include a gateway device 1206 that communicates with a communication network 180 via an uplink 1108 to a satellite 1110. In embodiments, the sensor kit 1200 of FIG. 12 is configured for use in industrial setting 120 located in remote locations, where cellular coverage is unreliable or non-existent, and where the edge device 104 is located in a location where physical transmission to a satellite is unreliable or impossible. In embodiments, the sensor kit 1100 may be installed in underground or underwater facilities, or in facilities having very thick walls. For example, the sensor kit 1100 may be deployed in underground mines, underwater oil or gas pipelines, underwater hydroelectric power stations, and the like.

In the example of FIG. 12, the server kit 1200 includes an edge device 104, a set of sensors 102, and a gateway device 1206. In embodiments, the gateway device 1206 is a communication device that includes a satellite terminal with a directional antenna that communicates with a satellite. The satellite terminal may be pre-configured to communicate with a geosynchronous or low Earth orbit satellites. In embodiments, the gateway device 1206 may communicate with the edge device 104 via a wired communication link 1208 (e.g., Ethernet). The edge device 104 may receive sensor data from the sensor kit network established by the sensor kit 1200. The edge device 104 may then transmit the sensor data to the gateway device 1206 via the wired communication link 1208. The gateway device 1206 may then communicate the sensor data to the backend system 150 via the satellite uplink 1108.

The sensors 102 may include various types of sensors 102, which may vary depending on the industrial setting 120. In the illustrated example, the sensors 102 communicate with the edge device 104 via a mesh network. In these embodiments, the sensors 102 may communicate sensor data to proximate sensors 102, so as to propagate the sensor data to the edge device 104 located at the remote/peripheral areas of the industrial setting 120 to the edge device 104. While a mesh network is shown, the sensor kits 1200 of FIG. 12 may include alternative network topologies, such as a hierarchal topology (e.g., some or all of the sensors 102 communicate with the edge device 104 via respective collection devices) or a star topology (e.g., sensors 102 communicate to the edge device directly).

In embodiments, the configurations of the server kit 1200 are suited for industrial setting 120 covering a remote area where external power sources are not abundant. In embodiments, the sensor kit 1200 may include external power sources, such as batteries, rechargeable batteries, generators, and/or solar panels. In these embodiments, the external power sources may be deployed to power the sensors 102, the edge device 104, and any other devices in the sensor kit 1200.

In embodiments, the configurations of the server kit 1200 are suited for underground or underwater industrial setting 120. In embodiments, the sensors 102, the edge device 104, and other devices of the sensor kit 100 (e.g., collection devices) may be configured with waterproof housings or otherwise airtight housings (to prevent dust from entering the edge device 104 and/or sensor devices 102). Furthermore, as the gateway device 1208 is likely to be situated outdoors, the gateway device 1208 may include a weatherproof housing.

In embodiments, the edge device 104 may be configured to perform one or more AI-related tasks prior to transmission via the satellite uplink. In some of these embodiments, the edge device 104 may be configured to determine whether there are likely no issues relating to any of the components and/or the industrial setting 120 based on the sensor data and one or more machine-learned models. In embodiments, the edge device 104 may receive the sensor data from the various sensors and may generate one or more feature vectors based thereon. The feature vectors may include sensor data from a single sensor 102, a subset of sensors 102, or all of the sensors 102 of the sensor kit 1200. In scenarios where a single sensor or a subset of sensors 102 are included in the feature vector, the machine-learned model may be trained to identify one or more issues relating to an industrial component or the industrial setting 120, but may not be sufficient to fully deem the entire setting as likely safe/free from issues. Additionally or alternatively, the feature vectors may correspond to a single snapshot in time (e.g., all sensor data in the feature vector corresponds to the same sampling event) or over a period of time (sensor data samples from a most recent sampling event and sensor data samples from previous sampling events). In embodiments where the feature vectors define sensor data from a single snapshot, the machine-learned models may be trained to identify potential issues without any temporal context. In embodiments where the feature vectors define sensor data over a period of time, the machine-learned models may be trained to identify potential issues with the context of what the sensor(s) 102 was/were reporting previously. In these embodiments, the edge device 104 may maintain a cache of sensor data that is sampled over a predetermined time (e.g., previous hour, previous day, previous N days), such that the cache is cleared out in a first-in-first-out manner. In these embodiments, the edge device 104 may retrieve the previous sensor data samples from the cache to use to generate feature vectors that have data samples spanning a period of time.

In embodiments, the edge device 104 may feed the one or more feature vectors into one or more respective machine-learned models. A respective model may output a prediction or classification relating to an industrial component and/or the industrial setting 120, and a confidence score relating to the prediction or classification. In some embodiments, the edge device 104 may make determinations relating to the manner by which sensor data is transmitted to the backend system 150 and/or stored at the edge device. For instance, in some embodiments, the edge device 104 may compress sensor data based on the prediction or classification. In some of these embodiments, the edge device 104 may compress sensor data when there are no likely issues across the entire industrial setting 120 and individual components of the industrial setting 120. For example, if the machine-learned models predict that there are likely no issues and classify that there are currently no issues with a high degree of confidence (e.g., a confidence score is greater than 0.98), the edge device 104 may compress the sensor data. Alternatively, in the scenario where the machine-learned models predict that there are likely no issues and classify that there are currently no issues with a high degree of confidence, the edge device 104 may forego transmission but may store the sensor data at the edge device 104 for a predefined period of time (e.g., one year). In scenarios where a machine-learned model predicts a potential issue or classifies a current issue, the edge device 104 may transmit the sensor data without compressing the sensor data or using a lossless compression codec. In this way, the amount of bandwidth that is transmitted via the satellite uplink may be reduced, as the majority of the time the sensor data will be compressed or not transmitted.

In embodiments, the edge device 104 may apply one or more rules to determine whether a triggering condition exists. In embodiments, the one or more rules may be tailored to identify potentially dangerous and/or emergency situations. In these embodiments, the edge device 104 may trigger one or more notifications or alarms when a triggering condition exists. Additionally or alternatively, the edge device 104 may transmit the sensor data (via the gateway device 1206) without any compression when a triggering condition exists.

Figure 13:
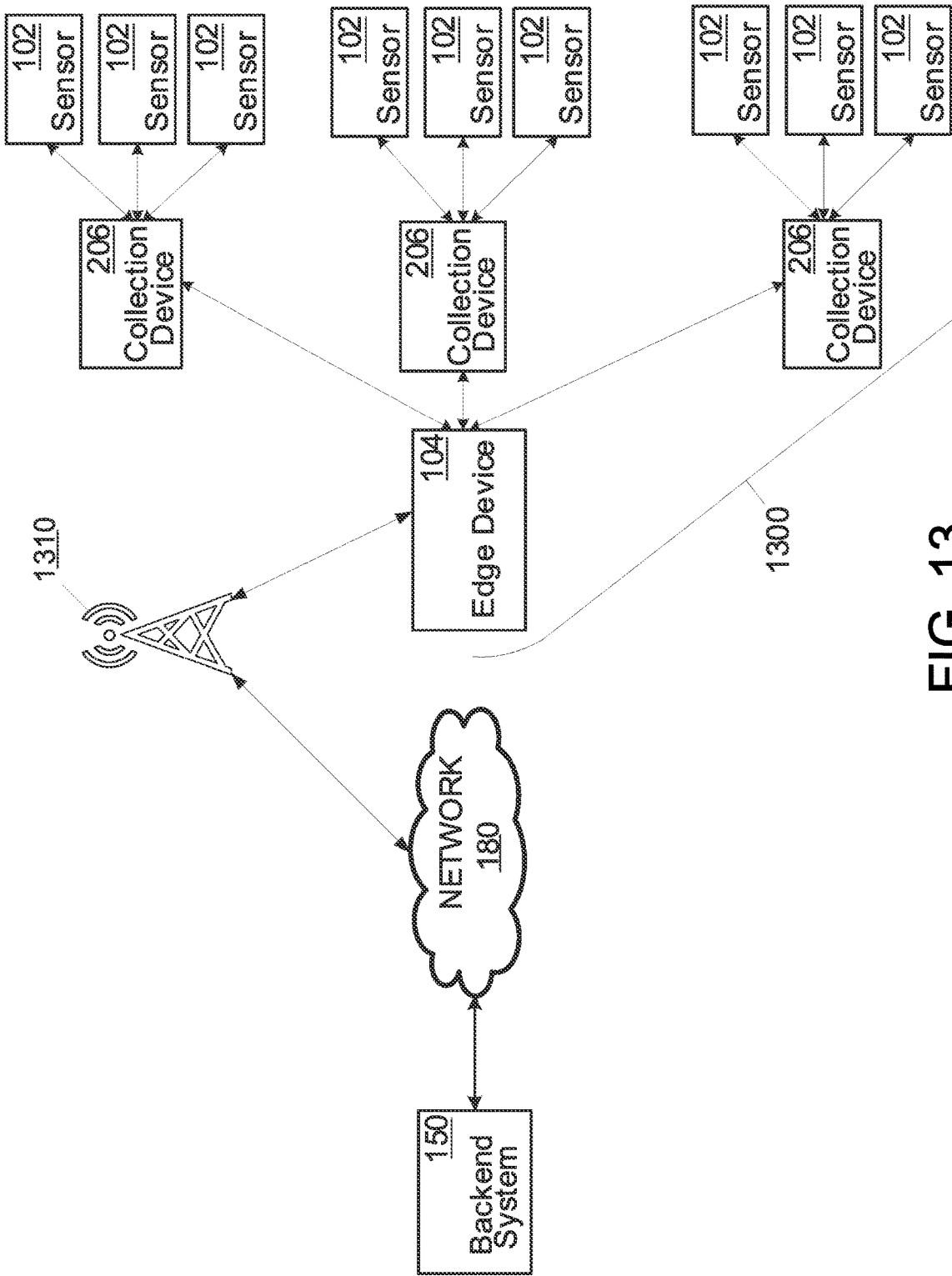

FIG. 13 illustrates an example configuration of a server kit 1300 according to some embodiments of the present disclosure. In the example of FIG. 13, the server kit 1300 includes an edge device 104, a set of sensors, and a set of collection devices. In embodiments, the configurations of the server kit 1300 are suited for industrial setting 120 covering a large area and where power sources are abundant; but where the industrial operator does not wish to connect the sensor kit 1400 to the private network of the industrial setting 120. In embodiments, the edge device 104 includes a cellular communication device (e.g., a 4G LTE chipset or 5G LTE chipset) with a transceiver that communicates with a cellular tower 1310. The cellular communication may be pre-configured to communicate with a cellular data provider. For example, in embodiments, the edge device 104 may include a SIM card that is registered with a cellular provider having a cellular tower 1310 that is proximate to the industrial setting 120. The edge device 104 may receive sensor data from the sensor kit network established by the sensor kit 1400. The edge device 104 may process the sensor data and then transmit the sensor data to the backend system 150 via the cellular tower 1310.

The sensors 102 may include various types of sensors 102, which may vary depending on the industrial setting 120. In the illustrated example, the sensors 102 communicate with the edge device 104 via a hierarchical network. In these embodiments, the sensors 102 may communicate sensor data to collection devices 206, which, in turn, may communicate the sensor data to edge device 104 via a wired or wireless communication link. The hierarchical network may be deployed where the area being monitored is rather larger (e.g., over 40,000 sq. ft.) and power supplies are abundant, such as in a factory, a power plant, a food inspection facility, an indoor grow facility, and the like. While a hierarchal network is shown, the sensor kits 1300 of FIG. 13 may include alternative network topologies, such as a mesh topology or a star topology (e.g., sensors 102 communicate to the edge device directly).

In embodiments, the edge device 104 may be configured to perform one or more AI-related tasks prior to transmission via the satellite uplink. In some of these embodiments, the edge device 104 may be configured to determine whether there are likely no issues relating to any of the components and/or the industrial setting 120 based on the sensor data and one or more machine-learned models. In embodiments, the edge device 104 may receive the sensor data from the various sensors and may generate one or more feature vectors based thereon. The feature vectors may include sensor data from a single sensor 102, a subset of sensors 102, or all of the sensors 102 of the sensor kit 1300. In scenarios where a single sensor or a subset of sensors 102 are included in the feature vector, the machine-learned model may be trained to identify one or more issues relating to an industrial component or the industrial setting 120, but may not be sufficient to fully deem the entire setting as likely safe/free from issues. Additionally or alternatively, the feature vectors may correspond to a single snapshot in time (e.g., all sensor data in the feature vector corresponds to the same sampling event) or over a period of time (sensor data samples from a most recent sampling event and sensor data samples from previous sampling events). In embodiments where the feature vectors define sensor data from a single snap shot, the machine-learned models may be trained to identify potential issues without any temporal context. In embodiments where the feature vectors define sensor data over a period of time, the machine-learned models may be trained to identify potential issues with the context of what the sensor(s) 102 was/were reporting previously. In these embodiments, the edge device 104 may maintain a cache of sensor data that is sampled over a predetermined time (e.g., previous hour, previous day, previous N days), such that the cache is cleared out in a first-in-first-out manner. In these embodiments, the edge device 104 may retrieve the previous sensor data samples from the cache to use to generate feature vectors that have data samples spanning a period of time.

In embodiments, the edge device 104 may feed the one or more feature vectors into one or more respective machine-learned models. A respective model may output a prediction or classification relating to an industrial component and/or the industrial setting 120, and a confidence score relating to the prediction or classification. In some embodiments, the edge device 104 may make determinations relating to the manner by which sensor data is transmitted to the backend system 150 and/or stored at the edge device. For instance, in some embodiments, the edge device 104 may compress sensor data based on the prediction or classification. In some of these embodiments, the edge device 104 may compress sensor data when there are no likely issues across the entire industrial setting 120 and individual components of the industrial setting 120. For example, if the machine-learned models predict that there are likely no issues and classify that there are currently no issues with a high degree of confidence (e.g., a confidence score is greater than 0.98), the edge device 104 may compress the sensor data. Alternatively, in the scenario where the machine-learned models predict that there are likely no issues and classify that there are currently no issues with a high degree of confidence, the edge device 104 may forego transmission but may store the sensor data at the edge device 104 for a predefined period of time (e.g., one year). In scenarios where a machine-learned model predicts a potential issue or classifies a current issue, the edge device 104 may transmit the sensor data without compressing the sensor data or using a lossless compression codec. In this way, the amount of bandwidth that is transmitted via the cellular tower may be reduced, as the majority of the time the sensor data will be compressed or not transmitted.

In embodiments, the edge device 104 may apply one or more rules to determine whether a triggering condition exists. In embodiments, the one or more rules may be tailored to identify potentially dangerous and/or emergency situations. In these embodiments, the edge device 104 may trigger one or more notifications or alarms when a triggering condition exists. Additionally or alternatively, the edge device 104 may transmit the sensor data without any compression when a triggering condition exists.

Figure 14:
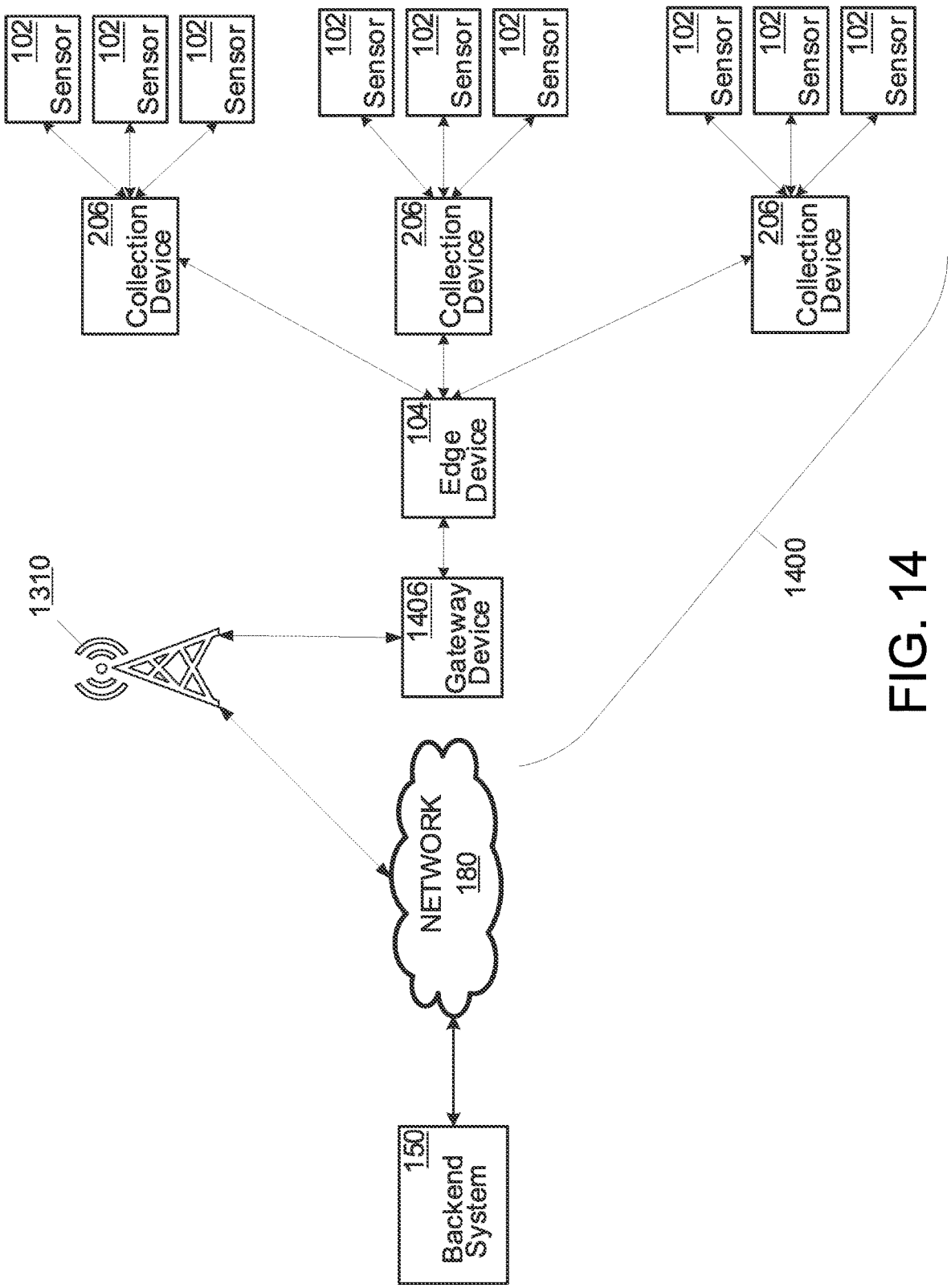

FIG. 14 illustrates an example configuration of a server kit 1400 according to some embodiments of the present disclosure. In the example of FIG. 14, the server kit 1400 includes an edge device 104, a set of sensors 102, a set of collection devices 206, and a gateway device 1406. In embodiments, the configurations of the server kit 1400 are suited for industrial setting 120 covering a large area and where power sources are abundant; but where the industrial operator does not wish to connect the sensor kit 1400 to the private network of the industrial setting 120 and the walls of the industrial setting 120 make wireless communication (e.g., cellular communication) unreliable or impossible. In embodiments, the gateway device 1406 is a cellular network gateway device that includes a cellular communication device (e.g., 4G, 5G chipset) with a transceiver that communicates with a cellular tower 1310. The cellular communication may be pre-configured to communicate with a cellular data provider. For example, in embodiments, the gateway device may include a SIM card that is registered with a cellular provider having a tower 1310 that is proximate to the industrial setting 120. In embodiments, the gateway device 1406 may communicate with the edge device 104 via a wired communication link 1408 (e.g., Ethernet). The edge device 104 may receive sensor data from the sensor kit network established by the sensor kit 1400. The edge device 104 may then transmit the sensor data to the gateway device 1406 via the wired communication link 1408. The gateway device 1406 may then communicate the sensor data to the backend system 150 via the cellular tower 1310.

The sensors 102 may include various types of sensors 102, which may vary depending on the industrial setting 120. In the illustrated example, the sensors 102 communicate with the edge device 104 via a hierarchical network. In these embodiments, the sensors 102 may communicate sensor data to collection devices 206, which, in turn, may communicate the sensor data to edge device 104 via a wired or wireless communication link. The hierarchical network may be deployed where the area being monitored is rather larger (e.g., over 40,000 sq. ft.) and power supplies are abundant, such as in a factory, a power plant, a food inspection facility, an indoor grow facility, and the like. While a hierarchal network is shown, the sensor kits 1400 of FIG. 14 may include alternative network topologies, such as a mesh topology or a star topology (e.g., sensors 102 communicate to the edge device directly).

In embodiments, the edge device 104 may be configured to perform one or more AI-related tasks prior to transmission via the satellite uplink. In some of these embodiments, the edge device 104 may be configured to determine whether there are likely no issues relating to any of the components and/or the industrial setting 120 based on the sensor data and one or more machine-learned models. In embodiments, the edge device 104 may receive the sensor data from the various sensors and may generate one or more feature vectors based thereon. The feature vectors may include sensor data from a single sensor 102, a subset of sensors 102, or all of the sensors 102 of the sensor kit 1400. In scenarios where a single sensor or a subset of sensors 102 are included in the feature vector, the machine-learned model may be trained to identify one or more issues relating to an industrial component or the industrial setting 120, but may not be sufficient to fully deem the entire setting as likely safe/free from issues. Additionally or alternatively, the feature vectors may correspond to a single snapshot in time (e.g., all sensor data in the feature vector corresponds to the same sampling event) or over a period of time (sensor data samples from a most recent sampling event and sensor data samples from previous sampling events). In embodiments where the feature vectors define sensor data from a single snapshot, the machine-learned models may be trained to identify potential issues without any temporal context. In embodiments where the feature vectors define sensor data over a period of time, the machine-learned models may be trained to identify potential issues with the context of what the sensor(s) 102 was/were reporting previously. In these embodiments, the edge device 104 may maintain a cache of sensor data that is sampled over a predetermined time (e.g., previous hour, previous day, previous N days), such that the cache is cleared out in a first-in-first-out manner. In these embodiments, the edge device 104 may retrieve the previous sensor data samples from the cache to use to generate feature vectors that have data samples spanning a period of time.

In embodiments, the edge device 104 may feed the one or more feature vectors into one or more respective machine-learned models. A respective model may output a prediction or classification relating to an industrial component and/or the industrial setting 120, and a confidence score relating to the prediction or classification. In some embodiments, the edge device 104 may make determinations relating to the manner by which sensor data is transmitted to the backend system 150 and/or stored at the edge device. For instance, in some embodiments, the edge device 104 may compress sensor data based on the prediction or classification. In some of these embodiments, the edge device 104 may compress sensor data when there are no likely issues across the entire industrial setting 120 and individual components of the industrial setting 120. For example, if the machine-learned models predict that there are likely no issues and classify that there are currently no issues with a high degree of confidence (e.g., the confidence score is greater than 0.98), the edge device 104 may compress the sensor data. Alternatively, in the scenario where the machine-learned models predict that there are likely no issues and classify that there are currently no issues with a high degree of confidence, the edge device 104 may forego transmission but may store the sensor data at the edge device 104 for a predefined period of time (e.g., one year). In scenarios where a machine-learned model predicts a potential issue or classifies a current issue, the edge device 104 may transmit the sensor data without compressing the sensor data or using a lossless compression codec. In this way, the amount of bandwidth that is transmitted via the cellular tower may be reduced, as the majority of the time the sensor data will be compressed or not transmitted.

In embodiments, the edge device 104 may apply one or more rules to determine whether a triggering condition exists. In embodiments, the one or more rules may be tailored to identify potentially dangerous and/or emergency situations. In these embodiments, the edge device 104 may trigger one or more notifications or alarms when a triggering condition exists. Additionally or alternatively, the edge device 104 may transmit the sensor data without any compression when a triggering condition exists.

Figure 15:
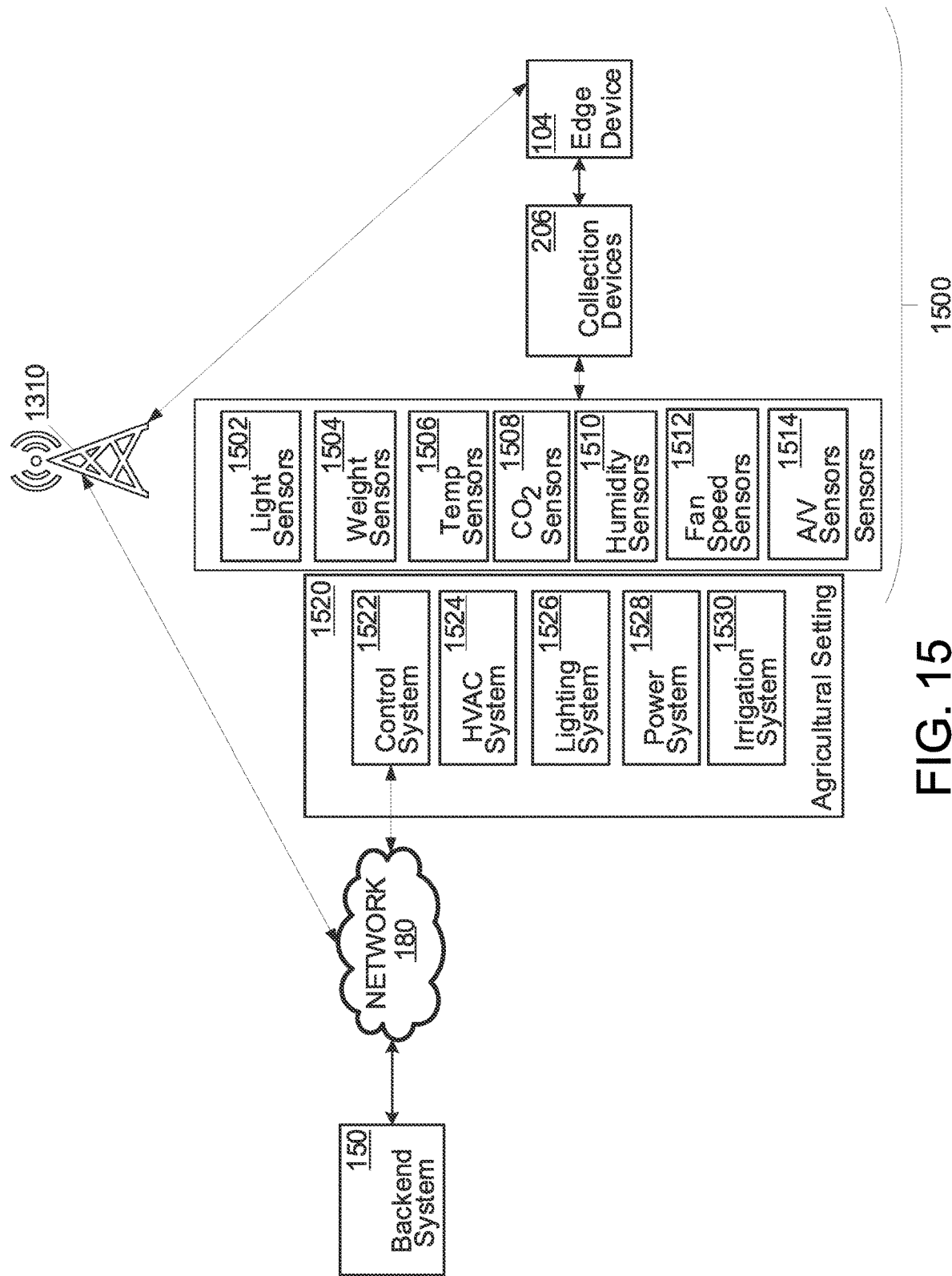

FIG. 15 illustrates an example configuration of a server kit 1500 for installation in an agricultural setting 1520 according to some embodiments of the present disclosure. In the example of FIG. 15, the server kit 1500 is configured for installation in an indoor agricultural setting 1520 that may include, but is not limited to, a control system 1522, an HVAC system 1524, a lighting system 1526, a power system 1528, and/or an irrigation system 1530. In this example, various features and components of the agricultural setting include components that are monitored by a set of sensors 102. In embodiments, the sensors 102 capture instances of sensor data and provide the respective instances of sensor data to an edge device 104. In the example embodiments of FIG. 15, the sensor kit 1500 includes a set of collection devices 206 that route sensor data from the sensors 102 to the edge device 104. Sensor kits 1500 for deployment in agricultural settings may have different sensor kit network topologies as well. For instance, in facilities not having more than two or three rooms being monitored, the sensor kit network may be a mesh or star network, depending on the distances between the edge device 104 and the furthest potential sensor location. For example, if the distance between the edge device 104 and the furthest potential sensor location is greater than 150 meters, then the sensor kit network may be configured as a mesh network. In the embodiments of FIG. 15, the edge device 104 transmits the sensor data to the backend system 150 directly. In these embodiments, the edge device 104 includes a cellular communication device that communicates with a cellular tower 1310 of a preset cellular provider via a preconfigured cellular connection to a cellular tower 1310. In other embodiments of the disclosure, the edge device 104 transmits the sensor data to the backend system 150 via a gateway device (e.g., gateway device 1406) that includes a cellular communication device that communicates with a cellular tower 1310 of a preset cellular provider.

In embodiments, a server kit 1500 may include any suitable combination of light sensors 1502, weight sensors 1504, temperature sensors 1506, CO2 sensors 1508, humidity sensors 1510, fan speed sensors 1512, and/or audio/visual (AV) sensors 1514 (e.g., cameras). Sensor kits 1500 may be arranged with additional or alternative sensors 102. In embodiments, the sensor data collected by the edge device 104 may include ambient light measurements indicating an amount of ambient light detected in the area of a light sensor 1502. In embodiments, the sensor data collected by the edge device 104 may include a weight or mass measurements indicating a weight or mass of an object (e.g., a pot or tray containing one or more plants) that is resting upon a weight sensor 1504. In embodiments, the sensor data collected by the edge device 104 may include temperature measurements indicating an ambient temperature in the vicinity of a temperature sensor 1506. In embodiments, the sensor data collected by the edge device 104 may include humidity measurements indicating an ambient humidity in the vicinity of a humidity sensor 1510 or moisture measurements indicating a relative amount of moisture in a medium (e.g., soil) monitored by a humidity sensor 1510. In embodiments, the sensor data collected by the edge device 104 may include CO2 measurements indicating ambient levels of CO2 in the vicinity of a CO2 sensor 1508. In embodiments, the sensor data collected by the edge device 104 may include temperature measurements indicating an ambient temperature in the vicinity of a temperature sensor 1506. In embodiments, the sensor data collected by the edge device 104 may include fan speed measurements indicating a measured speed of a fan (e.g., a fan of an HVAC system 1524) as measured by a fan speed sensor 1512. In embodiments, the sensor data collected by the edge device 104 may include video signals captured by an AV sensor 1516. The sensor data captured by sensors 102 and collected by the edge device 104 may include additional or alternative types of sensor data without departing from the scope of the disclosure.

In embodiments, the edge device 104 is configured to perform one or more edge operations on the sensor data. For example, the edge device 104 may pre-process the received sensor data. In embodiments, the edge device 104 may predict or classify potential issues with one or more components of the HVAC system 1524, lighting system 1526, power system 1528, the irrigation system 1530; the plants growing in the agricultural facility; and/or the facility itself. In embodiments, the edge device 104 may analyze the sensor data with respect to a set of rules that define triggering conditions. In these embodiments, the edge device 104 may trigger alarms or notifications in response to a triggering condition being met. In embodiments, the edge device 104 may encode, compress, and/or encrypt the sensor data, prior to transmission to the backend system 150. In some of these embodiments, the edge device 104 may selectively compress the sensor data based on predictions or classifications made by the edge device 104 and/or upon one or more triggering conditions being met.

In embodiments, the edge device 104 may be configured to perform one or more AI-related tasks prior to transmission via the satellite uplink. In some of these embodiments, the edge device 104 may be configured to determine whether there are likely no issues relating to any of the components and/or the industrial setting 120 based on the sensor data and one or more machine-learned models. In embodiments, the edge device 104 may receive the sensor data from the various sensors and may generate one or more feature vectors based thereon. The feature vectors may include sensor data from a single sensor 102, a subset of sensors 102, or all of the sensors 102 of the sensor kit 1300. In scenarios where a single sensor or a subset of sensors 102 are included in the feature vector, the machine-learned model may be trained to identify one or more issues relating to an industrial component or the industrial setting 120, but may not be sufficient to fully deem the entire setting as likely safe/free from issues. Additionally or alternatively, the feature vectors may correspond to a single snapshot in time (e.g., all sensor data in the feature vector corresponds to the same sampling event) or over a period of time (sensor data samples from a most recent sampling event and sensor data samples from previous sampling events). In embodiments where the feature vectors define sensor data from a single snapshot, the machine-learned models may be trained to identify potential issues without any temporal context. In embodiments where the feature vectors define sensor data over a period of time, the machine-learned models may be trained to identify potential issues with the context of what the sensor(s) 102 was/were reporting previously. In these embodiments, the edge device 104 may maintain a cache of sensor data that is sampled over a predetermined time (e.g., previous hour, previous day, previous N days), such that the cache is cleared out in a first-in-first-out manner. In these embodiments, the edge device 104 may retrieve the previous sensor data samples from the cache to use to generate feature vectors that have data samples spanning a period of time.

In embodiments, the edge device 104 may feed the one or more feature vectors into one or more respective machine-learned models. A respective model may output a prediction or classification relating to an industrial component and/or the industrial setting 120, and a confidence score relating to the prediction or classification. In some embodiments, the edge device 104 may make determinations relating to the manner by which sensor data is transmitted to the backend system 150 and/or stored at the edge device. For instance, in some embodiments, the edge device 104 may compress sensor data based on the prediction or classification. In some of these embodiments, the edge device 104 may compress sensor data when there are no likely issues across the entire industrial setting 120 and individual components of the industrial setting 120. For example, if the machine-learned models predict that there are likely no issues and classify that there are currently no issues with a high degree of confidence (e.g., the confidence score is greater than 0.98), the edge device 104 may compress the sensor data. Alternatively, in the scenario where the machine-learned models predict that there are likely no issues and classify that there are currently no issues with a high degree of confidence, the edge device 104 may forego transmission but may store the sensor data at the edge device 104 for a predefined period of time (e.g., one year). In scenarios where a machine-learned model predicts a potential issue or classifies a current issue, the edge device 104 may transmit the sensor data without compressing the sensor data or using a lossless compression codec. In this way, the amount of bandwidth that is transmitted via the cellular tower may be reduced, as the majority of the time the sensor data will be compressed or not transmitted.

In embodiments, the edge device 104 may apply one or more rules to the sensor data to determine whether a triggering condition exists. In embodiments, the one or more rules may be tailored to identify potentially dangerous and/or emergency situations. In these embodiments, the edge device 104 may trigger one or more notifications or alarms when a triggering condition exists. Additionally or alternatively, the edge device 104 may transmit the sensor data without any compression when a triggering condition exists. In some embodiments, the edge device 104 may selectively compress and/or transmit the sensor data based on the application of the one or more rules to the sensor data.

In embodiments, the backend system 150 may perform one or more backend operations based on received sensor data. In embodiments, the backend system 150 may decode/decompress/decrypt the sensor data received from respective sensor kits 1500. In embodiments, the backend system 150 may preprocess received sensor data. In embodiments, the backend system 150 may preprocess sensor data received from a respective server kit 1500. For example, the backend system 150 may filter, dedupe, and/or structure the sensor data. In embodiments, the backend system 150 may perform one or more AI-related tasks using the sensor data. In some of these embodiments, the backend system 150 may extract features from the sensor data, which may be used to predict on classify certain conditions or events relating to the agricultural setting. For example, the backend system 150 may deploy models used to predict yields of a crop based on weight measurements, temperature measurements, $CO_2$ measurements, light measurements, and/or other extracted features. In another example, the backend system 150 may deploy models used to predict or classify mold-inducing states in a room or area of the agricultural facility based on temperature measurements, humidity measurements, video signals or images, and/or other extracted features. In embodiments, the backend system 150 may perform one or more analytics tasks on the sensor data and may display the results to a human user via a dashboard. In some embodiments, the backend system 150 may receive control commands from a human user via the dashboard. For example, a human resource with sufficient login credentials may control an HVAC system 1524, a lighting system 1526, a power system 1528, and/or an irrigation system 1530 of the industrial setting 120. In some of these embodiments, the backend system 150 may telemetrically monitor the actions of the human user, and may train one or more machine-learned models (e.g., neural networks) on actions to take in response to displaying the analytics results to the human user. In other embodiments, the backend system 150 may execute one or more workflows associated with the HVAC system 1524, the lighting system 1526, the power system 1528, and/or the irrigation system 1530, in order to control one or more of the systems of the agricultural setting 1520 based on a prediction or classification made by the backend system in response to the sensor data. In embodiments, the backend system 150 provides one or more control commands to a control system 1522 of an agricultural setting 1520, which in turn may control the HVAC system 1524, the lighting system 1526, the power system 1528, and/or the irrigation system 1530 based on the received control commands. In embodiments, the backend system 150 may provide or utilize an API to provide control commands to the agricultural setting 1520.

Figure 16:
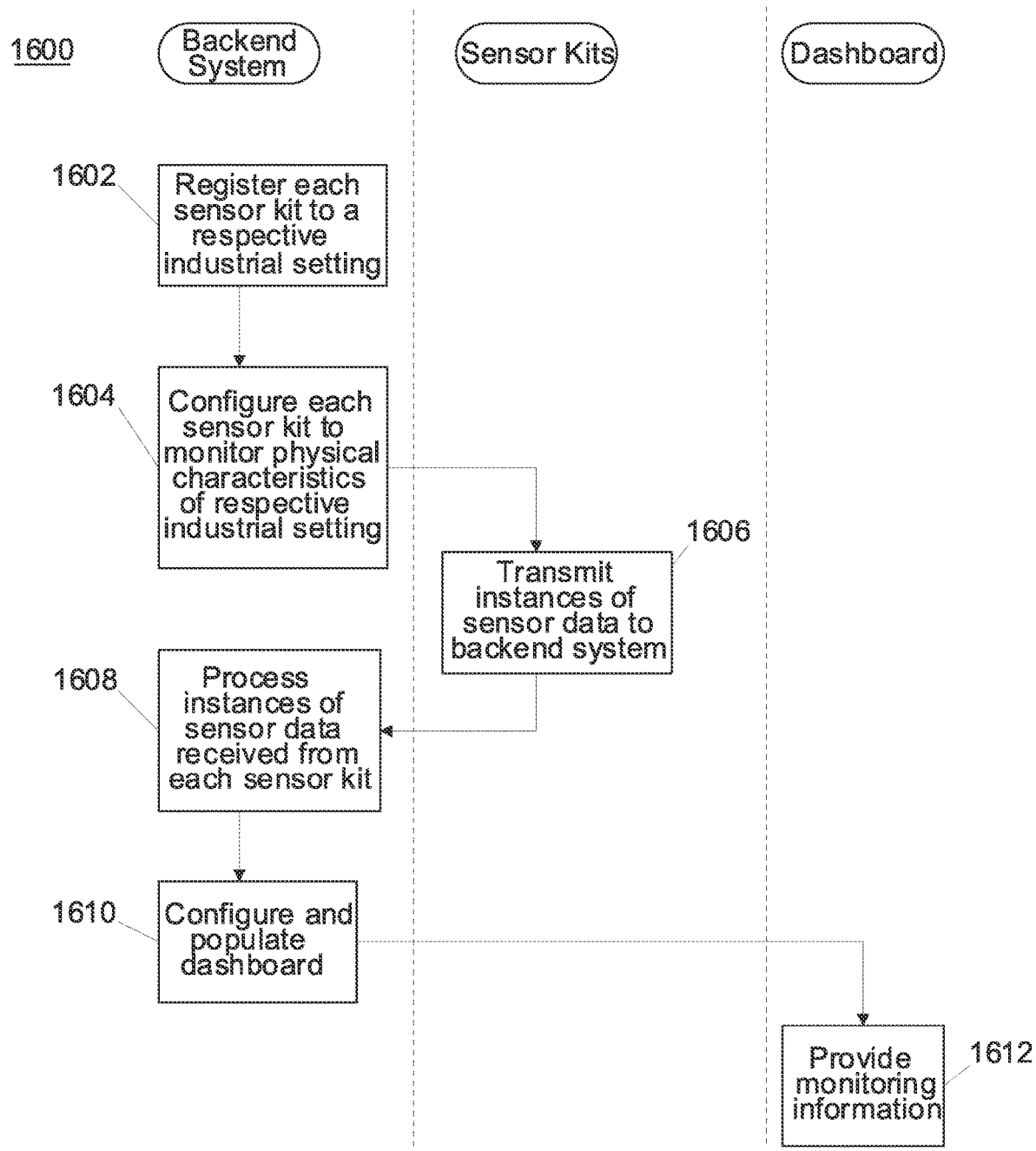
FIG. 16 is a flowchart illustrating an example set of operations of a method for monitoring industrial settings using an automatically configured backend system, according to some embodiments of the present disclosure.

FIG. 16—Exemplary Method of Monitoring Industrial Settings

FIG. 16 illustrates an example set of operations of a method 1600 for monitoring industrial setting 120 using an automatically configured backend system 150. In embodiments, the method 1600 may be performed by the backend system 150, the sensor kit 100, and the dashboard module 532.

At 1602, the backend system 150 registers the sensor kit 100 to a respective industrial setting 120. In some embodiments, the backend system 150 registers a plurality of sensor kits 100 and registers each sensor kit 100 of the plurality of sensor kits 100 to a respective industrial setting 120. In embodiments, the backend system 150 provides an interface for specifying a type of entity or industrial setting 120 to be monitored. In some embodiments, a user may select a set of parameters for monitoring of the respective industrial setting 120 of the sensor kit 100. The backend system 150 may automatically provision a set of services and capabilities of the backend system 150 based on the selected parameters.

At 1604, the backend system 150 configures the sensor kit 100 to monitor physical characteristics of the respective industrial setting 120 to which the sensor kit 100 is registered. For example, when the respective industrial setting 120 is a natural resource extraction setting, the backend system 150 may configure one or more of infrared sensors, ground penetrating sensors, light sensors, humidity sensors, temperature sensors, chemical sensors, fan speed sensors, rotational speed sensors, weight sensors, and camera sensors to monitor and collect sensor data relating to metrics and parameters of the natural resource extraction setting and equipment used therein.

At 1606, the sensor kit 100 transmits instances of sensor data to the backend system 150. In some embodiments, the sensor kit 100 transmits the instances of sensor data to the backend system 150 via a gateway device. The gateway device may provide a virtual container for instances of the sensor data such that only a registered owner or operator of the respective industrial setting 120 can access the sensor data via the backend system 150.

At 1608, the backend system 150 processes instances of sensor data received from the sensor kit 100. In some embodiments, the backend system 150 includes an analytics facility and/or a machine learning facility. The analytics facility and/or the machine learning facility may be configured based on the type of the industrial setting 120 and may process the instances of sensor data received from the sensor kit 100. In some embodiments, the backend system 150 updates and/or configures a distributed ledger based on the processed instances of sensor data.

At 1610, the backend system 150 configures and populates the dashboard. In embodiments, the backend system 150 configures the dashboard to retrieve and display one or more of raw sensor data provided by the sensor kit, analytical data relating to the sensor data provided by the sensor kit 100, predictions or classifications made by the backend system 150 based on the sensor data, and the like. In some embodiments, the backend system 150 configures alarm limits with respect to one or more sensor types and/or conditions based on the industrial setting 120. The backend system 150 may define which users receive a notification when an alarm is triggered. In embodiments, the backend system 150 may subscribe to additional features of the backend system 150 and/or an edge device 104 based on the industrial setting 120.

At 1612, the dashboard provides monitoring information to a human user. In embodiments, the dashboard provides monitoring information to the user by displaying the monitoring information on a device, e.g., a computer terminal, a smartphone, a monitor, or any other suitable device for displaying information. The monitoring information may be provided via a graphical user interface.

Figure 17:
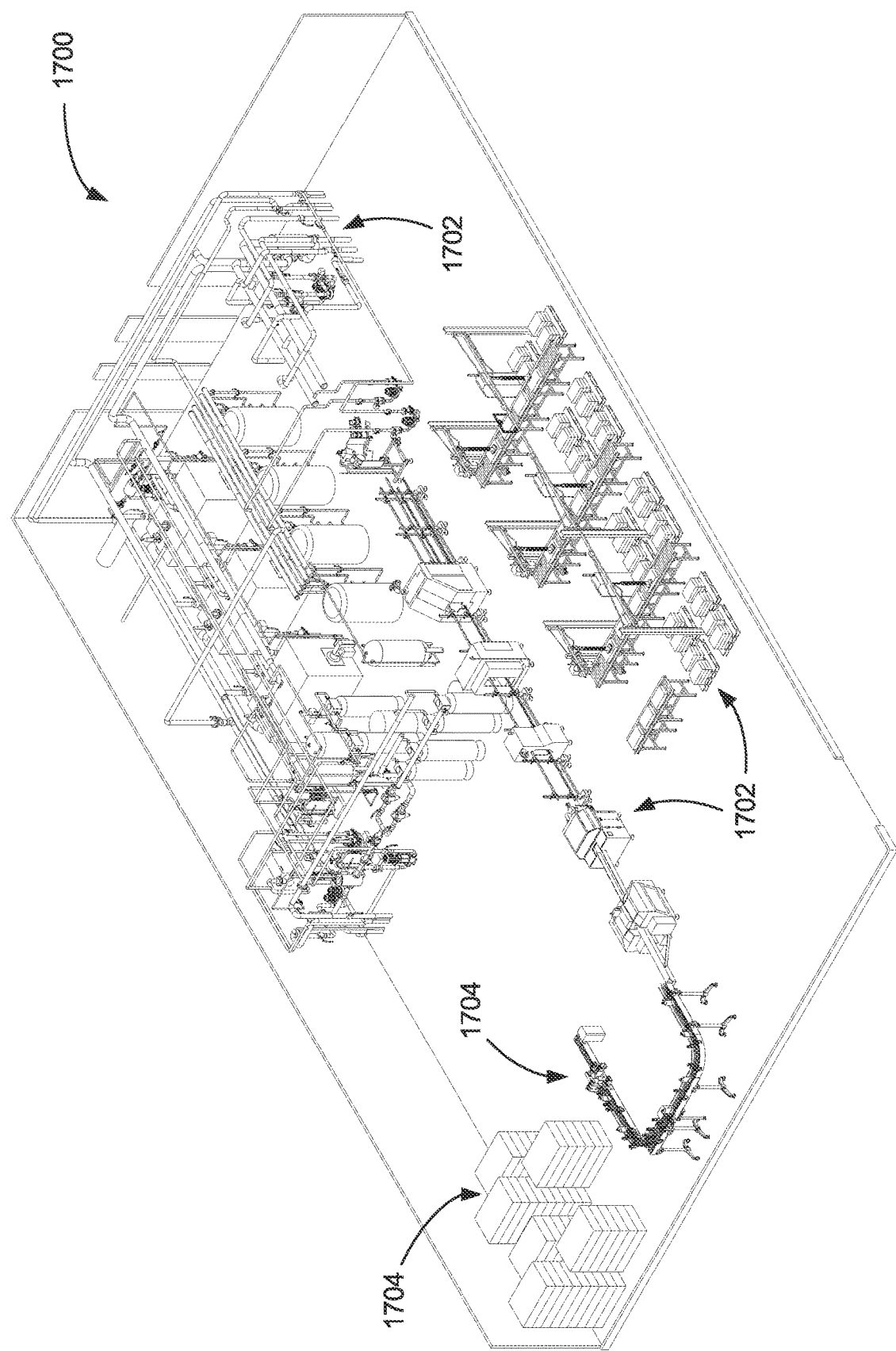
FIG. 17 is a plan view of a manufacturing facility illustrating an exemplary implementation of a sensor kit including an edge device, according to some embodiments of the present disclosure.

FIG. 17 illustrates an exemplary manufacturing facility 1700 according to some embodiments of the present disclosure. The manufacturing facility 1700 may include a plurality of industrial machines 1702 including, by way of example, conveyor belts, assembly machines, die machines, turbines, and power systems. The manufacturing facility 1700 may further include a plurality of products 1704. The manufacturing facility may have the sensor kit 100 installed therein, the sensor kit 100 including the plurality of sensors 102 and the edge device 104. By way of example, one or more of the sensors 102 may be installed on some or all of the industrial machines 1702 and the products 1704.

Figure 18:
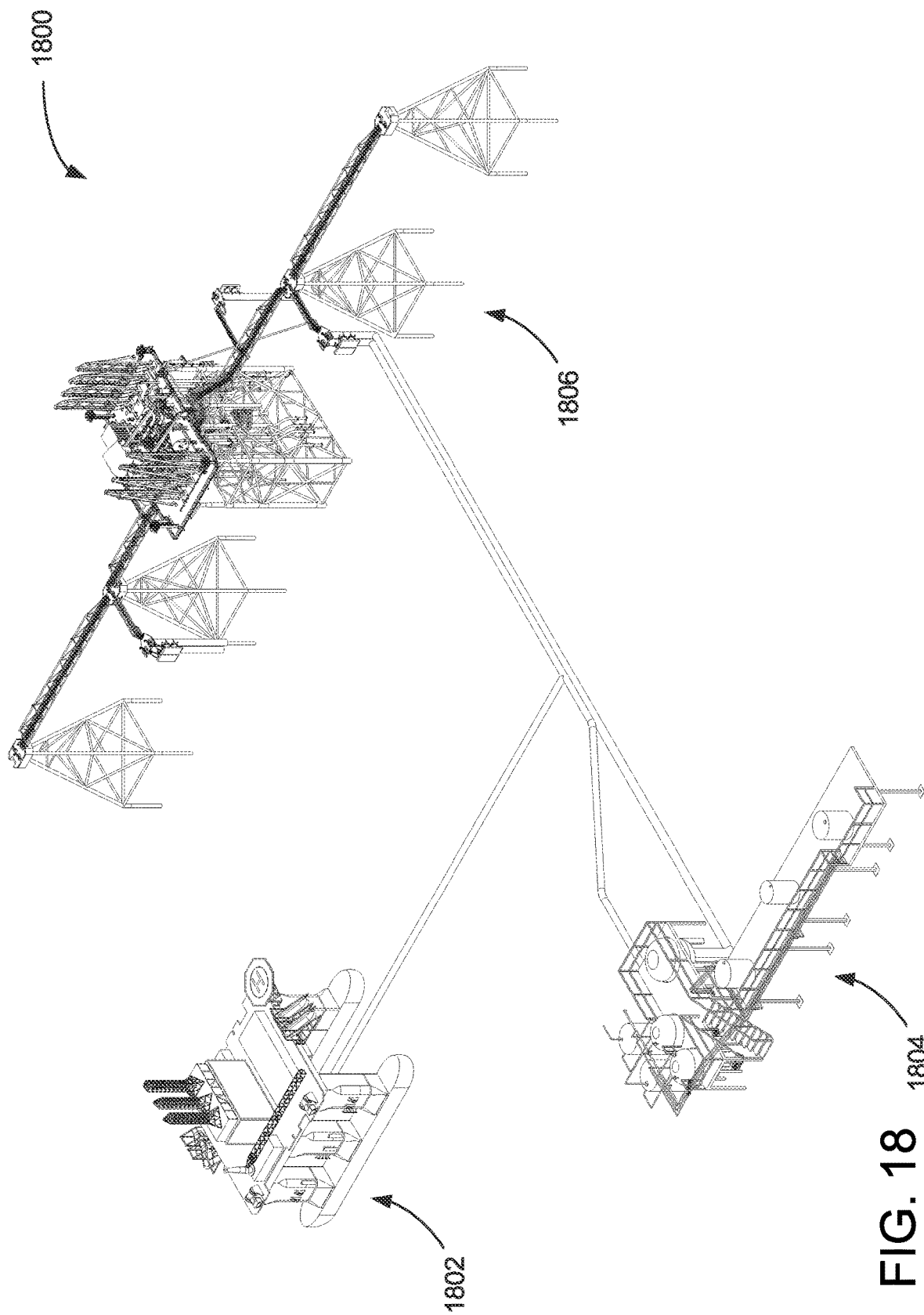
FIG. 18 is a plan view of a surface portion of an underwater industrial facility illustrating an exemplary implementation of a sensor kit including an edge device, according to some embodiments of the present disclosure.

FIG. 18 illustrates a surface portion of an exemplary underwater industrial facility 1800 according to some embodiments of the present disclosure. The underwater industrial facility 1800 may include a transportation and communication platform 1802, a storage platform 1804, and a pumping platform 1806. The underwater industrial facility 1800 may have the sensor kit 100 installed therein, the sensor kit 100 including the plurality of sensors 102 and the edge device 104. By way of example, one or more of the sensors 102 may be installed on some or all of the transportation and communication platform 1802, the storage platform 1804, and the pumping platform 1806, and on individual components and machines thereof.

Figure 19:
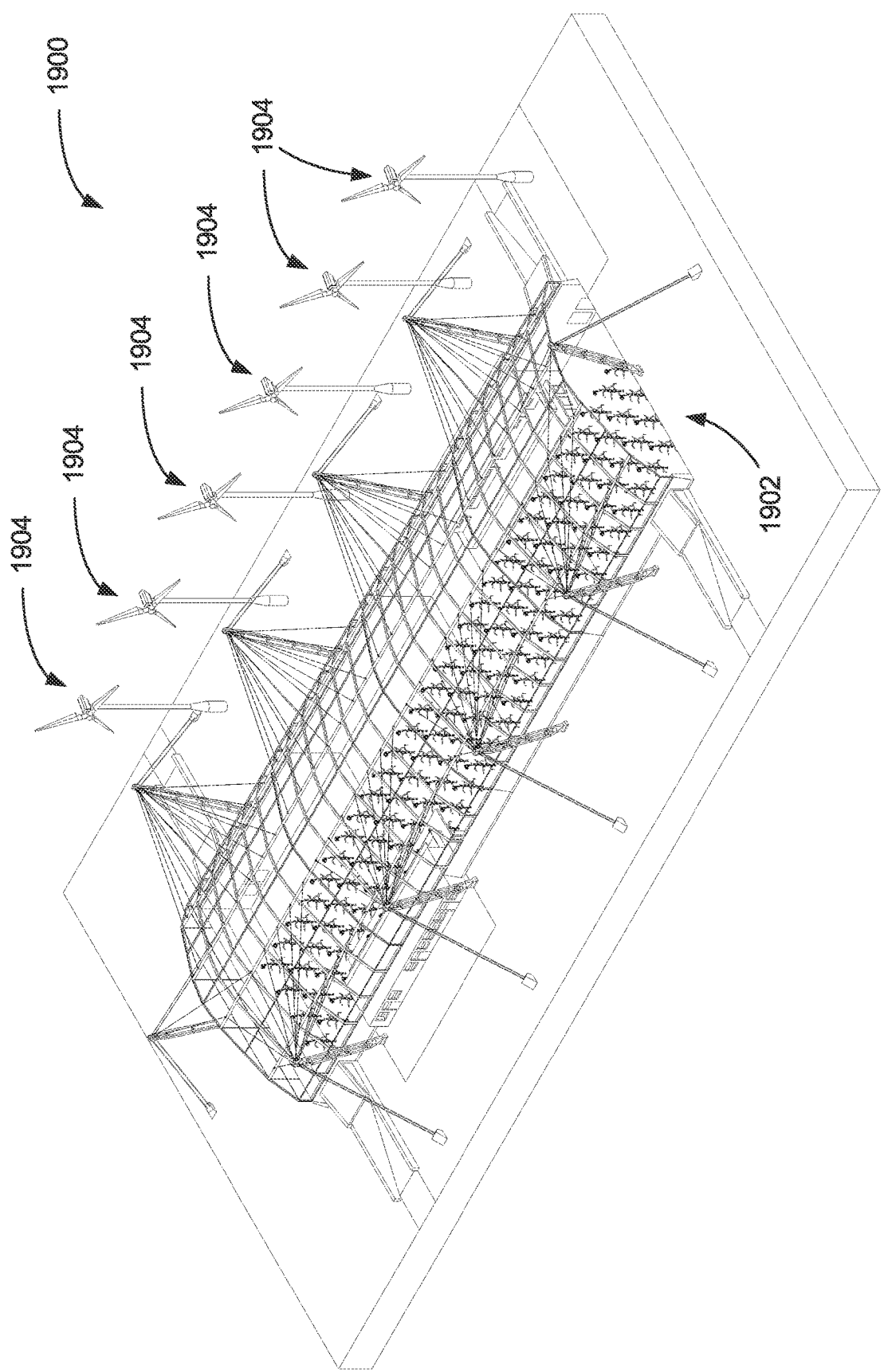
FIG. 19 is a plan view of an indoor agricultural facility illustrating an exemplary implementation of a sensor kit including an edge device, according to some embodiments of the present disclosure.

FIG. 19 illustrates an exemplary indoor agricultural facility 1900 according to some embodiments of the present disclosure. The indoor agricultural facility 1900 may include a greenhouse 1902 and a plurality of wind turbines 1904. The indoor agricultural facility 1900 may have the sensor kit 100 installed therein, the sensor kit 100 including the plurality of sensors 102 and the edge device 104. By way of example, one or more of the sensors 102 may be installed on some or all components of the greenhouse 1904 and on some or all components of the wind turbines 1904.

In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having the second communication device of the edge device is a satellite terminal device that is configured to transmit the sensor kit packets to a satellite that routes the sensor kits to the public network. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having the edge device further includes one or more storage devices that store a sensor data store that stores instances of sensor data captured by the plurality of sensors of the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having the self-configuring sensor kit network is a star network such that each sensor of the plurality of sensors transmits respective instances of sensor data with the edge device directly using a short-range communication protocol. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors in a self-configuring network and an edge device that performs one or more backend operations on sensor data obtained from the sensor. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that stores multiple models and performs AI-related tasks based on sensor data obtained from the sensor using an appropriate model. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that compresses sensor data collected by the sensor using a media codec. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a sensor kit and a backend system configured to receive sensor data collected by the sensor kit and perform one or more backend operations on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that are configured to monitor an indoor agricultural setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that are configured to monitor a natural resource extraction setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that are configured to monitor a pipeline setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that are configured to monitor a manufacturing facility. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that are configured to monitor an underwater industrial setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a sensor kit that collects sensor data and a backend system that receives the sensor data from the sensor kits and updates a distributed ledger based on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors and an edge device that is configured to add new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensors, an edge device, and a gateway device that communicates with a communication network on behalf of the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having an edge device that includes a data processing module that deduplicates, filters, flags, and/or aggregates sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having an edge device that includes an encoding module that encodes, compresses, and/or encrypts sensor data according to one or more media codecs. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having an edge device that includes a quick-decision AI module that uses machine-learned models to generate predictions related to and/or classifications of industrial components based on features of collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having an edge device that includes a notification module that provides notifications and/or alarms to users based on sensor data and/or rules applied to the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having an edge device that includes a configuration module that configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having an edge device that includes a distributed ledger module configured to update a distributed ledger with sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes a decoding module that decrypts, decodes, and/or decompresses encoded sensor kit packets. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes a data processing module that executes a workflow associated with a potential issue based on sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes an AI module that trains machine-learned models to make predictions or classifications related to sensor data captured by a sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes a notification module that issues notifications to users when an issue is detected in an industrial setting based on collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes an analytics module that performs analytics tasks on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes a control module that provides commands to a device or system in an industrial setting to take remedial action in response to a particular issue being detected. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes a dashboard module that presents a dashboard to a human user that provides the human user with raw sensor data, analytical data, and/or predictions or classifications based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a backend system that includes a dashboard module that presents a dashboard to a human user that provides a graphical user interface that allows the user to configure the sensor kit system. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a sensor kit and a backend system that updates a distributed ledger based on sensor data provided by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a sensor kit and a backend system that updates a smart contract defining a condition that may trigger an action based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a distributed ledger that is at least partially shared with a regulatory body to provide information related to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having sensor kit and a backend system that updates a smart contract, wherein the smart contract verifies one or more conditions put forth by a regulatory body with respect to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security including a gateway device that is configured to receive sensor kit packets from the edge device via a wired communication link and transmit the sensor kit packets to the backend system via the public network on behalf of the edge device and having a sensor, an edge device, and a gateway device that communicates with a communication network on behalf of the sensor kit.

In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having the edge device further includes one or more storage devices that store a sensor data store that stores instances of sensor data captured by the plurality of sensors of the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having the self-configuring sensor kit network is a star network such that each sensor of the plurality of sensors transmits respective instances of sensor data with the edge device directly using a short-range communication protocol. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors in a self-configuring network and an edge device that performs one or more backend operations on sensor data obtained from the sensor. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that stores multiple models and performs AI-related tasks based on sensor data obtained from the sensor using an appropriate model. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that compresses sensor data collected by the sensor using a media codec. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a sensor kit and a backend system configured to receive sensor data collected by the sensor kit and perform one or more backend operations on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that are configured to monitor an indoor agricultural setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that are configured to monitor a natural resource extraction setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that are configured to monitor a pipeline setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that are configured to monitor a manufacturing facility. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that are configured to monitor an underwater industrial setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a sensor kit that collects sensor data and a backend system that receives the sensor data from the sensor kits and updates a distributed ledger based on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors and an edge device that is configured to add new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensors, an edge device, and a gateway device that communicates with a communication network on behalf of the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having an edge device that includes a data processing module that deduplicates, filters, flags, and/or aggregates sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having an edge device that includes an encoding module that encodes, compresses, and/or encrypts sensor data according to one or more media codecs. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having an edge device that includes a quick-decision AI module that uses machine-learned models to generate predictions related to and/or classifications of industrial components based on features of collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having an edge device that includes a notification module that provides notifications and/or alarms to users based on sensor data and/or rules applied to the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having an edge device that includes a configuration module that configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having an edge device that includes a distributed ledger module configured to update a distributed ledger with sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes a decoding module that decrypts, decodes, and/or decompresses encoded sensor kit packets. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes a data processing module that executes a workflow associated with a potential issue based on sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes an AI module that trains machine-learned models to make predictions or classifications related to sensor data captured by a sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes a notification module that issues notifications to users when an issue is detected in an industrial setting based on collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes an analytics module that performs analytics tasks on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes a control module that provides commands to a device or system in an industrial setting to take remedial action in response to a particular issue being detected. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes a dashboard module that presents a dashboard to a human user that provides the human user with raw sensor data, analytical data, and/or predictions or classifications based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a backend system that includes a dashboard module that presents a dashboard to a human user that provides a graphical user interface that allows the user to configure the sensor kit system. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a sensor kit and a backend system that updates a distributed ledger based on sensor data provided by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a sensor kit and a backend system that updates a smart contract defining a condition that may trigger an action based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a distributed ledger that is at least partially shared with a regulatory body to provide information related to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having sensor kit and a backend system that updates a smart contract, wherein the smart contract verifies one or more conditions put forth by a regulatory body with respect to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the second communication device of the edge device is a satellite terminal device that is configured to transmit the sensor kit packets to a satellite that routes the sensor kits to the public network and having a sensor, an edge device, and a gateway device that communicates with a communication network on behalf of the sensor kit.

In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having the self-configuring sensor kit network is a star network such that each sensor of the plurality of sensors transmits respective instances of sensor data with the edge device directly using a short-range communication protocol. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors in a self-configuring network and an edge device that performs one or more backend operations on sensor data obtained from the sensor. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that stores multiple models and performs AI-related tasks based on sensor data obtained from the sensor using an appropriate model. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that compresses sensor data collected by the sensor using a media codec. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a sensor kit and a backend system configured to receive sensor data collected by the sensor kit and perform one or more backend operations on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that are configured to monitor an indoor agricultural setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that are configured to monitor a natural resource extraction setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that are configured to monitor a pipeline setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that are configured to monitor a manufacturing facility. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that are configured to monitor an underwater industrial setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a sensor kit that collects sensor data and a backend system that receives the sensor data from the sensor kits and updates a distributed ledger based on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors and an edge device that is configured to add new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensors, an edge device, and a gateway device that communicates with a communication network on behalf of the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having an edge device that includes a data processing module that deduplicates, filters, flags, and/or aggregates sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having an edge device that includes an encoding module that encodes, compresses, and/or encrypts sensor data according to one or more media codecs. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having an edge device that includes a quick-decision AI module that uses machine-learned models to generate predictions related to and/or classifications of industrial components based on features of collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having an edge device that includes a notification module that provides notifications and/or alarms to users based on sensor data and/or rules applied to the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having an edge device that includes a configuration module that configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having an edge device that includes a distributed ledger module configured to update a distributed ledger with sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes a decoding module that decrypts, decodes, and/or decompresses encoded sensor kit packets. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes a data processing module that executes a workflow associated with a potential issue based on sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes an AI module that trains machine-learned models to make predictions or classifications related to sensor data captured by a sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes a notification module that issues notifications to users when an issue is detected in an industrial setting based on collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes an analytics module that performs analytics tasks on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes a control module that provides commands to a device or system in an industrial setting to take remedial action in response to a particular issue being detected. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes a dashboard module that presents a dashboard to a human user that provides the human user with raw sensor data, analytical data, and/or predictions or classifications based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a backend system that includes a dashboard module that presents a dashboard to a human user that provides a graphical user interface that allows the user to configure the sensor kit system. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a sensor kit and a backend system that updates a distributed ledger based on sensor data provided by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a sensor kit and a backend system that updates a smart contract defining a condition that may trigger an action based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a distributed ledger that is at least partially shared with a regulatory body to provide information related to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having sensor kit and a backend system that updates a smart contract, wherein the smart contract verifies one or more conditions put forth by a regulatory body with respect to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the edge device further includes one or more storage devices that store a sensor data store that stores instances of sensor data captured by the plurality of sensors of the sensor kit and having a sensor, an edge device, and a gateway device that communicates with a communication network on behalf of the sensor kit.

In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors in a self-configuring network and an edge device that performs one or more backend operations on sensor data obtained from the sensor. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that stores multiple models and performs AI-related tasks based on sensor data obtained from the sensor using an appropriate model. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that compresses sensor data collected by the sensor using a media codec. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a sensor kit and a backend system configured to receive sensor data collected by the sensor kit and perform one or more backend operations on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that are configured to monitor an indoor agricultural setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that are configured to monitor a natural resource extraction setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that are configured to monitor a pipeline setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that are configured to monitor a manufacturing facility. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that are configured to monitor an underwater industrial setting. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a sensor kit that collects sensor data and a backend system that receives the sensor data from the sensor kits and updates a distributed ledger based on the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors and an edge device that is configured to add new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensors, an edge device, and a gateway device that communicates with a communication network on behalf of the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having an edge device that includes a data processing module that deduplicates, filters, flags, and/or aggregates sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having an edge device that includes an encoding module that encodes, compresses, and/or encrypts sensor data according to one or more media codecs. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having an edge device that includes a quick-decision AI module that uses machine-learned models to generate predictions related to and/or classifications of industrial components based on features of collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having an edge device that includes a notification module that provides notifications and/or alarms to users based on sensor data and/or rules applied to the sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having an edge device that includes a configuration module that configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having an edge device that includes a distributed ledger module configured to update a distributed ledger with sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes a decoding module that decrypts, decodes, and/or decompresses encoded sensor kit packets. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes a data processing module that executes a workflow associated with a potential issue based on sensor data captured by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes an AI module that trains machine-learned models to make predictions or classifications related to sensor data captured by a sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes a notification module that issues notifications to users when an issue is detected in an industrial setting based on collected sensor data. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes an analytics module that performs analytics tasks on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes a control module that provides commands to a device or system in an industrial setting to take remedial action in response to a particular issue being detected. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes a dashboard module that presents a dashboard to a human user that provides the human user with raw sensor data, analytical data, and/or predictions or classifications based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a backend system that includes a dashboard module that presents a dashboard to a human user that provides a graphical user interface that allows the user to configure the sensor kit system. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a sensor kit and a backend system that updates a distributed ledger based on sensor data provided by the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a sensor kit and a backend system that updates a smart contract defining a condition that may trigger an action based on sensor data received from the sensor kit. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a distributed ledger that is at least partially shared with a regulatory body to provide information related to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having sensor kit and a backend system that updates a smart contract, wherein the smart contract verifies one or more conditions put forth by a regulatory body with respect to compliance with a regulation or regulatory action. In embodiments, provided herein are methods and systems for monitoring industrial settings, including through a variety of kits that provide out-of-the-box, self-configuring and automatically provisioned capabilities for monitoring industrial settings while mitigating issues of complexity, integration, bandwidth, latency and security having the self-configuring sensor kit network is a star network such that each sensor of the plurality of sensors transmits respective instances of sensor data with the edge device directly using a short-range communication protocol and having a sensor, an edge device, and a gateway device that communicates with a communication network on behalf of the sensor kit.

In embodiments, provided herein is a sensor kit having sensors in a self-configuring network and an edge device that performs one or more backend operations on sensor data obtained from the sensor. In embodiments, provided herein is a sensor kit having sensors in a self-configuring network and an edge device that performs one or more backend operations on sensor data obtained from the sensor and having sensors and an edge device that stores multiple models and performs AI-related tasks based on sensor data obtained from the sensor using an appropriate model. In embodiments, provided herein is a sensor kit having sensors in a self-configuring network and an edge device that performs one or more backend operations on sensor data obtained from the sensor and having sensors and an edge device that compresses sensor data collected by the sensor using a media codec. In embodiments, provided herein is a sensor kit having sensors in a self-configuring network and an edge device that performs one or more backend operations on sensor data obtained from the sensor and having a sensor kit and a backend system configured to receive sensor data collected by the sensor kit and perform one or more backend operations on the sensor data. In embodiments, provided herein is a sensor kit having sensors in a self-configuring network and an edge device that performs one or more backend operations on sensor data obtained from the sensor and having sensors and an edge device that are configured to monitor an indoor agricultural setting. In embodiments, provided herein is a sensor kit having sensors in a self-configuring network and an edge device that performs one or more backend operations on sensor data obtained from the sensor and having sensors and an edge device that are configured to monitor a natural resource extraction setting. In embodiments, provided herein is a sensor kit having sensors in a self-configuring network and an edge device that performs one or more backend operations on sensor data obtained from the sensor and having sensors and an edge device that are configured to monitor a pipeline setting. In embodiments, provided herein is a sensor kit having sensors in a self-configuring network and an edge device that performs one or more backend operations on sensor data obtained from the sensor and having sensors and an edge device that are configured to monitor a manufacturing facility. In embodiments, provided herein is a sensor kit having sensors in a self-configuring network and an edge device that performs one or more backend operations on sensor data obtained from the sensor and having sensors and an edge device that are configured to monitor an underwater industrial setting. In embodiments, provided herein is a sensor kit having sensors in a self-configuring network and an edge device that performs one or more backend operations on sensor data obtained from the sensor and having a sensor kit that collects sensor data and a backend system that receives the sensor data from the sensor kits and updates a distributed ledger based on the sensor data. In embodiments, provided herein is a sensor kit having sensors in a self-configuring network and an edge device that performs one or more backend operations on sensor data obtained from the sensor and having sensors and an edge device that is configured to add new sensors to the sensor kit. In embodiments, provided herein is a sensor kit having sensors in a self-configuring network and an edge device that performs one or more backend operations on sensor data obtained from the sensor and having sensors, an edge device, and a gateway device that communicates with a communication network on behalf of the sensor kit. In embodiments, provided herein is a sensor kit having sensors in a self-configuring network and an edge device that performs one or more backend operations on sensor data obtained from the sensor and having an edge device that includes a data processing module that deduplicates, filters, flags, and/or aggregates sensor data. In embodiments, provided herein is a sensor kit having sensors in a self-configuring network and an edge device that performs one or more backend operations on sensor data obtained from the sensor and having an edge device that includes an encoding module that encodes, compresses, and/or encrypts sensor data according to one or more media codecs. In embodiments, provided herein is a sensor kit having sensors in a self-configuring network and an edge device that performs one or more backend operations on sensor data obtained from the sensor and having an edge device that includes a quick-decision AI module that uses machine-learned models to generate predictions related to and/or classifications of industrial components based on features of collected sensor data. In embodiments, provided herein is a sensor kit having sensors in a self-configuring network and an edge device that performs one or more backend operations on sensor data obtained from the sensor and having an edge device that includes a notification module that provides notifications and/or alarms to users based on sensor data and/or rules applied to the sensor data. In embodiments, provided herein is a sensor kit having sensors in a self-configuring network and an edge device that performs one or more backend operations on sensor data obtained from the sensor and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors in a self-configuring network and an edge device that performs one or more backend operations on sensor data obtained from the sensor and having an edge device that includes a distributed ledger module configured to update a distributed ledger with sensor data captured by the sensor kit. In embodiments, provided herein is a sensor kit having sensors in a self-configuring network and an edge device that performs one or more backend operations on sensor data obtained from the sensor and having a backend system that includes a decoding module that decrypts, decodes, and/or decompresses encoded sensor kit packets. In embodiments, provided herein is a sensor kit having sensors in a self-configuring network and an edge device that performs one or more backend operations on sensor data obtained from the sensor and having a backend system that includes a data processing module that executes a workflow associated with a potential issue based on sensor data captured by the sensor kit. In embodiments, provided herein is a sensor kit having sensors in a self-configuring network and an edge device that performs one or more backend operations on sensor data obtained from the sensor and having a backend system that includes an AI module that trains machine-learned models to make predictions or classifications related to sensor data captured by a sensor kit. In embodiments, provided herein is a sensor kit having sensors in a self-configuring network and an edge device that performs one or more backend operations on sensor data obtained from the sensor and having a backend system that includes a notification module that issues notifications to users when an issue is detected in an industrial setting based on collected sensor data. In embodiments, provided herein is a sensor kit having sensors in a self-configuring network and an edge device that performs one or more backend operations on sensor data obtained from the sensor and having a backend system that includes an analytics module that performs analytics tasks on sensor data received from the sensor kit. In embodiments, provided herein is a sensor kit having sensors in a self-configuring network and an edge device that performs one or more backend operations on sensor data obtained from the sensor and having a backend system that includes a control module that provides commands to a device or system in an industrial setting to take remedial action in response to a particular issue being detected. In embodiments, provided herein is a sensor kit having sensors in a self-configuring network and an edge device that performs one or more backend operations on sensor data obtained from the sensor and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors in a self-configuring network and an edge device that performs one or more backend operations on sensor data obtained from the sensor and having a backend system that includes a dashboard module that presents a dashboard to a human user that provides a graphical user interface that allows the user to configure the sensor kit system. In embodiments, provided herein is a sensor kit having sensors in a self-configuring network and an edge device that performs one or more backend operations on sensor data obtained from the sensor and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors in a self-configuring network and an edge device that performs one or more backend operations on sensor data obtained from the sensor and having a sensor kit and a backend system that updates a distributed ledger based on sensor data provided by the sensor kit. In embodiments, provided herein is a sensor kit having sensors in a self-configuring network and an edge device that performs one or more backend operations on sensor data obtained from the sensor and having a sensor kit and a backend system that updates a smart contract defining a condition that may trigger an action based on sensor data received from the sensor kit. In embodiments, provided herein is a sensor kit having sensors in a self-configuring network and an edge device that performs one or more backend operations on sensor data obtained from the sensor and having a distributed ledger that is at least partially shared with a regulatory body to provide information related to compliance with a regulation or regulatory action. In embodiments, provided herein is a sensor kit having sensors in a self-configuring network and an edge device that performs one or more backend operations on sensor data obtained from the sensor and having sensor kit and a backend system that updates a smart contract, wherein the smart contract verifies one or more conditions put forth by a regulatory body with respect to compliance with a regulation or regulatory action. In embodiments, provided herein is a sensor kit having sensors in a self-configuring network and an edge device that performs one or more backend operations on sensor data obtained from the sensor and having a sensor, an edge device, and a gateway device that communicates with a communication network on behalf of the sensor kit.

In embodiments, provided herein is a sensor kit having sensors and an edge device that stores multiple models and performs AI-related tasks based on sensor data obtained from the sensor using an appropriate model. In embodiments, provided herein is a sensor kit having sensors and an edge device that stores multiple models and performs AI-related tasks based on sensor data obtained from the sensor using an appropriate model and having sensors and an edge device that compresses sensor data collected by the sensor using a media codec. In embodiments, provided herein is a sensor kit having sensors and an edge device that stores multiple models and performs AI-related tasks based on sensor data obtained from the sensor using an appropriate model and having a sensor kit and a backend system configured to receive sensor data collected by the sensor kit and perform one or more backend operations on the sensor data. In embodiments, provided herein is a sensor kit having sensors and an edge device that stores multiple models and performs AI-related tasks based on sensor data obtained from the sensor using an appropriate model and having sensors and an edge device that are configured to monitor an indoor agricultural setting. In embodiments, provided herein is a sensor kit having sensors and an edge device that stores multiple models and performs AI-related tasks based on sensor data obtained from the sensor using an appropriate model and having sensors and an edge device that are configured to monitor a natural resource extraction setting. In embodiments, provided herein is a sensor kit having sensors and an edge device that stores multiple models and performs AI-related tasks based on sensor data obtained from the sensor using an appropriate model and having sensors and an edge device that are configured to monitor a pipeline setting. In embodiments, provided herein is a sensor kit having sensors and an edge device that stores multiple models and performs AI-related tasks based on sensor data obtained from the sensor using an appropriate model and having sensors and an edge device that are configured to monitor a manufacturing facility. In embodiments, provided herein is a sensor kit having sensors and an edge device that stores multiple models and performs AI-related tasks based on sensor data obtained from the sensor using an appropriate model and having sensors and an edge device that are configured to monitor an underwater industrial setting. In embodiments, provided herein is a sensor kit having sensors and an edge device that stores multiple models and performs AI-related tasks based on sensor data obtained from the sensor using an appropriate model and having a sensor kit that collects sensor data and a backend system that receives the sensor data from the sensor kits and updates a distributed ledger based on the sensor data. In embodiments, provided herein is a sensor kit having sensors and an edge device that stores multiple models and performs AI-related tasks based on sensor data obtained from the sensor using an appropriate model and having sensors and an edge device that is configured to add new sensors to the sensor kit. In embodiments, provided herein is a sensor kit having sensors and an edge device that stores multiple models and performs AI-related tasks based on sensor data obtained from the sensor using an appropriate model and having sensors, an edge device, and a gateway device that communicates with a communication network on behalf of the sensor kit. In embodiments, provided herein is a sensor kit having sensors and an edge device that stores multiple models and performs AI-related tasks based on sensor data obtained from the sensor using an appropriate model and having an edge device that includes a data processing module that deduplicates, filters, flags, and/or aggregates sensor data. In embodiments, provided herein is a sensor kit having sensors and an edge device that stores multiple models and performs AI-related tasks based on sensor data obtained from the sensor using an appropriate model and having an edge device that includes an encoding module that encodes, compresses, and/or encrypts sensor data according to one or more media codecs. In embodiments, provided herein is a sensor kit having sensors and an edge device that stores multiple models and performs AI-related tasks based on sensor data obtained from the sensor using an appropriate model and having an edge device that includes a quick-decision AI module that uses machine-learned models to generate predictions related to and/or classifications of industrial components based on features of collected sensor data. In embodiments, provided herein is a sensor kit having sensors and an edge device that stores multiple models and performs AI-related tasks based on sensor data obtained from the sensor using an appropriate model and having an edge device that includes a notification module that provides notifications and/or alarms to users based on sensor data and/or rules applied to the sensor data. In embodiments, provided herein is a sensor kit having sensors and an edge device that stores multiple models and performs AI-related tasks based on sensor data obtained from the sensor using an appropriate model and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that stores multiple models and performs AI-related tasks based on sensor data obtained from the sensor using an appropriate model and having an edge device that includes a distributed ledger module configured to update a distributed ledger with sensor data captured by the sensor kit. In embodiments, provided herein is a sensor kit having sensors and an edge device that stores multiple models and performs AI-related tasks based on sensor data obtained from the sensor using an appropriate model and having a backend system that includes a decoding module that decrypts, decodes, and/or decompresses encoded sensor kit packets. In embodiments, provided herein is a sensor kit having sensors and an edge device that stores multiple models and performs AI-related tasks based on sensor data obtained from the sensor using an appropriate model and having a backend system that includes a data processing module that executes a workflow associated with a potential issue based on sensor data captured by the sensor kit. In embodiments, provided herein is a sensor kit having sensors and an edge device that stores multiple models and performs AI-related tasks based on sensor data obtained from the sensor using an appropriate model and having a backend system that includes an AI module that trains machine-learned models to make predictions or classifications related to sensor data captured by a sensor kit. In embodiments, provided herein is a sensor kit having sensors and an edge device that stores multiple models and performs AI-related tasks based on sensor data obtained from the sensor using an appropriate model and having a backend system that includes a notification module that issues notifications to users when an issue is detected in an industrial setting based on collected sensor data. In embodiments, provided herein is a sensor kit having sensors and an edge device that stores multiple models and performs AI-related tasks based on sensor data obtained from the sensor using an appropriate model and having a backend system that includes an analytics module that performs analytics tasks on sensor data received from the sensor kit. In embodiments, provided herein is a sensor kit having sensors and an edge device that stores multiple models and performs AI-related tasks based on sensor data obtained from the sensor using an appropriate model and having a backend system that includes a control module that provides commands to a device or system in an industrial setting to take remedial action in response to a particular issue being detected. In embodiments, provided herein is a sensor kit having sensors and an edge device that stores multiple models and performs AI-related tasks based on sensor data obtained from the sensor using an appropriate model and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that stores multiple models and performs AI-related tasks based on sensor data obtained from the sensor using an appropriate model and having a backend system that includes a dashboard module that presents a dashboard to a human user that provides a graphical user interface that allows the user to configure the sensor kit system. In embodiments, provided herein is a sensor kit having sensors and an edge device that stores multiple models and performs AI-related tasks based on sensor data obtained from the sensor using an appropriate model and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that stores multiple models and performs AI-related tasks based on sensor data obtained from the sensor using an appropriate model and having a sensor kit and a backend system that updates a distributed ledger based on sensor data provided by the sensor kit. In embodiments, provided herein is a sensor kit having sensors and an edge device that stores multiple models and performs AI-related tasks based on sensor data obtained from the sensor using an appropriate model and having a sensor kit and a backend system that updates a smart contract defining a condition that may trigger an action based on sensor data received from the sensor kit. In embodiments, provided herein is a sensor kit having sensors and an edge device that stores multiple models and performs AI-related tasks based on sensor data obtained from the sensor using an appropriate model and having a distributed ledger that is at least partially shared with a regulatory body to provide information related to compliance with a regulation or regulatory action. In embodiments, provided herein is a sensor kit having sensors and an edge device that stores multiple models and performs AI-related tasks based on sensor data obtained from the sensor using an appropriate model and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that stores multiple models and performs AI-related tasks based on sensor data obtained from the sensor using an appropriate model and having a sensor, an edge device, and a gateway device that communicates with a communication network on behalf of the sensor kit.

In embodiments, provided herein is a sensor kit having sensors and an edge device that compresses sensor data collected by the sensor using a media codec. In embodiments, provided herein is a sensor kit having sensors and an edge device that compresses sensor data collected by the sensor using a media codec and having a sensor kit and a backend system configured to receive sensor data collected by the sensor kit and perform one or more backend operations on the sensor data. In embodiments, provided herein is a sensor kit having sensors and an edge device that compresses sensor data collected by the sensor using a media codec and having sensors and an edge device that are configured to monitor an indoor agricultural setting. In embodiments, provided herein is a sensor kit having sensors and an edge device that compresses sensor data collected by the sensor using a media codec and having sensors and an edge device that are configured to monitor a natural resource extraction setting. In embodiments, provided herein is a sensor kit having sensors and an edge device that compresses sensor data collected by the sensor using a media codec and having an edge device that are configured to monitor a pipeline setting. In embodiments, provided herein is a sensor kit having sensors and an edge device that compresses sensor data collected by the sensor using a media codec and having sensors and an edge device that are configured to monitor a manufacturing facility. In embodiments, provided herein is a sensor kit having sensors and an edge device that compresses sensor data collected by the sensor using a media codec and having sensors and an edge device that are configured to monitor an underwater industrial setting. In embodiments, provided herein is a sensor kit having sensors and an edge device that compresses sensor data collected by the sensor using a media codec and having a sensor kit that collects sensor data and a backend system that receives the sensor data from the sensor kits and updates a distributed ledger based on the sensor data. In embodiments, provided herein is a sensor kit having sensors and an edge device that compresses sensor data collected by the sensor using a media codec and having sensors and an edge device that is configured to add new sensors to the sensor kit. In embodiments, provided herein is a sensor kit having sensors and an edge device that compresses sensor data collected by the sensor using a media codec and having sensors, an edge device, and a gateway device that communicates with a communication network on behalf of the sensor kit. In embodiments, provided herein is a sensor kit having sensors and an edge device that compresses sensor data collected by the sensor using a media codec and having an edge device that includes a data processing module that deduplicates, filters, flags, and/or aggregates sensor data. In embodiments, provided herein is a sensor kit having sensors and an edge device that compresses sensor data collected by the sensor using a media codec and having an edge device that includes an encoding module that encodes, compresses, and/or encrypts sensor data according to one or more media codecs. In embodiments, provided herein is a sensor kit having sensors and an edge device that compresses sensor data collected by the sensor using a media codec and having an edge device that includes a quick-decision AI module that uses machine-learned models to generate predictions related to and/or classifications of industrial components based on features of collected sensor data. In embodiments, provided herein is a sensor kit having sensors and an edge device that compresses sensor data collected by the sensor using a media codec and having an edge device that includes a notification module that provides notifications and/or alarms to users based on sensor data and/or rules applied to the sensor data. In embodiments, provided herein is a sensor kit having sensors and an edge device that compresses sensor data collected by the sensor using a media codec and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that compresses sensor data collected by the sensor using a media codec and having an edge device that includes a distributed ledger module configured to update a distributed ledger with sensor data captured by the sensor kit. In embodiments, provided herein is a sensor kit having sensors and an edge device that compresses sensor data collected by the sensor using a media codec and having a backend system that includes a decoding module that decrypts, decodes, and/or decompresses encoded sensor kit packets. In embodiments, provided herein is a sensor kit having sensors and an edge device that compresses sensor data collected by the sensor using a media codec and having a backend system that includes a data processing module that executes a workflow associated with a potential issue based on sensor data captured by the sensor kit. In embodiments, provided herein is a sensor kit having sensors and an edge device that compresses sensor data collected by the sensor using a media codec and having a backend system that includes an AI module that trains machine-learned models to make predictions or classifications related to sensor data captured by a sensor kit. In embodiments, provided herein is a sensor kit having sensors and an edge device that compresses sensor data collected by the sensor using a media codec and having a backend system that includes a notification module that issues notifications to users when an issue is detected in an industrial setting based on collected sensor data. In embodiments, provided herein is a sensor kit having sensors and an edge device that compresses sensor data collected by the sensor using a media codec and having a backend system that includes an analytics module that performs analytics tasks on sensor data received from the sensor kit. In embodiments, provided herein is a sensor kit having sensors and an edge device that compresses sensor data collected by the sensor using a media codec and having a backend system that includes a control module that provides commands to a device or system in an industrial setting to take remedial action in response to a particular issue being detected. In embodiments, provided herein is a sensor kit having sensors and an edge device that compresses sensor data collected by the sensor using a media codec and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that compresses sensor data collected by the sensor using a media codec and having a backend system that includes a dashboard module that presents a dashboard to a human user that provides a graphical user interface that allows the user to configure the sensor kit system. In embodiments, provided herein is a sensor kit having sensors and an edge device that compresses sensor data collected by the sensor using a media codec and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that compresses sensor data collected by the sensor using a media codec and having a sensor kit and a backend system that updates a distributed ledger based on sensor data provided by the sensor kit. In embodiments, provided herein is a sensor kit having sensors and an edge device that compresses sensor data collected by the sensor using a media codec and having a sensor kit and a backend system that updates a smart contract defining a condition that may trigger an action based on sensor data received from the sensor kit. In embodiments, provided herein is a sensor kit having sensors and an edge device that compresses sensor data collected by the sensor using a media codec and having a distributed ledger that is at least partially shared with a regulatory body to provide information related to compliance with a regulation or regulatory action. In embodiments, provided herein is a sensor kit having sensors and an edge device that compresses sensor data collected by the sensor using a media codec and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that compresses sensor data collected by the sensor using a media codec and having a sensor, an edge device, and a gateway device that communicates with a communication network on behalf of the sensor kit.

In embodiments, provided herein is a sensor kit system having a sensor kit and a backend system configured to receive sensor data collected by the sensor kit and perform one or more backend operations on the sensor data. In embodiments, provided herein is a sensor kit system having a sensor kit and a backend system configured to receive sensor data collected by the sensor kit and perform one or more backend operations on the sensor data and having sensors and an edge device that are configured to monitor an indoor agricultural setting. In embodiments, provided herein is a sensor kit system having a sensor kit and a backend system configured to receive sensor data collected by the sensor kit and perform one or more backend operations on the sensor data and having sensors and an edge device that are configured to monitor a natural resource extraction setting. In embodiments, provided herein is a sensor kit system having a sensor kit and a backend system configured to receive sensor data collected by the sensor kit and perform one or more backend operations on the sensor data and having sensors and an edge device that are configured to monitor a pipeline setting. In embodiments, provided herein is a sensor kit system having a sensor kit and a backend system configured to receive sensor data collected by the sensor kit and perform one or more backend operations on the sensor data and having sensors and an edge device that are configured to monitor a manufacturing facility. In embodiments, provided herein is a sensor kit system having a sensor kit and a backend system configured to receive sensor data collected by the sensor kit and perform one or more backend operations on the sensor data and having sensors and an edge device that are configured to monitor an underwater industrial setting. In embodiments, provided herein is a sensor kit system having a sensor kit and a backend system configured to receive sensor data collected by the sensor kit and perform one or more backend operations on the sensor data and having a sensor kit that collects sensor data and a backend system that receives the sensor data from the sensor kits and updates a distributed ledger based on the sensor data. In embodiments, provided herein is a sensor kit system having a sensor kit and a backend system configured to receive sensor data collected by the sensor kit and perform one or more backend operations on the sensor data and having sensors and an edge device that is configured to add new sensors to the sensor kit. In embodiments, provided herein is a sensor kit system having a sensor kit and a backend system configured to receive sensor data collected by the sensor kit and perform one or more backend operations on the sensor data and having sensors, an edge device, and a gateway device that communicates with a communication network on behalf of the sensor kit. In embodiments, provided herein is a sensor kit system having a sensor kit and a backend system configured to receive sensor data collected by the sensor kit and perform one or more backend operations on the sensor data and having an edge device that includes a data processing module that deduplicates, filters, flags, and/or aggregates sensor data. In embodiments, provided herein is a sensor kit system having a sensor kit and a backend system configured to receive sensor data collected by the sensor kit and perform one or more backend operations on the sensor data and having an edge device that includes an encoding module that encodes, compresses, and/or encrypts sensor data according to one or more media codecs. In embodiments, provided herein is a sensor kit system having a sensor kit and a backend system configured to receive sensor data collected by the sensor kit and perform one or more backend operations on the sensor data and having an edge device that includes a quick-decision AI module that uses machine-learned models to generate predictions related to and/or classifications of industrial components based on features of collected sensor data. In embodiments, provided herein is a sensor kit system having a sensor kit and a backend system configured to receive sensor data collected by the sensor kit and perform one or more backend operations on the sensor data and having an edge device that includes a notification module that provides notifications and/or alarms to users based on sensor data and/or rules applied to the sensor data. In embodiments, provided herein is a sensor kit system having a sensor kit and a backend system configured to receive sensor data collected by the sensor kit and perform one or more backend operations on the sensor data and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit system having a sensor kit and a backend system configured to receive sensor data collected by the sensor kit and perform one or more backend operations on the sensor data and having an edge device that includes a distributed ledger module configured to update a distributed ledger with sensor data captured by the sensor kit. In embodiments, provided herein is a sensor kit system having a sensor kit and a backend system configured to receive sensor data collected by the sensor kit and perform one or more backend operations on the sensor data and having a backend system that includes a decoding module that decrypts, decodes, and/or decompresses encoded sensor kit packets. In embodiments, provided herein is a sensor kit system having a sensor kit and a backend system configured to receive sensor data collected by the sensor kit and perform one or more backend operations on the sensor data and having a backend system that includes a data processing module that executes a workflow associated with a potential issue based on sensor data captured by the sensor kit. In embodiments, provided herein is a sensor kit system having a sensor kit and a backend system configured to receive sensor data collected by the sensor kit and perform one or more backend operations on the sensor data and having a backend system that includes an AI module that trains machine-learned models to make predictions or classifications related to sensor data captured by a sensor kit. In embodiments, provided herein is a sensor kit system having a sensor kit and a backend system configured to receive sensor data collected by the sensor kit and perform one or more backend operations on the sensor data and having a backend system that includes a notification module that issues notifications to users when an issue is detected in an industrial setting based on collected sensor data. In embodiments, provided herein is a sensor kit system having a sensor kit and a backend system configured to receive sensor data collected by the sensor kit and perform one or more backend operations on the sensor data and having a backend system that includes an analytics module that performs analytics tasks on sensor data received from the sensor kit. In embodiments, provided herein is a sensor kit system having a sensor kit and a backend system configured to receive sensor data collected by the sensor kit and perform one or more backend operations on the sensor data and having a backend system that includes a control module that provides commands to a device or system in an industrial setting to take remedial action in response to a particular issue being detected. In embodiments, provided herein is a sensor kit system having a sensor kit and a backend system configured to receive sensor data collected by the sensor kit and perform one or more backend operations on the sensor data and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a sensor kit and a backend system configured to receive sensor data collected by the sensor kit and perform one or more backend operations on the sensor data and having a backend system that includes a dashboard module that presents a dashboard to a human user that provides a graphical user interface that allows the user to configure the sensor kit system. In embodiments, provided herein is a sensor kit system having a sensor kit and a backend system configured to receive sensor data collected by the sensor kit and perform one or more backend operations on the sensor data and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a sensor kit and a backend system configured to receive sensor data collected by the sensor kit and perform one or more backend operations on the sensor data and having a sensor kit and a backend system that updates a distributed ledger based on sensor data provided by the sensor kit. In embodiments, provided herein is a sensor kit system having a sensor kit and a backend system configured to receive sensor data collected by the sensor kit and perform one or more backend operations on the sensor data and having a sensor kit and a backend system that updates a smart contract defining a condition that may trigger an action based on sensor data received from the sensor kit. In embodiments, provided herein is a sensor kit system having a sensor kit and a backend system configured to receive sensor data collected by the sensor kit and perform one or more backend operations on the sensor data and having a distributed ledger that is at least partially shared with a regulatory body to provide information related to compliance with a regulation or regulatory action. In embodiments, provided herein is a sensor kit system having a sensor kit and a backend system configured to receive sensor data collected by the sensor kit and perform one or more backend operations on the sensor data and having sensor kit and a backend system that updates a smart contract, wherein the smart contract verifies one or more conditions put forth by a regulatory body with respect to compliance with a regulation or regulatory action. In embodiments, provided herein is a sensor kit system having a sensor kit and a backend system configured to receive sensor data collected by the sensor kit and perform one or more backend operations on the sensor data and having a sensor, an edge device, and a gateway device that communicates with a communication network on behalf of the sensor kit.

In embodiments, provided herein is a sensor kit having sensors and an edge device that are configured to monitor an indoor agricultural setting. In embodiments, provided herein is a sensor kit having sensors and an edge device that are configured to monitor an indoor agricultural setting and having sensors and an edge device that are configured to monitor a natural resource extraction setting. In embodiments, provided herein is a sensor kit having sensors and an edge device that are configured to monitor an indoor agricultural setting and having sensors and an edge device that are configured to monitor a pipeline setting. In embodiments, provided herein is a sensor kit having sensors and an edge device that are configured to monitor an indoor agricultural setting and having sensors and an edge device that are configured to monitor a manufacturing facility. In embodiments, provided herein is a sensor kit having sensors and an edge device that are configured to monitor an indoor agricultural setting and having sensors and an edge device that are configured to monitor an underwater industrial setting. In embodiments, provided herein is a sensor kit having sensors and an edge device that are configured to monitor an indoor agricultural setting and having a sensor kit that collects sensor data and a backend system that receives the sensor data from the sensor kits and updates a distributed ledger based on the sensor data. In embodiments, provided herein is a sensor kit having sensors and an edge device that are configured to monitor an indoor agricultural setting and having sensors and an edge device that is configured to add new sensors to the sensor kit. In embodiments, provided herein is a sensor kit having sensors and an edge device that are configured to monitor an indoor agricultural setting and having sensors, an edge device, and a gateway device that communicates with a communication network on behalf of the sensor kit. In embodiments, provided herein is a sensor kit having sensors and an edge device that are configured to monitor an indoor agricultural setting and having an edge device that includes a data processing module that deduplicates, filters, flags, and/or aggregates sensor data. In embodiments, provided herein is a sensor kit having sensors and an edge device that are configured to monitor an indoor agricultural setting and having an edge device that includes an encoding module that encodes, compresses, and/or encrypts sensor data according to one or more media codecs. In embodiments, provided herein is a sensor kit having sensors and an edge device that are configured to monitor an indoor agricultural setting and having an edge device that includes a quick-decision AI module that uses machine-learned models to generate predictions related to and/or classifications of industrial components based on features of collected sensor data. In embodiments, provided herein is a sensor kit having sensors and an edge device that are configured to monitor an indoor agricultural setting and having an edge device that includes a notification module that provides notifications and/or alarms to users based on sensor data and/or rules applied to the sensor data. In embodiments, provided herein is a sensor kit having sensors and an edge device that are configured to monitor an indoor agricultural setting and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor an indoor agricultural setting and having an edge device that includes a distributed ledger module configured to update a distributed ledger with sensor data captured by the sensor kit. In embodiments, provided herein is a sensor kit having sensors and an edge device that are configured to monitor an indoor agricultural setting and having a backend system that includes a decoding module that decrypts, decodes, and/or decompresses encoded sensor kit packets. In embodiments, provided herein is a sensor kit having sensors and an edge device that are configured to monitor an indoor agricultural setting and having a backend system that includes a data processing module that executes a workflow associated with a potential issue based on sensor data captured by the sensor kit. In embodiments, provided herein is a sensor kit having sensors and an edge device that are configured to monitor an indoor agricultural setting and having a backend system that includes an AI module that trains machine-learned models to make predictions or classifications related to sensor data captured by a sensor kit. In embodiments, provided herein is a sensor kit having sensors and an edge device that are configured to monitor an indoor agricultural setting and having a backend system that includes a notification module that issues notifications to users when an issue is detected in an industrial setting based on collected sensor data. In embodiments, provided herein is a sensor kit having sensors and an edge device that are configured to monitor an indoor agricultural setting and having a backend system that includes an analytics module that performs analytics tasks on sensor data received from the sensor kit. In embodiments, provided herein is a sensor kit having sensors and an edge device that are configured to monitor an indoor agricultural setting and having a backend system that includes a control module that provides commands to a device or system in an industrial setting to take remedial action in response to a particular issue being detected. In embodiments, provided herein is a sensor kit having sensors and an edge device that are configured to monitor an indoor agricultural setting and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that are configured to monitor an indoor agricultural setting and having a backend system that includes a dashboard module that presents a dashboard to a human user that provides a graphical user interface that allows the user to configure the sensor kit system. In embodiments, provided herein is a sensor kit having sensors and an edge device that are configured to monitor an indoor agricultural setting and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor an indoor agricultural setting and having a sensor kit and a backend system that updates a distributed ledger based on sensor data provided by the sensor kit. In embodiments, provided herein is a sensor kit having sensors and an edge device that are configured to monitor an indoor agricultural setting and having a sensor kit and a backend system that updates a smart contract defining a condition that may trigger an action based on sensor data received from the sensor kit. In embodiments, provided herein is a sensor kit having sensors and an edge device that are configured to monitor an indoor agricultural setting and having a distributed ledger that is at least partially shared with a regulatory body to provide information related to compliance with a regulation or regulatory action. In embodiments, provided herein is a sensor kit having sensors and an edge device that are configured to monitor an indoor agricultural setting and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that are configured to monitor an indoor agricultural setting and having a sensor, an edge device, and a gateway device that communicates with a communication network on behalf of the sensor kit.

In embodiments, provided herein is a sensor kit having sensors and an edge device that are configured to monitor a natural resource extraction setting. In embodiments, provided herein is a sensor kit having sensors and an edge device that are configured to monitor a natural resource extraction setting and having sensors and an edge device that are configured to monitor a pipeline setting. In embodiments, provided herein is a sensor kit having sensors and an edge device that are configured to monitor a natural resource extraction setting and having sensors and an edge device that are configured to monitor a manufacturing facility. In embodiments, provided herein is a sensor kit having sensors and an edge device that are configured to monitor a natural resource extraction setting and having sensors and an edge device that are configured to monitor an underwater industrial setting. In embodiments, provided herein is a sensor kit having sensors and an edge device that are configured to monitor a natural resource extraction setting and having a sensor kit that collects sensor data and a backend system that receives the sensor data from the sensor kits and updates a distributed ledger based on the sensor data. In embodiments, provided herein is a sensor kit having sensors and an edge device that are configured to monitor a natural resource extraction setting and having sensors and an edge device that is configured to add new sensors to the sensor kit. In embodiments, provided herein is a sensor kit having sensors and an edge device that are configured to monitor a natural resource extraction setting and having sensors, an edge device, and a gateway device that communicates with a communication network on behalf of the sensor kit. In embodiments, provided herein is a sensor kit having sensors and an edge device that are configured to monitor a natural resource extraction setting and having an edge device that includes a data processing module that deduplicates, filters, flags, and/or aggregates sensor data. In embodiments, provided herein is a sensor kit having sensors and an edge device that are configured to monitor a natural resource extraction setting and having an edge device that includes an encoding module that encodes, compresses, and/or encrypts sensor data according to one or more media codecs. In embodiments, provided herein is a sensor kit having sensors and an edge device that are configured to monitor a natural resource extraction setting and having an edge device that includes a quick-decision AI module that uses machine-learned models to generate predictions related to and/or classifications of industrial components based on features of collected sensor data. In embodiments, provided herein is a sensor kit having sensors and an edge device that are configured to monitor a natural resource extraction setting and having an edge device that includes a notification module that provides notifications and/or alarms to users based on sensor data and/or rules applied to the sensor data. In embodiments, provided herein is a sensor kit having sensors and an edge device that are configured to monitor a natural resource extraction setting and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor a natural resource extraction setting and having an edge device that includes a distributed ledger module configured to update a distributed ledger with sensor data captured by the sensor kit. In embodiments, provided herein is a sensor kit having sensors and an edge device that are configured to monitor a natural resource extraction setting and having a backend system that includes a decoding module that decrypts, decodes, and/or decompresses encoded sensor kit packets. In embodiments, provided herein is a sensor kit having sensors and an edge device that are configured to monitor a natural resource extraction setting and having a backend system that includes a data processing module that executes a workflow associated with a potential issue based on sensor data captured by the sensor kit. In embodiments, provided herein is a sensor kit having sensors and an edge device that are configured to monitor a natural resource extraction setting and having a backend system that includes an AI module that trains machine-learned models to make predictions or classifications related to sensor data captured by a sensor kit. In embodiments, provided herein is a sensor kit having sensors and an edge device that are configured to monitor a natural resource extraction setting and having a backend system that includes a notification module that issues notifications to users when an issue is detected in an industrial setting based on collected sensor data. In embodiments, provided herein is a sensor kit having sensors and an edge device that are configured to monitor a natural resource extraction setting and having a backend system that includes an analytics module that performs analytics tasks on sensor data received from the sensor kit. In embodiments, provided herein is a sensor kit having sensors and an edge device that are configured to monitor a natural resource extraction setting and having a backend system that includes a control module that provides commands to a device or system in an industrial setting to take remedial action in response to a particular issue being detected. In embodiments, provided herein is a sensor kit having sensors and an edge device that are configured to monitor a natural resource extraction setting and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that are configured to monitor a natural resource extraction setting and having a backend system that includes a dashboard module that presents a dashboard to a human user that provides a graphical user interface that allows the user to configure the sensor kit system. In embodiments, provided herein is a sensor kit having sensors and an edge device that are configured to monitor a natural resource extraction setting and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor a natural resource extraction setting and having a sensor kit and a backend system that updates a distributed ledger based on sensor data provided by the sensor kit. In embodiments, provided herein is a sensor kit having sensors and an edge device that are configured to monitor a natural resource extraction setting and having a sensor kit and a backend system that updates a smart contract defining a condition that may trigger an action based on sensor data received from the sensor kit. In embodiments, provided herein is a sensor kit having sensors and an edge device that are configured to monitor a natural resource extraction setting and having a distributed ledger that is at least partially shared with a regulatory body to provide information related to compliance with a regulation or regulatory action. In embodiments, provided herein is a sensor kit having sensors and an edge device that are configured to monitor a natural resource extraction setting and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that are configured to monitor a natural resource extraction setting and having a sensor, an edge device, and a gateway device that communicates with a communication network on behalf of the sensor kit.

In embodiments, provided herein is a sensor kit having sensors and an edge device that are configured to monitor a pipeline setting. In embodiments, provided herein is a sensor kit having sensors and an edge device that are configured to monitor a pipeline setting and having sensors and an edge device that are configured to monitor a manufacturing facility. In embodiments, provided herein is a sensor kit having sensors and an edge device that are configured to monitor a pipeline setting and having sensors and an edge device that are configured to monitor an underwater industrial setting. In embodiments, provided herein is a sensor kit having sensors and an edge device that are configured to monitor a pipeline setting and having a sensor kit that collects sensor data and a backend system that receives the sensor data from the sensor kits and updates a distributed ledger based on the sensor data. In embodiments, provided herein is a sensor kit having sensors and an edge device that are configured to monitor a pipeline setting and having sensors and an edge device that is configured to add new sensors to the sensor kit. In embodiments, provided herein is a sensor kit having sensors and an edge device that are configured to monitor a pipeline setting and having sensors, an edge device, and a gateway device that communicates with a communication network on behalf of the sensor kit. In embodiments, provided herein is a sensor kit having sensors and an edge device that are configured to monitor a pipeline setting and having an edge device that includes a data processing module that deduplicates, filters, flags, and/or aggregates sensor data. In embodiments, provided herein is a sensor kit having sensors and an edge device that are configured to monitor a pipeline setting and having an edge device that includes an encoding module that encodes, compresses, and/or encrypts sensor data according to one or more media codecs. In embodiments, provided herein is a sensor kit having sensors and an edge device that are configured to monitor a pipeline setting and having an edge device that includes a quick-decision AI module that uses machine-learned models to generate predictions related to and/or classifications of industrial components based on features of collected sensor data. In embodiments, provided herein is a sensor kit having sensors and an edge device that are configured to monitor a pipeline setting and having an edge device that includes a notification module that provides notifications and/or alarms to users based on sensor data and/or rules applied to the sensor data. In embodiments, provided herein is a sensor kit having sensors and an edge device that are configured to monitor a pipeline setting and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor a pipeline setting and having an edge device that includes a distributed ledger module configured to update a distributed ledger with sensor data captured by the sensor kit. In embodiments, provided herein is a sensor kit having sensors and an edge device that are configured to monitor a pipeline setting and having a backend system that includes a decoding module that decrypts, decodes, and/or decompresses encoded sensor kit packets. In embodiments, provided herein is a sensor kit having sensors and an edge device that are configured to monitor a pipeline setting and having a backend system that includes a data processing module that executes a workflow associated with a potential issue based on sensor data captured by the sensor kit. In embodiments, provided herein is a sensor kit having sensors and an edge device that are configured to monitor a pipeline setting and having a backend system that includes an AI module that trains machine-learned models to make predictions or classifications related to sensor data captured by a sensor kit. In embodiments, provided herein is a sensor kit having sensors and an edge device that are configured to monitor a pipeline setting and having a backend system that includes a notification module that issues notifications to users when an issue is detected in an industrial setting based on collected sensor data. In embodiments, provided herein is a sensor kit having sensors and an edge device that are configured to monitor a pipeline setting and having a backend system that includes an analytics module that performs analytics tasks on sensor data received from the sensor kit. In embodiments, provided herein is a sensor kit having sensors and an edge device that are configured to monitor a pipeline setting and having a backend system that includes a control module that provides commands to a device or system in an industrial setting to take remedial action in response to a particular issue being detected. In embodiments, provided herein is a sensor kit having sensors and an edge device that are configured to monitor a pipeline setting and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that are configured to monitor a pipeline setting and having a backend system that includes a dashboard module that presents a dashboard to a human user that provides a graphical user interface that allows the user to configure the sensor kit system. In embodiments, provided herein is a sensor kit having sensors and an edge device that are configured to monitor a pipeline setting and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor a pipeline setting and having a sensor kit and a backend system that updates a distributed ledger based on sensor data provided by the sensor kit. In embodiments, provided herein is a sensor kit having sensors and an edge device that are configured to monitor a pipeline setting and having a sensor kit and a backend system that updates a smart contract defining a condition that may trigger an action based on sensor data received from the sensor kit. In embodiments, provided herein is a sensor kit having sensors and an edge device that are configured to monitor a pipeline setting and having a distributed ledger that is at least partially shared with a regulatory body to provide information related to compliance with a regulation or regulatory action. In embodiments, provided herein is a sensor kit having sensors and an edge device that are configured to monitor a pipeline setting and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that are configured to monitor a pipeline setting and having a sensor, an edge device, and a gateway device that communicates with a communication network on behalf of the sensor kit.

In embodiments, provided herein is a sensor kit having sensors and an edge device that are configured to monitor a manufacturing facility. In embodiments, provided herein is a sensor kit having sensors and an edge device that are configured to monitor a manufacturing facility and having sensors and an edge device that are configured to monitor an underwater industrial setting. In embodiments, provided herein is a sensor kit having sensors and an edge device that are configured to monitor a manufacturing facility and having a sensor kit that collects sensor data and a backend system that receives the sensor data from the sensor kits and updates a distributed ledger based on the sensor data. In embodiments, provided herein is a sensor kit having sensors and an edge device that are configured to monitor a manufacturing facility and having sensors and an edge device that is configured to add new sensors to the sensor kit. In embodiments, provided herein is a sensor kit having sensors and an edge device that are configured to monitor a manufacturing facility and having sensors, an edge device, and a gateway device that communicates with a communication network on behalf of the sensor kit. In embodiments, provided herein is a sensor kit having sensors and an edge device that are configured to monitor a manufacturing facility and having an edge device that includes a data processing module that deduplicates, filters, flags, and/or aggregates sensor data. In embodiments, provided herein is a sensor kit having sensors and an edge device that are configured to monitor a manufacturing facility and having an edge device that includes an encoding module that encodes, compresses, and/or encrypts sensor data according to one or more media codecs. In embodiments, provided herein is a sensor kit having sensors and an edge device that are configured to monitor a manufacturing facility and having an edge device that includes a quick-decision AI module that uses machine-learned models to generate predictions related to and/or classifications of industrial components based on features of collected sensor data. In embodiments, provided herein is a sensor kit having sensors and an edge device that are configured to monitor a manufacturing facility and having an edge device that includes a notification module that provides notifications and/or alarms to users based on sensor data and/or rules applied to the sensor data. In embodiments, provided herein is a sensor kit having sensors and an edge device that are configured to monitor a manufacturing facility and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor a manufacturing facility and having an edge device that includes a distributed ledger module configured to update a distributed ledger with sensor data captured by the sensor kit. In embodiments, provided herein is a sensor kit having sensors and an edge device that are configured to monitor a manufacturing facility and having a backend system that includes a decoding module that decrypts, decodes, and/or decompresses encoded sensor kit packets. In embodiments, provided herein is a sensor kit having sensors and an edge device that are configured to monitor a manufacturing facility and having a backend system that includes a data processing module that executes a workflow associated with a potential issue based on sensor data captured by the sensor kit. In embodiments, provided herein is a sensor kit having sensors and an edge device that are configured to monitor a manufacturing facility and having a backend system that includes an AI module that trains machine-learned models to make predictions or classifications related to sensor data captured by a sensor kit. In embodiments, provided herein is a sensor kit having sensors and an edge device that are configured to monitor a manufacturing facility and having a backend system that includes a notification module that issues notifications to users when an issue is detected in an industrial setting based on collected sensor data. In embodiments, provided herein is a sensor kit having sensors and an edge device that are configured to monitor a manufacturing facility and having a backend system that includes an analytics module that performs analytics tasks on sensor data received from the sensor kit. In embodiments, provided herein is a sensor kit having sensors and an edge device that are configured to monitor a manufacturing facility and having a backend system that includes a control module that provides commands to a device or system in an industrial setting to take remedial action in response to a particular issue being detected. In embodiments, provided herein is a sensor kit having sensors and an edge device that are configured to monitor a manufacturing facility and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that are configured to monitor a manufacturing facility and having a backend system that includes a dashboard module that presents a dashboard to a human user that provides a graphical user interface that allows the user to configure the sensor kit system. In embodiments, provided herein is a sensor kit having sensors and an edge device that are configured to monitor a manufacturing facility and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor a manufacturing facility and having a sensor kit and a backend system that updates a distributed ledger based on sensor data provided by the sensor kit. In embodiments, provided herein is a sensor kit having sensors and an edge device that are configured to monitor a manufacturing facility and having a sensor kit and a backend system that updates a smart contract defining a condition that may trigger an action based on sensor data received from the sensor kit. In embodiments, provided herein is a sensor kit having sensors and an edge device that are configured to monitor a manufacturing facility and having a distributed ledger that is at least partially shared with a regulatory body to provide information related to compliance with a regulation or regulatory action. In embodiments, provided herein is a sensor kit having sensors and an edge device that are configured to monitor a manufacturing facility and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that are configured to monitor a manufacturing facility and having a sensor, an edge device, and a gateway device that communicates with a communication network on behalf of the sensor kit.

In embodiments, provided herein is a sensor kit having sensors and an edge device that are configured to monitor an underwater industrial setting. In embodiments, provided herein is a sensor kit having sensors and an edge device that are configured to monitor an underwater industrial setting and having a sensor kit that collects sensor data and a backend system that receives the sensor data from the sensor kits and updates a distributed ledger based on the sensor data. In embodiments, provided herein is a sensor kit having sensors and an edge device that are configured to monitor an underwater industrial setting and having sensors and an edge device that is configured to add new sensors to the sensor kit. In embodiments, provided herein is a sensor kit having sensors and an edge device that are configured to monitor an underwater industrial setting and having sensors, an edge device, and a gateway device that communicates with a communication network on behalf of the sensor kit. In embodiments, provided herein is a sensor kit having sensors and an edge device that are configured to monitor an underwater industrial setting and having an edge device that includes a data processing module that deduplicates, filters, flags, and/or aggregates sensor data. In embodiments, provided herein is a sensor kit having sensors and an edge device that are configured to monitor an underwater industrial setting and having an edge device that includes an encoding module that encodes, compresses, and/or encrypts sensor data according to one or more media codecs. In embodiments, provided herein is a sensor kit having sensors and an edge device that are configured to monitor an underwater industrial setting and having an edge device that includes a quick-decision AI module that uses machine-learned models to generate predictions related to and/or classifications of industrial components based on features of collected sensor data. In embodiments, provided herein is a sensor kit having sensors and an edge device that are configured to monitor an underwater industrial setting and having an edge device that includes a notification module that provides notifications and/or alarms to users based on sensor data and/or rules applied to the sensor data. In embodiments, provided herein is a sensor kit having sensors and an edge device that are configured to monitor an underwater industrial setting and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor an underwater industrial setting and having an edge device that includes a distributed ledger module configured to update a distributed ledger with sensor data captured by the sensor kit. In embodiments, provided herein is a sensor kit having sensors and an edge device that are configured to monitor an underwater industrial setting and having a backend system that includes a decoding module that decrypts, decodes, and/or decompresses encoded sensor kit packets. In embodiments, provided herein is a sensor kit having sensors and an edge device that are configured to monitor an underwater industrial setting and having a backend system that includes a data processing module that executes a workflow associated with a potential issue based on sensor data captured by the sensor kit. In embodiments, provided herein is a sensor kit having sensors and an edge device that are configured to monitor an underwater industrial setting and having a backend system that includes an AI module that trains machine-learned models to make predictions or classifications related to sensor data captured by a sensor kit. In embodiments, provided herein is a sensor kit having sensors and an edge device that are configured to monitor an underwater industrial setting and having a backend system that includes a notification module that issues notifications to users when an issue is detected in an industrial setting based on collected sensor data. In embodiments, provided herein is a sensor kit having sensors and an edge device that are configured to monitor an underwater industrial setting and having a backend system that includes an analytics module that performs analytics tasks on sensor data received from the sensor kit. In embodiments, provided herein is a sensor kit having sensors and an edge device that are configured to monitor an underwater industrial setting and having a backend system that includes a control module that provides commands to a device or system in an industrial setting to take remedial action in response to a particular issue being detected. In embodiments, provided herein is a sensor kit having sensors and an edge device that are configured to monitor an underwater industrial setting and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that are configured to monitor an underwater industrial setting and having a backend system that includes a dashboard module that presents a dashboard to a human user that provides a graphical user interface that allows the user to configure the sensor kit system. In embodiments, provided herein is a sensor kit having sensors and an edge device that are configured to monitor an underwater industrial setting and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that are configured to monitor an underwater industrial setting and having a sensor kit and a backend system that updates a distributed ledger based on sensor data provided by the sensor kit. In embodiments, provided herein is a sensor kit having sensors and an edge device that are configured to monitor an underwater industrial setting and having a sensor kit and a backend system that updates a smart contract defining a condition that may trigger an action based on sensor data received from the sensor kit. In embodiments, provided herein is a sensor kit having sensors and an edge device that are configured to monitor an underwater industrial setting and having a distributed ledger that is at least partially shared with a regulatory body to provide information related to compliance with a regulation or regulatory action. In embodiments, provided herein is a sensor kit having sensors and an edge device that are configured to monitor an underwater industrial setting and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that are configured to monitor an underwater industrial setting and having a sensor, an edge device, and a gateway device that communicates with a communication network on behalf of the sensor kit.

In embodiments, provided herein is a sensor kit system having a sensor kit that collects sensor data and a backend system that receives the sensor data from the sensor kits and updates a distributed ledger based on the sensor data. In embodiments, provided herein is a sensor kit system having a sensor kit that collects sensor data and a backend system that receives the sensor data from the sensor kits and updates a distributed ledger based on the sensor data and having sensors and an edge device that is configured to add new sensors to the sensor kit. In embodiments, provided herein is a sensor kit system having a sensor kit that collects sensor data and a backend system that receives the sensor data from the sensor kits and updates a distributed ledger based on the sensor data and having sensors, an edge device, and a gateway device that communicates with a communication network on behalf of the sensor kit. In embodiments, provided herein is a sensor kit system having a sensor kit that collects sensor data and a backend system that receives the sensor data from the sensor kits and updates a distributed ledger based on the sensor data and having an edge device that includes a data processing module that deduplicates, filters, flags, and/or aggregates sensor data. In embodiments, provided herein is a sensor kit system having a sensor kit that collects sensor data and a backend system that receives the sensor data from the sensor kits and updates a distributed ledger based on the sensor data and having an edge device that includes an encoding module that encodes, compresses, and/or encrypts sensor data according to one or more media codecs. In embodiments, provided herein is a sensor kit system having a sensor kit that collects sensor data and a backend system that receives the sensor data from the sensor kits and updates a distributed ledger based on the sensor data and having an edge device that includes a quick-decision AI module that uses machine-learned models to generate predictions related to and/or classifications of industrial components based on features of collected sensor data. In embodiments, provided herein is a sensor kit system having a sensor kit that collects sensor data and a backend system that receives the sensor data from the sensor kits and updates a distributed ledger based on the sensor data and having an edge device that includes a notification module that provides notifications and/or alarms to users based on sensor data and/or rules applied to the sensor data. In embodiments, provided herein is a sensor kit system having a sensor kit that collects sensor data and a backend system that receives the sensor data from the sensor kits and updates a distributed ledger based on the sensor data and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit system having a sensor kit that collects sensor data and a backend system that receives the sensor data from the sensor kits and updates a distributed ledger based on the sensor data and having an edge device that includes a distributed ledger module configured to update a distributed ledger with sensor data captured by the sensor kit. In embodiments, provided herein is a sensor kit system having a sensor kit that collects sensor data and a backend system that receives the sensor data from the sensor kits and updates a distributed ledger based on the sensor data and having a backend system that includes a decoding module that decrypts, decodes, and/or decompresses encoded sensor kit packets. In embodiments, provided herein is a sensor kit system having a sensor kit that collects sensor data and a backend system that receives the sensor data from the sensor kits and updates a distributed ledger based on the sensor data and having a backend system that includes a data processing module that executes a workflow associated with a potential issue based on sensor data captured by the sensor kit. In embodiments, provided herein is a sensor kit system having a sensor kit that collects sensor data and a backend system that receives the sensor data from the sensor kits and updates a distributed ledger based on the sensor data and having a backend system that includes an AI module that trains machine-learned models to make predictions or classifications related to sensor data captured by a sensor kit. In embodiments, provided herein is a sensor kit system having a sensor kit that collects sensor data and a backend system that receives the sensor data from the sensor kits and updates a distributed ledger based on the sensor data and having a backend system that includes a notification module that issues notifications to users when an issue is detected in an industrial setting based on collected sensor data. In embodiments, provided herein is a sensor kit system having a sensor kit that collects sensor data and a backend system that receives the sensor data from the sensor kits and updates a distributed ledger based on the sensor data and having a backend system that includes an analytics module that performs analytics tasks on sensor data received from the sensor kit. In embodiments, provided herein is a sensor kit system having a sensor kit that collects sensor data and a backend system that receives the sensor data from the sensor kits and updates a distributed ledger based on the sensor data and having a backend system that includes a control module that provides commands to a device or system in an industrial setting to take remedial action in response to a particular issue being detected. In embodiments, provided herein is a sensor kit system having a sensor kit that collects sensor data and a backend system that receives the sensor data from the sensor kits and updates a distributed ledger based on the sensor data and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a sensor kit that collects sensor data and a backend system that receives the sensor data from the sensor kits and updates a distributed ledger based on the sensor data and having a backend system that includes a dashboard module that presents a dashboard to a human user that provides a graphical user interface that allows the user to configure the sensor kit system. In embodiments, provided herein is a sensor kit system having a sensor kit that collects sensor data and a backend system that receives the sensor data from the sensor kits and updates a distributed ledger based on the sensor data and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a sensor kit that collects sensor data and a backend system that receives the sensor data from the sensor kits and updates a distributed ledger based on the sensor data and having a sensor kit and a backend system that updates a distributed ledger based on sensor data provided by the sensor kit. In embodiments, provided herein is a sensor kit system having a sensor kit that collects sensor data and a backend system that receives the sensor data from the sensor kits and updates a distributed ledger based on the sensor data and having a sensor kit and a backend system that updates a smart contract defining a condition that may trigger an action based on sensor data received from the sensor kit. In embodiments, provided herein is a sensor kit system having a sensor kit that collects sensor data and a backend system that receives the sensor data from the sensor kits and updates a distributed ledger based on the sensor data and having a distributed ledger that is at least partially shared with a regulatory body to provide information related to compliance with a regulation or regulatory action. In embodiments, provided herein is a sensor kit system having a sensor kit that collects sensor data and a backend system that receives the sensor data from the sensor kits and updates a distributed ledger based on the sensor data and having sensor kit and a backend system that updates a smart contract, wherein the smart contract verifies one or more conditions put forth by a regulatory body with respect to compliance with a regulation or regulatory action. In embodiments, provided herein is a sensor kit system having a sensor kit that collects sensor data and a backend system that receives the sensor data from the sensor kits and updates a distributed ledger based on the sensor data and having a sensor, an edge device, and a gateway device that communicates with a communication network on behalf of the sensor kit.

In embodiments, provided herein is a sensor kit having sensors and an edge device that is configured to add new sensors to the sensor kit. In embodiments, provided herein is a sensor kit having sensors and an edge device that is configured to add new sensors to the sensor kit and having sensors, an edge device, and a gateway device that communicates with a communication network on behalf of the sensor kit. In embodiments, provided herein is a sensor kit having sensors and an edge device that is configured to add new sensors to the sensor kit and having an edge device that includes a data processing module that deduplicates, filters, flags, and/or aggregates sensor data. In embodiments, provided herein is a sensor kit having sensors and an edge device that is configured to add new sensors to the sensor kit and having an edge device that includes an encoding module that encodes, compresses, and/or encrypts sensor data according to one or more media codecs. In embodiments, provided herein is a sensor kit having sensors and an edge device that is configured to add new sensors to the sensor kit and having an edge device that includes a quick-decision AI module that uses machine-learned models to generate predictions related to and/or classifications of industrial components based on features of collected sensor data. In embodiments, provided herein is a sensor kit having sensors and an edge device that is configured to add new sensors to the sensor kit and having an edge device that includes a notification module that provides notifications and/or alarms to users based on sensor data and/or rules applied to the sensor data. In embodiments, provided herein is a sensor kit having sensors and an edge device that is configured to add new sensors to the sensor kit and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors and an edge device that is configured to add new sensors to the sensor kit and having an edge device that includes a distributed ledger module configured to update a distributed ledger with sensor data captured by the sensor kit. In embodiments, provided herein is a sensor kit having sensors and an edge device that is configured to add new sensors to the sensor kit and having a backend system that includes a decoding module that decrypts, decodes, and/or decompresses encoded sensor kit packets. In embodiments, provided herein is a sensor kit having sensors and an edge device that is configured to add new sensors to the sensor kit and having a backend system that includes a data processing module that executes a workflow associated with a potential issue based on sensor data captured by the sensor kit. In embodiments, provided herein is a sensor kit having sensors and an edge device that is configured to add new sensors to the sensor kit and having a backend system that includes an AI module that trains machine-learned models to make predictions or classifications related to sensor data captured by a sensor kit. In embodiments, provided herein is a sensor kit having sensors and an edge device that is configured to add new sensors to the sensor kit and having a backend system that includes a notification module that issues notifications to users when an issue is detected in an industrial setting based on collected sensor data. In embodiments, provided herein is a sensor kit having sensors and an edge device that is configured to add new sensors to the sensor kit and having a backend system that includes an analytics module that performs analytics tasks on sensor data received from the sensor kit. In embodiments, provided herein is a sensor kit having sensors and an edge device that is configured to add new sensors to the sensor kit and having a backend system that includes a control module that provides commands to a device or system in an industrial setting to take remedial action in response to a particular issue being detected. In embodiments, provided herein is a sensor kit having sensors and an edge device that is configured to add new sensors to the sensor kit and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors and an edge device that is configured to add new sensors to the sensor kit and having a backend system that includes a dashboard module that presents a dashboard to a human user that provides a graphical user interface that allows the user to configure the sensor kit system. In embodiments, provided herein is a sensor kit having sensors and an edge device that is configured to add new sensors to the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors and an edge device that is configured to add new sensors to the sensor kit and having a sensor kit and a backend system that updates a distributed ledger based on sensor data provided by the sensor kit. In embodiments, provided herein is a sensor kit having sensors and an edge device that is configured to add new sensors to the sensor kit and having a sensor kit and a backend system that updates a smart contract defining a condition that may trigger an action based on sensor data received from the sensor kit. In embodiments, provided herein is a sensor kit having sensors and an edge device that is configured to add new sensors to the sensor kit and having a distributed ledger that is at least partially shared with a regulatory body to provide information related to compliance with a regulation or regulatory action. In embodiments, provided herein is a sensor kit having sensors and an edge device that is configured to add new sensors to the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit having sensors and an edge device that is configured to add new sensors to the sensor kit and having a sensor, an edge device, and a gateway device that communicates with a communication network on behalf of the sensor kit.

In embodiments, provided herein is a sensor kit having sensors, an edge device, and a gateway device that communicates with a communication network on behalf of the sensor kit. In embodiments, provided herein is a sensor kit having sensors, an edge device, and a gateway device that communicates with a communication network on behalf of the sensor kit and having an edge device that includes a data processing module that deduplicates, filters, flags, and/or aggregates sensor data. In embodiments, provided herein is a sensor kit having sensors, an edge device, and a gateway device that communicates with a communication network on behalf of the sensor kit and having an edge device that includes an encoding module that encodes, compresses, and/or encrypts sensor data according to one or more media codecs. In embodiments, provided herein is a sensor kit having sensors, an edge device, and a gateway device that communicates with a communication network on behalf of the sensor kit and having an edge device that includes a quick-decision AI module that uses machine-learned models to generate predictions related to and/or classifications of industrial components based on features of collected sensor data. In embodiments, provided herein is a sensor kit having sensors, an edge device, and a gateway device that communicates with a communication network on behalf of the sensor kit and having an edge device that includes a notification module that provides notifications and/or alarms to users based on sensor data and/or rules applied to the sensor data. In embodiments, provided herein is a sensor kit having sensors, an edge device, and a gateway device that communicates with a communication network on behalf of the sensor kit and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having sensors, an edge device, and a gateway device that communicates with a communication network on behalf of the sensor kit and having an edge device that includes a distributed ledger module configured to update a distributed ledger with sensor data captured by the sensor kit. In embodiments, provided herein is a sensor kit having sensors, an edge device, and a gateway device that communicates with a communication network on behalf of the sensor kit and having a backend system that includes a decoding module that decrypts, decodes, and/or decompresses encoded sensor kit packets. In embodiments, provided herein is a sensor kit having sensors, an edge device, and a gateway device that communicates with a communication network on behalf of the sensor kit and having a backend system that includes a data processing module that executes a workflow associated with a potential issue based on sensor data captured by the sensor kit. In embodiments, provided herein is a sensor kit having sensors, an edge device, and a gateway device that communicates with a communication network on behalf of the sensor kit and having a backend system that includes an AI module that trains machine-learned models to make predictions or classifications related to sensor data captured by a sensor kit. In embodiments, provided herein is a sensor kit having sensors, an edge device, and a gateway device that communicates with a communication network on behalf of the sensor kit and having a backend system that includes a notification module that issues notifications to users when an issue is detected in an industrial setting based on collected sensor data. In embodiments, provided herein is a sensor kit having sensors, an edge device, and a gateway device that communicates with a communication network on behalf of the sensor kit and having a backend system that includes an analytics module that performs analytics tasks on sensor data received from the sensor kit. In embodiments, provided herein is a sensor kit having sensors, an edge device, and a gateway device that communicates with a communication network on behalf of the sensor kit and having a backend system that includes a control module that provides commands to a device or system in an industrial setting to take remedial action in response to a particular issue being detected. In embodiments, provided herein is a sensor kit having sensors, an edge device, and a gateway device that communicates with a communication network on behalf of the sensor kit and having a backend system that includes a dashboard module that presents a dashboard to a human user that provides the human user with raw sensor data, analytical data, and/or predictions or classifications based on sensor data received from the sensor kit. In embodiments, provided herein is a sensor kit having sensors, an edge device, and a gateway device that communicates with a communication network on behalf of the sensor kit and having a backend system that includes a dashboard module that presents a dashboard to a human user that provides a graphical user interface that allows the user to configure the sensor kit system. In embodiments, provided herein is a sensor kit having sensors, an edge device, and a gateway device that communicates with a communication network on behalf of the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having sensors, an edge device, and a gateway device that communicates with a communication network on behalf of the sensor kit and having a sensor kit and a backend system that updates a distributed ledger based on sensor data provided by the sensor kit. In embodiments, provided herein is a sensor kit having sensors, an edge device, and a gateway device that communicates with a communication network on behalf of the sensor kit and having a sensor kit and a backend system that updates a smart contract defining a condition that may trigger an action based on sensor data received from the sensor kit. In embodiments, provided herein is a sensor kit having sensors, an edge device, and a gateway device that communicates with a communication network on behalf of the sensor kit and having a distributed ledger that is at least partially shared with a regulatory body to provide information related to compliance with a regulation or regulatory action. In embodiments, provided herein is a sensor kit having sensors, an edge device, and a gateway device that communicates with a communication network on behalf of the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit having sensors, an edge device, and a gateway device that communicates with a communication network on behalf of the sensor kit and having a sensor, an edge device, and a gateway device that communicates with a communication network on behalf of the sensor kit.

In embodiments, provided herein is a sensor kit having an edge device that includes a data processing module that deduplicates, filters, flags, and/or aggregates sensor data. In embodiments, provided herein is a sensor kit having an edge device that includes a data processing module that deduplicates, filters, flags, and/or aggregates sensor data and having an edge device that includes an encoding module that encodes, compresses, and/or encrypts sensor data according to one or more media codecs. In embodiments, provided herein is a sensor kit having an edge device that includes a data processing module that deduplicates, filters, flags, and/or aggregates sensor data and having an edge device that includes a quick-decision AI module that uses machine-learned models to generate predictions related to and/or classifications of industrial components based on features of collected sensor data. In embodiments, provided herein is a sensor kit having an edge device that includes a data processing module that deduplicates, filters, flags, and/or aggregates sensor data and having an edge device that includes a notification module that provides notifications and/or alarms to users based on sensor data and/or rules applied to the sensor data. In embodiments, provided herein is a sensor kit having an edge device that includes a data processing module that deduplicates, filters, flags, and/or aggregates sensor data and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having an edge device that includes a data processing module that deduplicates, filters, flags, and/or aggregates sensor data and having an edge device that includes a distributed ledger module configured to update a distributed ledger with sensor data captured by the sensor kit. In embodiments, provided herein is a sensor kit having an edge device that includes a data processing module that deduplicates, filters, flags, and/or aggregates sensor data and having a backend system that includes a decoding module that decrypts, decodes, and/or decompresses encoded sensor kit packets. In embodiments, provided herein is a sensor kit having an edge device that includes a data processing module that deduplicates, filters, flags, and/or aggregates sensor data and having a backend system that includes a data processing module that executes a workflow associated with a potential issue based on sensor data captured by the sensor kit. In embodiments, provided herein is a sensor kit having an edge device that includes a data processing module that deduplicates, filters, flags, and/or aggregates sensor data and having a backend system that includes an AI module that trains machine-learned models to make predictions or classifications related to sensor data captured by a sensor kit. In embodiments, provided herein is a sensor kit having an edge device that includes a data processing module that deduplicates, filters, flags, and/or aggregates sensor data and having a backend system that includes a notification module that issues notifications to users when an issue is detected in an industrial setting based on collected sensor data. In embodiments, provided herein is a sensor kit having an edge device that includes a data processing module that deduplicates, filters, flags, and/or aggregates sensor data and having a backend system that includes an analytics module that performs analytics tasks on sensor data received from the sensor kit. In embodiments, provided herein is a sensor kit having an edge device that includes a data processing module that deduplicates, filters, flags, and/or aggregates sensor data and having a backend system that includes a control module that provides commands to a device or system in an industrial setting to take remedial action in response to a particular issue being detected. In embodiments, provided herein is a sensor kit having an edge device that includes a data processing module that deduplicates, filters, flags, and/or aggregates sensor data and having a backend system that includes a dashboard module that presents a dashboard to a human user that provides the human user with raw sensor data, analytical data, and/or predictions or classifications based on sensor data received from the sensor kit. In embodiments, provided herein is a sensor kit having an edge device that includes a data processing module that deduplicates, filters, flags, and/or aggregates sensor data and having a backend system that includes a dashboard module that presents a dashboard to a human user that provides a graphical user interface that allows the user to configure the sensor kit system. In embodiments, provided herein is a sensor kit having an edge device that includes a data processing module that deduplicates, filters, flags, and/or aggregates sensor data and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having an edge device that includes a data processing module that deduplicates, filters, flags, and/or aggregates sensor data and having a sensor kit and a backend system that updates a distributed ledger based on sensor data provided by the sensor kit. In embodiments, provided herein is a sensor kit having an edge device that includes a data processing module that deduplicates, filters, flags, and/or aggregates sensor data and having a sensor kit and a backend system that updates a smart contract defining a condition that may trigger an action based on sensor data received from the sensor kit. In embodiments, provided herein is a sensor kit having an edge device that includes a data processing module that deduplicates, filters, flags, and/or aggregates sensor data and having a distributed ledger that is at least partially shared with a regulatory body to provide information related to compliance with a regulation or regulatory action. In embodiments, provided herein is a sensor kit having an edge device that includes a data processing module that deduplicates, filters, flags, and/or aggregates sensor data and having sensor kit and a backend system that updates a smart contract, wherein the smart contract verifies one or more conditions put forth by a regulatory body with respect to compliance with a regulation or regulatory action. In embodiments, provided herein is a sensor kit having an edge device that includes a data processing module that deduplicates, filters, flags, and/or aggregates sensor data and having a sensor, an edge device, and a gateway device that communicates with a communication network on behalf of the sensor kit.

In embodiments, provided herein is a sensor kit having an edge device that includes an encoding module that encodes, compresses, and/or encrypts sensor data according to one or more media codecs. In embodiments, provided herein is a sensor kit having an edge device that includes an encoding module that encodes, compresses, and/or encrypts sensor data according to one or more media codecs and having an edge device that includes a quick-decision AI module that uses machine-learned models to generate predictions related to and/or classifications of industrial components based on features of collected sensor data. In embodiments, provided herein is a sensor kit having an edge device that includes an encoding module that encodes, compresses, and/or encrypts sensor data according to one or more media codecs and having an edge device that includes a notification module that provides notifications and/or alarms to users based on sensor data and/or rules applied to the sensor data. In embodiments, provided herein is a sensor kit having an edge device that includes an encoding module that encodes, compresses, and/or encrypts sensor data according to one or more media codecs and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having an edge device that includes an encoding module that encodes, compresses, and/or encrypts sensor data according to one or more media codecs and having an edge device that includes a distributed ledger module configured to update a distributed ledger with sensor data captured by the sensor kit. In embodiments, provided herein is a sensor kit having an edge device that includes an encoding module that encodes, compresses, and/or encrypts sensor data according to one or more media codecs and having a backend system that includes a decoding module that decrypts, decodes, and/or decompresses encoded sensor kit packets. In embodiments, provided herein is a sensor kit having an edge device that includes an encoding module that encodes, compresses, and/or encrypts sensor data according to one or more media codecs and having a backend system that includes a data processing module that executes a workflow associated with a potential issue based on sensor data captured by the sensor kit. In embodiments, provided herein is a sensor kit having an edge device that includes an encoding module that encodes, compresses, and/or encrypts sensor data according to one or more media codecs and having a backend system that includes an AI module that trains machine-learned models to make predictions or classifications related to sensor data captured by a sensor kit. In embodiments, provided herein is a sensor kit having an edge device that includes an encoding module that encodes, compresses, and/or encrypts sensor data according to one or more media codecs and having a backend system that includes a notification module that issues notifications to users when an issue is detected in an industrial setting based on collected sensor data. In embodiments, provided herein is a sensor kit having an edge device that includes an encoding module that encodes, compresses, and/or encrypts sensor data according to one or more media codecs and having a backend system that includes an analytics module that performs analytics tasks on sensor data received from the sensor kit. In embodiments, provided herein is a sensor kit having an edge device that includes an encoding module that encodes, compresses, and/or encrypts sensor data according to one or more media codecs and having a backend system that includes a control module that provides commands to a device or system in an industrial setting to take remedial action in response to a particular issue being detected. In embodiments, provided herein is a sensor kit having an edge device that includes an encoding module that encodes, compresses, and/or encrypts sensor data according to one or more media codecs and having a backend system that includes a dashboard module that presents a dashboard to a human user that provides the human user with raw sensor data, analytical data, and/or predictions or classifications based on sensor data received from the sensor kit. In embodiments, provided herein is a sensor kit having an edge device that includes an encoding module that encodes, compresses, and/or encrypts sensor data according to one or more media codecs and having a backend system that includes a dashboard module that presents a dashboard to a human user that provides a graphical user interface that allows the user to configure the sensor kit system. In embodiments, provided herein is a sensor kit having an edge device that includes an encoding module that encodes, compresses, and/or encrypts sensor data according to one or more media codecs and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having an edge device that includes an encoding module that encodes, compresses, and/or encrypts sensor data according to one or more media codecs and having a sensor kit and a backend system that updates a distributed ledger based on sensor data provided by the sensor kit. In embodiments, provided herein is a sensor kit having an edge device that includes an encoding module that encodes, compresses, and/or encrypts sensor data according to one or more media codecs and having a sensor kit and a backend system that updates a smart contract defining a condition that may trigger an action based on sensor data received from the sensor kit. In embodiments, provided herein is a sensor kit having an edge device that includes an encoding module that encodes, compresses, and/or encrypts sensor data according to one or more media codecs and having a distributed ledger that is at least partially shared with a regulatory body to provide information related to compliance with a regulation or regulatory action. In embodiments, provided herein is a sensor kit having an edge device that includes an encoding module that encodes, compresses, and/or encrypts sensor data according to one or more media codecs and having sensor kit and a backend system that updates a smart contract, wherein the smart contract verifies one or more conditions put forth by a regulatory body with respect to compliance with a regulation or regulatory action. In embodiments, provided herein is a sensor kit having an edge device that includes an encoding module that encodes, compresses, and/or encrypts sensor data according to one or more media codecs and having a sensor, an edge device, and a gateway device that communicates with a communication network on behalf of the sensor kit.

In embodiments, provided herein is a sensor kit having an edge device that includes a quick-decision AI module that uses machine-learned models to generate predictions related to and/or classifications of industrial components based on features of collected sensor data. In embodiments, provided herein is a sensor kit having an edge device that includes a quick-decision AI module that uses machine-learned models to generate predictions related to and/or classifications of industrial components based on features of collected sensor data and having an edge device that includes a notification module that provides notifications and/or alarms to users based on sensor data and/or rules applied to the sensor data. In embodiments, provided herein is a sensor kit having an edge device that includes a quick-decision AI module that uses machine-learned models to generate predictions related to and/or classifications of industrial components based on features of collected sensor data and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having an edge device that includes a quick-decision AI module that uses machine-learned models to generate predictions related to and/or classifications of industrial components based on features of collected sensor data and having an edge device that includes a distributed ledger module configured to update a distributed ledger with sensor data captured by the sensor kit. In embodiments, provided herein is a sensor kit having an edge device that includes a quick-decision AI module that uses machine-learned models to generate predictions related to and/or classifications of industrial components based on features of collected sensor data and having a backend system that includes a decoding module that decrypts, decodes, and/or decompresses encoded sensor kit packets. In embodiments, provided herein is a sensor kit having an edge device that includes a quick-decision AI module that uses machine-learned models to generate predictions related to and/or classifications of industrial components based on features of collected sensor data and having a backend system that includes a data processing module that executes a workflow associated with a potential issue based on sensor data captured by the sensor kit. In embodiments, provided herein is a sensor kit having an edge device that includes a quick-decision AI module that uses machine-learned models to generate predictions related to and/or classifications of industrial components based on features of collected sensor data and having a backend system that includes an AI module that trains machine-learned models to make predictions or classifications related to sensor data captured by a sensor kit. In embodiments, provided herein is a sensor kit having an edge device that includes a quick-decision AI module that uses machine-learned models to generate predictions related to and/or classifications of industrial components based on features of collected sensor data and having a backend system that includes a notification module that issues notifications to users when an issue is detected in an industrial setting based on collected sensor data. In embodiments, provided herein is a sensor kit having an edge device that includes a quick-decision AI module that uses machine-learned models to generate predictions related to and/or classifications of industrial components based on features of collected sensor data and having a backend system that includes an analytics module that performs analytics tasks on sensor data received from the sensor kit. In embodiments, provided herein is a sensor kit having an edge device that includes a quick-decision AI module that uses machine-learned models to generate predictions related to and/or classifications of industrial components based on features of collected sensor data and having a backend system that includes a control module that provides commands to a device or system in an industrial setting to take remedial action in response to a particular issue being detected. In embodiments, provided herein is a sensor kit having an edge device that includes a quick-decision AI module that uses machine-learned models to generate predictions related to and/or classifications of industrial components based on features of collected sensor data and having a backend system that includes a dashboard module that presents a dashboard to a human user that provides the human user with raw sensor data, analytical data, and/or predictions or classifications based on sensor data received from the sensor kit. In embodiments, provided herein is a sensor kit having an edge device that includes a quick-decision AI module that uses machine-learned models to generate predictions related to and/or classifications of industrial components based on features of collected sensor data and having a backend system that includes a dashboard module that presents a dashboard to a human user that provides a graphical user interface that allows the user to configure the sensor kit system. In embodiments, provided herein is a sensor kit having an edge device that includes a quick-decision AI module that uses machine-learned models to generate predictions related to and/or classifications of industrial components based on features of collected sensor data and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having an edge device that includes a quick-decision AI module that uses machine-learned models to generate predictions related to and/or classifications of industrial components based on features of collected sensor data and having a sensor kit and a backend system that updates a distributed ledger based on sensor data provided by the sensor kit. In embodiments, provided herein is a sensor kit having an edge device that includes a quick-decision AI module that uses machine-learned models to generate predictions related to and/or classifications of industrial components based on features of collected sensor data and having a sensor kit and a backend system that updates a smart contract defining a condition that may trigger an action based on sensor data received from the sensor kit. In embodiments, provided herein is a sensor kit having an edge device that includes a quick-decision AI module that uses machine-learned models to generate predictions related to and/or classifications of industrial components based on features of collected sensor data and having a distributed ledger that is at least partially shared with a regulatory body to provide information related to compliance with a regulation or regulatory action. In embodiments, provided herein is a sensor kit having an edge device that includes a quick-decision AI module that uses machine-learned models to generate predictions related to and/or classifications of industrial components based on features of collected sensor data and having sensor kit and a backend system that updates a smart contract, wherein the smart contract verifies one or more conditions put forth by a regulatory body with respect to compliance with a regulation or regulatory action. In embodiments, provided herein is a sensor kit having an edge device that includes a quick-decision AI module that uses machine-learned models to generate predictions related to and/or classifications of industrial components based on features of collected sensor data and having a sensor, an edge device, and a gateway device that communicates with a communication network on behalf of the sensor kit.

In embodiments, provided herein is a sensor kit having an edge device that includes a notification module that provides notifications and/or alarms to users based on sensor data and/or rules applied to the sensor data. In embodiments, provided herein is a sensor kit having an edge device that includes a notification module that provides notifications and/or alarms to users based on sensor data and/or rules applied to the sensor data and having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having an edge device that includes a notification module that provides notifications and/or alarms to users based on sensor data and/or rules applied to the sensor data and having an edge device that includes a distributed ledger module configured to update a distributed ledger with sensor data captured by the sensor kit. In embodiments, provided herein is a sensor kit having an edge device that includes a notification module that provides notifications and/or alarms to users based on sensor data and/or rules applied to the sensor data and having a backend system that includes a decoding module that decrypts, decodes, and/or decompresses encoded sensor kit packets. In embodiments, provided herein is a sensor kit having an edge device that includes a notification module that provides notifications and/or alarms to users based on sensor data and/or rules applied to the sensor data and having a backend system that includes a data processing module that executes a workflow associated with a potential issue based on sensor data captured by the sensor kit. In embodiments, provided herein is a sensor kit having an edge device that includes a notification module that provides notifications and/or alarms to users based on sensor data and/or rules applied to the sensor data and having a backend system that includes an AI module that trains machine-learned models to make predictions or classifications related to sensor data captured by a sensor kit. In embodiments, provided herein is a sensor kit having an edge device that includes a notification module that provides notifications and/or alarms to users based on sensor data and/or rules applied to the sensor data and having a backend system that includes a notification module that issues notifications to users when an issue is detected in an industrial setting based on collected sensor data. In embodiments, provided herein is a sensor kit having an edge device that includes a notification module that provides notifications and/or alarms to users based on sensor data and/or rules applied to the sensor data and having a backend system that includes an analytics module that performs analytics tasks on sensor data received from the sensor kit.

In embodiments, provided herein is a sensor kit having an edge device that includes a notification module that provides notifications and/or alarms to users based on sensor data and/or rules applied to the sensor data and having a backend system that includes a control module that provides commands to a device or system in an industrial setting to take remedial action in response to a particular issue being detected. In embodiments, provided herein is a sensor kit having an edge device that includes a notification module that provides notifications and/or alarms to users based on sensor data and/or rules applied to the sensor data and having a backend system that includes a dashboard module that presents a dashboard to a human user that provides the human user with raw sensor data, analytical data, and/or predictions or classifications based on sensor data received from the sensor kit. In embodiments, provided herein is a sensor kit having an edge device that includes a notification module that provides notifications and/or alarms to users based on sensor data and/or rules applied to the sensor data and having a backend system that includes a dashboard module that presents a dashboard to a human user that provides a graphical user interface that allows the user to configure the sensor kit system. In embodiments, provided herein is a sensor kit having an edge device that includes a notification module that provides notifications and/or alarms to users based on sensor data and/or rules applied to the sensor data and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having an edge device that includes a notification module that provides notifications and/or alarms to users based on sensor data and/or rules applied to the sensor data and having a sensor kit and a backend system that updates a distributed ledger based on sensor data provided by the sensor kit. In embodiments, provided herein is a sensor kit having an edge device that includes a notification module that provides notifications and/or alarms to users based on sensor data and/or rules applied to the sensor data and having a sensor kit and a backend system that updates a smart contract defining a condition that may trigger an action based on sensor data received from the sensor kit. In embodiments, provided herein is a sensor kit having an edge device that includes a notification module that provides notifications and/or alarms to users based on sensor data and/or rules applied to the sensor data and having a distributed ledger that is at least partially shared with a regulatory body to provide information related to compliance with a regulation or regulatory action. In embodiments, provided herein is a sensor kit having an edge device that includes a notification module that provides notifications and/or alarms to users based on sensor data and/or rules applied to the sensor data and having sensor kit and a backend system that updates a smart contract, wherein the smart contract verifies one or more conditions put forth by a regulatory body with respect to compliance with a regulation or regulatory action. In embodiments, provided herein is a sensor kit having an edge device that includes a notification module that provides notifications and/or alarms to users based on sensor data and/or rules applied to the sensor data and having a sensor, an edge device, and a gateway device that communicates with a communication network on behalf of the sensor kit.

In embodiments, provided herein is a sensor kit having an edge device that includes a configuration module that configures a sensor kit network by transmitting configuration requests to sensor devices, generating device records based on responses to the configuration requests, and/or adding new sensors to the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having an edge device that includes a distributed ledger module configured to update a distributed ledger with sensor data captured by the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes a decoding module that decrypts, decodes, and/or decompresses encoded sensor kit packets. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes a data processing module that executes a workflow associated with a potential issue based on sensor data captured by the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes an AI module that trains machine-learned models to make predictions or classifications related to sensor data captured by a sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes a notification module that issues notifications to users when an issue is detected in an industrial setting based on collected sensor data. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes an analytics module that performs analytics tasks on sensor data received from the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes a control module that provides commands to a device or system in an industrial setting to take remedial action in response to a particular issue being detected. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes a dashboard module that presents a dashboard to a human user that provides the human user with raw sensor data, analytical data, and/or predictions or classifications based on sensor data received from the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a backend system that includes a dashboard module that presents a dashboard to a human user that provides a graphical user interface that allows the user to configure the sensor kit system. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a sensor kit and a backend system that updates a distributed ledger based on sensor data provided by the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a sensor kit and a backend system that updates a smart contract defining a condition that may trigger an action based on sensor data received from the sensor kit. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a distributed ledger that is at least partially shared with a regulatory body to provide information related to compliance with a regulation or regulatory action. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit having an edge device that includes a configuration module that configures a sensor kit network by transmitting configuration requests to sensor devices, generating device records based on responses to the configuration requests, and/or adding new sensors to the sensor kit and having a sensor, an edge device, and a gateway device that communicates with a communication network on behalf of the sensor kit.

In embodiments, provided herein is a sensor kit having an edge device that includes a distributed ledger module configured to update a distributed ledger with sensor data captured by the sensor kit. In embodiments, provided herein is a sensor kit having an edge device that includes a distributed ledger module configured to update a distributed ledger with sensor data captured by the sensor kit and having a backend system that includes a decoding module that decrypts, decodes, and/or decompresses encoded sensor kit packets. In embodiments, provided herein is a sensor kit having an edge device that includes a distributed ledger module configured to update a distributed ledger with sensor data captured by the sensor kit and having a backend system that includes a data processing module that executes a workflow associated with a potential issue based on sensor data captured by the sensor kit. In embodiments, provided herein is a sensor kit having an edge device that includes a distributed ledger module configured to update a distributed ledger with sensor data captured by the sensor kit and having a backend system that includes an AI module that trains machine-learned models to make predictions or classifications related to sensor data captured by a sensor kit. In embodiments, provided herein is a sensor kit having an edge device that includes a distributed ledger module configured to update a distributed ledger with sensor data captured by the sensor kit and having a backend system that includes a notification module that issues notifications to users when an issue is detected in an industrial setting based on collected sensor data. In embodiments, provided herein is a sensor kit having an edge device that includes a distributed ledger module configured to update a distributed ledger with sensor data captured by the sensor kit and having a backend system that includes an analytics module that performs analytics tasks on sensor data received from the sensor kit. In embodiments, provided herein is a sensor kit having an edge device that includes a distributed ledger module configured to update a distributed ledger with sensor data captured by the sensor kit and having a backend system that includes a control module that provides commands to a device or system in an industrial setting to take remedial action in response to a particular issue being detected. In embodiments, provided herein is a sensor kit having an edge device that includes a distributed ledger module configured to update a distributed ledger with sensor data captured by the sensor kit and having a backend system that includes a dashboard module that presents a dashboard to a human user that provides the human user with raw sensor data, analytical data, and/or predictions or classifications based on sensor data received from the sensor kit. In embodiments, provided herein is a sensor kit having an edge device that includes a distributed ledger module configured to update a distributed ledger with sensor data captured by the sensor kit and having a backend system that includes a dashboard module that presents a dashboard to a human user that provides a graphical user interface that allows the user to configure the sensor kit system. In embodiments, provided herein is a sensor kit having an edge device that includes a distributed ledger module configured to update a distributed ledger with sensor data captured by the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit having an edge device that includes a distributed ledger module configured to update a distributed ledger with sensor data captured by the sensor kit and having a sensor kit and a backend system that updates a distributed ledger based on sensor data provided by the sensor kit. In embodiments, provided herein is a sensor kit having an edge device that includes a distributed ledger module configured to update a distributed ledger with sensor data captured by the sensor kit and having a sensor kit and a backend system that updates a smart contract defining a condition that may trigger an action based on sensor data received from the sensor kit. In embodiments, provided herein is a sensor kit having an edge device that includes a distributed ledger module configured to update a distributed ledger with sensor data captured by the sensor kit and having a distributed ledger that is at least partially shared with a regulatory body to provide information related to compliance with a regulation or regulatory action. In embodiments, provided herein is a sensor kit having an edge device that includes a distributed ledger module configured to update a distributed ledger with sensor data captured by the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit having an edge device that includes a distributed ledger module configured to update a distributed ledger with sensor data captured by the sensor kit and having a sensor, an edge device, and a gateway device that communicates with a communication network on behalf of the sensor kit.

In embodiments, provided herein is a sensor kit system having a backend system that includes a decoding module that decrypts, decodes, and/or decompresses encoded sensor kit packets. In embodiments, provided herein is a sensor kit system having a backend system that includes a decoding module that decrypts, decodes, and/or decompresses encoded sensor kit packets and having a backend system that includes a data processing module that executes a workflow associated with a potential issue based on sensor data captured by the sensor kit. In embodiments, provided herein is a sensor kit system having a backend system that includes a decoding module that decrypts, decodes, and/or decompresses encoded sensor kit packets and having a backend system that includes an AI module that trains machine-learned models to make predictions or classifications related to sensor data captured by a sensor kit. In embodiments, provided herein is a sensor kit system having a backend system that includes a decoding module that decrypts, decodes, and/or decompresses encoded sensor kit packets and having a backend system that includes a notification module that issues notifications to users when an issue is detected in an industrial setting based on collected sensor data. In embodiments, provided herein is a sensor kit system having a backend system that includes a decoding module that decrypts, decodes, and/or decompresses encoded sensor kit packets and having a backend system that includes an analytics module that performs analytics tasks on sensor data received from the sensor kit. In embodiments, provided herein is a sensor kit system having a backend system that includes a decoding module that decrypts, decodes, and/or decompresses encoded sensor kit packets and having a backend system that includes a control module that provides commands to a device or system in an industrial setting to take remedial action in response to a particular issue being detected. In embodiments, provided herein is a sensor kit system having a backend system that includes a decoding module that decrypts, decodes, and/or decompresses encoded sensor kit packets and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a backend system that includes a decoding module that decrypts, decodes, and/or decompresses encoded sensor kit packets and having a backend system that includes a dashboard module that presents a dashboard to a human user that provides a graphical user interface that allows the user to configure the sensor kit system. In embodiments, provided herein is a sensor kit system having a backend system that includes a decoding module that decrypts, decodes, and/or decompresses encoded sensor kit packets and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes a decoding module that decrypts, decodes, and/or decompresses encoded sensor kit packets and having a sensor kit and a backend system that updates a distributed ledger based on sensor data provided by the sensor kit. In embodiments, provided herein is a sensor kit system having a backend system that includes a decoding module that decrypts, decodes, and/or decompresses encoded sensor kit packets and having a sensor kit and a backend system that updates a smart contract defining a condition that may trigger an action based on sensor data received from the sensor kit. In embodiments, provided herein is a sensor kit system having a backend system that includes a decoding module that decrypts, decodes, and/or decompresses encoded sensor kit packets and having a distributed ledger that is at least partially shared with a regulatory body to provide information related to compliance with a regulation or regulatory action. In embodiments, provided herein is a sensor kit system having a backend system that includes a decoding module that decrypts, decodes, and/or decompresses encoded sensor kit packets and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes a decoding module that decrypts, decodes, and/or decompresses encoded sensor kit packets and having a sensor, an edge device, and a gateway device that communicates with a communication network on behalf of the sensor kit.

In embodiments, provided herein is a sensor kit system having a backend system that includes a data processing module that executes a workflow associated with a potential issue based on sensor data captured by the sensor kit. In embodiments, provided herein is a sensor kit system having a backend system that includes a data processing module that executes a workflow associated with a potential issue based on sensor data captured by the sensor kit and having a backend system that includes an AI module that trains machine-learned models to make predictions or classifications related to sensor data captured by a sensor kit. In embodiments, provided herein is a sensor kit system having a backend system that includes a data processing module that executes a workflow associated with a potential issue based on sensor data captured by the sensor kit and having a backend system that includes a notification module that issues notifications to users when an issue is detected in an industrial setting based on collected sensor data. In embodiments, provided herein is a sensor kit system having a backend system that includes a data processing module that executes a workflow associated with a potential issue based on sensor data captured by the sensor kit and having a backend system that includes an analytics module that performs analytics tasks on sensor data received from the sensor kit. In embodiments, provided herein is a sensor kit system having a backend system that includes a data processing module that executes a workflow associated with a potential issue based on sensor data captured by the sensor kit and having a backend system that includes a control module that provides commands to a device or system in an industrial setting to take remedial action in response to a particular issue being detected. In embodiments, provided herein is a sensor kit system having a backend system that includes a data processing module that executes a workflow associated with a potential issue based on sensor data captured by the sensor kit and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a backend system that includes a data processing module that executes a workflow associated with a potential issue based on sensor data captured by the sensor kit and having a backend system that includes a dashboard module that presents a dashboard to a human user that provides a graphical user interface that allows the user to configure the sensor kit system. In embodiments, provided herein is a sensor kit system having a backend system that includes a data processing module that executes a workflow associated with a potential issue based on sensor data captured by the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes a data processing module that executes a workflow associated with a potential issue based on sensor data captured by the sensor kit and having a sensor kit and a backend system that updates a distributed ledger based on sensor data provided by the sensor kit. In embodiments, provided herein is a sensor kit system having a backend system that includes a data processing module that executes a workflow associated with a potential issue based on sensor data captured by the sensor kit and having a sensor kit and a backend system that updates a smart contract defining a condition that may trigger an action based on sensor data received from the sensor kit. In embodiments, provided herein is a sensor kit system having a backend system that includes a data processing module that executes a workflow associated with a potential issue based on sensor data captured by the sensor kit and having a distributed ledger that is at least partially shared with a regulatory body to provide information related to compliance with a regulation or regulatory action. In embodiments, provided herein is a sensor kit system having a backend system that includes a data processing module that executes a workflow associated with a potential issue based on sensor data captured by the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes a data processing module that executes a workflow associated with a potential issue based on sensor data captured by the sensor kit and having a sensor, an edge device, and a gateway device that communicates with a communication network on behalf of the sensor kit.

In embodiments, provided herein is a sensor kit system having a backend system that includes an AI module that trains machine-learned models to make predictions or classifications related to sensor data captured by a sensor kit. In embodiments, provided herein is a sensor kit system having a backend system that includes an AI module that trains machine-learned models to make predictions or classifications related to sensor data captured by a sensor kit and having a backend system that includes a notification module that issues notifications to users when an issue is detected in an industrial setting based on collected sensor data. In embodiments, provided herein is a sensor kit system having a backend system that includes an AI module that trains machine-learned models to make predictions or classifications related to sensor data captured by a sensor kit and having a backend system that includes an analytics module that performs analytics tasks on sensor data received from the sensor kit. In embodiments, provided herein is a sensor kit system having a backend system that includes an AI module that trains machine-learned models to make predictions or classifications related to sensor data captured by a sensor kit and having a backend system that includes a control module that provides commands to a device or system in an industrial setting to take remedial action in response to a particular issue being detected. In embodiments, provided herein is a sensor kit system having a backend system that includes an AI module that trains machine-learned models to make predictions or classifications related to sensor data captured by a sensor kit and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a backend system that includes an AI module that trains machine-learned models to make predictions or classifications related to sensor data captured by a sensor kit and having a backend system that includes a dashboard module that presents a dashboard to a human user that provides a graphical user interface that allows the user to configure the sensor kit system. In embodiments, provided herein is a sensor kit system having a backend system that includes an AI module that trains machine-learned models to make predictions or classifications related to sensor data captured by a sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes an AI module that trains machine-learned models to make predictions or classifications related to sensor data captured by a sensor kit and having a sensor kit and a backend system that updates a distributed ledger based on sensor data provided by the sensor kit. In embodiments, provided herein is a sensor kit system having a backend system that includes an AI module that trains machine-learned models to make predictions or classifications related to sensor data captured by a sensor kit and having a sensor kit and a backend system that updates a smart contract defining a condition that may trigger an action based on sensor data received from the sensor kit. In embodiments, provided herein is a sensor kit system having a backend system that includes an AI module that trains machine-learned models to make predictions or classifications related to sensor data captured by a sensor kit and having a distributed ledger that is at least partially shared with a regulatory body to provide information related to compliance with a regulation or regulatory action. In embodiments, provided herein is a sensor kit system having a backend system that includes an AI module that trains machine-learned models to make predictions or classifications related to sensor data captured by a sensor kit and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes an AI module that trains machine-learned models to make predictions or classifications related to sensor data captured by a sensor kit and having a sensor, an edge device, and a gateway device that communicates with a communication network on behalf of the sensor kit.

In embodiments, provided herein is a sensor kit system having a backend system that includes a notification module that issues notifications to users when an issue is detected in an industrial setting based on collected sensor data. In embodiments, provided herein is a sensor kit system having a backend system that includes a notification module that issues notifications to users when an issue is detected in an industrial setting based on collected sensor data and having a backend system that includes an analytics module that performs analytics tasks on sensor data received from the sensor kit. In embodiments, provided herein is a sensor kit system having a backend system that includes a notification module that issues notifications to users when an issue is detected in an industrial setting based on collected sensor data. and having a backend system that includes a control module that provides commands to a device or system in an industrial setting to take remedial action in response to a particular issue being detected. In embodiments, provided herein is a sensor kit system having a backend system that includes a notification module that issues notifications to users when an issue is detected in an industrial setting based on collected sensor data. and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a backend system that includes a notification module that issues notifications to users when an issue is detected in an industrial setting based on collected sensor data. and having a backend system that includes a dashboard module that presents a dashboard to a human user that provides a graphical user interface that allows the user to configure the sensor kit system. In embodiments, provided herein is a sensor kit system having a backend system that includes a notification module that issues notifications to users when an issue is detected in an industrial setting based on collected sensor data. and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes a notification module that issues notifications to users when an issue is detected in an industrial setting based on collected sensor data. and having a sensor kit and a backend system that updates a distributed ledger based on sensor data provided by the sensor kit. In embodiments, provided herein is a sensor kit system having a backend system that includes a notification module that issues notifications to users when an issue is detected in an industrial setting based on collected sensor data. and having a sensor kit and a backend system that updates a smart contract defining a condition that may trigger an action based on sensor data received from the sensor kit. In embodiments, provided herein is a sensor kit system having a backend system that includes a notification module that issues notifications to users when an issue is detected in an industrial setting based on collected sensor data. and having a distributed ledger that is at least partially shared with a regulatory body to provide information related to compliance with a regulation or regulatory action. In embodiments, provided herein is a sensor kit system having a backend system that includes a notification module that issues notifications to users when an issue is detected in an industrial setting based on collected sensor data. and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes a notification module that issues notifications to users when an issue is detected in an industrial setting based on collected sensor data. and having a sensor, an edge device, and a gateway device that communicates with a communication network on behalf of the sensor kit.

In embodiments, provided herein is a sensor kit system having a backend system that includes an analytics module that performs analytics tasks on sensor data received from the sensor kit. In embodiments, provided herein is a sensor kit system having a backend system that includes an analytics module that performs analytics tasks on sensor data received from the sensor kit and having a backend system that includes a control module that provides commands to a device or system in an industrial setting to take remedial action in response to a particular issue being detected. In embodiments, provided herein is a sensor kit system having a backend system that includes an analytics module that performs analytics tasks on sensor data received from the sensor kit and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a backend system that includes an analytics module that performs analytics tasks on sensor data received from the sensor kit and having a backend system that includes a dashboard module that presents a dashboard to a human user that provides a graphical user interface that allows the user to configure the sensor kit system. In embodiments, provided herein is a sensor kit system having a backend system that includes an analytics module that performs analytics tasks on sensor data received from the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes an analytics module that performs analytics tasks on sensor data received from the sensor kit and having a sensor kit and a backend system that updates a distributed ledger based on sensor data provided by the sensor kit. In embodiments, provided herein is a sensor kit system having a backend system that includes an analytics module that performs analytics tasks on sensor data received from the sensor kit and having a sensor kit and a backend system that updates a smart contract defining a condition that may trigger an action based on sensor data received from the sensor kit. In embodiments, provided herein is a sensor kit system having a backend system that includes an analytics module that performs analytics tasks on sensor data received from the sensor kit and having a distributed ledger that is at least partially shared with a regulatory body to provide information related to compliance with a regulation or regulatory action. In embodiments, provided herein is a sensor kit system having a backend system that includes an analytics module that performs analytics tasks on sensor data received from the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes an analytics module that performs analytics tasks on sensor data received from the sensor kit and having a sensor, an edge device, and a gateway device that communicates with a communication network on behalf of the sensor kit.

In embodiments, provided herein is a sensor kit system having a backend system that includes a control module that provides commands to a device or system in an industrial setting to take remedial action in response to a particular issue being detected. In embodiments, provided herein is a sensor kit system having a backend system that includes a control module that provides commands to a device or system in an industrial setting to take remedial action in response to a particular issue being detected and having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a backend system that includes a control module that provides commands to a device or system in an industrial setting to take remedial action in response to a particular issue being detected and having a backend system that includes a dashboard module that presents a dashboard to a human user that provides a graphical user interface that allows the user to configure the sensor kit system. In embodiments, provided herein is a sensor kit system having a backend system that includes a control module that provides commands to a device or system in an industrial setting to take remedial action in response to a particular issue being detected and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes a control module that provides commands to a device or system in an industrial setting to take remedial action in response to a particular issue being detected and having a sensor kit and a backend system that updates a distributed ledger based on sensor data provided by the sensor kit. In embodiments, provided herein is a sensor kit system having a backend system that includes a control module that provides commands to a device or system in an industrial setting to take remedial action in response to a particular issue being detected and having a sensor kit and a backend system that updates a smart contract defining a condition that may trigger an action based on sensor data received from the sensor kit. In embodiments, provided herein is a sensor kit system having a backend system that includes a control module that provides commands to a device or system in an industrial setting to take remedial action in response to a particular issue being detected and having a distributed ledger that is at least partially shared with a regulatory body to provide information related to compliance with a regulation or regulatory action. In embodiments, provided herein is a sensor kit system having a backend system that includes a control module that provides commands to a device or system in an industrial setting to take remedial action in response to a particular issue being detected and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes a control module that provides commands to a device or system in an industrial setting to take remedial action in response to a particular issue being detected and having a sensor, an edge device, and a gateway device that communicates with a communication network on behalf of the sensor kit.

In embodiments, provided herein is a sensor kit system having a backend system that includes a dashboard module that presents a dashboard to a human user that provides the human user with raw sensor data, analytical data, and/or predictions or classifications based on sensor data received from the sensor kit. In embodiments, provided herein is a sensor kit system having a backend system that includes a dashboard module that presents a dashboard to a human user that provides the human user with raw sensor data, analytical data, and/or predictions or classifications based on sensor data received from the sensor kit and having a backend system that includes a dashboard module that presents a dashboard to a human user that provides a graphical user interface that allows the user to configure the sensor kit system. In embodiments, provided herein is a sensor kit system having a backend system that includes a dashboard module that presents a dashboard to a human user that provides the human user with raw sensor data, analytical data, and/or predictions or classifications based on sensor data received from the sensor kit and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes a dashboard module that presents a dashboard to a human user that provides the human user with raw sensor data, analytical data, and/or predictions or classifications based on sensor data received from the sensor kit and having a sensor kit and a backend system that updates a distributed ledger based on sensor data provided by the sensor kit. In embodiments, provided herein is a sensor kit system having a backend system that includes a dashboard module that presents a dashboard to a human user that provides the human user with raw sensor data, analytical data, and/or predictions or classifications based on sensor data received from the sensor kit and having a sensor kit and a backend system that updates a smart contract defining a condition that may trigger an action based on sensor data received from the sensor kit. In embodiments, provided herein is a sensor kit system having a backend system that includes a dashboard module that presents a dashboard to a human user that provides the human user with raw sensor data, analytical data, and/or predictions or classifications based on sensor data received from the sensor kit and having a distributed ledger that is at least partially shared with a regulatory body to provide information related to compliance with a regulation or regulatory action. In embodiments, provided herein is a sensor kit system having a backend system that includes a dashboard module that presents a dashboard to a human user that provides the human user with raw sensor data, analytical data, and/or predictions or classifications based on sensor data received from the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes a dashboard module that presents a dashboard to a human user that provides the human user with raw sensor data, analytical data, and/or predictions or classifications based on sensor data received from the sensor kit and having a sensor, an edge device, and a gateway device that communicates with a communication network on behalf of the sensor kit.

In embodiments, provided herein is a sensor kit system having a backend system that includes a dashboard module that presents a dashboard to a human user that provides a graphical user interface that allows the user to configure the sensor kit system. In embodiments, provided herein is a sensor kit system having a backend system that includes a dashboard module that presents a dashboard to a human user that provides a graphical user interface that allows the user to configure the sensor kit system and having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a backend system that includes a dashboard module that presents a dashboard to a human user that provides a graphical user interface that allows the user to configure the sensor kit system and having a sensor kit and a backend system that updates a distributed ledger based on sensor data provided by the sensor kit. In embodiments, provided herein is a sensor kit system having a backend system that includes a dashboard module that presents a dashboard to a human user that provides a graphical user interface that allows the user to configure the sensor kit system and having a sensor kit and a backend system that updates a smart contract defining a condition that may trigger an action based on sensor data received from the sensor kit. In embodiments, provided herein is a sensor kit system having a backend system that includes a dashboard module that presents a dashboard to a human user that provides a graphical user interface that allows the user to configure the sensor kit system and having a distributed ledger that is at least partially shared with a regulatory body to provide information related to compliance with a regulation or regulatory action. In embodiments, provided herein is a sensor kit system having a backend system that includes a dashboard module that presents a dashboard to a human user that provides a graphical user interface that allows the user to configure the sensor kit system and having sensor kit and a backend system that updates a smart contract, wherein the smart contract verifies one or more conditions put forth by a regulatory body with respect to compliance with a regulation or regulatory action. In embodiments, provided herein is a sensor kit system having a backend system that includes a dashboard module that presents a dashboard to a human user that provides a graphical user interface that allows the user to configure the sensor kit system and having a sensor, an edge device, and a gateway device that communicates with a communication network on behalf of the sensor kit.

In embodiments, provided herein is a sensor kit system having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit. In embodiments, provided herein is a sensor kit system having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit and having a sensor kit and a backend system that updates a distributed ledger based on sensor data provided by the sensor kit. In embodiments, provided herein is a sensor kit system having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit and having a sensor kit and a backend system that updates a smart contract defining a condition that may trigger an action based on sensor data received from the sensor kit. In embodiments, provided herein is a sensor kit system having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit and having a distributed ledger that is at least partially shared with a regulatory body to provide information related to compliance with a regulation or regulatory action. In embodiments, provided herein is a sensor kit system having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit system having a sensor kit and a backend system that includes a configuration module that maintains configurations of the sensor kit and configures a sensor kit network by transmitting configuration requests to sensor devices, generating device records based on responses to the configuration requests, and/or adding new sensors to the sensor kit and having a sensor, an edge device, and a gateway device that communicates with a communication network on behalf of the sensor kit.

In embodiments, provided herein is a sensor kit system having a sensor kit and a backend system that updates a distributed ledger based on sensor data provided by the sensor kit. In embodiments, provided herein is a sensor kit system having a sensor kit and a backend system that updates a distributed ledger based on sensor data provided by the sensor kit and having a sensor kit and a backend system that updates a smart contract defining a condition that may trigger an action based on sensor data received from the sensor kit. In embodiments, provided herein is a sensor kit system having a sensor kit and a backend system that updates a distributed ledger based on sensor data provided by the sensor kit and having a distributed ledger that is at least partially shared with a regulatory body to provide information related to compliance with a regulation or regulatory action. In embodiments, provided herein is a sensor kit system having a sensor kit and a backend system that updates a distributed ledger based on sensor data provided by the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit system having a sensor kit and a backend system that updates a distributed ledger based on sensor data provided by the sensor kit and having a sensor, an edge device, and a gateway device that communicates with a communication network on behalf of the sensor kit.

In embodiments, provided herein is a sensor kit system having a sensor kit and a backend system that updates a smart contract defining a condition that may trigger an action based on sensor data received from the sensor kit. In embodiments, provided herein is a sensor kit system having a sensor kit and a backend system that updates a smart contract defining a condition that may trigger an action based on sensor data received from the sensor kit and having a distributed ledger that is at least partially shared with a regulatory body to provide information related to compliance with a regulation or regulatory action. In embodiments, provided herein is a sensor kit system having a sensor kit and a backend system that updates a smart contract defining a condition that may trigger an action based on sensor data received from the sensor kit and having sensor kit and a backend system that updates a smart contract, wherein the smart contract verifies one or more conditions put forth by a regulatory body with respect to compliance with a regulation or regulatory action. In embodiments, provided herein is a sensor kit system having a sensor kit and a backend system that updates a smart contract defining a condition that may trigger an action based on sensor data received from the sensor kit and having a sensor, an edge device, and a gateway device that communicates with a communication network on behalf of the sensor kit.

In embodiments, provided herein is a sensor kit system having a distributed ledger that is at least partially shared with a regulatory body to provide information related to compliance with a regulation or regulatory action. In embodiments, provided herein is a sensor kit system having a distributed ledger that is at least partially shared with a regulatory body to provide information related to compliance with a regulation or regulatory action and having sensor kit and a backend system that updates a smart contract, wherein the smart contract verifies one or more conditions put forth by a regulatory body with respect to compliance with a regulation or regulatory action. In embodiments, provided herein is a sensor kit system having a distributed ledger that is at least partially shared with a regulatory body to provide information related to compliance with a regulation or regulatory action and having a sensor, an edge device, and a gateway device that communicates with a communication network on behalf of the sensor kit.

In embodiments, provided herein is a sensor kit system having sensor kit and a backend system that updates a smart contract, wherein the smart contract verifies one or more conditions put forth by a regulatory body with respect to compliance with a regulation or regulatory action. In embodiments, provided herein is a sensor kit system having sensor kit and a backend system that updates a smart contract, wherein the smart contract verifies one or more conditions put forth by a regulatory body with respect to compliance with a regulation or regulatory action and having a sensor, an edge device, and a gateway device that communicates with a communication network on behalf of the sensor kit.

In embodiments, provided herein is a sensor kit having a sensor, an edge device, and a gateway device that communicates with a communication network on behalf of the sensor kit.

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like. The processor may be or may include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable the execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, Internet server, intranet server, cloud server, and other variants such as a secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, Internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flowcharts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flowchart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium. The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples but is to be understood in the broadest sense allowable by law.

The use of the terms "a" and "an" and "the" and similar referents in the context of describing the disclosure (especially in the context of the following claims) is to be construed to cover both the singular and the plural unless otherwise indicated herein or clearly contradicted by context. The terms "comprising," "having," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A system comprising:
   a backend system; and
   a sensor kit configured to monitor an industrial setting, the sensor kit comprising:
      an edge device; and
      a plurality of sensors that capture sensor data and transmit the sensor data via a self-configuring sensor kit network, wherein the plurality of sensors includes one or more sensors of a first sensor type and one or more sensors of a second sensor type, wherein at least one sensor of the plurality of sensors comprises:
         a sensing component that captures sensor measurements and outputs instances of sensor data;
         a processing unit that generates reporting packets based on one or more instances of sensor data and outputs the reporting packets, wherein each reporting packet includes routing data and one or more instances of sensor data; and
         a communication device configured to receive reporting packets from the processing unit and to transmit the reporting packets to the edge device via the self-configuring sensor kit network in accordance with a first communication protocol;
      wherein the edge device comprises:
         a communication system having:
            a first communication device that receives reporting packets from the plurality of sensors via the self-configuring sensor kit network; and
            a second communication device that transmits sensor kit packets to a backend system via a public network; and
         a processing system having one or more processors that execute computer-executable instructions that cause the processing system to:
            receive the reporting packets from the communication system;
            perform one or more edge operations on the instances of sensor data in the reporting packets;
            generate the sensor kit packets based on the instances of sensor data, wherein each sensor kit packet includes at least one instance of sensor data; and
            output the sensor kits packets to the communication system, wherein the communication system transmits the sensor kit packets to the backend system via the public network;
      wherein the backend system comprises:
         a backend storage system that stores a sensor kit data store that stores sensor data received from one or more respective sensor kits, including the sensor kit; and
         a backend processing system having one or more processors that execute computer-executable instructions that cause the backend processing system to:
            receive the sensor kit packets from the sensor kit;
            determine the sensor data collected by the sensor kit based on the sensor kit packets;
            perform one or more backend operations on the sensor data collected by the sensor kit; and
            store the sensor data collected by the sensor kit in the sensor kit data store.

2. The system of claim 1, wherein the sensor kit further comprises a gateway device, wherein the gateway device is configured to receive sensor kit packets from the edge device via a wired communication link and transmit the sensor kit packets to the backend system via the public network on behalf of the edge device.

3. The system of claim 2, wherein the gateway device includes a satellite terminal device that is configured to transmit the sensor kit packets to a satellite that routes the sensor kits to the public network.

4. The system of claim 2, wherein the gateway device includes a cellular chipset that is pre-configured to transmit sensor kit packets to a cellphone tower of a preselected cellular provider.

5. The system of claim 1, wherein the second communication device of the edge device is a satellite terminal device that is configured to transmit the sensor kit packets to a satellite that routes the sensor kits to the public network.

6. The system of claim 1, wherein the edge device further comprises one or more storage devices that store a sensor data store that stores instances of sensor data captured by the plurality of sensors of the sensor kit.

7. The system of claim 1, wherein the edge device further comprises one or more storage devices that store a model data store that stores one or more machine-learned models that are each trained to predict or classify a condition of an industrial component of the industrial setting and/or the industrial setting based on a set of features that are derived from instances of sensor data captured by one or more of the plurality of sensors.

8. The system of claim 7, wherein performing one or more edge operations includes:
- generating a feature vector based on one or more instances of sensor data received from one or more sensors of the plurality of sensors;
- inputting the feature vector to the machine-learned model to obtain a prediction or classification relating to a condition of a particular industrial component of the industrial setting or the industrial setting and a degree of confidence corresponding to the prediction or classification; and
- selectively encoding the one or more instances of sensor data prior to transmission to the backend system based on the condition or prediction.

9. The system of claim 8, wherein selectively encoding the one or more instances of sensor data includes: in response to obtaining one or more predictions or classifications relating to conditions of respective industrial components of the industrial setting and the industrial setting that collectively indicate that there are likely no issues relating to any industrial component of the industrial setting and the industrial setting, compressing the one or more instances of sensor data using a lossy codec.

10. The system of claim 9, wherein compressing the one or more instances of sensor data using the lossy codec includes:
- normalizing the one or more instances of sensor data into respective pixel values;
- encoding the respective pixel values into a media content frame; and
- compressing a block of media content frames using the lossy codec to obtain a compressed block, wherein the lossy codec is a video codec and the compressed block includes the media content frame and one or more other media content frames that include normalized pixel values of other instances of sensor data.

11. The system of claim 10, wherein the backend system receives the compressed block in one or more sensor kit packets and determines the sensor data collected by the sensor kit by decompressing the compressed block using the lossy codec.

12. The system of claim 8, wherein selectively encoding the one or more instances of sensor data includes:
- in response to obtaining a prediction or classification relating to a condition of a particular industrial component or the industrial setting that indicates that there is likely an issue relating to the particular industrial component or the industrial setting, compressing the one or more instances of sensor data using a lossless codec.

13. The system of claim 8, wherein selectively encoding the one or more instances of sensor data includes:
- in response to obtaining a prediction or classification relating to a condition of a particular industrial component or the industrial setting that indicates that there is likely an issue relating to the particular industrial component or the industrial setting, refraining from compressing the one or more instances of sensor data.

14. The system of claim 8, wherein selectively encoding the one or more instances of sensor data includes selecting a stream of sensor data instances for uncompressed transmission.

15. The system of claim 7, wherein performing one or more edge operations includes:
- generating a feature vector based on one or more instances of sensor data received from one or more sensors of the plurality of sensors;
- inputting the feature vector to the machine-learned model to obtain a prediction or classification relating to a condition of a particular industrial component of the industrial setting or the industrial setting and a degree of confidence corresponding to the prediction or classification; and
- selectively storing the one or more instances of sensor data in a storage device of the edge device based on the prediction or classification.

16. The system of claim 15, wherein selectively storing the one or more instances of sensor data includes: in response to obtaining one or more predictions or classifications relating to conditions of respective industrial components of the industrial setting and the industrial setting that collectively indicate that there are likely no issues relating to any industrial component of the industrial setting and the industrial setting, storing the one or more instances of sensor data in the storage device with an expiry, such that the one or more instances of sensor data are purged from the storage device in accordance with the expiry.

17. The system of claim 15, wherein selectively storing the one or more instances of sensor data includes:
- in response to obtaining a prediction or classification relating to a condition of a particular industrial component or the industrial setting that indicates that there is likely an issue relating to the particular industrial component or the industrial setting, storing the one or more instances of sensor data in the storage device indefinitely.

18. The system of claim 1, wherein the self-configuring sensor kit network is a star network such that each sensor of the plurality of sensors transmits respective instances of sensor data with the edge device directly using a short-range communication protocol.

19. The system of claim 18, wherein the computer-executable instructions further cause the one or more processors of the edge device to initiate configuration of the self-configuring sensor kit network.

20. The system of claim 1, wherein the self-configuring sensor kit network is a mesh network such that:
- the communication device of each sensor of the plurality of sensors is configured to establish a communication channel with at least one other sensor of the plurality of sensors;
- at least one sensor of the plurality of sensors is configured to receive instances of sensor data from one or more other sensors of the plurality of sensors and to route the received instances of the sensor data towards the edge device.

21. The system of claim 20, wherein the computer-executable instructions further cause the one or more processors of the edge device to initiate configuration of the self-configuring sensor kit network, wherein the plurality of sensors form the mesh network in response to the edge device initiating configuration of the self-configuring sensor kit network.

22. The system of claim 1, wherein the self-configuring sensor kit network is a hierarchical network.

23. The system of claim 22, wherein the sensor kit further comprises one or more collection devices configured to receive reporting packets from one or more sensors of the plurality of sensors and route the reporting packets to the edge device.

24. The system of claim 1, wherein the backend operations include performing one or more analytics tasks using the sensor data.

25. The system of claim 1, wherein the backend operations include performing one or more artificial intelligence tasks using the sensor data.

26. The system of claim 1, wherein the backend operations include issuing a notification to a human user associated with the industrial setting based on the sensor data.

27. The system of claim 1, wherein the backend operations include controlling at least one component of the industrial setting based on the sensor data.

* * * * *